US012360733B2

(12) United States Patent
Carrigan

(10) Patent No.: US 12,360,733 B2
(45) Date of Patent: Jul. 15, 2025

(54) SYSTEMS, METHODS, AND GRAPHICAL USER INTERFACES FOR SELECTING AUDIO OUTPUT MODES OF WEARABLE AUDIO OUTPUT DEVICES

(71) Applicant: Apple Inc., Cupertino, CA (US)

(72) Inventor: Taylor G. Carrigan, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/443,162

(22) Filed: Feb. 15, 2024

(65) Prior Publication Data

US 2024/0184513 A1    Jun. 6, 2024

Related U.S. Application Data

(63) Continuation of application No. 17/379,864, filed on Jul. 19, 2021, now Pat. No. 11,941,319.
(Continued)

(51) Int. Cl.
*G06F 3/16* (2006.01)
*G06F 3/04842* (2022.01)
(Continued)

(52) U.S. Cl.
CPC .......... *G06F 3/165* (2013.01); *G06F 3/04842* (2013.01); *H04R 5/04* (2013.01);
(Continued)

(58) Field of Classification Search
CPC ....... G06F 3/165; G06F 3/04842; H04R 5/04; H04S 7/301; H04S 7/303; H04S 2400/01; H04S 2420/01
See application file for complete search history.

(56) References Cited

U.S. PATENT DOCUMENTS 5,003,607 A    3/1991  Reed
8,126,399 B1   2/2012  Lee
(Continued)

FOREIGN PATENT DOCUMENTS

CN    102439972 A    5/2012
CN    104054323 A    9/2014
(Continued)

OTHER PUBLICATIONS

Aguilera et al., "Spatial Audio for Audioconferencing in Mobile Devices: Investigating the Importance of Virtual Mobility and Private Communication and Optimizations", https://www.aes.og/e-lib=18138, 4 pages.
(Continued)

*Primary Examiner* — Fan S Tsang
*Assistant Examiner* — David Siegel
(74) *Attorney, Agent, or Firm* — Morgan, Lewis & Bockius LLP

(57) ABSTRACT

An electronic device, while displaying a first interface, receives a request to display an audio settings interface. In response, the electronic device displays the audio settings interface, including a first interface element that enables a first audio mode of an audio output device. Displaying the audio settings interface includes: if the first audio mode is enabled and the electronic device is causing audio that is configured for output using the first audio mode to be output using the first audio mode, displaying the first interface element with a first indication that the first audio mode is being used; and if the first audio mode is enabled and the electronic device is not causing audio to be output using the first audio mode, displaying the first interface element without displaying the first indication that the first audio mode is being used.

51 Claims, 71 Drawing Sheets

Related U.S. Application Data

(60) Provisional application No. 63/197,481, filed on Jun. 6, 2021, provisional application No. 63/054,194, filed on Jul. 20, 2020.

(51) Int. Cl.
*H04R 5/04* (2006.01)
*H04S 7/00* (2006.01)

(52) U.S. Cl.
CPC .............. *H04S 7/301* (2013.01); *H04S 7/303* (2013.01); *H04S 2400/01* (2013.01); *H04S 2420/01* (2013.01)

(56) References Cited

U.S. PATENT DOCUMENTS

| | | | |
|---|---|---|---|
| 8,290,537 B2 | 10/2012 | Lee et al. |
| 8,831,238 B2 | 9/2014 | Rashid et al. |
| 8,971,546 B2 | 3/2015 | Millington et al. |
| 9,148,717 B2 | 9/2015 | Shaffer |
| 9,210,498 B1 | 12/2015 | Shaffer |
| 9,342,354 B2 | 5/2016 | Banda |
| 9,344,801 B2 | 5/2016 | Yoo et al. |
| 9,385,546 B2 | 7/2016 | Wakayama et al. |
| 9,398,367 B1 | 7/2016 | Scott et al. |
| 9,729,958 B2 | 8/2017 | Jaques et al. |
| 9,807,491 B2 | 10/2017 | Kim |
| 9,894,452 B1 | 2/2018 | Termeulen et al. |
| 9,936,297 B2 | 4/2018 | Dennis |
| 9,949,015 B1 | 4/2018 | Minoo et al. |
| 9,949,021 B1 | 4/2018 | Voigt et al. |
| 10,042,595 B2 | 8/2018 | Behzadi et al. |
| 10,045,111 B1 | 8/2018 | Bonner et al. |
| 10,133,358 B1 | 11/2018 | Chen et al. |
| 10,136,214 B2 | 11/2018 | Smus et al. |
| 10,142,577 B1 | 11/2018 | Laird |
| 10,157,037 B2 | 12/2018 | Patel et al. |
| 10,165,347 B2 | 12/2018 | Pantfoerder et al. |
| 10,200,780 B2 | 2/2019 | Steiner |
| 10,405,165 B2 | 9/2019 | Llami et al. |
| 10,423,381 B2 | 9/2019 | Utsuki et al. |
| 10,560,773 B1 | 2/2020 | Roadley-Battin et al. |
| 10,628,105 B2 | 4/2020 | Behzadi et al. |
| 10,735,554 B1 | 8/2020 | Jorgovanovic |
| 10,873,798 B1 | 12/2020 | Jackson et al. |
| 10,951,043 B2 | 3/2021 | Behzadi et al. |
| 11,006,201 B2 | 5/2021 | Kumar et al. |
| 11,018,516 B2 | 5/2021 | Cho et al. |
| 11,089,398 B1 | 8/2021 | Venkatraman et al. |
| 11,115,746 B1 | 9/2021 | Morrison et al. |
| 11,204,733 B2 | 12/2021 | Behzadi et al. |
| 11,211,819 B2 | 12/2021 | Ng et al. |
| 11,228,625 B1 | 1/2022 | Libin |
| 11,240,583 B1 | 2/2022 | DeMaio |
| 11,258,280 B2 | 2/2022 | Li |
| 11,269,575 B2 | 3/2022 | Behzadi et al. |
| 11,688,382 B2 | 6/2023 | Hull et al. |
| 2003/0202341 A1 | 10/2003 | McClanahan |
| 2003/0223604 A1 | 12/2003 | Nakagawa |
| 2006/0135218 A1 | 6/2006 | Son et al. |
| 2006/0166718 A1 | 7/2006 | Seshadri et al. |
| 2006/0193487 A1 | 8/2006 | Mok et al. |
| 2006/0200358 A1 | 9/2006 | Ohnemus et al. |
| 2007/0206829 A1 | 9/2007 | Weinans et al. |
| 2007/0213092 A1 | 9/2007 | Geelen |
| 2007/0300063 A1 | 12/2007 | Adams et al. |
| 2008/0065720 A1 | 3/2008 | Brodersen et al. |
| 2008/0076489 A1 | 3/2008 | Rosener et al. |
| 2008/0152160 A1 | 6/2008 | Chew et al. |
| 2008/0166968 A1 | 7/2008 | Tang et al. |
| 2008/0226094 A1 | 9/2008 | Rutschman |
| 2008/0248748 A1 | 10/2008 | Sangster et al. |
| 2008/0280655 A1 | 11/2008 | Ozaki |
| 2009/0081999 A1 | 3/2009 | Khasawneh et al. |
| 2009/0170431 A1 | 7/2009 | Pering et al. |
| 2009/0280871 A1 | 11/2009 | Hofer et al. |
| 2010/0041333 A1 | 2/2010 | Ungari et al. |
| 2010/0074451 A1 | 3/2010 | Usher et al. |
| 2010/0110368 A1 | 5/2010 | Chaum |
| 2010/0309284 A1 | 12/2010 | Samadani et al. |
| 2010/0310087 A1 | 12/2010 | Ishida |
| 2010/0320961 A1 | 12/2010 | Castillo et al. |
| 2011/0116643 A1 | 5/2011 | Tiscareno et al. |
| 2011/0159959 A1 | 6/2011 | Mallinson et al. |
| 2011/0222701 A1 | 9/2011 | Donaldson et al. |
| 2011/0286615 A1 | 11/2011 | Olodort et al. |
| 2012/0096188 A1 | 4/2012 | Cohen et al. |
| 2012/0144473 A1 | 6/2012 | Wyld |
| 2012/0215366 A1 | 8/2012 | Redmond et al. |
| 2012/0262537 A1 | 10/2012 | Baker et al. |
| 2012/0289157 A1 | 11/2012 | Palin et al. |
| 2012/0317194 A1 | 12/2012 | Tian |
| 2013/0010975 A1 | 1/2013 | Tsingos et al. |
| 2013/0121494 A1 | 5/2013 | Johnston |
| 2013/0154917 A1 | 6/2013 | Adermann et al. |
| 2013/0182867 A1 | 7/2013 | Knowles |
| 2013/0300463 A1 | 11/2013 | Gemmeke et al. |
| 2013/0311694 A1 | 11/2013 | Bhamidipati et al. |
| 2013/0316679 A1 | 11/2013 | Miller et al. |
| 2014/0016803 A1 | 1/2014 | Puskarich |
| 2014/0037104 A1 | 2/2014 | Seo et al. |
| 2014/0126733 A1 | 5/2014 | Gauger, Jr. et al. |
| 2014/0126734 A1 | 5/2014 | Gauger, Jr. et al. |
| 2014/0143744 A1 | 5/2014 | Dimond |
| 2014/0152235 A1 | 6/2014 | Huang et al. |
| 2014/0247948 A1 | 9/2014 | Goldstein |
| 2014/0270200 A1 | 9/2014 | Usher et al. |
| 2014/0341399 A1 | 11/2014 | Dusse et al. |
| 2015/0045921 A1* | 2/2015 | Stewart ............ H04M 1/72403 700/94 |
| 2015/0054458 A1 | 2/2015 | Yoon et al. |
| 2015/0102879 A1 | 4/2015 | Jacobs et al. |
| 2015/0110263 A1 | 4/2015 | Johnston |
| 2015/0121328 A1 | 4/2015 | Segal |
| 2015/0200558 A1 | 7/2015 | Castillo et al. |
| 2015/0230022 A1 | 8/2015 | Sakai et al. |
| 2015/0245126 A1 | 8/2015 | Shaffer |
| 2015/0245127 A1 | 8/2015 | Shaffer |
| 2015/0281830 A1 | 10/2015 | Gauger, Jr. et al. |
| 2015/0294662 A1 | 10/2015 | Ibrahim |
| 2015/0310846 A1 | 10/2015 | Andersen et al. |
| 2015/0319554 A1 | 11/2015 | Blanche et al. |
| 2015/0331940 A1 | 11/2015 | Manning |
| 2015/0351143 A1 | 12/2015 | Seymour et al. |
| 2016/0007140 A1 | 1/2016 | Yae et al. |
| 2016/0014492 A1 | 1/2016 | McCarthy et al. |
| 2016/0029114 A1 | 1/2016 | Chen |
| 2016/0071409 A1 | 3/2016 | Suomela et al. |
| 2016/0072936 A1 | 3/2016 | Kim et al. |
| 2016/0073249 A1 | 3/2016 | Moore et al. |
| 2016/0077843 A1 | 3/2016 | Jakoboski et al. |
| 2016/0094934 A1 | 3/2016 | Yang et al. |
| 2016/0109931 A1 | 4/2016 | Kobayashi |
| 2016/0119708 A1 | 4/2016 | Rodzevski et al. |
| 2016/0134141 A1 | 5/2016 | Jentz et al. |
| 2016/0165381 A1 | 6/2016 | Kapoor et al. |
| 2016/0180806 A1 | 6/2016 | Sharp et al. |
| 2016/0219358 A1 | 7/2016 | Shaffer et al. |
| 2016/0241972 A1 | 8/2016 | Gobeli et al. |
| 2016/0291666 A1 | 10/2016 | Hosoya et al. |
| 2016/0327911 A1 | 11/2016 | Eim et al. |
| 2016/0351183 A1 | 12/2016 | Gauger, Jr. et al. |
| 2017/0013345 A1 | 1/2017 | Kumar et al. |
| 2017/0026509 A1 | 1/2017 | Rand |
| 2017/0048613 A1 | 2/2017 | Smus et al. |
| 2017/0078820 A1 | 3/2017 | Brandenburg et al. |
| 2017/0108906 A1 | 4/2017 | Chandra et al. |
| 2017/0134845 A1 | 5/2017 | Milam et al. |
| 2017/0140089 A1 | 5/2017 | Hathaway et al. |
| 2017/0180840 A1 | 6/2017 | Yamkovoy |
| 2017/0192746 A1* | 7/2017 | Jeong ................ G06F 3/04886 |
| 2017/0193974 A1 | 7/2017 | Gadonniex et al. |
| 2017/0195466 A1 | 7/2017 | Chen |
| 2017/0214994 A1 | 7/2017 | Gadonniex et al. |

(56) References Cited

U.S. PATENT DOCUMENTS

| | | |
|---|---|---|
| 2017/0245039 A1 | 8/2017 | Chen |
| 2017/0251295 A1 | 8/2017 | Pergament et al. |
| 2017/0256978 A1 | 9/2017 | Sauterel et al. |
| 2017/0293577 A1 | 10/2017 | Gomzin et al. |
| 2017/0318374 A1 | 11/2017 | Dolenc et al. |
| 2017/0339483 A1 | 11/2017 | Ergezer et al. |
| 2018/0014973 A1 | 1/2018 | Echeverri et al. |
| 2018/0048960 A1 | 2/2018 | Jeffrey et al. |
| 2018/0067712 A1 | 3/2018 | Behzadi et al. |
| 2018/0081453 A1 | 3/2018 | Ely |
| 2018/0088897 A1 | 3/2018 | Mathur |
| 2018/0091887 A1 | 3/2018 | Minoo et al. |
| 2018/0114518 A1 | 4/2018 | Scanlan et al. |
| 2018/0132088 A1 | 5/2018 | Lee |
| 2018/0152781 A1 | 5/2018 | Boyer et al. |
| 2018/0206022 A1 | 7/2018 | Hsieh |
| 2018/0206025 A1 | 7/2018 | Rule et al. |
| 2018/0242085 A1 | 8/2018 | Dohmen et al. |
| 2018/0249266 A1 | 8/2018 | Termeulen et al. |
| 2018/0277123 A1 | 9/2018 | Boesen et al. |
| 2018/0279063 A1 | 9/2018 | Sun et al. |
| 2018/0286428 A1 | 10/2018 | Seider |
| 2018/0295439 A1 | 10/2018 | Garrett |
| 2018/0295455 A1 | 10/2018 | Eichfeld et al. |
| 2018/0301134 A1 | 10/2018 | Le et al. |
| 2018/0310116 A1 | 10/2018 | Arteaga et al. |
| 2018/0341448 A1 | 11/2018 | Behzadi et al. |
| 2018/0376528 A1 | 12/2018 | Lee et al. |
| 2019/0007780 A1* | 1/2019 | Sheaffer ............... G06T 7/20 |
| 2019/0052951 A1 | 2/2019 | Kofman et al. |
| 2019/0075385 A1 | 3/2019 | Lee et al. |
| 2019/0081499 A1 | 3/2019 | Sun et al. |
| 2019/0124432 A1 | 4/2019 | Champy |
| 2019/0155487 A1 | 5/2019 | Zhao et al. |
| 2019/0179604 A1 | 6/2019 | Alexander et al. |
| 2019/0215611 A1 | 7/2019 | Lou et al. |
| 2019/0227536 A1 | 7/2019 | Cella et al. |
| 2019/0278556 A1 | 9/2019 | Usher et al. |
| 2019/0305591 A1 | 10/2019 | Ng et al. |
| 2019/0313178 A1 | 10/2019 | Mutlu et al. |
| 2019/0320282 A1 | 10/2019 | Moeller |
| 2019/0339825 A1 | 11/2019 | Anzures et al. |
| 2019/0341050 A1 | 11/2019 | Diamant et al. |
| 2019/0361666 A1 | 11/2019 | Oide et al. |
| 2019/0394607 A1 | 12/2019 | Laaksonen et al. |
| 2020/0007989 A1 | 1/2020 | Gong et al. |
| 2020/0014792 A1 | 1/2020 | Lyren et al. |
| 2020/0067340 A1 | 2/2020 | Batra et al. |
| 2020/0120384 A1 | 4/2020 | Armaly |
| 2020/0150740 A1 | 5/2020 | Zhang et al. |
| 2020/0169101 A1 | 5/2020 | Li |
| 2020/0204484 A1 | 6/2020 | Altman |
| 2020/0213705 A1 | 7/2020 | Ding et al. |
| 2020/0213799 A1 | 7/2020 | Lyren |
| 2020/0218486 A1 | 7/2020 | Behzadi et al. |
| 2020/0275223 A1 | 8/2020 | Usher et al. |
| 2020/0367006 A1 | 11/2020 | Beckhardt |
| 2021/0014610 A1 | 1/2021 | Carrigan et al. |
| 2021/0014611 A1 | 1/2021 | Carrigan et al. |
| 2021/0014612 A1 | 1/2021 | Carrigan |
| 2021/0014613 A1 | 1/2021 | Carrigan et al. |
| 2021/0092543 A1* | 3/2021 | Salehin ............... H04S 3/006 |
| 2021/0126470 A1 | 4/2021 | Banerjee et al. |
| 2021/0210967 A1 | 7/2021 | Xiongbin |
| 2021/0218595 A1 | 7/2021 | Liu et al. |
| 2021/0255816 A1 | 8/2021 | Behzadi et al. |
| 2021/0258419 A1 | 8/2021 | Lyren et al. |
| 2021/0281943 A1 | 9/2021 | Lehnert |
| 2021/0319778 A1 | 10/2021 | Lerner et al. |
| 2021/0329367 A1 | 10/2021 | Fletcher et al. |
| 2021/0376880 A1 | 12/2021 | Carrigan et al. |
| 2021/0377663 A1 | 12/2021 | Carrigan et al. |
| 2021/0391739 A1 | 12/2021 | Venkatraman et al. |
| 2022/0078864 A1 | 3/2022 | Yang et al. |
| 2022/0103963 A1 | 3/2022 | Satongar et al. |
| 2022/0107771 A1 | 4/2022 | Behzadi et al. |
| 2022/0256275 A1 | 8/2022 | Bang et al. |
| 2022/0337969 A1* | 10/2022 | Seefeldt ............... H04R 29/005 |
| 2022/0374197 A1 | 11/2022 | Carrigan |
| 2023/0007398 A1 | 1/2023 | Carrigan |
| 2023/0020542 A1 | 1/2023 | Satongar et al. |
| 2023/0246671 A1 | 8/2023 | Carrigan et al. |
| 2024/0078079 A1 | 3/2024 | Carrigan et al. |
| 2025/0063303 A1 | 2/2025 | Carrigan et al. |
| 2025/0138767 A1 | 5/2025 | Behzadi et al. |
| 2025/0158660 A1 | 5/2025 | Carrigan et al. |

FOREIGN PATENT DOCUMENTS

| | | |
|---|---|---|
| CN | 104365173 A | 2/2015 |
| CN | 106291121 A | 1/2017 |
| CN | 206759683 U | 12/2017 |
| EP | 2190213 A1 | 5/2010 |
| EP | 3188495 A1 | 7/2017 |
| EP | 3001695 B1 | 7/2018 |
| EP | 3456299 A1 | 3/2019 |
| EP | 3599777 A1 | 1/2020 |
| EP | 3664092 A1 | 6/2020 |
| JP | 2009-532937 | 9/2009 |
| JP | 2011-521504 | 7/2011 |
| JP | 2013-051626 A | 3/2013 |
| JP | 2016-076202 A | 5/2016 |
| JP | 2017-126873 A | 7/2017 |
| JP | 2022-078056 A | 5/2022 |
| KR | 101236167 B1 | 2/2013 |
| KR | 2014-0018701 A | 2/2014 |
| KR | 2015-0021803 A | 3/2015 |
| KR | 101518010 B1 | 5/2015 |
| KR | 2016-0098522 A | 8/2016 |
| KR | 2016-0103779 A | 9/2016 |
| KR | 2017-0138588 A | 12/2017 |
| KR | 2019-0013880 A | 2/2019 |
| WO | WO 2008/000304 A1 | 1/2008 |
| WO | WO 2012/170446 A2 | 12/2012 |
| WO | WO 2013/030736 A1 | 3/2013 |
| WO | WO 2013/064747 A1 | 5/2013 |
| WO | WO 2015/006950 A1 | 1/2015 |
| WO | WO 2015/185123 A1 | 12/2015 |
| WO | WO 2016/036541 A2 | 3/2016 |
| WO | WO 2016/063143 A1 | 4/2016 |
| WO | WO 2016/066483 A1 | 5/2016 |
| WO | WO 2017203484 A1 | 11/2017 |
| WO | WO 2019/053993 A1 | 3/2019 |
| WO | WO 2020/204611 A1 | 10/2020 |
| WO | WO 2021/136671 A1 | 7/2021 |
| WO | WO 2022/031260 A1 | 2/2022 |

OTHER PUBLICATIONS

Anonymous, "RX-V3800AV Receiver Owner's Manual", Yamaha Music Manuals, Dec. 31, 2007, pp. 35, 36, 44-50.
Samsung Electronics America, Inc., "Gear Icon X SM-R150", User Manual, https://static.bhphtovideo.com/lit_files/268655.pdf, Aug. 6, 2016, 43 pages.
Innovation Patent, dated Aug. 16, 2017, received in Australian Patent Application No. 2017101032, which corresponds with U.S. Appl. No. 15/271,114, 4 pages.
Office Action, dated Nov. 6, 2017, received in Australian Patent Apploocation No. 2017101032, which corresponds with U.S. Appl. No. 15/271,114, 5 pages.
Certificate of Exam, dated May 1, 2018, received in Australian Patent Application No. 2017101032, which corresponds with U.S. Appl. No. 15/271,114, 1 page.
Notice of Acceptance, dated Feb. 19, 2019, received in Australian Patent Application No. 2017324072, which corresponds with U.S. Appl. No. 15/271,114, 3 pages.
Certificate of Grant, dated Jun. 13, 2019, received in Australian Patent Application No. 2017324072, which corresponds with U.S. Appl. No. 15/271,114, 1 page.
Office Action, dated Sep. 25, 2019, received in Chinese Patent Application No. 201710741130.4, which corresponds with U.S. Appl. No. 15/271,114, 5 pages.

(56) References Cited

OTHER PUBLICATIONS

Office Action, dated Jun. 18, 2020, received in Chinese Patent Application No. 201710741130.4, which corresponds with U.S. Appl. No. 15/271,114, 10 pages.
Notice of Allowance, dated Nov. 27, 2020, received in Chinese Patent Application No. 201710741130.4, which corresponds with U.S. Appl. No. 15/271,114, 3 pages.
Patent, dated Jan. 22, 2021, received in Chinese Application No. 201710741130.4, which corresponds with U.S. Appl. No. 15/271,114, 6 pages.
Office Action, dated Dec. 16, 2016, received in Danish Patent Application No. 201670727, which corresponds with U.S. Appl. No. 15/271,114, 7 pages.
Office Action, dated May 29, 2017, received in Danish Patent Application No. 201670727, which corresponds with U.S. Appl. No. 15/271,114, 6 pages.
Office Action, dated Dec. 13, 2017, received in Danish Patent Application No. 201670727, which corresponds with U.S. Appl. No. 15/271,114, 6 pages.
Office Action, dated Aug. 16, 2019, received in European Patent Application No. 17746593.7, which corresponds with U.S. Appl. No. 15/271,114, 6 pages.
Office Action, dated Jul. 5, 2019, received in Japanese Patent Application No. 2019-506652, which corresponds with U.S. Appl. No. 15/271,114, 4 pages.
Notice of Allowance, dated Oct. 18, 2019, received in Japanese Patent Application No. 2019-506652, which corresponds with U.S. Appl. No. 15/271,114, 5 pages.
Patent, dated Nov. 22, 2019, received in Japanese Patent Application No. 2019-506652, which corresponds with U.S. Appl. No. 15/271,114, 3 pages.
Office Action, dated Jun. 17, 2019, received in Korean Patent Application No. 2019-7004211, which corresponds with U.S. Appl. No. 15/271,114, 3 pages.
Notice of Allowance, dated Sep. 17, 2019, received in Korean Patent Application No. 2019-7004211, which corresponds with U.S. Appl. No. 15/271,114, 4 pages.
Patent, dated Dec. 4, 2019, received in Korean Patent Application No. 2019-7004211, which corresponds with U.S. Appl. No. 15/271,114, 4 pages.
Office Action, dated Oct. 3, 2019, received in U.S. Appl. No. 16/056,328, 11 pages.
Notice of Allowance, dated Jan. 15, 2020, received in U.S. Appl. No. 16/056,328, 7 pages.
Notice of Allowance, dated Feb. 22, 2021, received in Australian Patent Application No. 2019203626, which corresponds with U.S. Appl. No. 16/056,328, 3 pages.
Certificate of Grant, dated Jun. 24, 2021, received in Australian Patent Application No. 2019203626, which corresponds with U.S. Appl. No. 16/056,328, 3 pages.
Office Action, dated Jul. 2, 2021, received from Chinese Patent Application No. 202011538744.0, which corresponds with U.S. Appl. No. 16/056,328, 4 pages.
Office Action, dated Dec. 30, 2021, received from Chinese Patent Application No. 202011538744.0, which corresponds with U.S. Appl. No. 16/056,328, 2 pages.
Office Action, dated Mar. 29, 2022, received from Chinese Patent Application No. 202011538744.0, which corresponds with U.S. Appl. No. 16/056,328, 1 page.
Office Action, dated Jan. 19, 2023, received from Chinese Patent Application No. 202011538744.0, which corresponds with U.S. Appl. No. 16/056,328, 1 page.
Patent, dated Jun. 13, 2023, received from Chinese Patent Application No. 202011538744.0, which corresponds with U.S. Appl. No. 16/056,328, 6 pages.
Office Action, dated Jan. 12, 2021, received in Japanese Patent Application No. 2019-207313, which corresponds with U.S. Appl. No. 16/056,328, 5 pages.
Office Action, dated Oct. 18, 2021, received in Japanese Patent Application No. 2019-207313, which corresponds with U.S. Appl. No. 16/056,328, 2 pages.
Notice of Allowance, dated Mar. 11, 2022, received in Japanese Patent Application No. 2019-207313, which corresponds with U.S. Appl. No. 16/056,328, 2 pages.
Patent, dated Mar. 25, 2022, received in Japanese Patent Application No. 2019-207313, which corresponds with U.S. Appl. No. 16/056,328, 3 pages.
Office Action, dated Apr. 6, 2020, received in Korean Patent Application No. 2019-7035730, which corresponds with U.S. Appl. No. 16/056,328, 2 pages.
Notice of Allowance, dated Jun. 23, 2020, received in Korean Patent Application No. 2019-7035730, which corresponds with U.S. Appl. No. 16/056,328, 2 pages.
Patent, dated Sep. 14, 2020, received in Korean Patent Application No. 2019-7035730, which corresponds with U.S. Appl. No. 16/056,328, 3 pages.
Office Action, dated Jun. 24, 2021, received in U.S. Appl. No. 16/920,303, 5 pages.
Notice of Allowance, dated Sep. 14, 2021, received in U.S. Appl. No. 16/920,303, 7 pages.
Office Action, dated Sep. 10, 2021, received in Australian Patent Application No. 2020-239693, which corresponds with U.S. Appl. No. 16/920,303, 2 pages.
Notice of Allowance, dated Oct. 15, 2021, received in Australian Patent Application No. 2020-239693, which corresponds with U.S. Appl. No. 16/920,303, 3 pages.
Patent, dated Feb. 17, 2022, 2022, received in Australian Patent Application No. 2020-239693, which corresponds with U.S. Appl. No. 16/920,303, 3 pages.
Office Action, dated Dec. 21, 2020, received in Danish Patent Application No. 2020-70630, which corresponds with U.S. Appl. No. 16/920,303, 8 pages.
Intention to Grant, Action, dated Mar. 3, 2021, received in Danish Patent Application No. 2020-70630, which corresponds with U.S. Appl. No. 16/920,303, 2 pages.
Notice of Allowance, dated Jun. 10, 2021, received in Danish Patent Application No. 2020-70630, which corresponds with U.S. Appl. No. 16/920,303, 2 pages.
Patent, dated Oct. 14, 2021, received in Danish Patent Application No. 2020-70630, which corresponds with U.S. Appl. No. 16/920,303, 6 pages.
Office Action, dated Oct. 10, 2023, received in European Patent Application No. 20745450.5, which corresponds with U.S. Appl. No. 16/920,303, 9 pages.
Office Action, dated Feb. 21, 2022, received in Indian Patent Application No. 202017041564, which corresponds with U.S. Appl. No. 16/920,303, 6 pages.
Office Action, dated Jan. 7, 2022, received in Japanese Patent Application No. 2020-550113, which corresponds with U.S. Appl. No. 16/920,303, 2 pages.
Office Action, dated Aug. 12, 2022, received in Japanese Patent Application No. 2020-550113, which corresponds with U.S. Appl. No. 16/920,303, 2 pages.
Notice of Allowance, dated Nov. 14, 2022, received in Japanese Patent Application No. 2020-550113, which corresponds with U.S. Appl. No. 16/920,303, 2 pages.
Patent, dated Dec. 8, 2022, received in Japanese Patent Application No. 2020-550113, which corresponds with U.S. Appl. No. 16/920,303, 3 pages.
Office Action, dated Apr. 13, 2022, received in Korean Patent Application No. 2020-7027641, which corresponds with U.S. Appl. No. 16/920,303, 7 pages.
Office Action, dated Oct. 26, 2022, received in Korean Patent Application No. 2020-7027641, which corresponds with U.S. Appl. No. 16/920,303, 3 pages.
Notice of Allowance, dated May 24, 2023, received in Korean Patent Application No. 2020-7027641, which corresponds with U.S. Appl. No. 16/920,303, 2 pages.
Office Action, dated Nov. 24, 2021, received in U.S. Appl. No. 17/023,265, 16 pages.

(56) References Cited

OTHER PUBLICATIONS

Final Office Action, dated Jun. 2, 2022, received in U.S. Appl. No. 17/023,265, 19 pages.
Notice of Allowance, dated Nov. 17, 2022, received in U.S. Appl. No. 17/023,265, 10 pages.
Notice of Allowance, dated Mar. 21, 2023, received in U.S. Appl. No. 17/023,265, 9 pages.
Office Action, dated Sep. 4, 2020, received in U.S. Appl. No. 16/824,506, 17 pages.
Final Office Action, dated Mar. 22, 2021, received in U.S. Appl. No. 16/824,506, 22 pages.
Office Action, dated Aug. 5, 2021, received in U.S. Appl. No. 16/824,506, 20 pages.
Notice of Allowance, dated Oct. 18, 2021, received in U.S. Appl. No. 16/824,506, 9 pages.
Intent to Grant, dated Sep. 29, 2021, received in Australian Patent Application No. 2021201777, which corresponds with U.S. Appl. No. 16/824,506, 3 pages.
Notice of Acceptance, dated Nov. 29, 2021, received in Australian Patent Application No. 2021201777, which corresponds with U.S. Appl. No. 16/824,506, 3 pages.
Patent, dated Mar. 31, 2022, received in Australian Patent Application No. 2021201777, which corresponds with U.S. Appl. No. 16/824,506, 3 pages.
Office Action, dated Jun. 9, 2021, received in Chinese Patent Application No. 202011544171.2, which corresponds with U.S. Appl. No. 16/824,506, 1 page.
Office Action, dated Nov. 11, 2021, received in Chinese Patent Application No. 202011544171.2, which corresponds with U.S. Appl. No. 16/824,506. (English translation is provided.) 5 pages.
Office Action, dated Jun. 29, 2022, received in Chinese Patent Application No. 202011544171.2, which corresponds with U.S. Appl. No. 16/824,506, 5 pages.
Patent, dated Nov. 28, 2023, received in Chinese Patent Application No. 202011544171.2, which corresponds with U.S. Appl. No. 16/824,506, 6 pages.
Notice of Allowance, dated May 24, 2021, received in Korean Patent Application No. 2020-7026460, which corresponds with U.S. Appl. No. 16/824,506, 2 pages.
Notice of Allowance, dated Feb. 1, 2022, received in U.S. Appl. No. 17/031,637, 26 pages.
Notice of Allowance, dated Mar. 21, 2022, received in U.S. Appl. No. 17/031,637, 7 pages.
Notice of Allowance, dated Aug. 29, 2022, received in U.S. Appl. No. 17/483,741, 42 pages.
Office Action, dated Jan. 1, 2021, received in U.S. Appl. No. 17/028,936, 16 pages.
Final Office Action, dated Apr. 9, 2021, received in U.S. Appl. No. 17/028,936, 17 pages.
Notice of Allowance, dated Aug. 20, 2021, received in U.S. Appl. No. 17/028,936, 7 pages.
Notice of Allowance, dated Sep. 29, 2021, received in U.S. Appl. No. 17/028,936, 7 pages.
Office Action, dated Oct. 7, 2022, received in Australian Patent Application No. 2021245251, which corresponds with U.S. Appl. No. 17/028,936, 3 pages
Office Action, dated Jan. 18, 2023, received in Australian Patent Application No. 2021245251, which corresponds with U.S. Appl. No. 17/028,936, 3 pages.
Office Action, dated Jan. 29, 2021, received in Danish Patent Application No. 2020-70718, which corresponds with U.S. Appl. No. 17/028,936, 7 pages.
Office Action, dated Oct. 22, 2021, received in Danish Patent Application No. 2020-70718, which corresponds with U.S. Appl. No. 17/028,936, 4 pages.
Intention to Grant, dated Jan. 7, 2022, received in Danish Patent Application No. 2020-70718, which corresponds with U.S. Appl. No. 17/028,936, 2 pages.
Notice of Allowance, dated Apr. 26, 2022, received in Danish Patent Application No. 2020-70718, which corresponds with U.S. Appl. No. 17/028,936, 2 pages.
Patent, dated Aug. 11, 2022, received in Danish Patent Application No. 2020-70718, which corresponds with U.S. Appl. No. 17/028,936, 3 pages.
Patent, dated Jul. 19, 2023. received in European Patent Application No. 23175376.5, which corresponds with U.S. Appl. No. 17/028,936, 3 pages.
Office Action, dated May 25, 2022, received in U.S. Appl. No. 17/028,943, 5 pages.
Notice of Allowance, dated Jun. 29, 2022, received in U.S. Appl. No. 17/028,943, 7 pages.
Office Action, dated Jan. 29, 2021, received in Danish Patent Application No. 2020-70719, which corresponds with U.S. Appl. No. 17/028,936, 7 pages.
Intention to Grant, dated Aug. 27, 2021, received in Danish Patent Application No. 2020-70719, which corresponds with U.S. Appl. No. 17/028,936, 2 pages.
Notice of Allowance, dated Dec. 16, 2021, received in Danish Patent Application No. 2020-70719, which corresponds with U.S. Appl. No. 17/028,936, 2 pages.
Patent, dated Mar. 21, 2022, received in Danish Patent Application No. 2020-70719, which corresponds with U.S. Appl. No. 17/028,936, 5 pages.
Intent to Grant, dated Feb. 1, 2023, received from European Patent Application No. 22161118.9, which corresponds with U.S. Appl. No. 17/028,936, 8 pages.
Decision to Grant, dated Jun. 22, 2023, received from European Patent Application No. 22161118.9, which corresponds with U.S. Appl. No. 17/028,936, 3 pages.
Office Action, dated Dec. 24, 2020, received in U.S. Appl. No. 17/028,947, 10 pages.
Final Office Action, dated Mar. 17, 2021, received in U.S. Appl. No. 17/028,947, 8 pages.
Office Action, dated Sep. 27, 2021, received in U.S. Appl. No. 17/028,947, 10 pages.
Notice of Allowance, dated Dec. 13, 2021, received in U.S. Appl. No. 17/028,947, 5 pages.
Office Action, dated Feb. 2, 2021, received in Danish Patent Application No. 202070720, which corresponds with U.S. Appl. No. 17/028,947, 3 pages.
Office Action, dated Nov. 4, 2021, received in Danish Patent Application No. 202070720, which corresponds with U.S. Appl. No. 17/028,947, 3 pages.
Intent to Grant, dated May 5, 2022, received in Danish Patent Application No. 202070720, which corresponds with U.S. Appl. No. 17/028,947, 2 pages.
Notice of Allowance, dated Jul. 28, 2022, received in Danish Patent Application No. 202070720, which corresponds with U.S. Appl. No. 17/028,947, 2 pages.
Patent, dated Oct. 6, 2022, received in Danish Patent Application No. 202070720, which corresponds with U.S. Appl. No. 17/028,947, 5 pages.
Office Action, dated Sep. 1, 2022, received in U.S. Appl. No. 17/023,274, 16 pages.
Notice of Allowance, dated Mar. 9, 2023, received in U.S. Appl. No. 17/023,274, 10 pages.
Office Action, dated Oct. 21, 2022, received in Australian Patent Application No. 2021290349, 2 pages.
Office Action, dated Aug. 5, 2021, received in U.S. Appl. No. 17/306,898, 6 pages.
Notice of Allowance, dated Oct. 29, 2021, received in U.S. Appl. No. 17/306,898, 5 pages.
Office Action, dated Mar. 3, 2023, received in Japanese Patent Application No. 2022-018022, which corresponds with U.S. Appl. No. 17/306,898, 6 pages.
Notice of Allowance, dated Sep. 8, 2023, received in Japanese Patent Application No. 2022-018022, which corresponds with U.S. Appl. No. 17/306,898, 1 page.
Patent, dated Oct. 5, 2023, received in Japanese Patent Application No. 2022-018022, which corresponds with U.S. Appl. No. 17/306,898, 4 pages.

(56) References Cited

OTHER PUBLICATIONS

Office Action, dated Aug. 20, 2021, received in Korean Patent Application No. 2021-7022726, which corresponds with U.S. Appl. No. 17/306,898, 5 pages.
Final Office Action, dated Feb. 10, 2022, received in Korean Patent Application No. 2021-7022726, which corresponds with U.S. Appl. No. 17/306,898, 4 pages.
Office Action, dated Jan. 13, 2023, received in U.S. Appl. No. 17/379,864, 24 pages.
Notice of Allowance, dated Jul. 6, 2023, received in U.S. Appl. No. 17/379,864, 9 pages.
Notice of Allowance, dated Oct. 23, 2023, received in U.S. Appl. No. 17/379,864, 9 pages.
Final Office Action, dated Feb. 14, 2023, received in U.S. Appl. No. 17/553,018, 18 pages.
Office Action, dated Jun. 8, 2023, received in U.S. Appl. No. 17/553,018, 17 pages.
Office Action, dated Jun. 23, 2022, received in U.S. Appl. No. 17/553,018, 17 pages.
Final Office Action, dated Jan. 16, 2024, received in U.S. Appl. No. 17/553,018, 17 pages.
Office Action, dated Jun. 8, 2022, received in Korean Patent Application No. 2022-7016117, which corresponds with U.S. Appl. No. 17/553,018, 5 pages.
Office Action, dated Dec. 8, 2022, received in Korean Patent Application No. 2022-7016117, which corresponds with U.S. Appl. No. 17/553,018, 5 pages.
Final Office Action, dated Oct. 17, 2023, received in Korean Patent Application No. 2022-7016117, which corresponds with U.S. Appl. No. 17/553,018, 4 pages.
Office Action, dated Apr. 17, 2023, received in U.S. Appl. No. 17/898,735, 16 pages.
Final Office Action, dated Sep. 19, 2023, received in U.S. Appl. No. 17/898,735, 15 pages.
Office Action, dated Jan. 8, 2024, received in U.S. Appl. No. 17/898,735 (7898) 16 pages.
Office Action, dated Oct. 13, 2023, received in U.S. Appl. No. 17/947,042, 29 pages.
International Search Report and Written Opinion, dated Sep. 8, 2021, received in International Patent Application No. PCT/US2021/033200, which corresponds with U.S. Appl. No. 17/023,265, 17 pages.
Invitation to Pay Additional Fees, dated Nov. 18, 2021, received in International Patent Application No. PCT/2021/042402, which corresponds with U.S. Appl. No. 17/031,637, 22 pages.
International Search Report and Written Opinion, dated Jan. 11, 2022, received in International Patent Application No. US/2021/042402, which corresponds with U.S. Appl. No. 17/031,637, 22 pages.
Invitation to Pay Additional Fees, dated Mar. 9, 2022, received in International Patent Application No. PCT/US2021/052052, which corresponds with U.S. Appl. No. 17/483,741, 23 pages.
International Search Report and Written Opinion, dated May 3, 2022, received in International Patent Application No. PCT/US2021/052052, which corresponds with U.S. Appl. No. 17/483,741, 54 pages.
European Search Report, dated Sep. 1, 2023, received in European Patent Application No. 23175376.5, 16 pages.
Extended European Search Report, dated Jul. 29, 2022, received in European Patent Application No. 22161118.9, which corresponds with U.S. Appl. No. 17/028,943, 8 pages.
Invitation to Pay Additional Fees, dated Dec. 13, 2023, received in International Patent Application No. PCT/US2023/032012), which corresponds with U.S. Appl. No. 18/241,778, 13 pages.
Certificate of Grant, dated Feb. 1, 2024, received in Australian Patent Application No. 2021245251, which corresponds with U.S. Appl. No. 17/028,936, 4 pages.
Certificate of Grant, dated Feb. 22, 2024, received in Australian Patent Application No. 2021290349, 4 pages.
Notice of Allowance, dated Mar. 4, 2024, received in Korean Patent Application No. 2022-7016117, which corresponds with U.S. Appl. No. 17/553,018, 3 pages.
Patent, dated May 17, 2024, received in Korean Patent Application No. 2022-7016117, which corresponds with U.S. Appl. No. 17/553,018, 3 pages.
Final Office Action, dated Apr. 18, 2024, received in U.S. Appl. No. 17/898,735, 15 pages.
Final Office Action, dated Mar. 7, 2024, received in U.S. Appl. No. 17/947,042, 33 pages.
Office Action, dated Mar. 7, 2024, received in U.S. Appl. No. 18/133,484, 10 pages.
International Search Report and Written Opinion, dated Feb. 5, 2024, received in International Patent Application No. PCT/US2023/032012, which corresponds with U.S. Appl. No. 18/241,778, 20 pages.
Notice of Allowance, dated Jun. 25, 2024, received in Chinese Patent Application No. 202210183369.5, which corresponds with U.S. Appl. No. 16/920,303, 2 pages.
Patent, dated Jul. 23, 2024, received in Chinese Patent Application No. 202210183369.5, which corresponds with U.S. Appl. No. 16/920,303, 6 pages.
Intent to Grant, dated Sep. 24, 2024, received in European Patent Application No. 20745450.5, which corresponds with U.S. Appl. No. 16/920,303, 10 pages.
Patent, dated Oct. 23, 2024, received in Indian Patent Application No. 202017041564, which corresponds with U.S. Appl. No. 16/920,303, 6 pages.
Office Action, dated Jul. 1, 2024, received in Japanese Patent Application No. 2023-172092, which corresponds with U.S. Appl. No. 16/824,506, 6 pages.
Notice of Allowance, dated Oct. 15, 2024, received in Japanese Patent Application No. 2022-194986, which corresponds with U.S. Appl. No. 17/028,936, 2 pages.
Office Action, dated Jul. 30, 2024, received in Australian Patent Application No. 2023285975, which corresponds with U.S. Appl. No. 17/028,943, 3 pages.
Notice of Allowance, dated Jun. 24, 2024, received in Chinese Patent Application No. 202210183363.8, which corresponds with U.S. Appl. No. 17/028,942, 2 pages.
Patent, dated Jul. 23, 2024, received in Chinese Patent Application No. 202210183363.8, which corresponds with U.S. Appl. No. 17/028,942, 6 pages.
Notice of Allowance, dated Aug. 23, 2024, received in U.S. Appl. No. 17/853,763, 10 pages.
Office Action, dated Jul. 2, 2014, received in U.S. Appl. No. 17/947,042, 37 pages.
Notice of Allowance, dated Aug. 15, 2024, received in U.S. Appl. No. 18/133,484, 8 pages.
Final Office Action, dated Jan. 6, 2025, received in Japanese Patent Application No. 2023-172092, which corresponds with U.S. Appl. No. 16/824,506, 5 pages.
Patent, dated Dec. 16, 2024, received in Japanese Patent Application No. 2022-194986, which corresponds with U.S. Appl. No. 17/028,936, 3 pages.
Notice of Allowance, dated Jan. 30, 2025, received in Australian Patent Application No. 2023285975, which corresponds with U.S. Appl. No. 17/028,943, 5 pages.
Office Action, dated Nov. 14, 2024, received in Australia Patent Application No. 2024200357, which corresponds with U.S. Appl. No. 17/553,018, 2 pages.
Notice of Allowance, dated Dec. 13, 2024, received in U.S. Appl. No. 18/133,484, 9 pages.
International Search Report and Written Opinion, dated Nov. 6, 2024, received in International Patent Application No. PCT/2024/026058, which corresponds with U.S. Appl. No. 18/639,759, 30 pages.
Decision to Grant, dated Mar. 5, 2025, received in European Patent Application No. 20745450.5, which corresponds with U.S. Appl. No. 16/920,303, 5 pages.
Patent, dated Mar. 5, 2025, received in European Patent Application No. 20745450.5, which corresponds with U.S. Appl. No. 16/920,303, 2 pages.

(56) References Cited

OTHER PUBLICATIONS

Notice of Allowance, dated Jan. 23, 2025, received in U.S. Appl. No. 17/947,042, 23 pages.
Patent, dated Apr. 8, 2025, received in Ukranian Patent Application No. 20745450.5, 3 pages.
Notice of Allowance, dated May 16, 2025, received in Japanese Patent Application No. 2023-172092, which corresponds with U.S. Appl. No. 16/824,506, 2 pages.
Patent, dated Apr. 7, 2025, received in Korean Patent Application No. 2023-7028776, which corresponds with U.S. Appl. No. 17/028,936, 6 pages.
Patent, dated May 15, 2025, received in Australian Patent Application No. 2023285975, U.S. Appl. No. 17/028,943, which corresponds with U.S. Appl. No. 17/028,943, 3 pages.
Notice of Allowance, dated May 16, 2025, received in Australia Patent Application No. 2024200357, U.S. Appl. No. 17/553,018, which corresponds with U.S. Appl. No. 17/553,018, 5 pages.

* cited by examiner

Type of content: Podcast

Spatial audio enabled: No

Content includes spatial content: No

What's being played: Stereo Audio

700

716 The first audio output mode is a non-spatial audio output mode; the second audio output mode is a spatial audio output mode; a spatial audio output mode is an audio output mode where audio of the set of one or more wearable audio output devices is adjusted as the set of one or more wearable audio output devices is moved relative to a frame of reference, so as to position one or more sources of sound in the frame of reference independently of a position of the set of one or more wearable audio output devices relative to the frame of reference; and a non-spatial audio output mode is an audio output mode where audio of the set of one or more wearable audio output devices is not adjusted as the set of one or more wearable audio output devices is moved relative to the frame of reference 718 The first audio output mode is a spatial audio output mode; the second audio output mode is a non-spatial audio output mode; a spatial audio output mode is an audio output mode where audio of the set of one or more wearable audio output devices is adjusted as the set of one or more wearable audio output devices is moved relative to a frame of reference, so as to position one or more sources of sound in the frame of reference independently of a position of the set of one or more wearable audio output device relative to the frame of reference; and a non-spatial audio output mode is an audio output mode where audio of the set of one or more wearable audio output devices are not adjusted as the set of one or more wearable audio output devices is moved relative to the frame of reference 720 The user interface includes a user interface element that, when activated, selects as the active audio output mode for the respective type of audio content an audio output mode in which the electronic device outputs audio without using the respective audio output mode even when the electronic device is playing audio that can be presented using the respective audio output mode

722 The user interface includes a user interface element that, when activated, selects as the active audio output mode for the respective type of audio content an audio output mode in which the electronic device outputs audio using the respective audio output mode when the electronic device is playing audio that can be presented using the respective audio output mode

---

724 The first visual indication includes a first animation associated with the first audio output mode; and the second visual indication includes a second animation, different from the first animation, associated with the second audio output mode 726 The respective audio output mode is a spatial audio output mode; and a respective animation of the first animation and the second animation that corresponds to the spatial audio output mode includes moving a representation of a user while maintaining a representation of an audio output displayed in the user interface 728 The respective audio output mode is a spatial audio output mode; and a respective animation of the first animation and the second animation that corresponds to a non-spatial audio output mode includes concurrently moving a representation of a user and a representation of a first audio output displayed with a first predefined spatial relationship to the representation of the user in accordance with the movement of the representation of the user

---

730 The second audio is a continuation of the first audio, with the second audio rendered using the second audio output mode where the first audio is rendered using the first audio output mode

732 Outputting the first audio using the first audio output mode includes rendering respective audio for output using the first audio output mode; and outputting the second audio using the second audio output mode includes rendering the respective audio for output using the second audio output mode 734 The respective audio includes a moving source of sound

---

736 The set of one or more wearable audio output devices includes a first wearable audio output component and a second wearable audio output component, and prior to displaying the user interface, in accordance with a determination that at least one of the first wearable audio output component or the second wearable audio output component is not in a respective position relative to an ear of a user, present a notification prompting the user to place the first wearable audio output component in the respective position relative to a first ear of the user and the second wearable audio output component in the respective position relative to a second ear of the user

---

738 The user interface is displayed in accordance with the electronic device establishing communication with the set of one or more wearable audio output devices for a first time

---

740 The user interface is displayed in accordance with the electronic device establishing communication with the set of one or more wearable audio output devices for a first time since a most recent update of software executing on the electronic device

---

742 Prior to displaying the user interface, display a settings user interface that includes a selectable option for initiating an audio output mode demonstration process, and the user interface is displayed in response to a user input that corresponds to activation of the selectable option

812 The first visual indication that the first audio output mode is being used is an appearance of the first user interface element

814 While displaying the first user interface element concurrently with the first visual indication that the first audio output mode is being used, the appearance of the first user interface element includes a respective animation, and while displaying the first user interface element without displaying the first visual indication that the first audio output mode is being used, the appearance of the first user interface element does not include the respective animation

816 Displaying the audio settings user interface includes, in accordance with a determination that the first audio output mode is not enabled, displaying the first user interface element and displaying a visual indication that the first audio output mode is not enabled

818 The visual indication that the first audio output mode is not enabled is an appearance of the first user interface element that is different from one or more appearances of the first user interface element that are displayed while the first audio output mode is enabled

820 The appearance of the first user interface element while the first audio output mode is not enabled is different from the one or more appearances of the first user interface element that are displayed while the first audio output mode is enabled in color, fill, and/or shading

822 The audio settings user interface includes a second user interface element indicating a first ambient sound control mode in which the one or more audio output devices are operating

824 Detect a user input that corresponds to activation of the second user interface element; and in response to detecting the user input that corresponds to the activation of the second user interface element: cease to display the first user interface element that is activatable to change whether the first audio output mode is enabled; and display a user interface element corresponding to the first ambient sound control mode, and a user interface element corresponding to a second ambient sound control mode different from the first ambient sound control mode

826 In accordance with the determination that the first audio output mode is enabled and that the electronic device is not causing respective audio to be output using the first audio output mode via one or more audio output devices that are in communication with the electronic device: while outputting second respective audio that is not configured for output using the first audio output mode, output the second respective audio using a second audio output mode that is different from the first audio output mode

828 The one or more audio output devices include a first wearable audio output component configured to be placed in a respective position relative to a first ear of a user and a second wearable audio output component configured to be placed in the respective position relative to a second ear of the user; and causing the respective audio to be output using the first audio output mode is performed in accordance with a determination that the first wearable audio output component is in the respective position relative to a first ear of a user and that the second wearable audio output component is in the respective position relative to a second ear of the user. While the first audio output mode is enabled, and while causing the respective audio that is configured for output using the first audio output mode to be output via the one or more audio output devices: in accordance with a determination that the first wearable audio output component or the second wearable audio output component is not in the respective position relative to a respective ear of the user, cause the respective audio to be output via the one or more audio output devices using a third audio output mode that is different from the first audio output mode

830 Detect an input activating the first user interface element to change whether the first audio output mode is enabled; in response to detecting the input activating the first user interface element: display an indication whether the first audio output mode is enabled

832 Automatically cease to display the indication whether the first audio output mode is enabled after occurrence of a predetermined condition

834 The first settings user interface includes a third user interface element for adjusting a volume of audio output via the one or more audio output devices. Detect a user input that changes the third user interface element from indicating a first value to indicating a second value different from the first value; and in response to detecting the user input that changes the third user interface element from indicating the first value to indicating the second value: change the volume of audio output via the one or more audio output devices

836 While the first audio output mode is enabled: while causing the respective audio that is configured for output using the first audio output mode to be output using the first audio output mode: in accordance with a determination that an electronic device tracking audio output mode is enabled, output the respective audio using the first audio output mode includes modifying output of the respective audio based on a current location of the electronic device as the electronic device is moved in a physical environment relative to the one or more audio output devices that are outputting the respective audio; and in accordance with a determination that the electronic device tracking audio output mode is disabled, output the respective audio using the first audio output mode without modifying the output of the respective audio based on the current location of the electronic device relative to the one or more audio output devices that are outputting the respective audio

838 Detect a user input directed to the first user interface element; and in response to detecting the user input directed to the first user interface element: in accordance with a determination that the user input directed to the first user interface element is detected while the first audio output mode is enabled, disable the first audio output mode; and in accordance with a determination that the user input directed to the first user interface element is detected while the first audio output mode is disabled, enable the first audio output mode

840 In response to receiving the sequence of one or more inputs, the audio settings user interface includes the first user interface element in accordance with a determination that the one or more audio output devices that are in communication with the electronic device are capable of outputting audio using the first audio output mode. While the electronic device is in communication with one or more audio output devices that are not capable of outputting audio using the first audio output mode, and while displaying the audio settings user interface, forgo displaying the first user interface element 842 Audio that is configured for output using the first audio output mode includes one or more of: audio associated with television content, audio associated with movie content, audio associated with video calls, sounds associated with an operating system of the electronic device, audio associated with a virtual assistant, and audio associated with notifications on the electronic device

Figure 8E

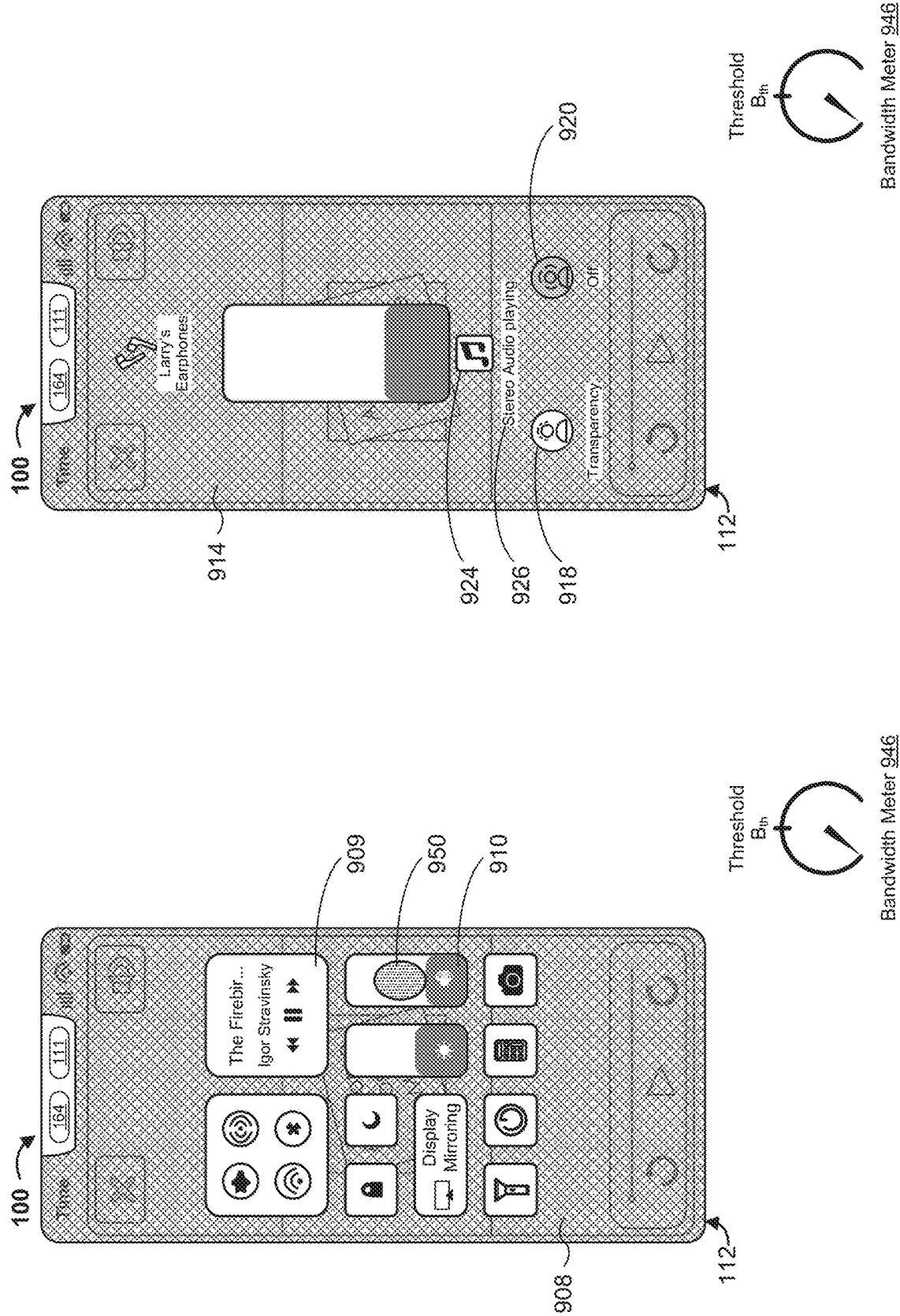

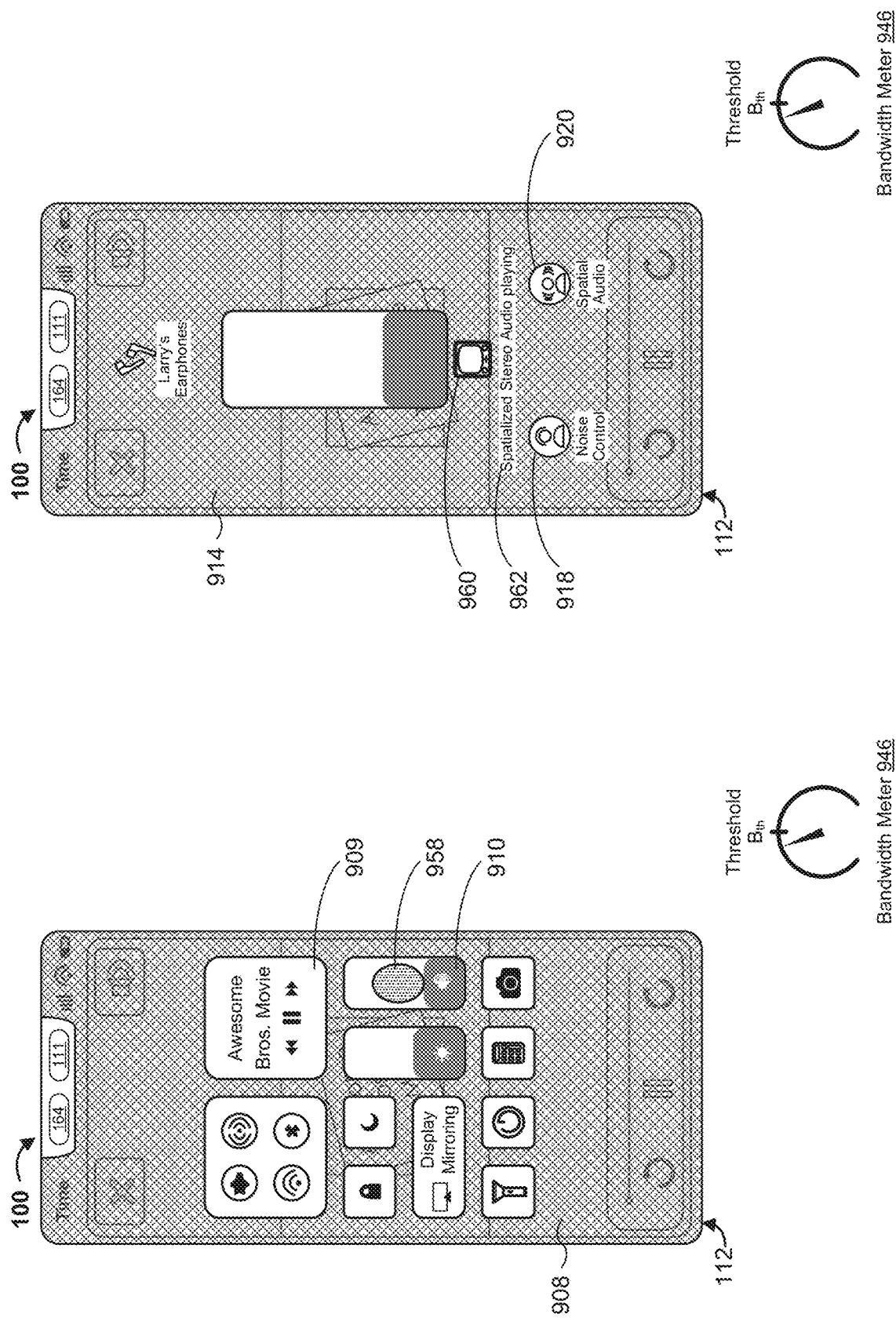

1012 An audio output mode for the first application, previously selected for the first application using the system audio output setting control, is the first audio output mode;
while executing the first application, using the system audio output setting control, change the audio output mode for the first application from the first audio output mode to the second audio output mode; and
after changing the audio output mode for the first application to the second audio output mode, while the first application is delivering audio information to the one or more audio output devices, cause output of the audio information from the first application via the one or more audio output devices in accordance with the second audio output mode > 1014 Save the changed audio output mode for the first application for future audio output by the first application 1016 An audio output mode for the second application, previously selected for the second application using the system audio output setting control, is the second audio output mode;
while executing the second application, using the system audio output setting control, change the audio output mode for the second application from the second audio output mode to the first audio output mode; and
after changing the audio output mode for the second application to the first audio output mode, while the second application is delivering audio information to the one or more audio output devices, cause output of the audio information from the second application via the one or more audio output devices in accordance with the first audio output mode > 1018 Save the changed audio output mode for the second application for future audio output by the second application

Figure 10B

1020 The first audio output mode is a spatial audio output mode, and the second audio output mode is the spatial audio output mode or a non-spatial audio output mode 1022 An audio output mode of the first application is configured, by default, to be the spatial audio output mode 1024 An audio output mode of the second application is configured, by default, to be the non-spatial audio output mode 1026 An audio output mode of the first application is configured, by default, in accordance with a user preference of a user of the computer system 1028 An audio output mode of the first application is configured, by default, by the first application (A)

Figure 10C

1020 The first audio output mode is a spatial audio output mode, and the second audio output mode is the spatial audio output mode or a non-spatial audio output mode (A)

1030 While an audio output mode of the first application is a spatial audio output mode:
    in accordance with a determination that the computer system is receiving streaming content at a reduced bandwidth, less than a threshold bandwidth, cause output of audio information by the first application, from the streaming content to the one or more audio output devices, as spatialized stereo audio information; and
    in accordance with a determination that the computer system is receiving streaming content at a bandwidth of at least the threshold bandwidth, cause output of audio information by the first application, from the streaming content to the one or more audio output devices, as spatial audio information

1032 Make a determination of whether the computer system is receiving streaming content at a bandwidth of at least the threshold bandwidth while buffering the streaming content

1034 After causing output of audio information by the first application, from the streaming content to the one or more audio output devices, as spatial audio information:
    in accordance with a determination that the computer system is receiving the streaming content at a reduced bandwidth, less than the threshold bandwidth, transition to causing output of audio information by the first application, from the streaming content to the one or more audio output devices, as spatialized stereo audio information

1036 After causing output of audio information by the first application, from the streaming content to the one or more audio output devices, as spatialized stereo audio information:
    in accordance with a determination that the computer system is receiving the streaming content at or above the threshold bandwidth, transition to causing output of audio information by the first application, from the streaming content to the one or more audio output devices, as spatial audio information

Figure 10D

1038 The first audio output mode is a spatialized stereo audio output mode

1040 The first audio output mode is an active noise cancelling mode, which reduces audio components corresponding to ambient sound from a physical environment, or a transparency audio mode that outputs audio components selected so as to increase audio-pass through of ambient sound from the physical environment 1042 Display a system control user interface that includes the system audio output setting control and at least one additional system control 1044 The system audio output setting control in the system control user interface indicates whether the audio information from the first application includes spatial audio information 1046 The system audio output setting control in the system control user interface identifies an application causing output of audio information to the set of one or more audio output devices 1048 In accordance with a determination that a current audio output mode of the computer system is a spatial audio output mode and that the computer system is causing output of audio information that includes spatial audio content, display the system audio output setting control with a first appearance;
in accordance with a determination that a current audio output mode of the computer system is a spatial audio output mode and that the computer system is causing output of audio information that does not include spatial audio content, display the system audio output setting control with a second appearance; and
in accordance with a determination that a current audio output mode of the computer system is a non-spatial audio output mode, display the system audio output setting control with a third appearance

Figure 10E

1050 The set of one or more audio output devices comprises a first set of one or more audio output devices or a second set of one or more audio output devices;
  while using the first set of one or more audio output devices, save, using the system audio output setting control, a first respective audio output mode for the first application;
  while using the second set of one or more audio output devices, save, using the system audio output setting control, a second respective audio output mode for the first application;
  in accordance with a determination that the first set of one or more audio output devices is in use, cause output of the audio information from the first application to the first set of one or more audio output devices in accordance with the first respective audio output mode saved for the first application while using the first set of one or more audio output devices; and
  in accordance with a determination that the second set of one or more audio output devices is in use, causing output of the audio information from the first application to the second set of one or more audio output devices in accordance with the second respective audio output mode saved for the first application while using the second set of one or more audio output devices > 1052 The first set of one or more audio output devices and the second set of one or more audio output devices are associated with a same user account 1054 While displaying a settings user interface, detect an input directed to a first respective user interface element for enabling or disabling a spatial audio output mode with respect to all applications, installed on the computer system, capable of causing output of audio information in accordance with the spatial audio output mode; and
  in response to the input directed to the first respective user interface element:
    in accordance with a determination that the input corresponds to a request to disable spatial audio, disable the spatial audio output mode with respect to all applications, installed on the computer system, capable of causing output of audio information in accordance with the spatial audio output mode; and
    in accordance with a determination that input corresponds to a request to enable spatial audio, make the spatial audio output mode available to all applications, installed on the computer system, capable of causing output of audio information in accordance with the spatial audio output mode

Figure 10F

1056 Display a settings user interface that concurrently displays:
    a first set of one or more controls for enabling or disabling use of a spatial audio output mode for the first application; and
    a second set of one or more controls for enabling or disabling use of the spatial audio output mode for the second application;
  while displaying the settings user interface, receive an input;
  in accordance with a determination that the input is directed to the first set of one or more controls:
    in accordance with a determination that the input corresponds to a request to disable spatial audio for the first application, disable use of the spatial audio output mode for the first application; and
    in accordance with a determination that the input corresponds to a request to enable spatial audio for the first application, enable use of the spatial audio output mode for the first application; and
  in accordance with a determination that the input is directed to the second set of one or more controls:
    in accordance with a determination that the input corresponds to a request to disable spatial audio for the second application, disable use of the spatial audio output mode for the second application; and
    in accordance with a determination that the input corresponds to a request to enable spatial audio for the second application, enable use of the spatial audio output mode for the second application 1058 While displaying a settings user interface, detect an input directed to a second respective user interface element for enabling or disabling a spatialized stereo audio output mode with respect to a plurality of applications, installed on the computer system, capable of causing output of audio information in accordance with the spatialized stereo audio output mode; and
  in response to the input directed to the second respective user interface element:
    in accordance with a determination that the input corresponds to a request to disable spatialized stereo audio, disable the spatialized stereo audio output mode with respect to all applications, installed on the computer system, capable of causing output of audio information in accordance with the spatialized stereo audio output mode; and
    in accordance with a determination that the input corresponds to a request to enable spatialized stereo audio, make the spatialized stereo audio output mode available to all applications, installed on the computer system, capable of causing output of audio information in accordance with the spatialized stereo audio output mode

Figure 10G

1060 Display a settings user interface that concurrently displays:
    a first user interface element for enabling or disabling use of a spatialized stereo audio output mode for the first application; and
    a second user interface element for enabling or disabling use of the spatialized stereo audio output mode for the second application;
  while displaying the settings user interface, receive an input;
  in accordance with a determination that the input is directed to the first user interface element:
    in accordance with a determination that the input corresponds to a request to disable spatialized stereo audio for the first application, disable use of the spatialized stereo audio output mode for the first application; and
    in accordance with a determination that the input corresponds to a request to enable spatialized stereo audio for the first application, enable use of the spatialized stereo audio output mode for the first application; and
  in accordance with a determination that the input is directed to the second user interface element:
    in accordance with a determination that the input corresponds to a request to disable spatialized stereo audio for the second application, disable use of the spatialized stereo audio output mode for the second application; and
    in accordance with a determination that the input corresponds to a request to enable spatialized stereo audio for the second application, enable use of the spatialized stereo audio output mode for the second application

Figure 10H

SYSTEMS, METHODS, AND GRAPHICAL USER INTERFACES FOR SELECTING AUDIO OUTPUT MODES OF WEARABLE AUDIO OUTPUT DEVICES

RELATED APPLICATIONS

This application is a continuation of U.S. patent application Ser. No. 17/379,864 filed Jul. 19, 2021, which claims priority to U.S. Provisional Patent Application No. 63/197, 481, filed Jun. 6, 2021, and U.S. Provisional Patent Application No. 63/054,194, filed Jul. 20, 2020, each of which is hereby incorporated by reference in its entirety.

TECHNICAL FIELD

This relates generally to audio output systems, including but not limited to systems for selecting audio output modes on audio output devices that are in communication with electronic devices, optionally via user interfaces displayed on the electronic devices.

BACKGROUND

Audio output devices, including wearable audio output devices such as headphones, earbuds, and earphones, are widely used to provide audio outputs to a user.

But conventional methods for playing audio on wearable audio output devices are limited in the types of audio output modes in which the wearable audio output devices can output audio. For example, conventionally-used audio output modes, such as stereo and mono audio output modes, provide audio with respect to a frame of reference that is tied to the audio output devices, which can make the listening experience less immersive and less realistic than the listening experience provided when outputting audio using a spatial audio output mode, which simulates a more realistic listening experience in which audio seems to come from sources of sound in a separate frame of reference, such as the physical environment surrounding the user. Furthermore, an audio output device (e.g., a wearable audio output device) that supports a spatial audio output mode, in which the positioning of simulated sources of sound is independent of movement of the audio output devices or the user, enables the realistic and immersive aspects of a public listening experience while also providing the non-intrusiveness of a private listening experience. Moreover, conventional methods of selecting an active audio output mode for an audio output device fail to audibly and visually illustrate the differences between different available types of audio modes. Conventional methods of selecting audio output modes also fail to save audio output settings that have been selected for a particular context (e.g., for a respective application, for a respective set of audio output device, for a respective user, etc.) for future use, requiring a user to select the same settings again at a later time. In addition, conventional methods take longer and require more user interaction than necessary, which results in increased user mistakes and, more generally, wasted energy. These latter considerations are particularly important in battery-operated devices.

SUMMARY

Accordingly, there is a need for audio output devices and associated electronic devices with improved methods and interfaces for selecting between different audio output modes for a set of one or more wearable audio output devices, and for providing feedback to aid a user in making such a selection. Such methods and interfaces optionally complement or replace conventional methods for selecting audio output modes. Such methods and interfaces reduce the number, extent, and/or nature of the inputs from a user and produce a more efficient human-machine interface. For battery-operated systems and devices, such methods and interfaces conserve power and increase the time between battery charges.

The above deficiencies and other problems associated with user interfaces for electronic devices in communication with a set of one or more wearable audio output devices are reduced or eliminated by the disclosed devices. In some embodiments, the electronic device is a desktop computer. In some embodiments, the electronic device is portable (e.g., a notebook computer, tablet computer, or handheld device). In some embodiments, the electronic device is a personal electronic device (e.g., a wearable electronic device, such as a watch). In some embodiments, the electronic device has a touchpad. In some embodiments, the electronic device has a touch-sensitive display (also known as a "touch screen" or "touch-screen display"). In some embodiments, the electronic device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music/audio playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device that is in communication with one or more display devices, one or more input devices, and a set of one or more wearable audio output devices. The method includes displaying, via one or more display devices, a user interface for determining whether or not to enable a respective audio output mode for the set of one or more wearable audio output devices for a respective type of audio content. The method includes, while displaying the user interface, concurrently outputting, via the set of one or more wearable audio output devices, first audio using a first audio output mode while displaying in the user interface, via the one or more display devices, a first visual indication that the first audio output mode is being used for the first audio. The method includes, while displaying the user interface and outputting the first audio using the first audio output mode, receiving, via the one or more input devices, a request to switch to using a second audio output mode. The method includes, in response to the electronic device receiving the request to switch to using the second audio output mode, concurrently outputting, via the set of one or more wearable audio output devices, second audio using the second audio output mode while displaying in the user interface, via the one or more display devices, a second visual indication that the second audio output mode is being used for the second audio. The second visual indication is different from the first visual indication. The method includes, while concurrently outputting the second audio using the second audio output mode and displaying the second visual indication that the second audio output mode is being used, detecting, via the one or more input devices, an input directed to the user interface. The method includes, in response to detecting the input directed to the user interface, selecting, based on the input, one of the first audio output mode or the second audio output mode as an active audio output mode for the respective type of audio content.

In accordance with some embodiments, a method is performed at an electronic device that is in communication with one or more display devices and one or more input devices. The method includes, while displaying, via the one or more display devices, a first user interface of the electronic device, the electronic device receives, via the one or more input devices, a sequence of one or more inputs that corresponds to a request to display an audio settings user interface. The method includes, in response to the electronic device receiving the sequence of one or more inputs, displaying, via the one or more display devices, the audio settings user interface. The audio settings user interface includes a first user interface element that is activatable to change whether a first audio output mode of one or more audio output devices that are in communication with the electronic device is enabled. Displaying the audio settings user interface includes: in accordance with a determination that the first audio output mode is enabled and that the electronic device is causing respective audio that is configured for output using the first audio output mode to be output using the first audio output mode via one or more audio output devices that are in communication with the electronic device, displaying the first user interface element concurrently with a first visual indication that the first audio output mode is being used; and, in accordance with a determination that the first audio output mode is enabled and that the electronic device is not causing respective audio to be output using the first audio output mode via one or more audio output devices that are in communication with the electronic device, displaying the first user interface element without displaying the first visual indication that the first audio output mode is being used.

In accordance with some embodiments, a method of playing audio is performed at a computer system that is in communication with a display generation component, one or more input devices, and a set of one or more audio output devices. The method includes, while a first application is causing output of audio information to the set of one or more audio output devices, causing output of the audio information from the first application to the set of one or more audio output devices in accordance with a first audio output mode previously selected for the first application using a system audio output setting control. The method includes, after causing output of audio information from the first application via the set of one or more audio output devices in accordance with the first audio output mode, receiving a request to play audio from a second application different from the first application. The method includes, in response to receiving the request to play audio from the second application, causing output of audio information from the second application to the set of one or more audio output devices, which includes: in accordance with a determination that a second audio output mode, different from the first audio output mode, was previously selected for the second application using the system audio output setting control, causing output of the audio information from the second application via the set of one or more audio output devices in accordance with the second audio output mode.

In accordance with some embodiments an electronic device (or, as alternatively used herein, a computer system) includes or is in communication with one or more display devices, one or more input devices, one or more audio output devices, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device as described herein cause the electronic device to perform or cause performance of the operations of any of the methods described herein. In accordance with some embodiments, a graphical user interface on an electronic device as described herein includes one or more of the elements displayed in any of the methods described herein, which are updated in response to inputs, as described in any of the methods described herein. In accordance with some embodiments, an electronic device as described herein includes means for performing or causing performance of the operations of any of the methods described herein. In accordance with some embodiments, an information processing apparatus, for use in an electronic device as described herein includes means for performing or causing performance of the operations of any of the methods described herein.

Thus, electronic devices that include or are in communication with one or more display devices, one or more input devices, one or more audio output devices, optionally one or more sensors to detect intensities of contacts with the touch-sensitive surface, optionally one or more tactile output generators are provided with improved methods and interfaces for selecting audio output modes of the one or more audio output devices, thereby increasing the effectiveness, efficiency, and user satisfaction with such devices. Such methods and interfaces may complement or replace conventional methods for selecting audio output modes.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7D are flow diagrams of a process for demonstrating and selecting audio output modes of wearable audio output devices in accordance with some embodiments.

FIGS. 8A-8E are flow diagrams of a process for displaying and modifying status of audio output modes of audio output devices in accordance with some embodiments.

FIGS. 10A-10H are flow diagrams of a process for selecting, and saving user selections of, audio output modes of audio output devices in accordance with some embodiments.

DESCRIPTION OF EMBODIMENTS

Figure 1A:
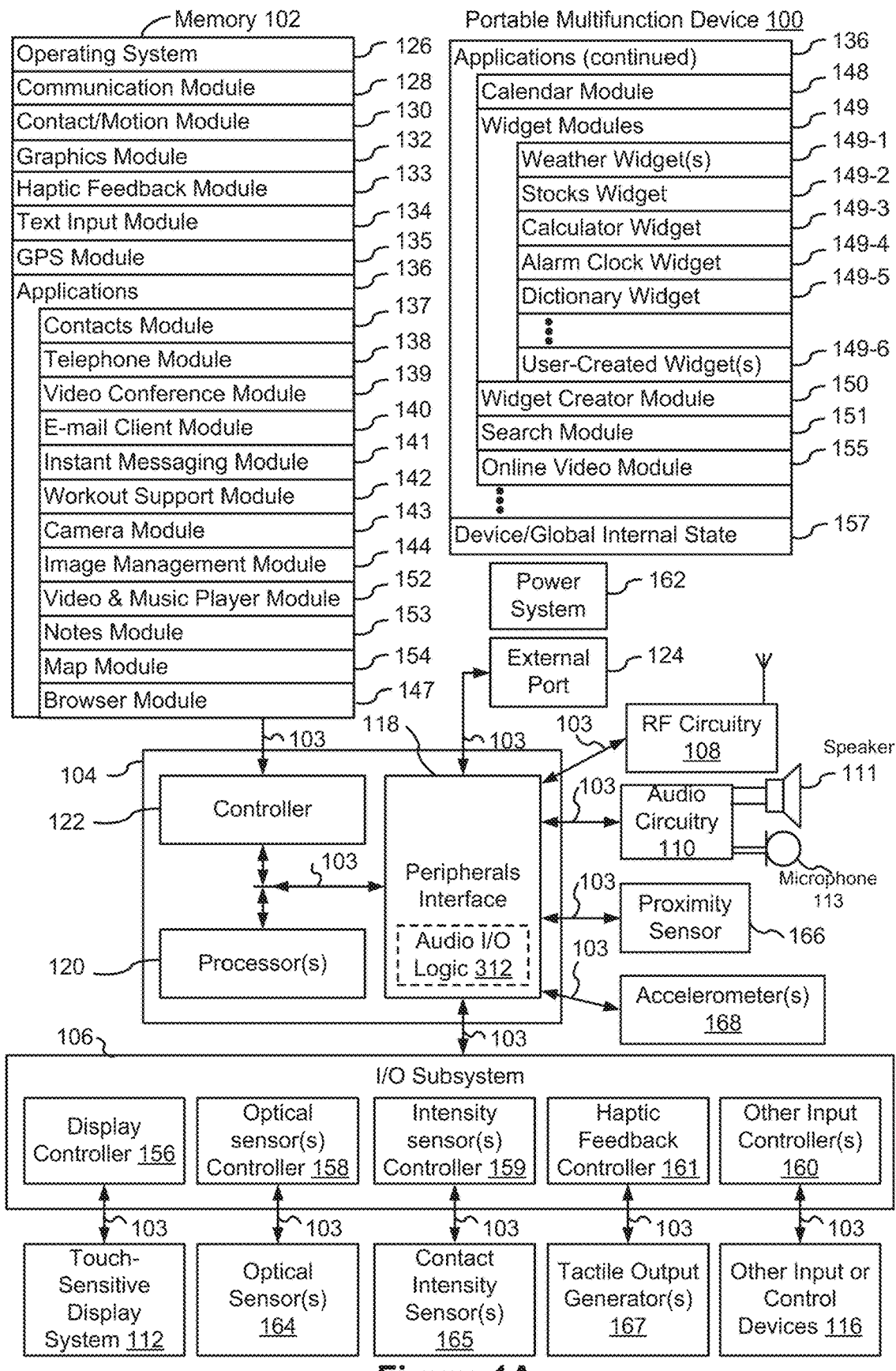
FIG. 1A is a block diagram illustrating a portable multifunction device with a touch-sensitive display in accordance with some embodiments.

As noted above, audio output devices such as wearable audio output devices are widely used to provide audio outputs to a user. Many electronic devices that include or are in communication with audio output devices fail to provide a quick way of selecting between audio output modes, fail to save previously selected audio output settings, and/or fail to provide sufficient feedback to aid a user in selecting a desired audio output mode. The methods, systems, and user interfaces/interactions described herein improve in multiple ways how audio output modes are selected. For example, embodiments disclosed herein describe improved ways of demonstrating different available audio output modes and of enabling and disabling specific audio output modes.

The processes described below enhance the operability of the devices and make the user-device interfaces more efficient (e.g., by helping the user to provide proper inputs and reducing user mistakes when operating/interacting with the device) through various techniques, including by providing improved visual, audio, and/or haptic feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

Below, FIGS. 1A-1B, 2, and 3A-3C, 4A-4B provide a description of example devices. FIGS. 5A-1 through 5J, 6A-6O, and 9A-9AM illustrate example user interfaces for demonstrating and selecting audio output modes of audio output devices such as wearable audio output devices and for displaying and modifying the status of such audio output modes, as well as for saving user selections of such audio output modes. FIGS. 7A-7D illustrate a flow diagram of a method of demonstrating and selecting audio output modes of wearable audio output devices. FIGS. 8A-8E illustrate a flow diagram of a method of displaying and modifying status of audio output modes of audio output devices. FIGS. 10A-10H illustrate a flow diagram of a method of selecting, and saving user selections of, audio output modes of audio output devices. The user interfaces in FIGS. 5A-1 through 5J, 6A-6O, and 9A-9AM are used to illustrate the processes in FIGS. 7A-7D, 8A-8E, and 10A-10H.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes or is in communication with one or more other physical user-interface devices, such as a physical keyboard, a mouse and/or a joystick. In some embodiments, the touch-sensitive surface and/or the other aforementioned physical user-interface devices are replaced by or supplemented by a voice recognition device or subsystem for receiving orally delivered user inputs, and/or a user gaze determination device or subsystem that determines a location (e.g., in a user interface, or in a two or three dimensional environment) or sequence of locations at which a user is gazing or focusing.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone). In some embodiments, peripherals interface 118, in conjunction with RF circuitry 108 and optionally audio circuitry 110, communicates wirelessly with one or more peripheral audio output devices, such as wearable audio output device 301 (FIG. 3B), to control audio outputs and other functions of the peripheral audio output devices.

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button (e.g., or an up button and a separate down button) for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (e.g., touchpad 355 discussed below with reference to FIG. 3A) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen. Furthermore, in some embodiments, in place of a touch screen, or in addition to a touch screen, device 100 includes a display generation component (e.g., a display driver, for displaying images using a peripheral device, such as display or headset with a holographic image generation component) and a device, such as a touchpad, with a touch-sensitive surface, and/or other input device(s), such as a voice recognition device or subsystem for receiving orally delivered user inputs, and/or a user gaze determination device or subsystem that determines a location (e.g., in a user interface, or in a two or three dimensional environment) or sequence of locations at which a user is gazing or focusing, and thus receives or determines inputs in the form of gestures performed with the user's gaze (e.g., the user input may include gazing at or focusing on a respective user interface element, moving the user's gaze position along a path or trajectory, blinking the user's eyes, and other gaze based inputs).

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer, and/or a GPS (or GLONASS or other global navigation system) receiver for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS)

and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
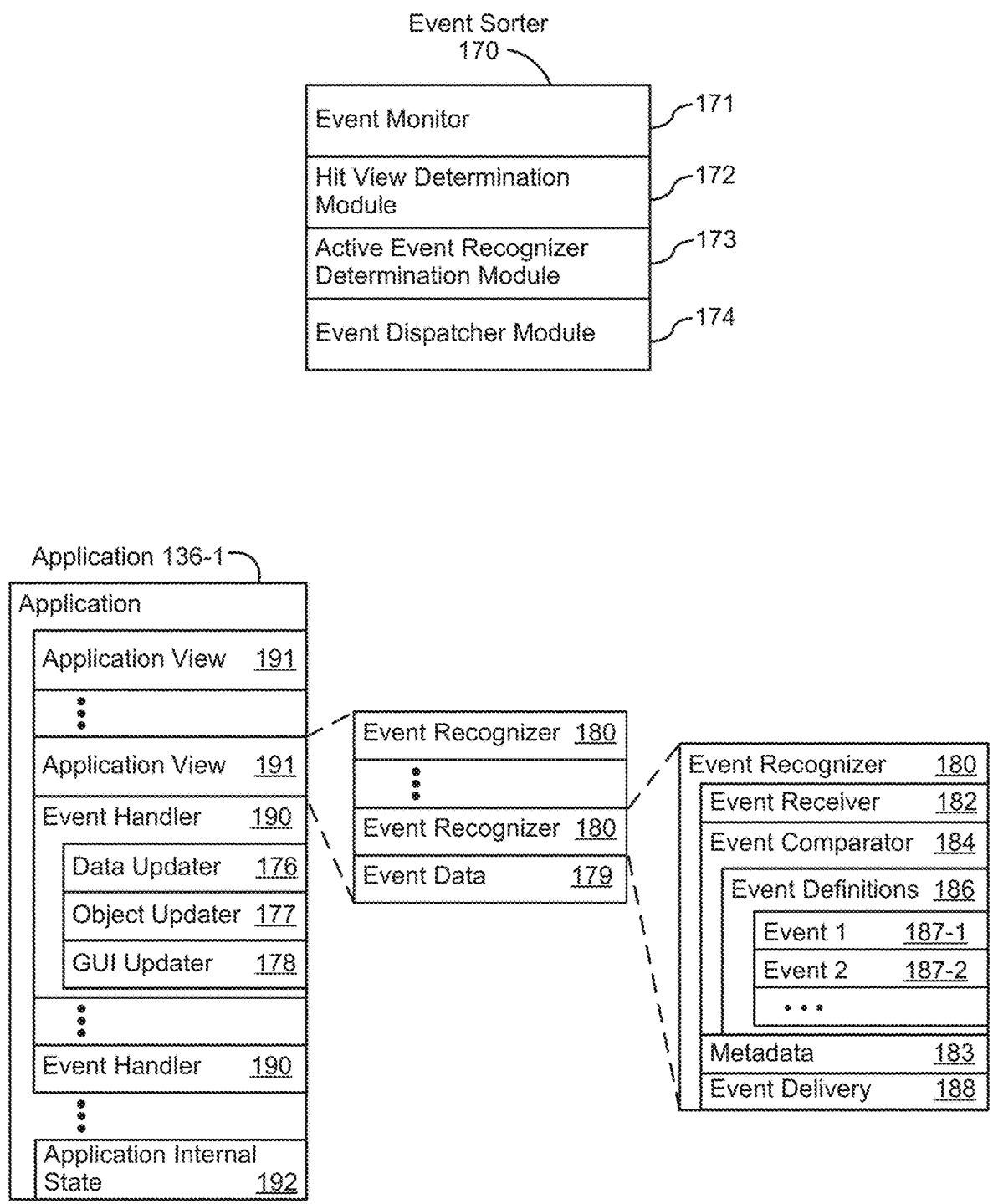
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher-level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
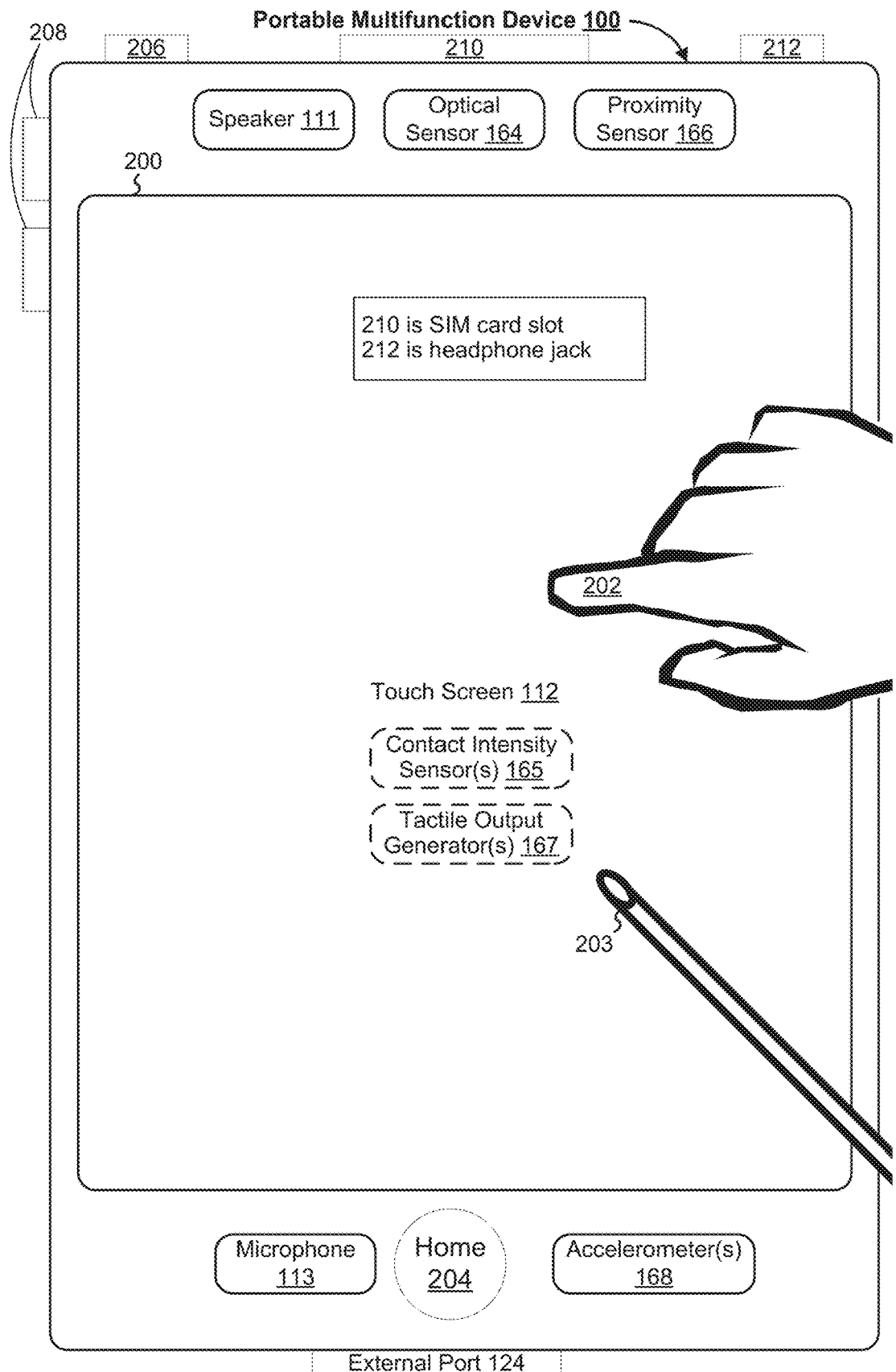
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

Figure 3A:
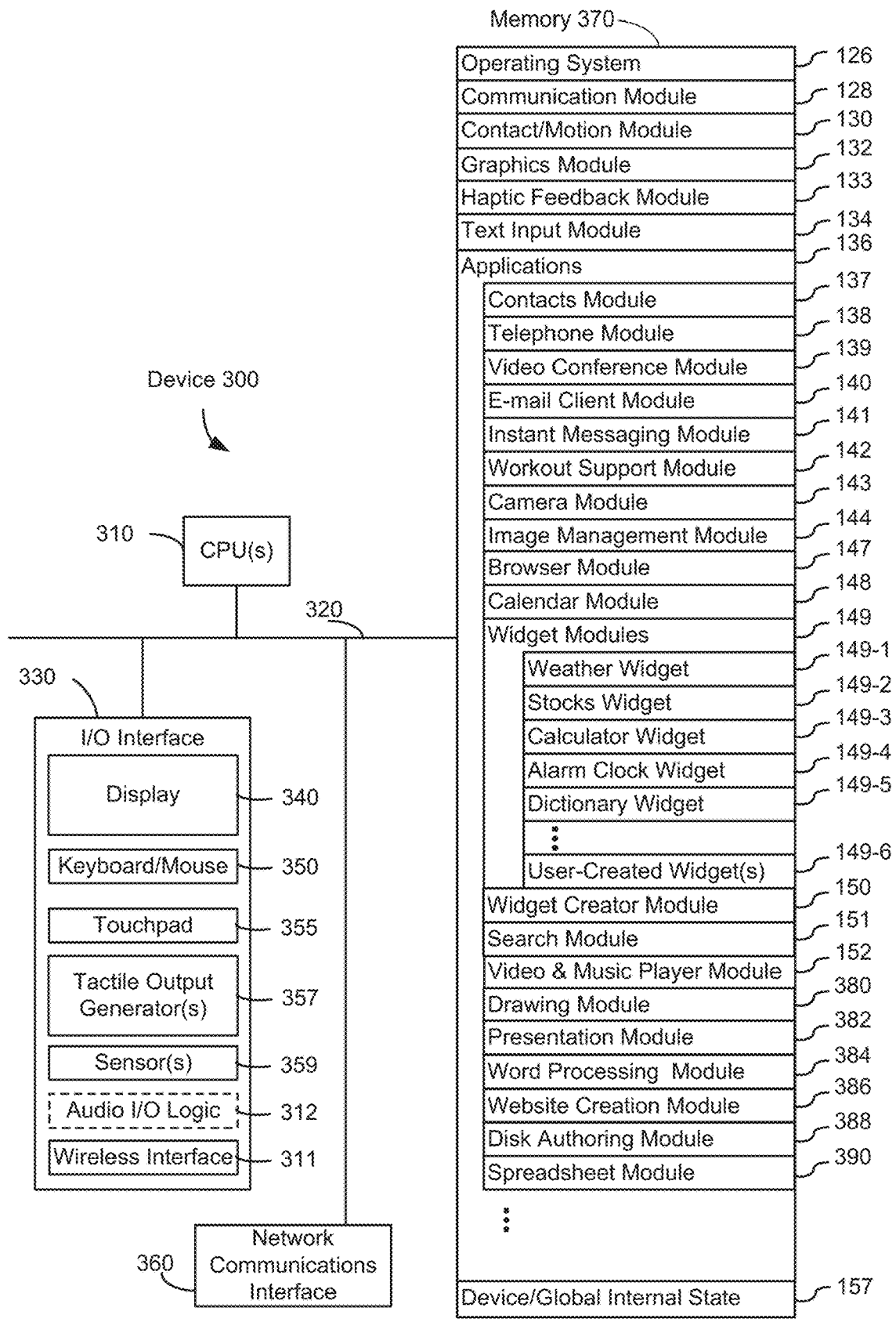
FIG. 3A is a block diagram of an example multifunction device with a display and a touch-sensitive surface in accordance with some embodiments.

FIG. 3A is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). In some embodiments, device 300 includes a wireless interface 311 for communication with one or more wearable audio output devices 301.

Memory 370 includes high-speed random access memory, such as DRAM, SRAM, DDR RAM or other random access solid-state memory devices; and optionally includes non-volatile memory, such as one or more magnetic disk storage devices, optical disk storage devices, flash memory devices, or other non-volatile solid-state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3A are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 3B:
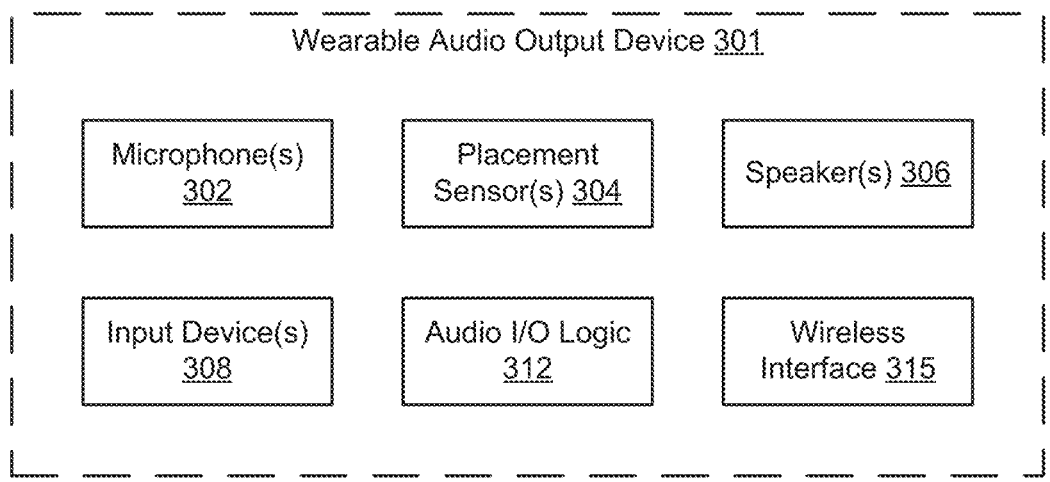
FIG. 3B is a block diagram of an example wearable audio output device in accordance with some embodiments.

FIG. 3B is a block diagram of an example wearable audio output device 301 in accordance with some embodiments. In some embodiments, wearable audio output device 301 is one or more in-ear earphone(s), earbud(s), over-ear headphone(s), or the like. In some examples, wearable audio output device 301 includes a pair of earphones or earbuds (e.g., one for each of a user's ears). In some examples, wearable audio output device 301 includes over-ear headphones (e.g., headphones with two over-ear earcups to be placed over a user's ears and optionally connected by a headband). In some embodiments, wearable audio output device 301 includes one or more audio speakers 306 for providing audio output (e.g., to a user's ear). In some embodiments, wearable audio output device 301 includes one or more placement sensors 304 to detect positioning or placement of wearable audio output device 301 relative to a user's ear, such as to detect placement of wearable audio output device 301 in a user's ear. In some embodiments, wearable audio output device 301 conditionally outputs audio based on whether wearable audio output device 301 is in or near a user's ear (e.g., wearable audio output device 301 forgoes outputting audio when not in a user's ear, to reduce power usage). In some embodiments where wearable audio output device 301 includes multiple (e.g., a pair) of wearable audio output components (e.g., earphones, earbuds, or earcups), each component includes one or more respective placement sensors, and wearable audio output device 301 conditionally outputs audio based on whether one or both components is in or near a user's ear, as described herein.

In some embodiments, wearable audio output device 301 includes audio I/O logic 312, which determines the positioning or placement of wearable audio output device 301 relative to a user's ear based on information received from placement sensor(s) 304, and, in some embodiments, audio I/O logic 312 controls the resulting conditional outputting of audio. In some embodiments, wearable audio output device 301 includes a wireless interface 315 for communication with one or more multifunction devices, such as device 100 (FIG. 1A) or device 300 (FIG. 3A). In some embodiments, interface 315 is a wired interface for connection with a multifunction device, such as device 100 (FIG. 1A) or device 300 (FIG. 3A) (e.g., via a headphone jack or other audio port). In some embodiments, a user can interact with and provide inputs (e.g., remotely) to wearable audio output device 301 via interface 315. In some embodiments, wearable audio output device 301 is in communication with multiple multifunction devices, and audio I/O logic 312 determines, which of the multifunction devices from which to accept instructions for outputting audio.

In some embodiments, wearable audio output device 301 includes one or more microphones 302 for receiving audio input. In some embodiments, microphone(s) 302 detect speech from a user wearing wearable audio output device 301 and/or ambient noise around wearable audio output device 301. In some embodiments, as described in more detail herein with reference to FIG. 3C, multiple microphones of microphones 302 are positioned at different locations on wearable audio output device 301 to measure speech and/or ambient noise at different locations around wearable audio output device 301. In some embodiments where wearable audio output device 301 includes multiple (e.g., a pair) of wearable audio output components (e.g., earphones or earbuds), each component includes one or more respective microphones. In some embodiments, audio I/O logic 312 detects or recognizes speech or ambient noise based on information received from microphone(s) 302.

Figure 3C:
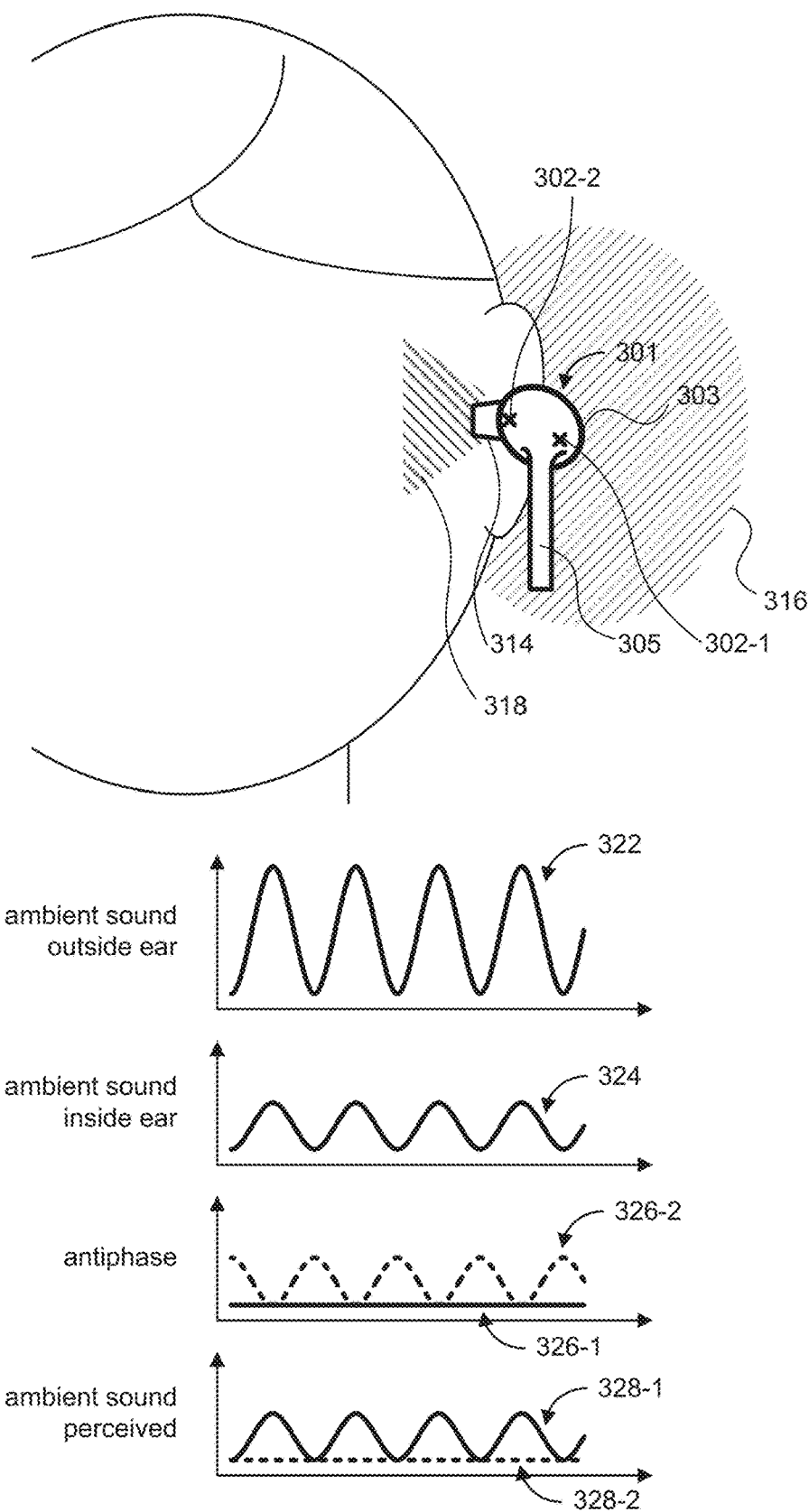
FIG. 3C illustrates example audio control by a wearable audio output device in accordance with some embodiments.

In some embodiments, wearable audio output device 301 includes one or more input devices 308. In some embodiments where wearable audio output device 301 includes multiple (e.g., a pair) of wearable audio output components (e.g., earphones, earbuds, or earcups), each component includes one or more respective input devices. In some embodiments, input device(s) 308 includes a pressure-sensitive (e.g., intensity-sensitive) input device, which in some embodiments is located within a portion of wearable audio output device 301, sometimes called a "stem," that physically extends from a portion of wearable audio output device 301 that is configured to be inserted in a user's ear (e.g., stem 305 as shown in FIG. 3C). In some embodiments, the pressure-sensitive input device detects inputs from a user in response to the user squeezing the input device (e.g., by pinching the stem of wearable audio output device 301 between two fingers). In some embodiments, input device(s) 308 include a touch-sensitive surface (for detecting touch inputs), accelerometer(s) and/or attitude sensor(s) (for determining an attitude of wearable audio output device 301 relative to a physical environment and/or changes in attitude of the device, and/or other input device by which a user can interact with and provide inputs to wearable audio output device 301. In some embodiments, input device(s) 308 include one or more volume control hardware elements (e.g., an up/down button for volume control, or an up button and a separate down button, as described herein with reference to FIG. 1A) for volume control (e.g., locally) of wearable audio output device 301. In some embodiments, inputs provided via input device(s) 308 are processed by audio I/O logic 312. In some embodiments, audio I/O logic 312 is in communication with a separate device (e.g., device 100, FIG. 1A, or device 300, FIG. 3A) that provides instructions or content for audio output, and that optionally receives and processes inputs (or information about inputs) provided via microphone(s) 302, placement sensor(s) 304, and/or input device(s) 308, or via one or more input devices of the separate device. In some embodiments, audio I/O logic 312 is located in device 100 (e.g., as part of peripherals interface 118, FIG. 1A) or device 300 (e.g., as part of I/O interface 330, FIG. 3A), instead of device 301, or alternatively is located in part in device 100 and in part in device 301, or in part in device 300 and in part in device 301.

FIG. 3C illustrates example audio control by a wearable audio output device in accordance with some embodiments. In some embodiments, when a wearable audio output device having earbuds to which interchangeable eartips may be attached are worn in a user's ears, the earbuds and eartips together act as physical barriers that block at least some ambient sound from the surrounding physical environment from reaching the user's ear. For example, in FIG. 3C, wearable audio output device 301 is worn by a user such that earbud 303 and eartip 314 are in the user's left ear. Eartip 314 extends at least partially into the user's ear canal. Preferably, when earbud 303 and eartip 314 are inserted into the user's ear, a seal is formed between eartip 314 and the user's ear so as to isolate the user's ear canal from the surrounding physical environment. However, in some circumstances, earbud 303 and eartip 314 together block some, but not necessarily all, of the ambient sound in the surrounding physical environment from reaching the user's ear. Accordingly, in some embodiments, a first microphone (or, in some embodiments, a first set of one or more microphones) 302-1 (e.g., of microphones 302, FIG. 3B) is located on wearable audio output device 301 so as to detect ambient sound, represented by waveform 322, in region 316 of a physical environment surrounding (e.g., outside of) earbud 303. In some embodiments, a second microphone (or, in some embodiments, a second set of one or more microphones) 302-2 (e.g., of microphones 302, FIG. 3B) is located on wearable audio output device 301 so as to detect any ambient sound, represented by waveform 324, that is not completely blocked by earbud 303 and eartip 314 and that can be heard in region 318 inside the user's ear canal. Accordingly, in some circumstances in which wearable audio output device 301 is not producing a noise-cancelling (also called "antiphase") audio signal to cancel (e.g., attenuate) ambient sound from the surrounding physical environment, as indicated by waveform 326-1, ambient sound waveform 324 is perceivable by the user, as indicated by waveform 328-1. In some circumstances in which wearable audio output device 301 is producing an antiphase audio signal to cancel ambient sound, as indicated by waveform 326-2, ambient sound waveform 324 is not perceivable by the user, as indicated by waveform 328-2.

In some embodiments, ambient sound waveform 322 is compared to attenuated ambient sound waveform 324 (e.g., by wearable audio output device 301 or a component of wearable audio output device 301, such as audio I/O logic 312, or by an electronic device that is in communication with wearable audio output device 301) to determine the passive attenuation provided by wearable audio output device 301. In some embodiments, the amount of passive attenuation provided by wearable audio output device 301 is taken into account when providing the antiphase audio signal to cancel ambient sound from the surrounding physical environment. For example, antiphase audio signal waveform 326-2 is configured to cancel attenuated ambient sound waveform 324 rather than unattenuated ambient sound waveform 322.

In some embodiments, wearable audio output device 301 is configured to operate in one of a plurality of available audio output modes, such as an active noise control audio output mode, an active pass-through audio output mode, and a bypass audio output mode (also sometimes called a noise control off audio output mode). In the active noise control mode (also called "ANC"), wearable audio output device 301 outputs one or more audio-cancelling audio components (e.g., one or more antiphase audio signals, also called "audio-cancellation audio components") to at least partially cancel ambient sound from the surrounding physical environment that would otherwise be perceivable to the user. In the active pass-through audio output mode, wearable audio output device 301 outputs one or more pass-through audio components (e.g., plays at least a portion of the ambient sound from outside the user's ear, received by microphone 302-1, for example) so that the user can hear a greater amount of ambient sound from the surrounding physical environment than would otherwise be perceivable to the user (e.g., a greater amount of ambient sound than would be audible with the passive attenuation of wearable audio output device 301 placed in the user's ear). In the bypass mode, active noise management is turned off, such that wearable audio output device 301 outputs neither any audio-cancelling audio components nor any pass-through audio components (e.g., such that any amount of ambient sound that the user perceives is due to physical attenuation by wearable audio output device 301).

In some embodiments, wearable audio output device 301b represents a set of headphones with on-ear earcups to be worn on a user's ears, or over-ear earcups to be worn over a user's ears, rather than one or more earbuds to be worn in the user's ears. In some such embodiments, the earcups act as the physical barriers that block at least some ambient sound from the surrounding physical environment from reaching the user's ear. At least one of the earcups includes microphones 302-1 and 302-2 to detect, respectively, ambient sound in the physical environment (corresponding to ambient sound in region 316, represented by waveform 322 in FIG. 3C) and ambient sound that is not completely blocked by the earcup (corresponding to ambient sound that can be heard in region 318, represented by waveform 324 in FIG. 3C). In some embodiments, both earcups include respective pairs of microphones 302 for detecting ambient sound with respect to each earcup.

Attention is now directed towards embodiments of user interfaces ("U") that are, optionally, implemented on portable multifunction device 100.

Figure 4A:
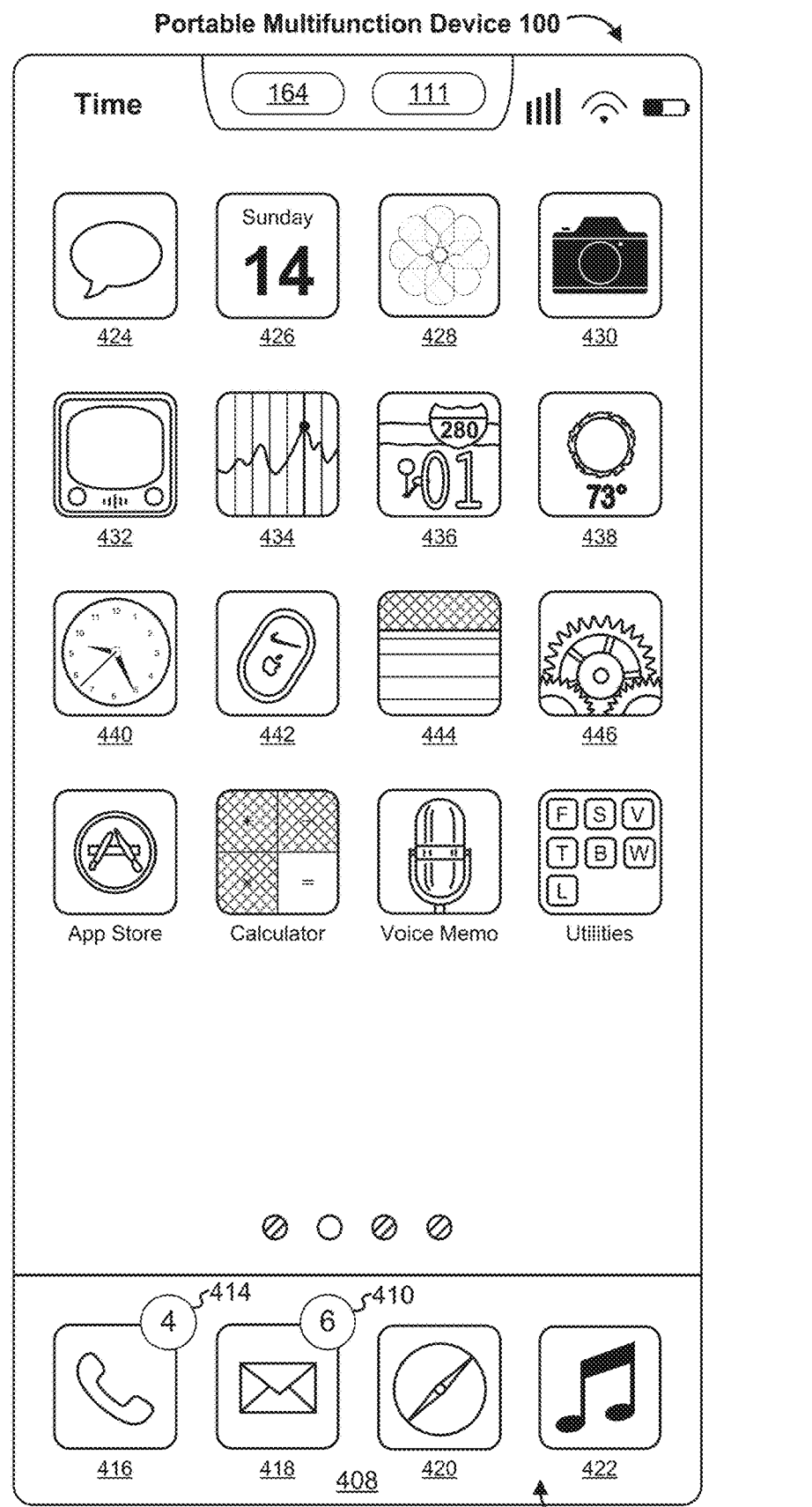
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, labeled "Music;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
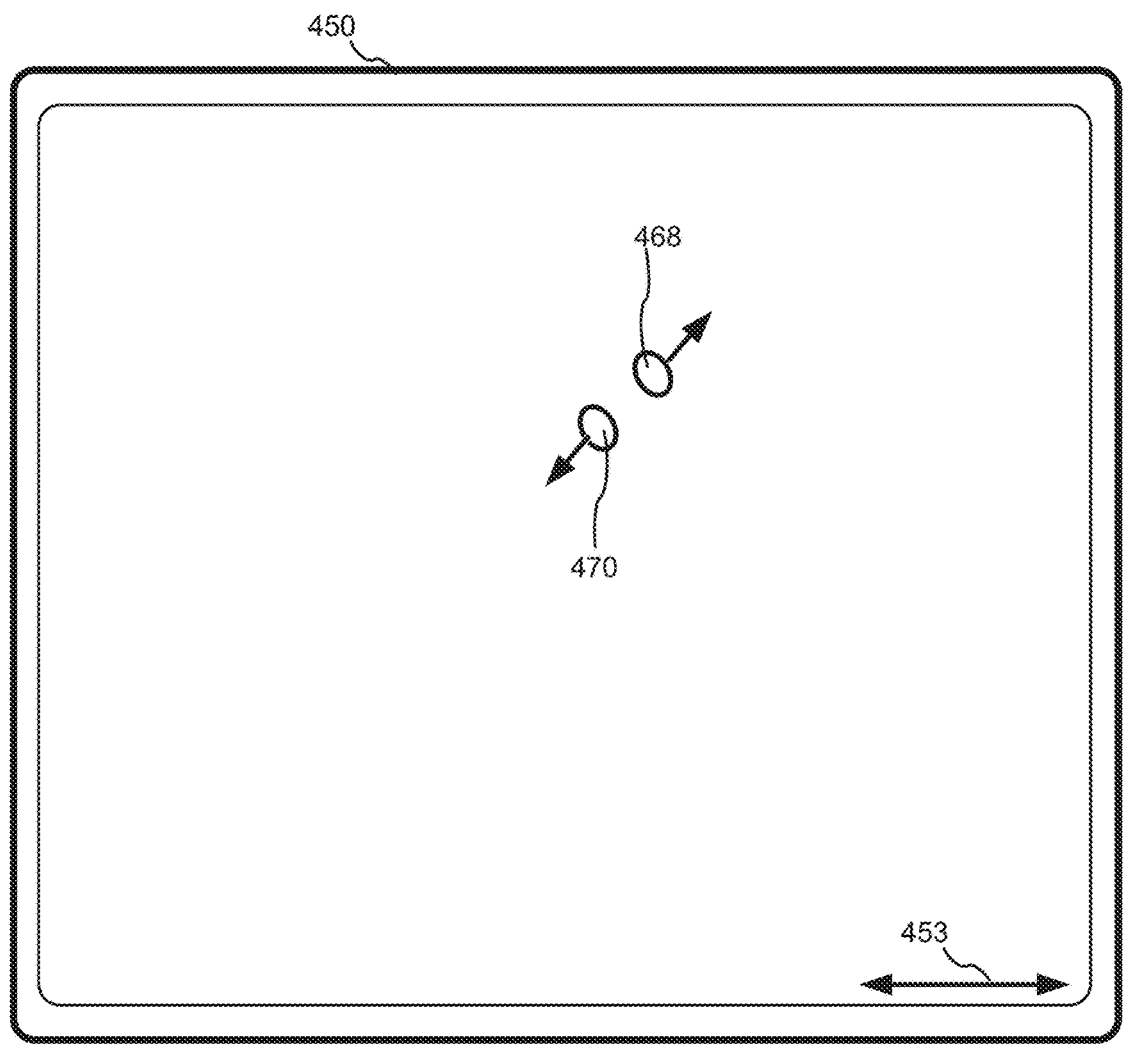
FIG. 4B illustrates an example user interface for a multifunction device with a touch-sensitive surface that is separate from the display in accordance with some embodiments.
Figure 4B:
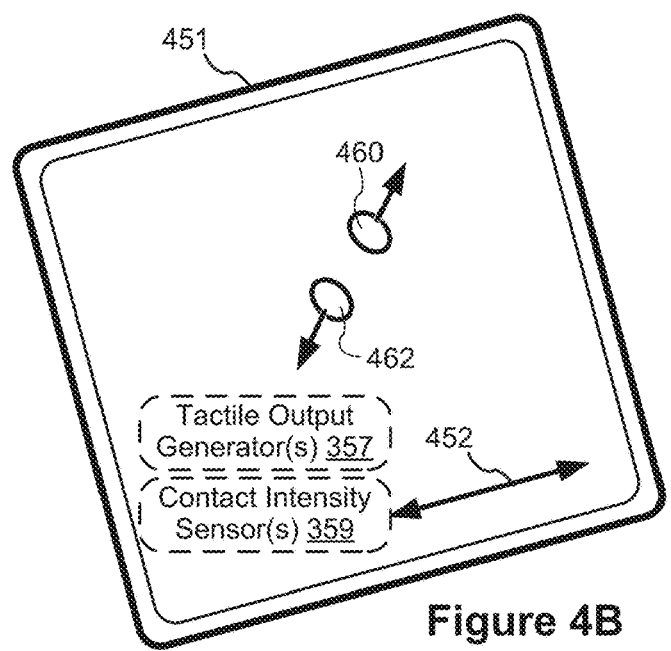

FIG. 4B illustrates an example user interface on a device (e.g., device 300, FIG. 3A) with a touch-sensitive surface 451 (e.g., a tablet or touchpad 355, FIG. 3A) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. Furthermore, as described above, in some embodiments, other input devices and methodologies are used to receive user inputs. It should be understood that similar methods are, optionally, used for other user interfaces described herein.

In some embodiments, the response of the device to inputs detected by the device depends on criteria based on characteristics of the input, such as the duration of the input or the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria. Alternatively, in some embodiments, for some light press inputs, the duration of the input exceeding a first threshold amount of time (e.g., since the input was detected) triggers a first response; and in some embodiments, for some deep press inputs, the duration of the input exceeding a second threshold amount of time (e.g., since the input was detected), greater than the first threshold amount of time, triggers a second response different from the first response.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

User Interfaces and Associated Processes

Attention is now directed towards embodiments of user interfaces ("UI") and associated processes that may be implemented on an electronic device (e.g., portable multifunction device 100 (FIG. 1A) or device 300 (FIG. 3A)) that is in communication with one or more display devices (e.g., touch-sensitive display system 112 (FIG. 1A), or display 340 (FIG. 3A)), one or more input devices (e.g., touch-sensitive display system 112 (FIG. 1A) or touchpad 355 (FIG. 3A)), and one or more audio output devices (e.g., a set of one or more wearable audio output devices 301 (FIG. 3B), such as a set of on-ear or over-ear headphones, a pair of earbuds or earphones, etc.). In some embodiments, the user interfaces and associated processes may be implemented at least in part on one or more audio output devices (e.g., one or more wearable audio output devices 301 (FIG. 3B)), and in some embodiments at least in part on one or more electronic devices, such as portable multifunction device 100 (FIG. 1A) or device 300 (FIG. 3A). In some embodiments, the user interfaces and associated processes may be implemented on a system, optionally a wearable system, that includes or is in communication with one or more audio output devices (e.g., a set of one or more wearable audio output devices 301 (FIG. 3B)), and that includes or is in communication with one or more electronic devices (e.g., portable multifunction device 100 (FIG. 1A) or device 300 (FIG. 3A)).

Figure 5A:
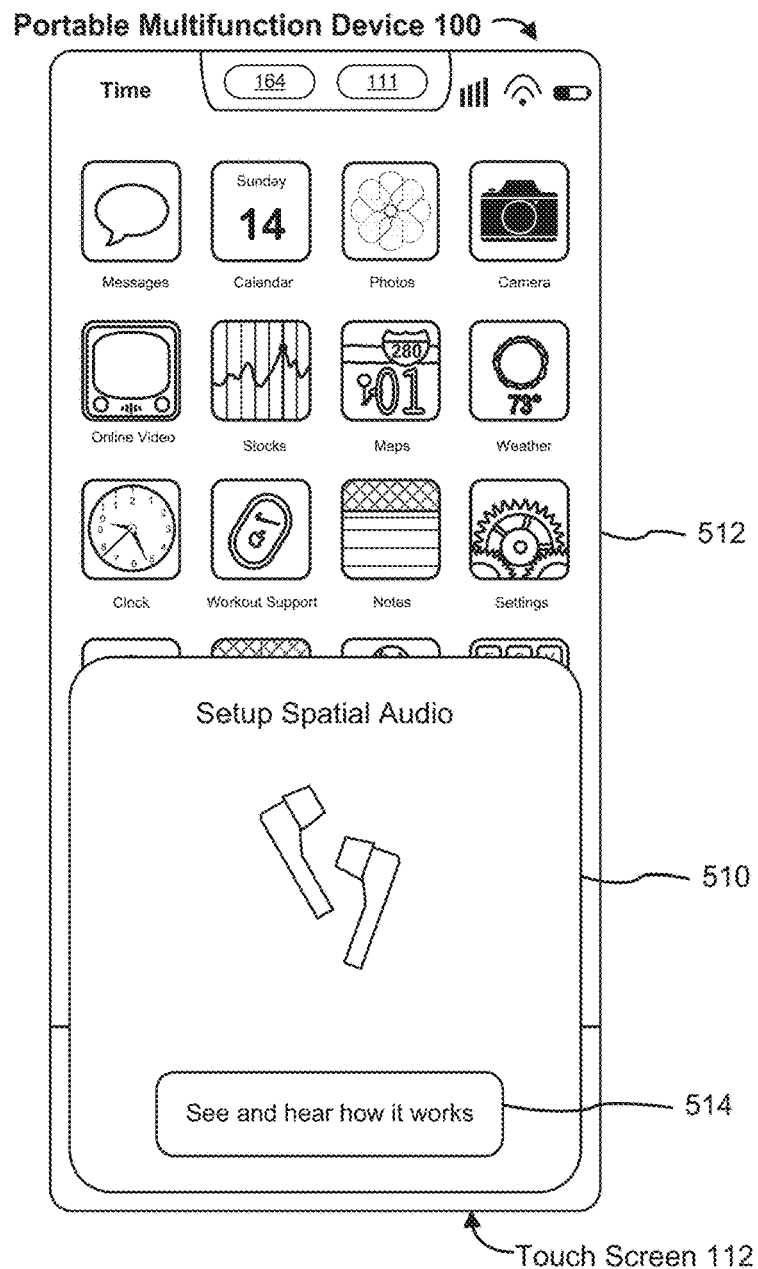
FIGS. 5A-1 through 5J illustrate example user interfaces for demonstrating and selecting audio output modes of wearable audio output devices in accordance with some embodiments.
Figure 1:
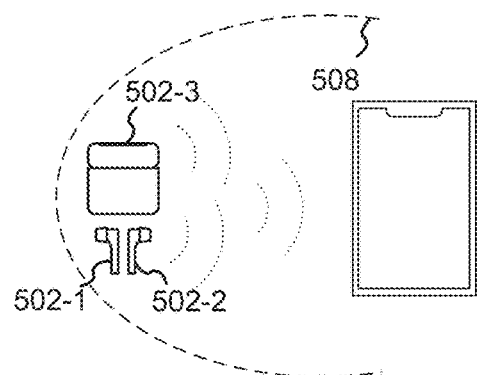
Figures 2, 5A:
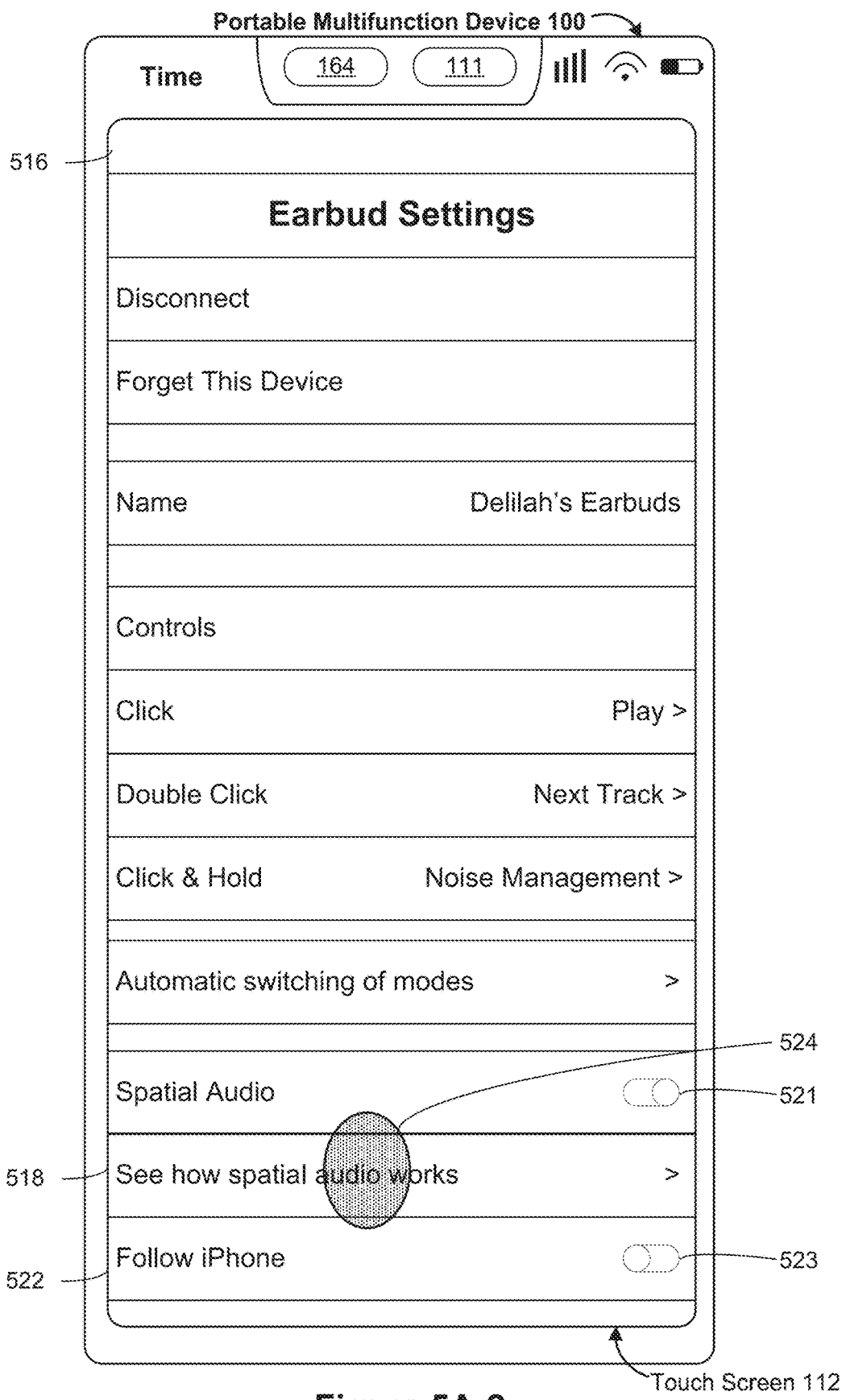
Figure 5B:
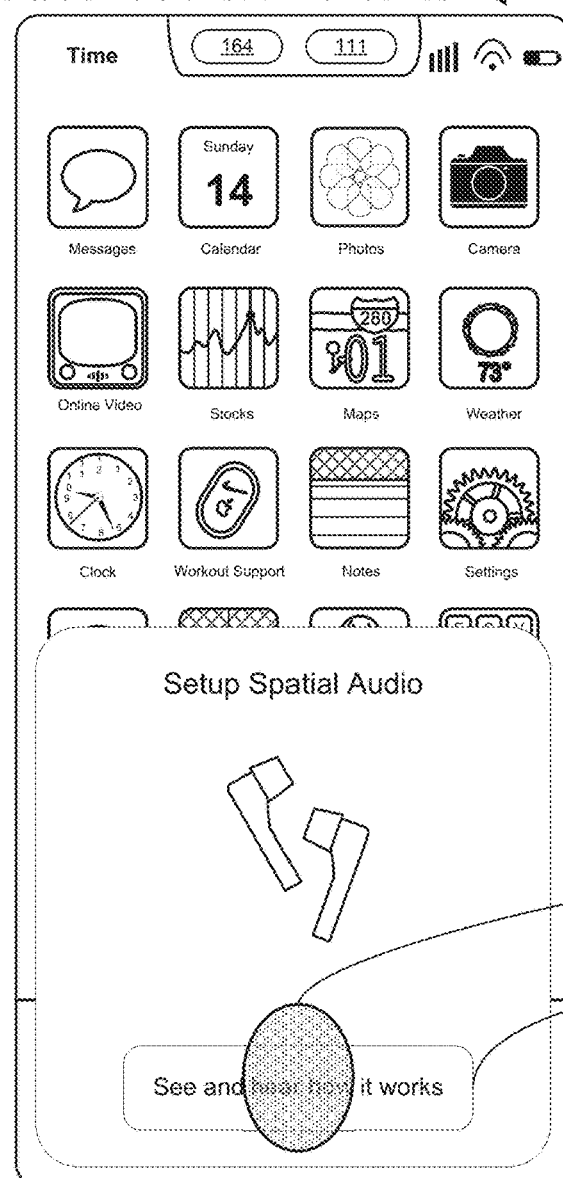
Figure 5B:
Figure 5B:
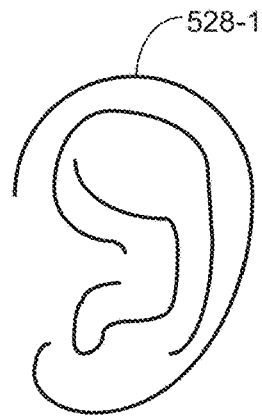
Figure 5B:
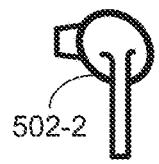
Figure 5B:
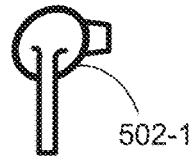
Figure 5B:
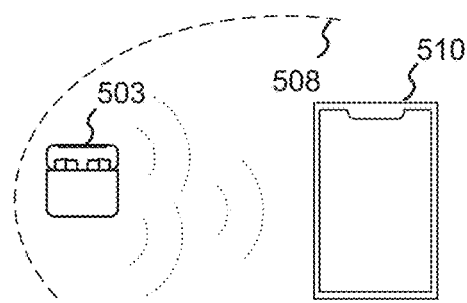
Figure 5C:
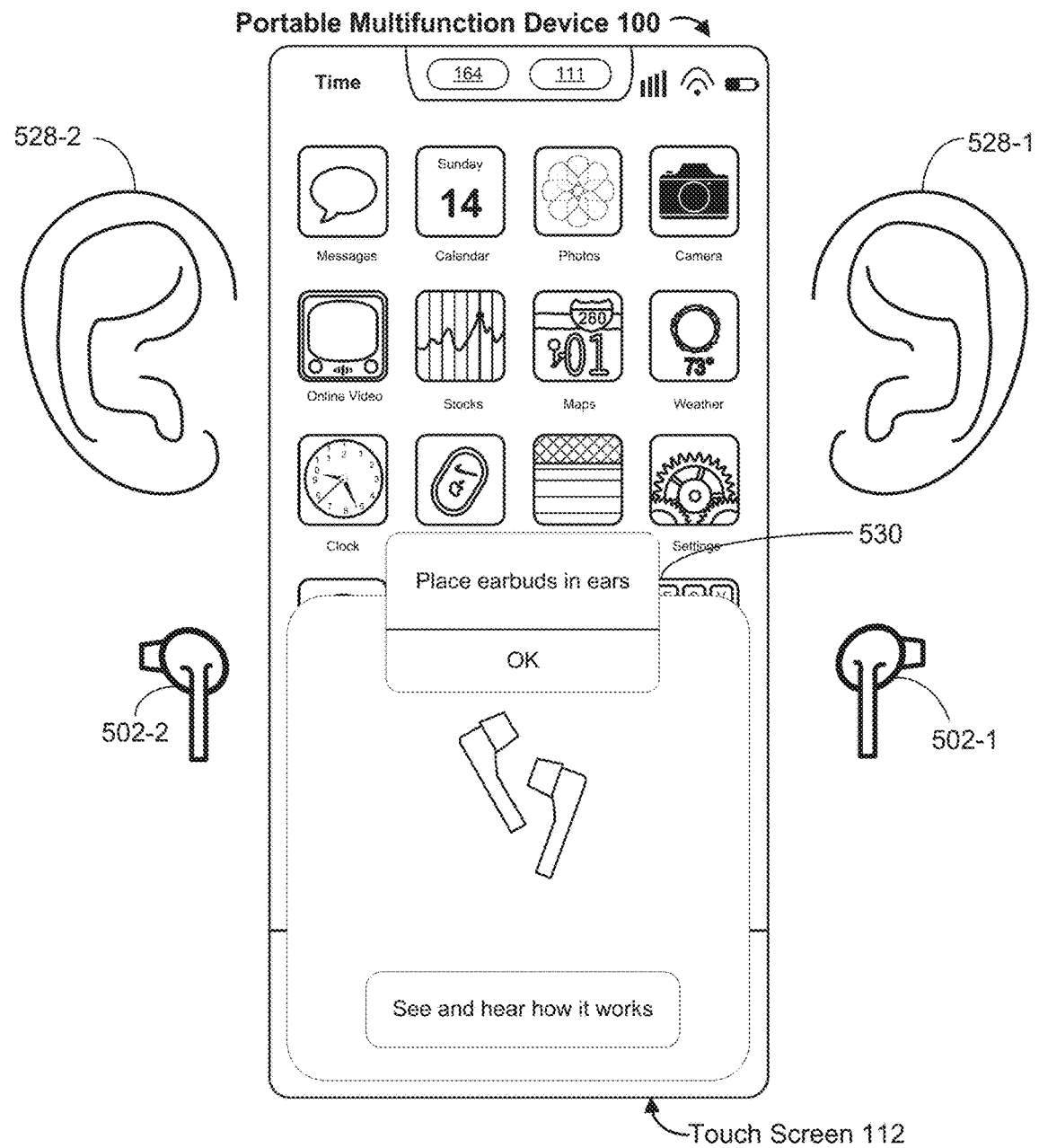
Figure 5D:
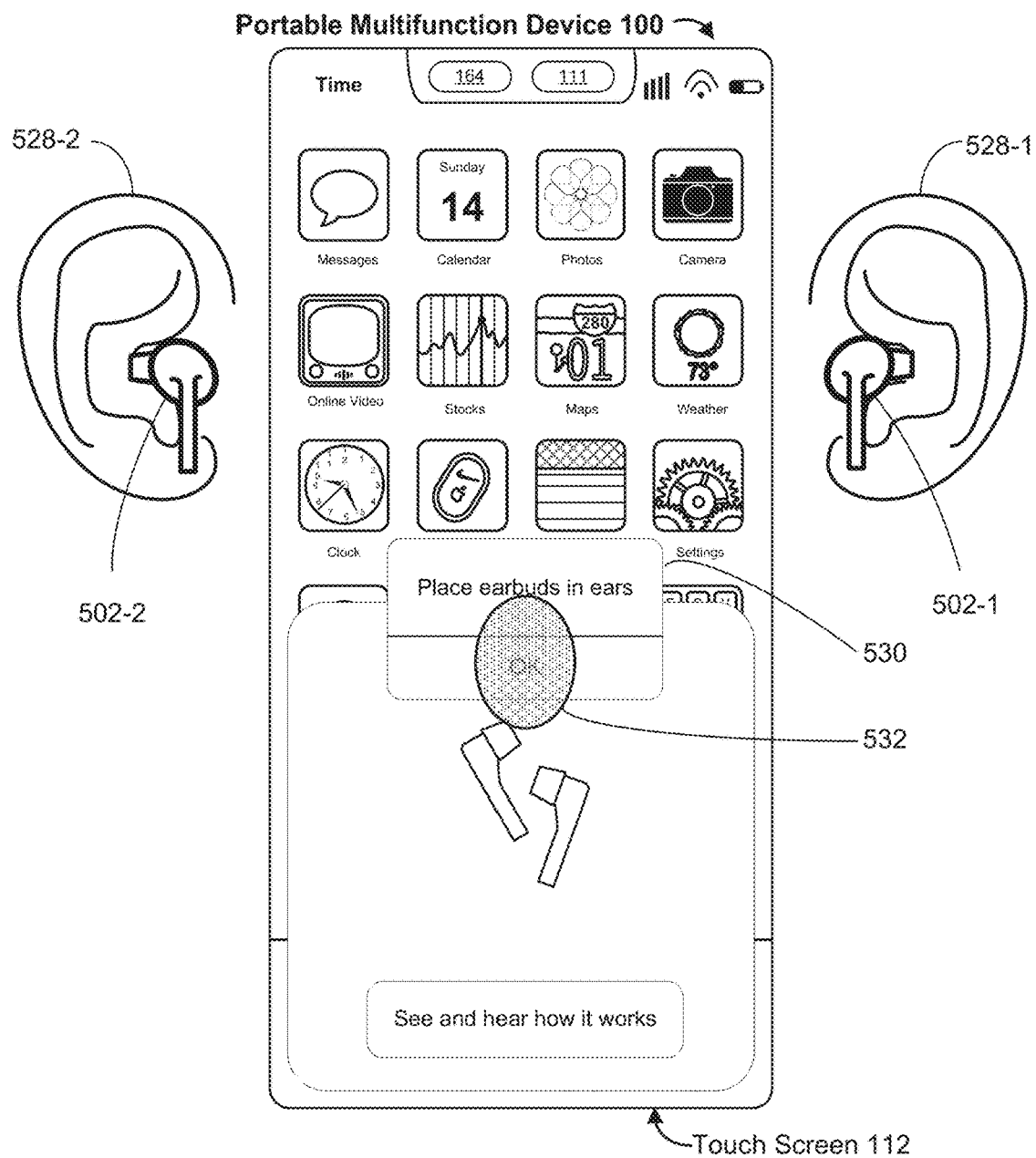
Figure 5E:
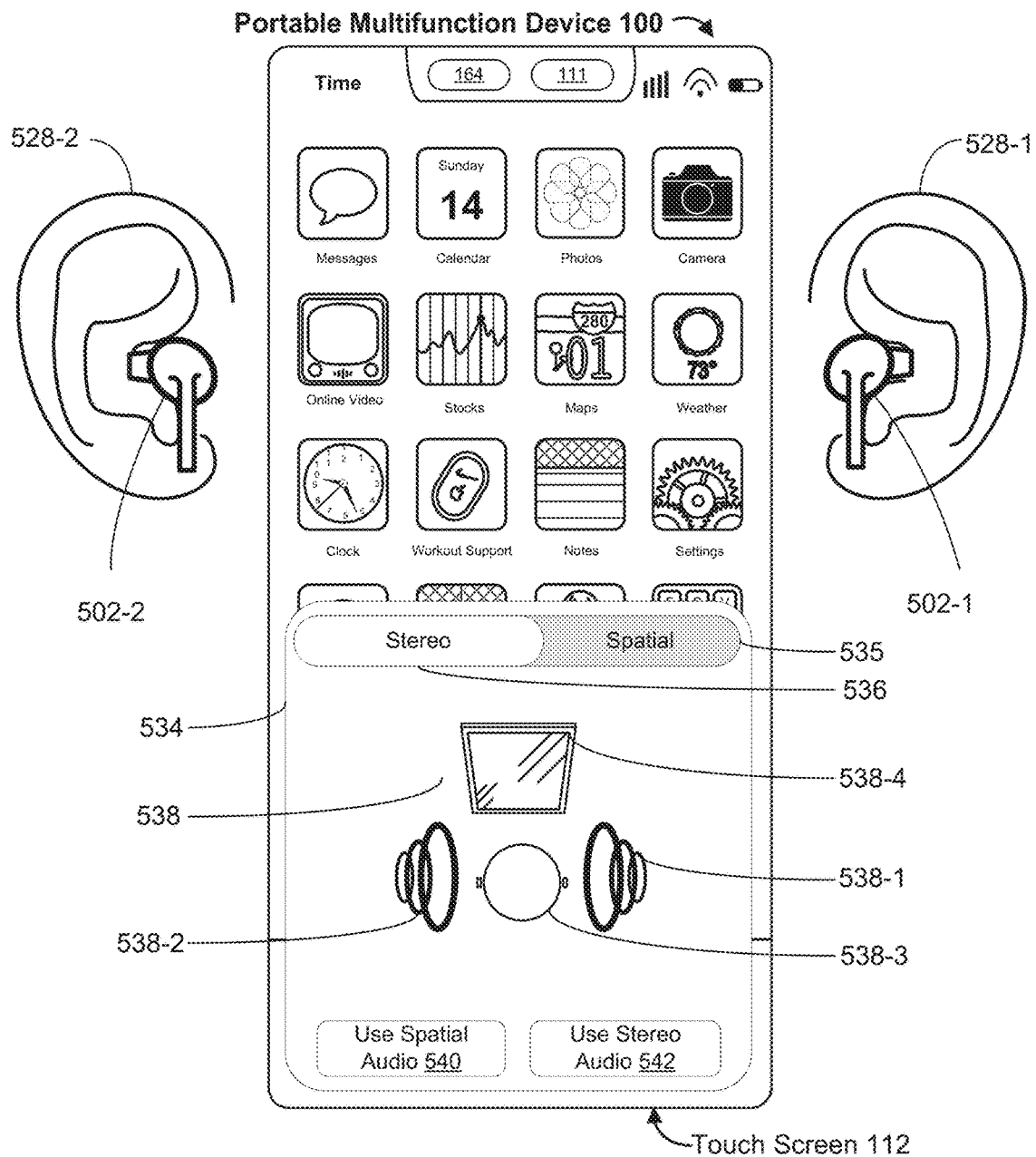
Figure 5F:
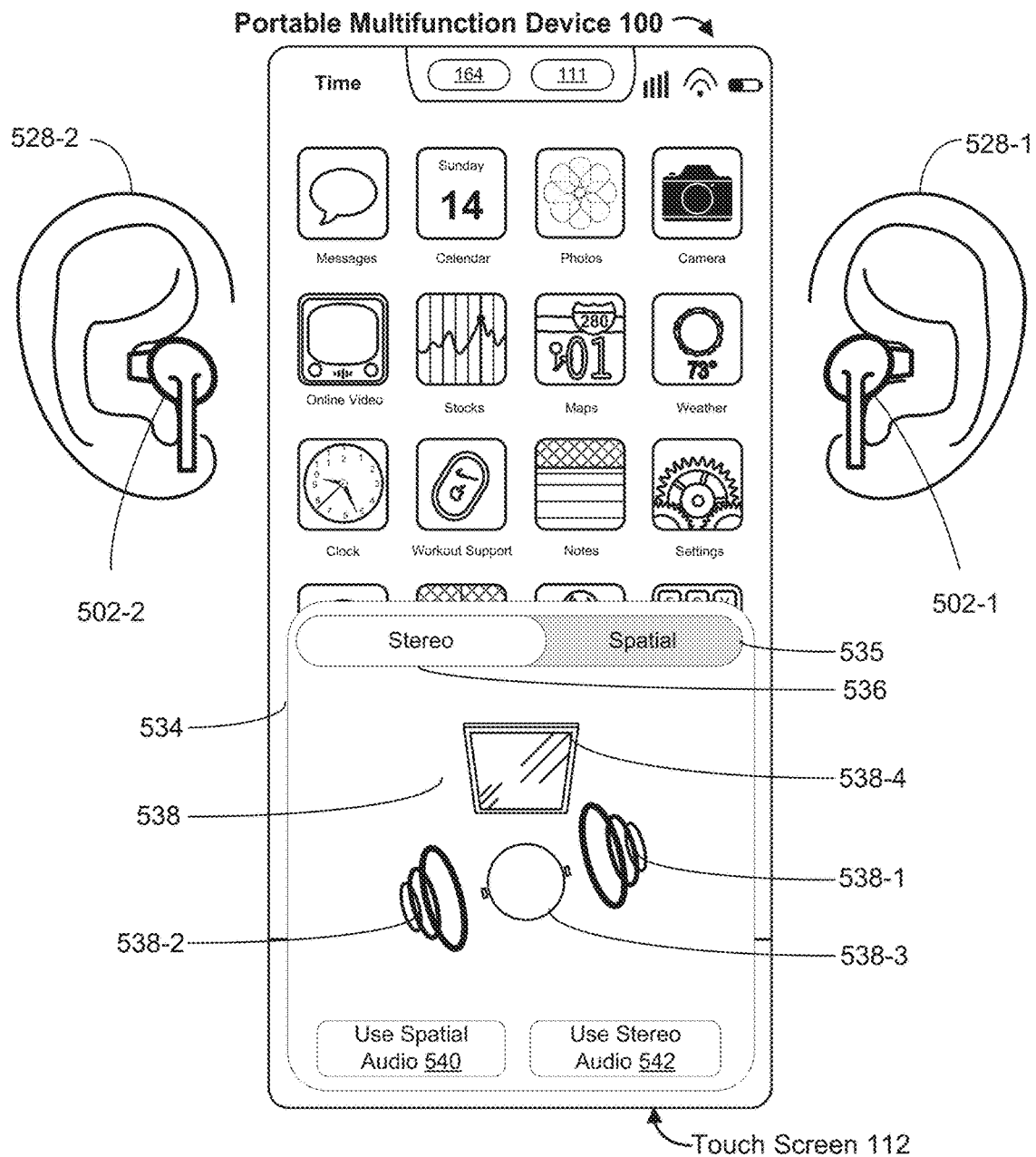
Figure 5G:
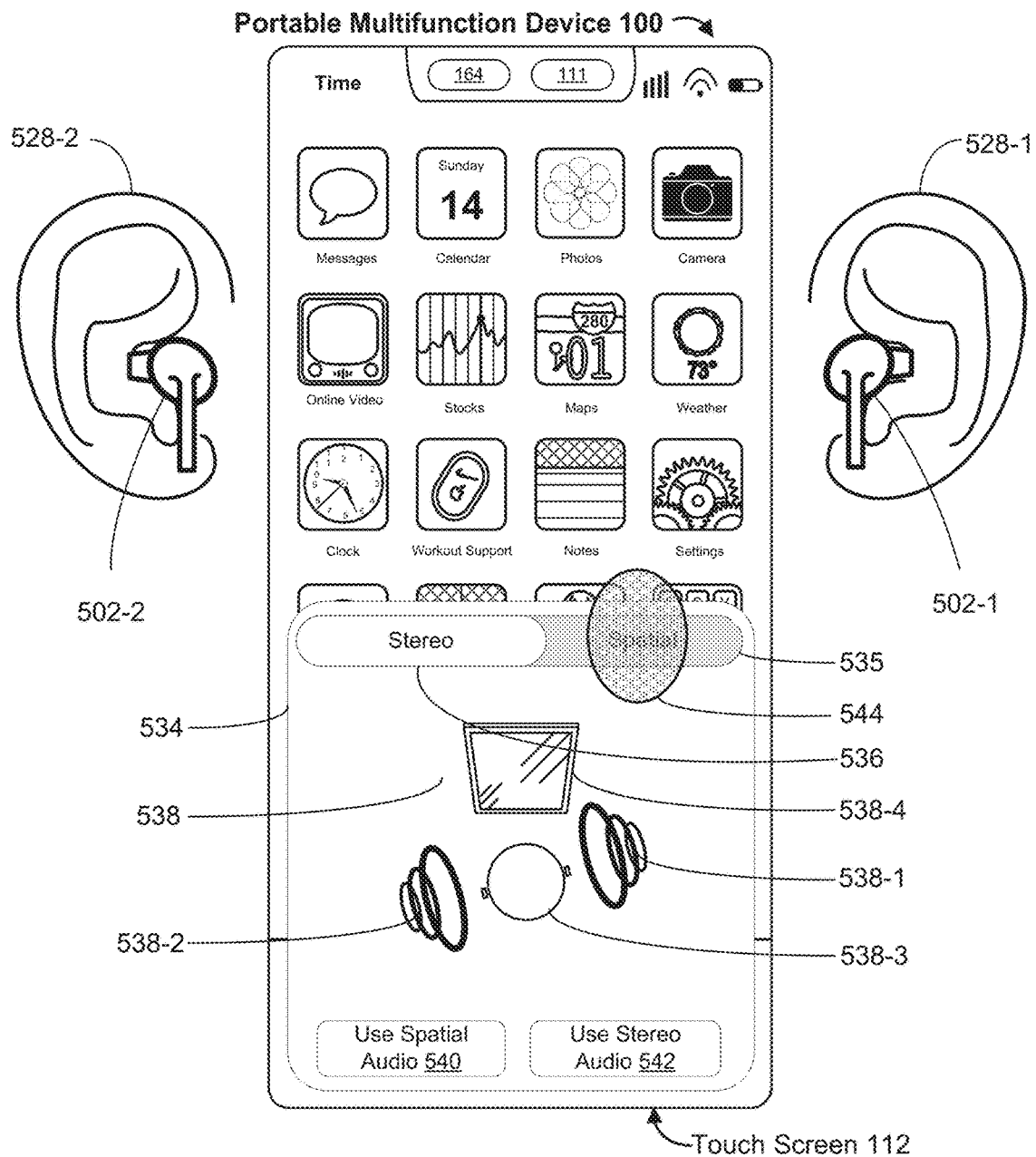
Figure 5H:
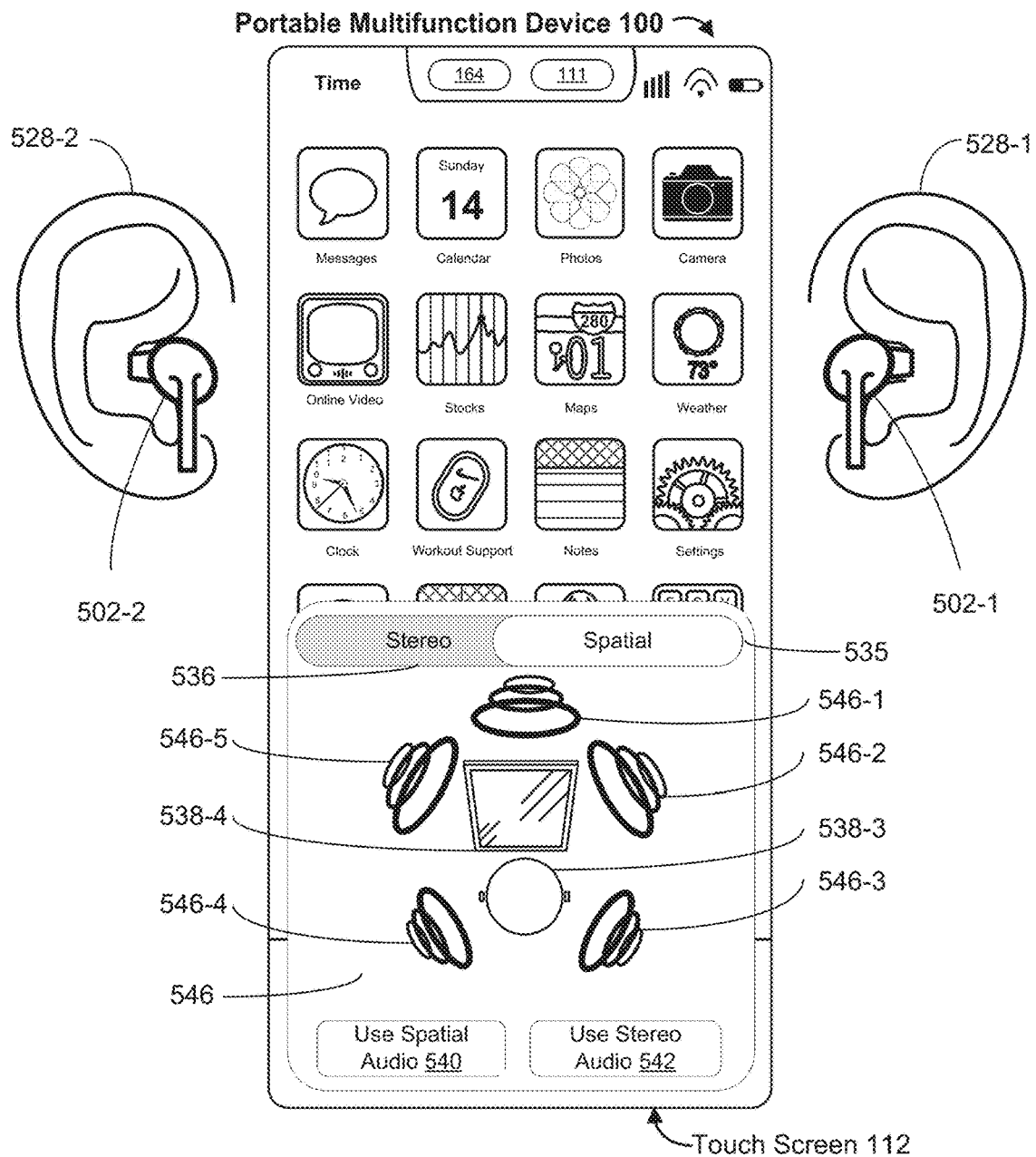
Figure 5I:
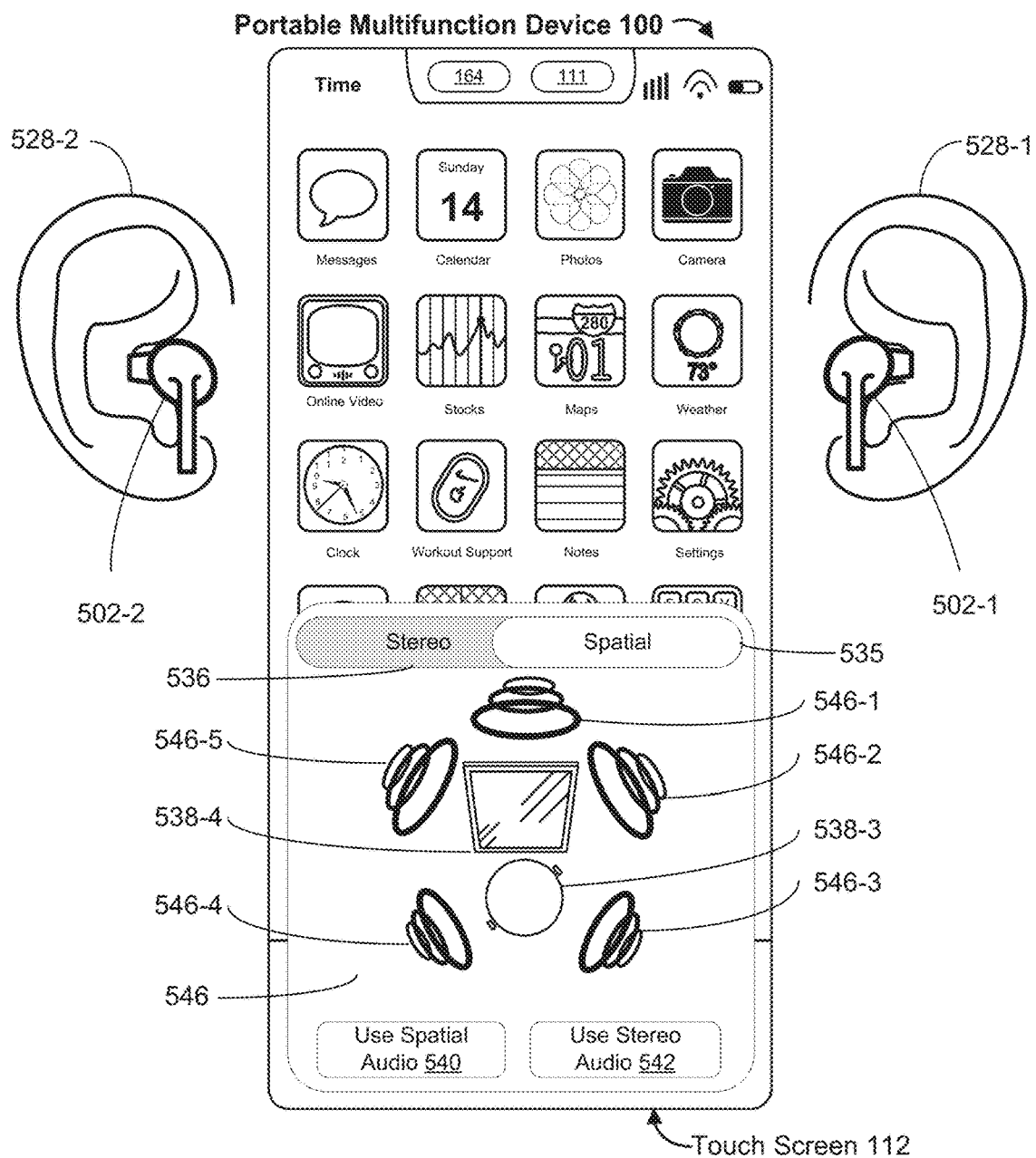
Figure 5J:
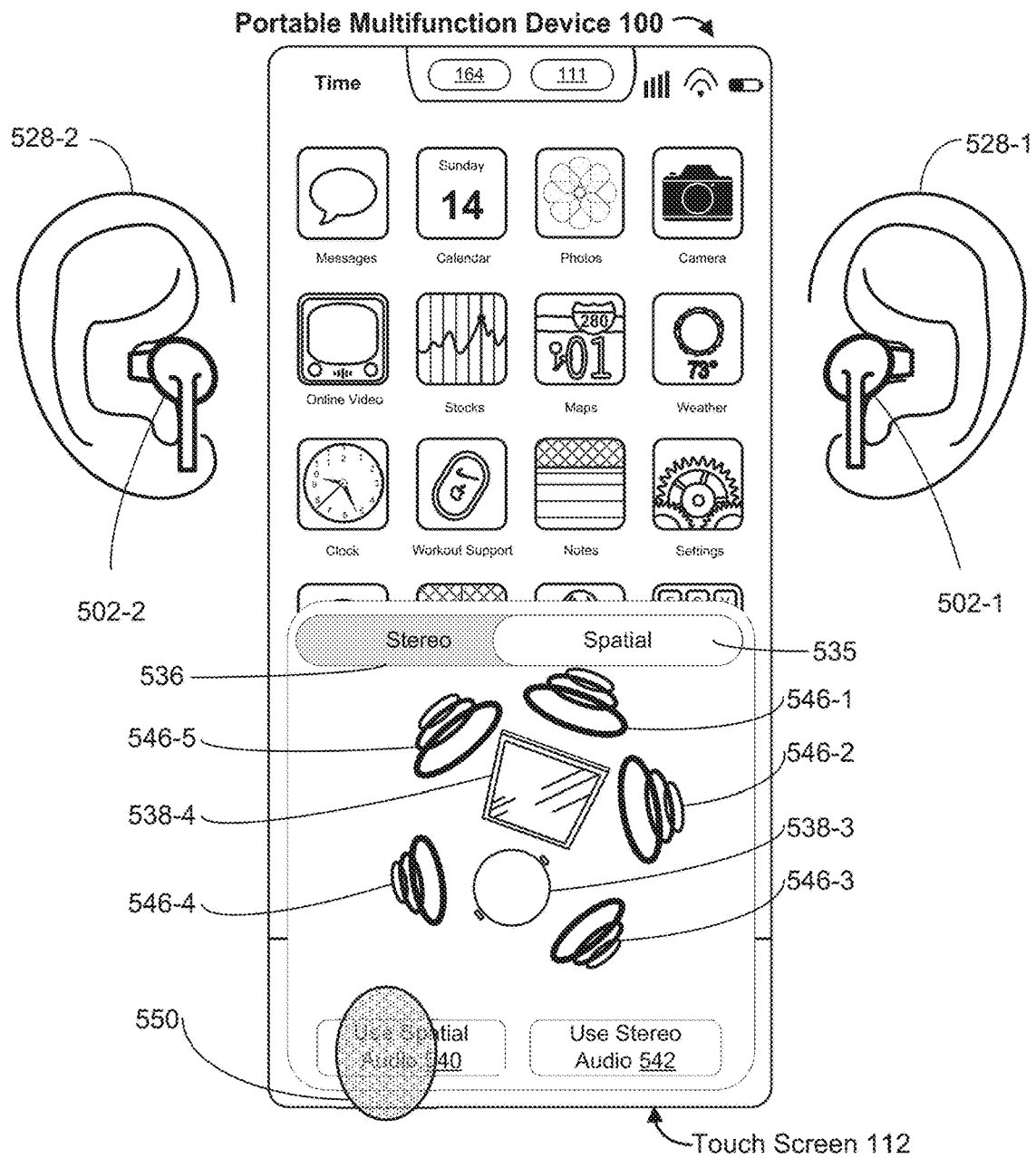
Figure 6A:
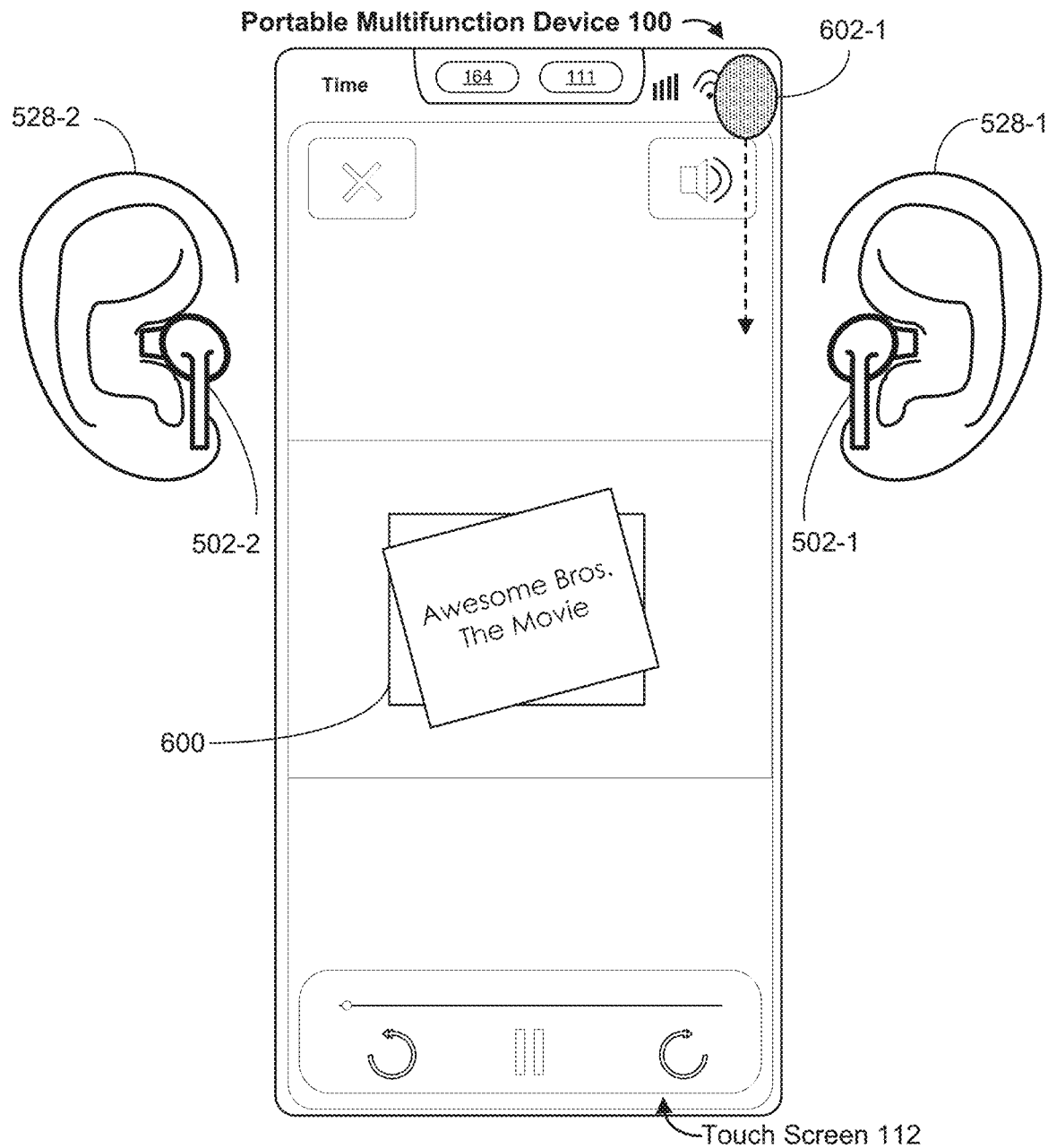
FIGS. 6A-6O illustrate example user interfaces for displaying and modifying status of audio output modes of audio output devices in accordance with some embodiments.

FIGS. 5A-1 to 5J illustrate example user interfaces for demonstrating and selecting audio output modes of wearable audio output devices in accordance with some embodiments. FIGS. 6A-6P illustrate example user interfaces for displaying and modifying status of audio output modes of audio output devices in accordance with some embodiments. The user interfaces in these figures are used to illustrate the processes described below, including the processes in FIGS. 7A-7D, and 8A-8E. For convenience of explanation, some of the embodiments will be discussed with reference to operations performed on an electronic device 100 having a touch-sensitive display system 112 and that is in communication with a set of one or more wearable audio output devices. However, analogous operations are, optionally, performed on other types of devices with other types of input devices. For example, analogous operations may be performed using a device with a display 450 and a separate touch-sensitive surface 451 (FIG. 4B) in response to detecting inputs on the touch-sensitive surface 451 while displaying the user interface shown in the figures on the display 450. In other examples, the touch-sensitive display and/or the other aforementioned physical user-interface devices are replaced by or supplemented by other forms of providing input such as a voice recognition device or subsystem for receiving orally delivered user inputs, one or more cameras or camera subsystem tracking the position of a physical input device that in some cases is separate from (e.g., held or worn by) the user or that in some cases is a feature of the user such as the user's hand, and/or a user gaze determination device or subsystem that determines a location (e.g., in a user interface, or in a two or three dimensional environment) or sequence of locations at which a user is gazing or focusing. In addition, while some of the embodiments will be discussed with reference to a set of wearable audio output devices that includes a pair of earbuds 502, analogous operations are, optionally, performed using a wearable audio output device that is a pair of on-ear or over-ear headphones, and that includes a pair of earcups. In such cases, an operation described below as being performed with respect to one earbud of the pair of earbuds is analogously performed using one earcup of the pair of headphones (e.g., placement of an earbud in the user's ear is analogous to placement of an earcup over the user's ear, and removal of an earbud from a user's ear is analogous to removal of an earcup from the user's ear).

FIGS. 5A-1 to 5J illustrate example user interfaces for demonstrating and selecting audio output modes of wearable audio output devices in accordance with some embodiments. FIG. 5A-1 illustrates an example user interface 512 on display 112 of device 100. In the example of FIG. 5A-1, user interface 512 is an application launcher user interface. In other examples, user interface 512 is a system user interface (e.g., other than an application launcher user interface) or a respective application user interface. While displaying the user interface 512, device 100 periodically and repeatedly listens for wireless broadcast signals (e.g., pairing requests) from one or more peripherals (e.g., earbuds 502-1 and 502-2 as well as earbud case 502-3) to pair the peripheral(s) with device 100. In some embodiments, device 100 detects pairing requests from a peripheral when the peripheral is within threshold distance 508 of device 100 and cannot detect pairing requests from a peripheral when the peripheral is outside of threshold distance 508. For example, at the bottom of FIG. 5A-1, FIG. 5A-1 illustrates an example spatial relationship (e.g., physical distance) between device 100 and earbuds 502-1 and 502-2 (collectively also referred to as earbuds 502 or wearable audio output devices 502) as well as earbud case 502-3, where earbuds 502-1 and 502-2 as well as earbud case 502-3 (illustrated and hereinafter referred to collectively as earbud set 503) are within a threshold distance 508 of device 100.

FIG. 5A-1 shows that after the device 100 and the earbud set 503 have successfully paired (e.g., for a first time ever, or for a first time since system software of device 100 has been updated), a user interface 510 (e.g., titled "Setup Spatial Audio") is displayed. In the example shown in FIG. 5A-1, user interface 510 is a user interface card that overlays or replaces display of a portion of the previously displayed user interface, which in this example is application launcher user interface 512). In some embodiments, user interface card 510 is displayed automatically in response to device 100 and earbud set 503 successfully pairing, without further user intervention. The user interface 510 is displayed to begin a setup process to demonstrate a spatial audio output mode and determine which mode to set as the active mode that earbuds 502 will use to play back audio (e.g., whether to enable the spatial audio output mode). User interface 510 includes button 514 (e.g., labeled, "See and hear how it works"), which, when activated, begins the setup process.

A spatial audio output mode is a mode that allows audio that is output from the earbuds 502 to sound as though the audio is coming from one or more locations (e.g., one or more sources of sound) in a frame of reference, such as a physical environment (e.g., a surround sound effect), where the positioning of the one or more simulated or perceived sources of sound is independent of movement of earbuds 502 relative to the frame of reference. Typically, the one or more perceived sound sources, when fixed, are fixed relative to the frame of reference, and, when moving, move relative to the frame of reference. For example, where the frame of reference is a physical environment, the one or more perceived sound sources have respective spatial locations in the physical environment. As earbuds 502 move about the physical environment, the audio output from earbuds 502 is adjusted so that the audio continues to sound as though it is coming from the one or more perceived sound sources at the respective spatial locations in the physical environment. Where the one or more perceived sound sources are moving sources that move through a sequence of spatial locations about the physical environment, the audio output from earbuds 502 is adjusted so that the audio continues to sound as though it is coming from the one or more perceived sound sources at the sequence of spatial locations in the physical environment. Such adjustment for moving sound sources also takes into account any movement of earbuds 502 relative to the physical environment (e.g., if earbuds 502 move relative to the physical environment along an analogous path as the moving source of sound so as to maintain a constant spatial relationship with the source of sound, the audio would be output so that the sound does not appear to move relative to earbuds 502).

In some embodiments, the frame of reference for the spatial audio effect is fixed to an electronic device, such as device 100, that is outputting audio via earbuds 502 (e.g., the sound follows the device), and is referred to herein as the "follow device" feature. For example, locations of the simulated sources of the audio in a physical environment move corresponding to movement of device 100 in the physical environment. This feature may be useful when the user is traveling in a vehicle or other mode of transportation, or walking, or the like and the device is moving along with the user, so the audio moves along with the device and the user in the vehicle, or in situations where the device is moving relative to the audio output device(s) and is associated with visual content playing on the device, so that the simulated sources of sound are located at virtual locations that correspond to the location of the device as it moves around the physical environment. When the follow device feature is not enabled, the audio output does not follow the movement of device 100. For example, spatial audio is positioned relative to a frame of reference that is not fixed to device 100 (e.g., such that the spatial audio is not moved based on movement of device 100 even as device 100 moves relative to the frame of reference), and non-spatial stereo or mono audio is positioned relative to the position of the earbuds, and is not moved based on device 100 being moved.

FIG. 5A-2 shows an example user interface on display 112 of device 100. The example user interface is a settings user interface 516 for the earbuds 502. The settings user interface 516 includes a plurality of user interface elements for adjusting the audio output of the earbuds 502. In some embodiments, one of the plurality of user interface elements is a selectable option 518 for accessing a demonstration of the spatial audio output mode (and optionally demonstrations of one or more other audio output modes), as described in more detail herein with reference to FIG. 5E. In some embodiments, one of the plurality of user interface elements is a user interface element 520 that includes a button (e.g., a toggle) 521 for activating and deactivating spatial audio. In some embodiments, one of the plurality of user interface elements is a user interface element 522 that includes a button (e.g., a toggle) 523 for activating and deactivating the follow device feature (e.g., where spatial audio is positioned relative to and follows the position of device 100 while spatial audio is activated). FIG. 5A-2 also shows an input 524 on selectable option 518. Optionally, in response to input 524, device 100 transitions from displaying settings user interface 516 to displaying the interface shown in FIG. 5E if earbuds 502 are placed in the ears of a user, or alternatively displays an alert or notification (described herein with reference to FIG. 5C) if earbuds 502 are not placed in the ears of a user.

FIG. 5B illustrates a transition from FIG. 5A-1, and shows an input 526 over button 514 for initiating a process to demonstrate and configure a spatial audio output mode. FIG. 5B also shows earbuds 502 not placed in ear 528-1 and ear 528-2 of a user (collectively referred to as ears 528).

FIG. 5C shows that in response to the input 526 over button 514 while the earbuds 502 are not placed in ears 528, device 100 displays a notification 530 that prompts the user to place earbuds 502 in the user's ears (e.g., via the text "Place earbuds in ears"). While both earbuds 502 are shown outside of ears 528 in FIG. 5C, in some embodiments notification 530 is displayed in accordance with a determination that only one earbud (e.g., either earbud 502-1 or earbud 502-2) is placed in one ear (e.g., ear 528-1 of the user or ear 528-2 of the user). In some embodiments where a pair of headphones is used instead of a pair of earbuds, notification 530 is displayed in accordance with a determination that at least one earcup of the headphones is not placed on an ear 528 of the user (e.g., for on-ear headphones) or over an ear 528 of the user (e.g., for over-ear headphones), to prompt the user to place both earcups of the headphones on or over the user's ears.

FIG. 5D illustrates that the earbuds 502 have been placed in the user's ears 528. FIG. 5D also illustrates an input 532 being received at notification 530 to dismiss notification 530. In some embodiments, device 100 automatically ceases to display notification 530 in response to detecting (e.g., via one or more placement sensors of earbuds 502, such as placement sensor(s) 304 in FIG. 3B) that earbuds 502 have been placed in the ears 528 of the user, in which case no input at notification 530 is needed to dismiss notification 530.

FIG. 5E illustrates a demo user interface 534 for spatial audio and stereo audio output modes. To aid the user in selecting between a spatial audio output mode and a stereo audio output mode, sample audio is played through the earbuds 502 for a selected audio output mode, which allows the user to hear how audio that is output using the selected audio output mode sounds. Playing sample audio, particular the same sample audio, for two different audio output modes allows the user to hear differences between the two modes. In some embodiments, in addition to an audible demonstration, a visual indication as to how a selected audio output mode works is displayed, to further aid in selection between the spatial audio output mode and the stereo audio output mode. In FIG. 5E, a stereo audio user interface element 536 is selected, and indicates selection of the stereo audio output mode for the audio output demonstration. To help the user visualize how stereo audio is output, stereo audio simulation (e.g., animation) 538 is shown, which shows representations of two speakers 538-1 and 538-2, a representation of the user's head with earbuds 538-3, and a representation of a device 538-4. FIG. 5E also includes a spatial audio user interface element 535 that is displayed, but not currently selected, and that is activatable to initiate a demonstration of a spatial audio output mode. In addition, FIG. 5E includes a button 540 (e.g., labeled "Use Spatial Audio") that is activatable to select the spatial audio output mode as the active audio output mode for earbuds 502, and a button 542 (e.g., labeled "Use Stereo Audio") that is activatable to select the stereo audio output mode as the active audio output mode for earbuds 502. It is noted that activation of stereo audio user interface element 536 or spatial audio user interface element 535 selects the audio output mode used for rendering audio as part of the audio output demonstration (e.g., but does not set the active audio output mode for earbuds 502), whereas activation of either button 540 or button 542 sets the active audio output mode for earbuds 502 (but does not change which audio output mode is being used for the demonstration).

FIG. 5F illustrates a transition from FIG. 5E that, together with FIG. 5E, illustrates an animation of how audio is output in the stereo audio output mode. In FIG. 5F, simulation 538 is updated from its appearance in FIG. 5E to show that representation 538-3 of the user's head and earbuds have moved counter-clockwise in simulation 538, and that speaker representations 538-1 and 538-2 have also moved counter-clockwise in accordance with the movement of representation 538-3 of the user's head and earbuds (e.g., with the same degree of movement or a corresponding amount of movement). This indicates that audio that is output using the stereo audio output mode is output to sound as though the audio is emanating from one or more simulated sources of sound, relative to the location of audio output devices such as earbuds 502, where the simulated sound sources are not adjusted based on movement of the earbuds 502 (e.g., the simulated sound sources continue to have the same locations relative to the earbuds 502, as the user's head and earbuds move).

FIG. 5G illustrates an input 544 on spatial audio user interface element 535. FIG. 5H shows that in response to input 544 on spatial audio user interface element 535, spatial audio user interface element 535 becomes selected. FIG. 5H also shows a spatial audio simulation 546 replacing display of stereo audio simulation 538. Spatial audio simulation 546 shows representations of five speakers 546-1, 546-2, 546-3, 546-4, 546-5, a representation of the user's head with earbuds 538-3, and a representation of the device 538-4. While simulation 546 shows representations of five speakers, the spatial audio output mode may output sound to simulate any number of sources of sound as appropriate for the particular audio being output.

FIG. 5I illustrates a transition of FIG. 5H that, together with FIG. 5H, illustrates an animation of how audio is output in the spatial audio output mode. As previously discussed, the spatial audio output mode outputs audio to sound as though the audio is coming from one or more simulated sources of sound that are positioned or that move relative to a frame of reference. In the example in FIGS. 5H-5I, the frame of reference is a physical environment. Accordingly, in FIG. 5I, simulation 546 is updated from its appearance in FIG. 5H to show that representation 538-3 of the user's head and earbuds have rotated in a counter-clockwise direction. Unlike the stereo audio simulation, although representation 538-3 of the user's head has rotated, the representations of the five speakers 546-1 through 546-5 remain in the same positions in the user interface. This indicates that in the spatial audio output mode, audio is output so as to sound as though coming from one or more simulated locations in a frame of reference (e.g., a physical environment), where the one or more simulated locations do not move based on movement of the audio output devices, such as earbuds 502, that are used to output the audio in the spatial audio output mode. Stated another way, the audio that is output via earbuds 502 must be adjusted as earbuds 502 are moved (e.g., as the user moves his head) around the physical environment so that the simulated sources of sound continue to appear positioned at one or more particular locations relative to the physical environment rather than relative to earbuds 502. In the example in FIGS. 5H-5I, the audio output by the earbuds 502 in spatial audio simulation 546 is rendered from the same audio content as the audio output for stereo audio simulation 538, but in the scenario shown in FIGS. 5H-5I the audio content is rendered as spatial audio instead of as stereo audio (e.g., as in the scenario shown in FIG. 5E-5F).

FIG. 5J illustrates a transition from FIG. 5I that, together with FIG. 5I, illustrates the "follow device" feature where the frame of reference for the spatial audio output is tied to the position of an electronic device that is in communication with the audio output devices (e.g., an electronic device from which the audio output devices receive instructions for outputting audio). In particular, FIG. 5J shows that device representation 538-4 has moved relative to the user interface (e.g., representing movement of a device relative to its physical surroundings). In accordance with the movement of device representation 538-4, speaker representations 546-1 through 546-5 have also moved in the user interface (e.g., with the same degree of movement or a corresponding amount of movement), to indicate that in the spatial audio output mode with the "follow device" feature enabled, audio is output to sound as though the audio moves relative to the user based on movement of the electronic device relative to the user (e.g., the simulated sources of sound are positioned relative to the electronic device as the frame of reference), rather than movement of the user's head. Lastly, FIG. 5J also shows an input 550 over button 540 (e.g., labeled as "Use Spatial Audio") for selecting the spatial audio output mode.

Figure 6B:
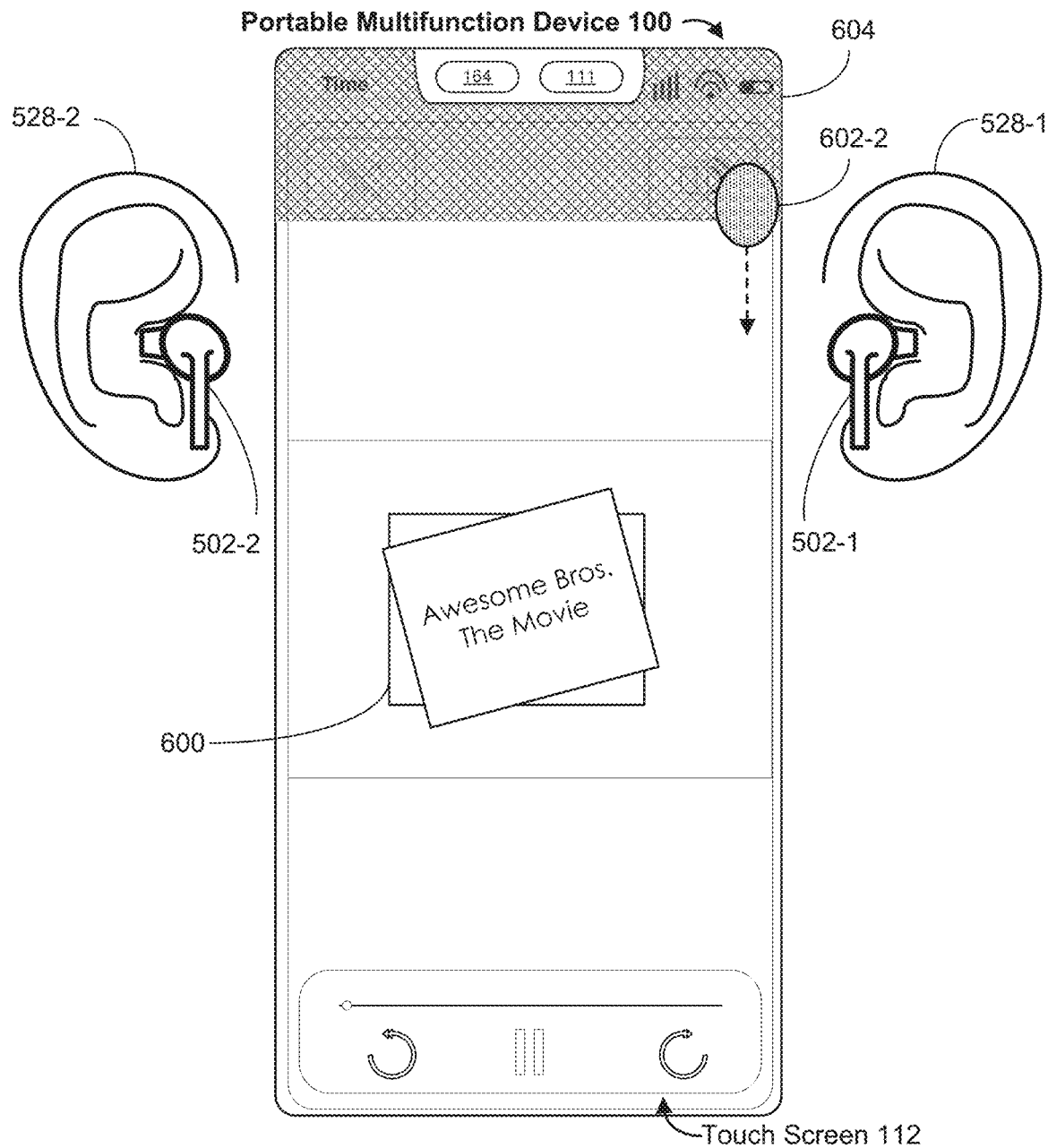

FIGS. 6A-6P illustrate example user interfaces for displaying and modifying status of audio output modes of audio output devices (e.g., earbuds 502) in accordance with some embodiments. FIG. 6A shows a video user interface 600 that is currently playing video content (e.g., titled "Awesome Bros. The Movie") on the device 100. Additionally, the example in FIG. 6A shows that earbuds 502 are placed in ears 528 and are outputting audio corresponding to the video content being played. Alternatively, earcups of a set of over the ear headphones are placed over ears 528 of the user. FIGS. 6A-6B show a swipe gesture 602 that begins in FIG. 6A with input 602-1 at the top right corner of display 112 and continues in FIG. 6B with input 602-2, and in response to which settings user interface 604 is displayed (an initial portion of which is shown in FIG. 6B). In some embodiments, as in the example in FIG. 6B, settings user interface 604 is displayed over the user interface that was previously displayed in the foreground (e.g., video user interface 600). In some embodiments, settings user interface 604 is a system level user interface, and is accessible in a plurality of different contexts on the device with a predefined gesture (e.g., a swipe from an edge of the device or a press of a predetermined button), regardless of which user interface is displayed on device 100 (e.g., settings user interface 604 can be invoked over another system user interface or application user interface).

Figure 6C:
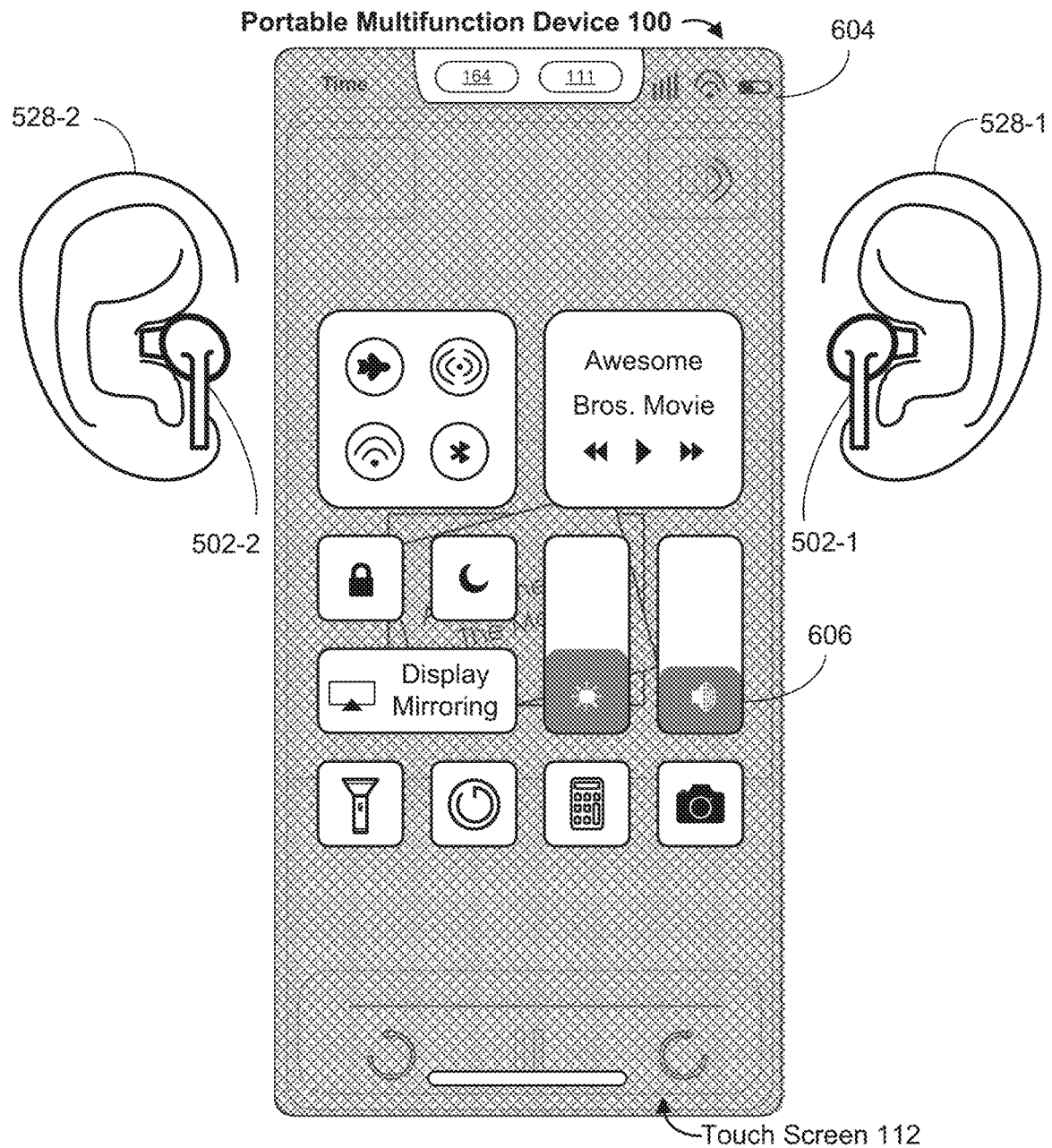

FIG. 6C shows settings user interface 604 fully displayed on display 112. Settings user interface 604 includes a plurality of controls for controlling various features of the device (e.g., data connectivity controls, screen orientation control, brightness control, volume control, media controls, and shortcuts to various applications). The volume control 606 controls the volume of audio output via the earbuds 502 when earbuds 502 are paired with the device 100. Upward and downward swipe inputs on volume control 606 increase or decrease, respectively, the volume of audio outputs from device 100 (e.g., via earbuds 502).

Figure 6D:
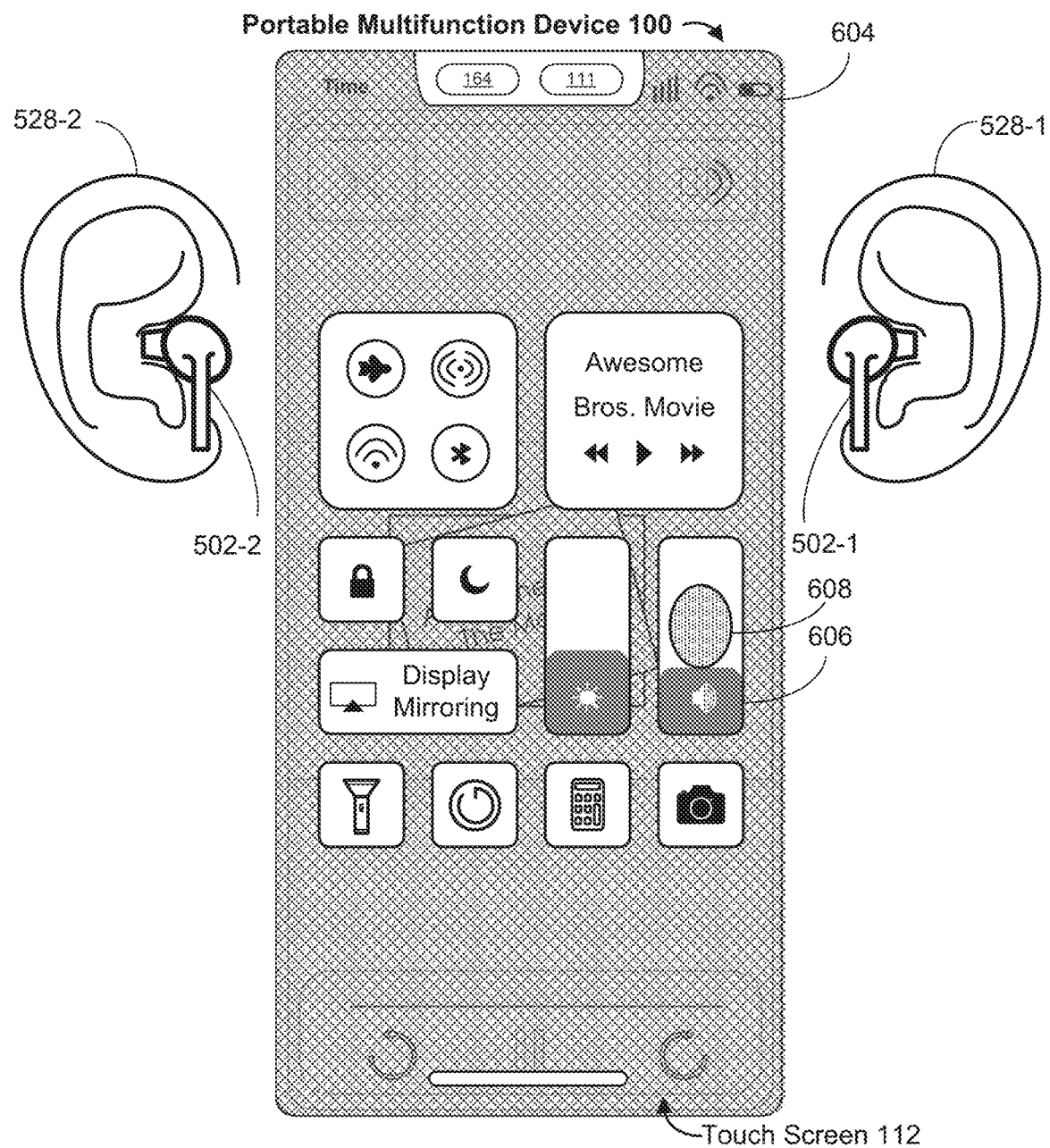
Figure 6E:
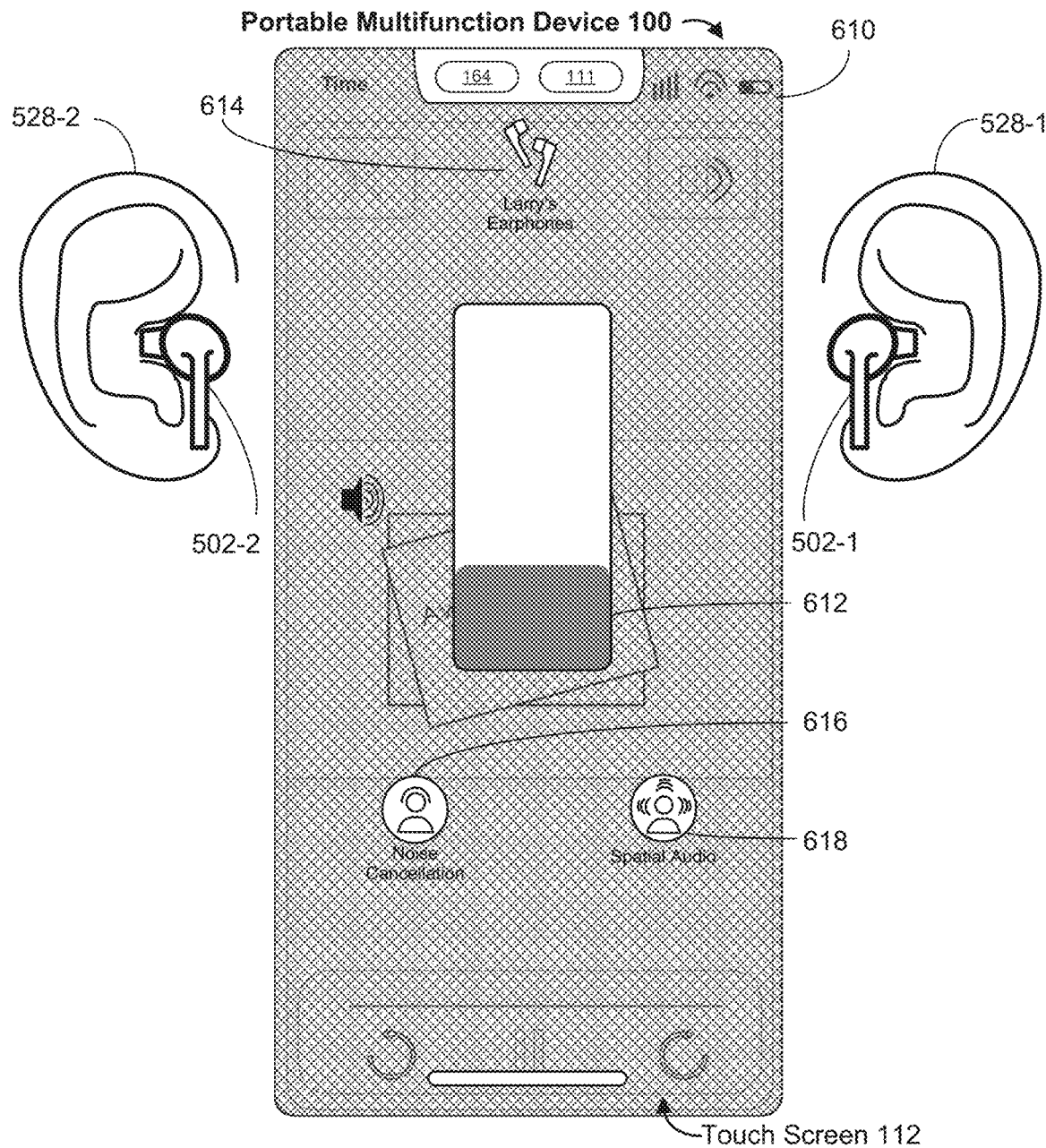

FIG. 6D shows a touch input 608 over volume control 606, in response to which device 100 displays an audio settings user interface 610 as shown in FIG. 6E. In some embodiments, input 608 is a tap input on volume control 606 or a long press input that is maintained on volume control 606 for at least a predetermined amount of time.

In FIG. 6E, audio settings user interface 610 includes an expanded volume control slider 612 for adjusting the volume of the audio output of the earbuds 502 (e.g., expanded volume control slider 612 in audio settings user interface 610 is a larger version of volume control 606 in settings user interface 604 having analogous behavior to volume control 606), and includes a plurality of controls for enabling and selecting audio output modes. Audio settings user interface 610 includes a spatial audio toggle 618 for activating (e.g., enabling) or deactivating (e.g., disabling) a spatial audio output mode. When spatial audio is activated, spatial audio toggle 618 is displayed in an activated state (e.g., the spatial audio toggle 618 is displayed with an appearance corresponding to the enabled state, such as with a particular color (e.g., blue, green, red, black, white, etc.), fill, and/or shading to indicate that it is in the activated state). Additionally, in some embodiments, when spatial audio is enabled and device 100 is playing media that can be and that is being output using the spatial audio output mode, spatial audio toggle 618 is animated. In some embodiments, the animation of spatial audio toggle 618 includes representations of sound waves traveling (e.g., as indicated by the three sets of multiple sound waves in the example shown in FIG. 6E). In some embodiments, device 100 outputs certain types of audio using spatial audio but not other types of audio. For example, in some circumstances spatial audio is available for music and video content. One of ordinary skill will recognize that spatial audio can be used for any combination of audio types, including such audio types as audio for audio/video calls, system level sounds (e.g., a ringtone), game audio, virtual assistant audio, navigation audio (e.g., from a map application) and/or any other type of audio that supports the use of spatial audio. In some embodiments, as shown in FIG. 6E, audio settings user interface 610 includes an icon 614 identifying the currently connected set of audio output devices (e.g., the label "Larry's Earphones" identifying earbuds 502).

Audio settings user interface 610 in FIG. 6E also includes a mode control 616 that indicates a current noise control audio output mode in which earbuds 502 are operating and that is activatable to select one of a plurality of available noise control audio output modes as the current noise control audio output mode for earbuds 502. The plurality of available noise control audio output modes includes any combination of: an active noise control audio output mode, an active pass-through audio output mode, and/or a bypass audio output mode (also sometimes called a noise control off audio output mode). Noise control audio output modes are described in more detail herein with reference to FIG. 3C. Mode control 616 in FIG. 6E displays an icon that represents the active noise control audio output mode (optionally with a text label such as "Noise Cancellation"), indicating that the active noise control audio output mode is the currently selected mode. In the active noise control mode (also called "ANC"), wearable audio output device 301 outputs one or more audio-cancelling audio components (e.g., one or more antiphase audio signals, also called "audio-cancellation audio components") to at least partially cancel ambient sound from the surrounding physical environment that would otherwise be perceivable to the user. In the active pass-through audio output mode, earbuds 502 output one or more pass-through audio components (e.g., plays at least a portion of the ambient sound from outside the user's ear, received by microphone(s) 302, for example) so that the user can hear a greater amount of ambient sound from the surrounding physical environment than would otherwise be perceivable to the user (e.g., a greater amount of ambient sound than would be audible with the passive attenuation of wearable audio output device 301 placed in the user's ear). In the bypass mode, active noise management is turned off, such that earbuds 502 output neither any audio-cancelling audio components nor any pass-through audio components (e.g., such that any amount of ambient sound that the user perceives is due to physical attenuation by earbuds 502).

To aid in understanding the circumstances associated with how audio settings user interface 610 is presented in FIGS. 6E-6O, FIG. 6E also shows a legend 619 that identifies the type of content being played (under "Type of content:"), whether the spatial audio output mode is enabled (under "Spatial audio enabled:"), whether the content being played includes content that is capable of being output as spatial audio (under "Content includes spatial content:"), and which audio output mode is being used to output audio being played (under "What's being played:").

Figure 6F:
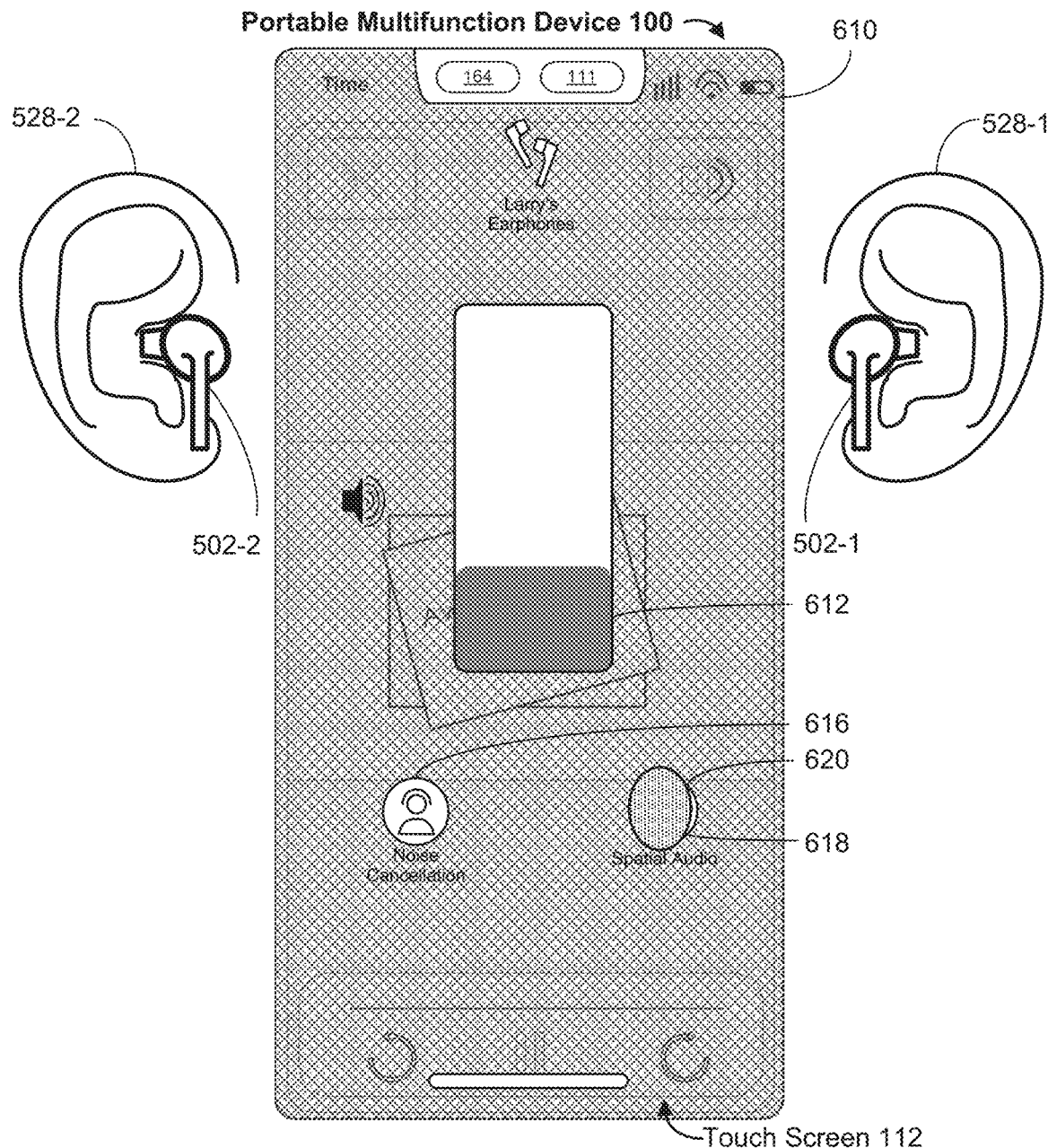
Figure 6G:
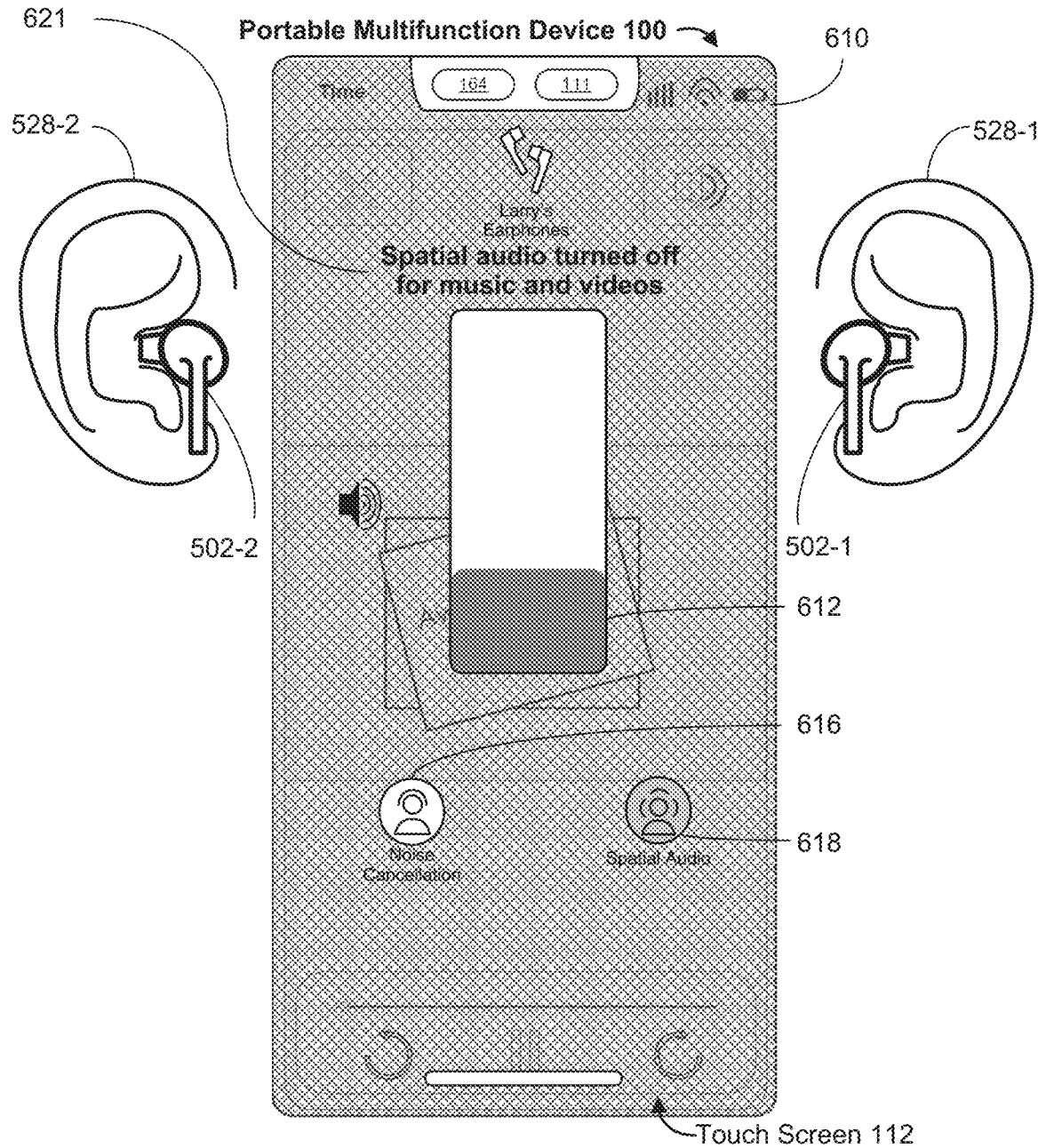

FIG. 6F illustrates an input 620 over spatial audio toggle 618, which in FIGS. 6E-6F indicates that the spatial audio output mode is currently activated. FIG. 6G shows that in response to input 620 over spatial audio toggle 618, the spatial audio output mode is deactivated. In some embodiments, the appearance of spatial audio toggle 618 is changed to indicate that the spatial audio output mode has been deactivated. For example, device 100 may cease to animate spatial audio toggle 618, and/or change a color, shading, and/or fill of spatial audio toggle 618 (e.g., the spatial audio toggle 618 is shaded and/or grayed-out in FIG. 6G, in contrast to its highlighted appearance in FIG. 6E). The legend 619 now indicates that the spatial audio output mode is no longer enabled (under "Spatial audio enabled: No"). Legend 619 in FIG. 6G also shows that, although the content being played via earbuds 502 includes spatial audio content (under "Content includes spatial content: Yes"), the content is output using the stereo audio output mode (under "What's being played: Stereo Audio") because the spatial audio output mode is disabled. In addition to the change in visual appearance of spatial audio toggle 618, audio settings user interface 610 shows a textual indication 621 that spatial audio is turned off (e.g., "Spatial audio turned off . . . "). In some embodiments, textual indication 621 states the types of audio for which spatial audio is turned off (e.g., " . . . for music and videos"). In some embodiments, the textual indication 621 ceases to be displayed after a predetermined amount of time since it was first displayed, as described herein in more detail with reference to method 800 (e.g., operation 832).

Figure 6H:
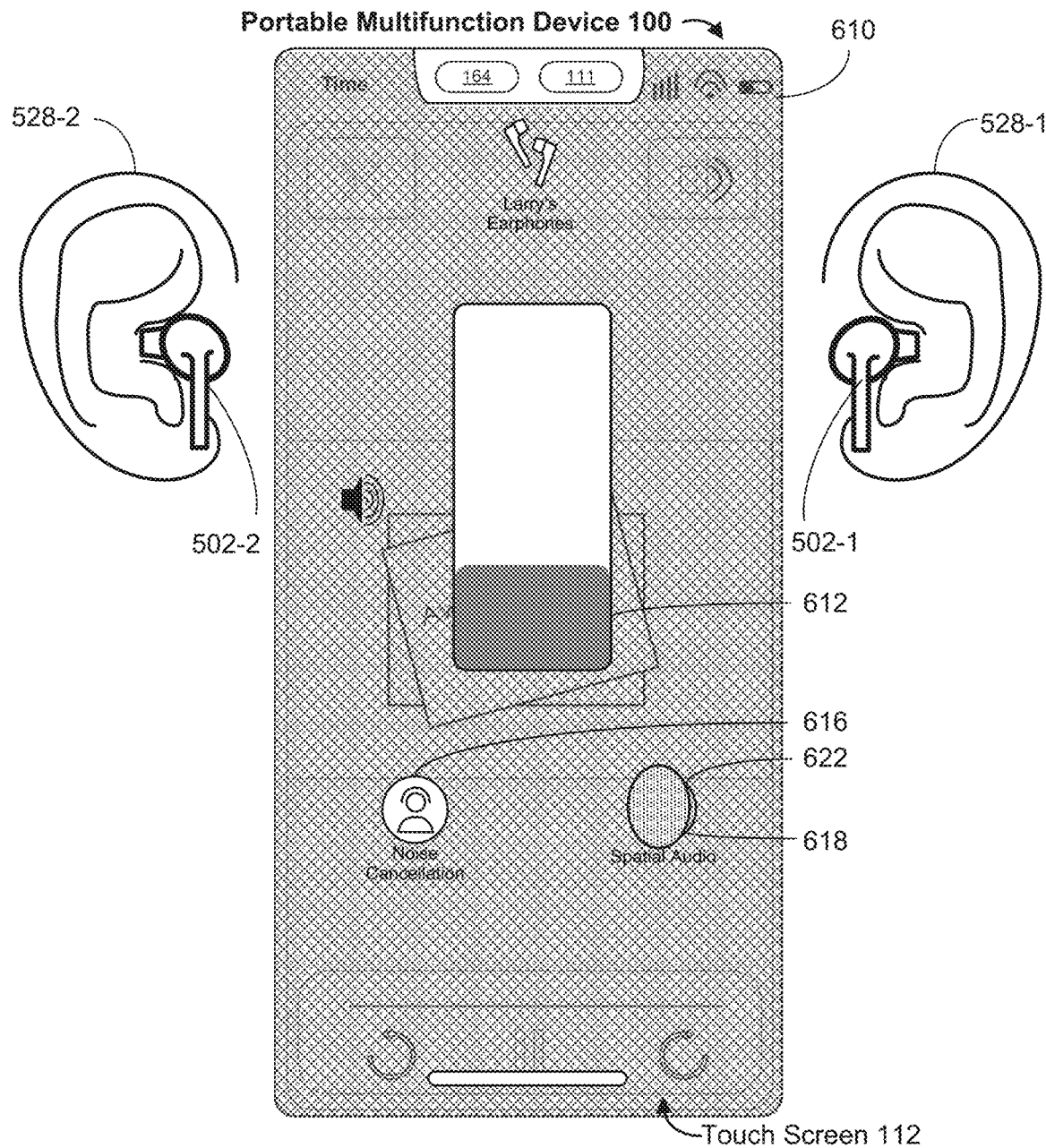
Figure 6I:
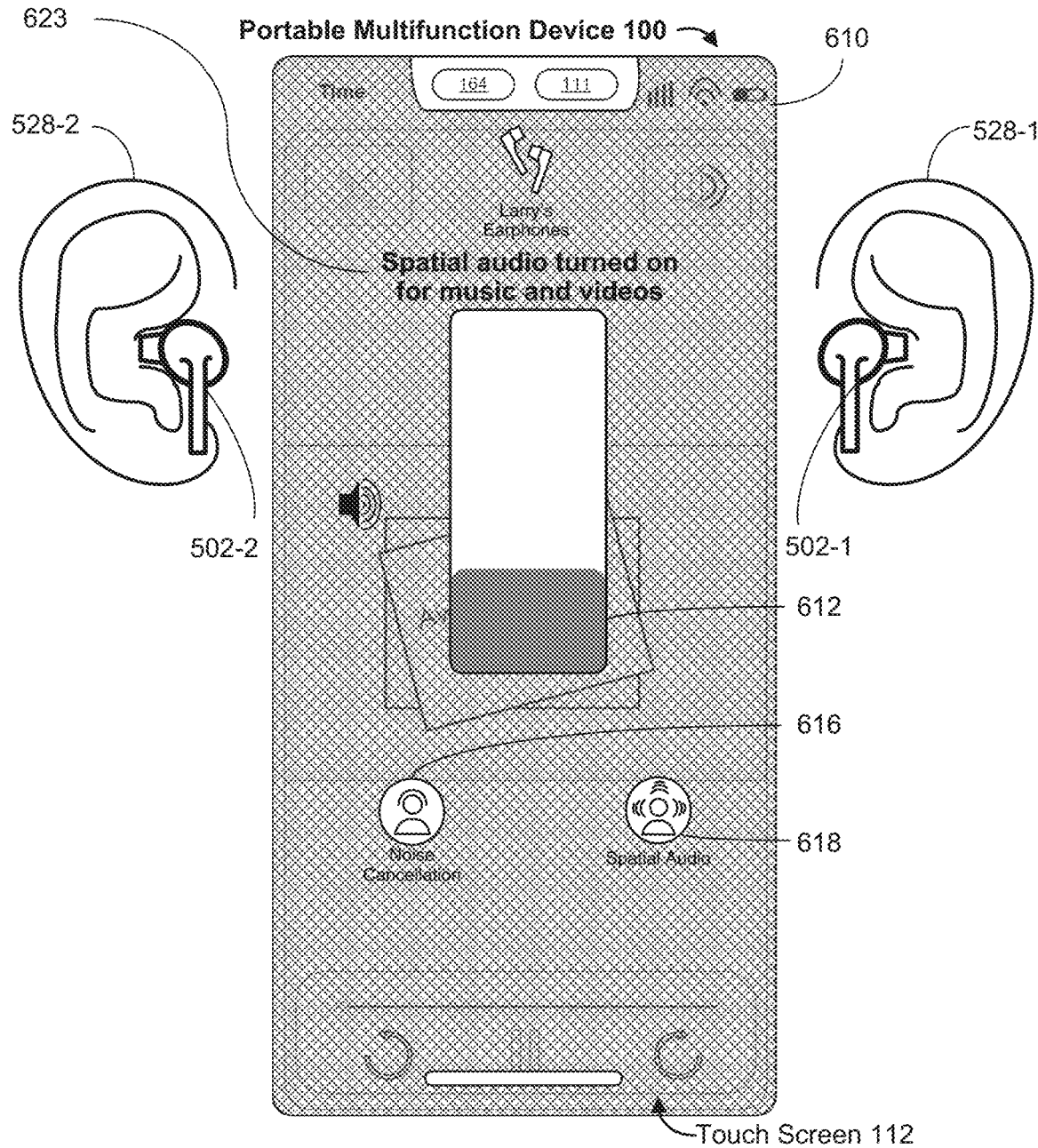

FIG. 6H illustrates an input 622 over spatial audio toggle 618, which indicates that the spatial audio output mode is currently deactivated. FIG. 6I shows that in response to input 622 over spatial audio toggle 618, the spatial audio output mode is enabled and the spatial audio toggle 618 is displayed with an appearance indicating that the spatial audio output mode is activated (e.g., the toggle 618 is highlighted and animated rather than being static and displayed in the shaded and/or grayed-out state). The legend 619 also indicates that the spatial audio output mode is enabled, and that the content being output via earbuds 502 includes spatial audio content. In addition to the change in visual appearance of spatial audio toggle 618, audio settings user interface 610 optionally shows another textual indication 623 that indicates that spatial audio is turned on. In some embodiments, as in the example in FIG. 6I, the textual indication 623 states the types of audio for which spatial audio is turned on (e.g., music and videos). In FIG. 6I, because the type of content being output (indicated under "Type of content: Movie") is one of the types of audio for which spatial audio is enabled (e.g., videos, as indicated by textual indication 623), and because the content being output includes spatial audio content (indicated under "Content includes spatial content: Yes"), the audio that is output using the spatial audio output mode (indicated under "What's being played: Spatial Audio").

Figure 6J:
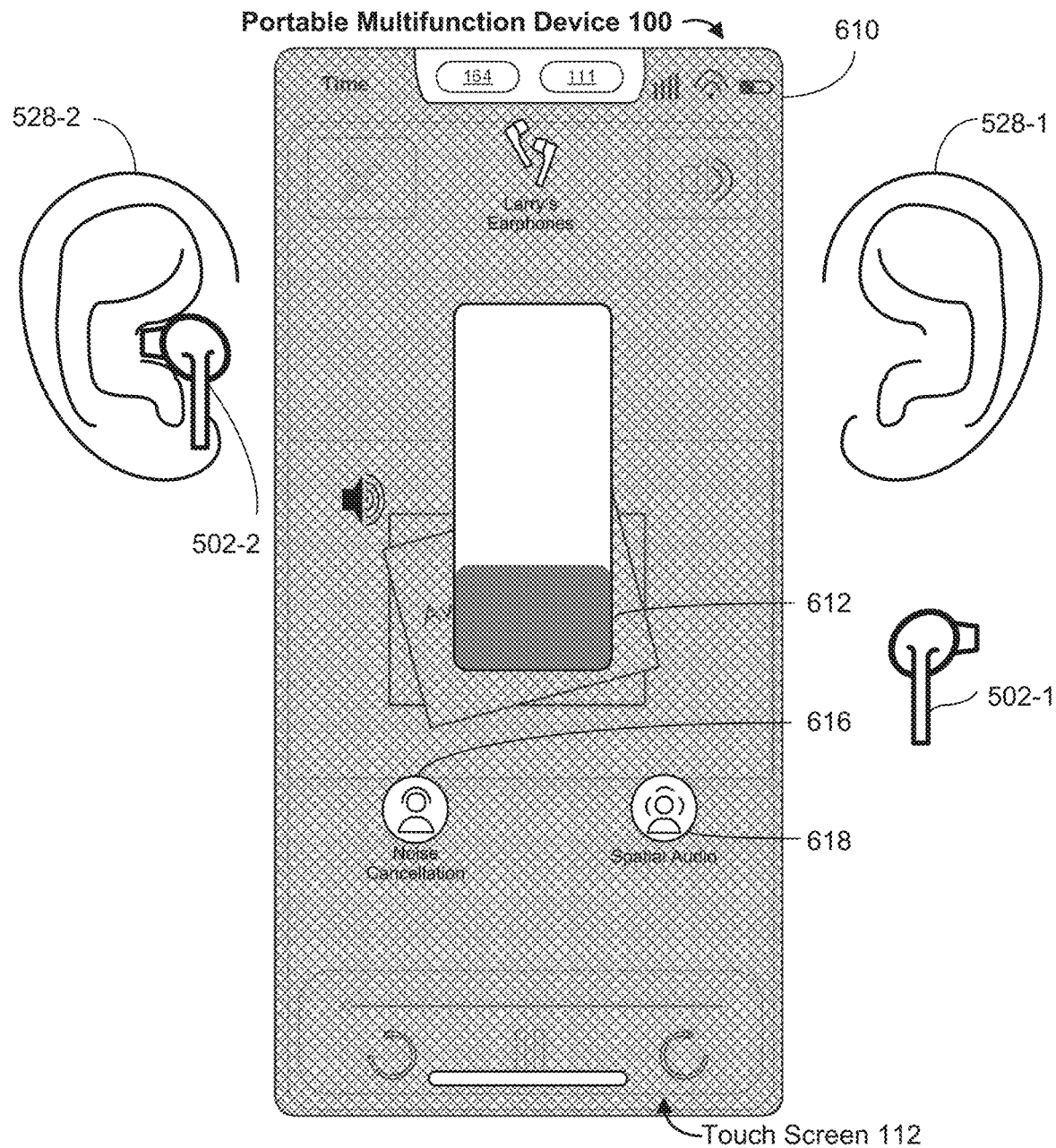

FIG. 6J illustrates that the earbud 502-1 is removed from the ear 528-1. In response to removing the earbud 502-1 from the ear 528-1 (or, alternatively, removing an earcup from one ear for over-the-ear headphones), the spatial audio output is disabled (e.g., because audio output device(s) positioned to provide audio output to both ears of the user are needed to effectively convey spatial audio), even though the device is still configured to output spatial audio when the audio output device(s) are positioned (e.g., repositioned) to provide audio output to both ears of the user. Accordingly, the animation of spatial audio toggle 618 is stopped to indicate that spatial audio is no longer being output by the earbuds 502-2. As legend 619 indicates, earbud 502-2 outputs mono audio instead of spatial audio. Similarly, if the device were playing content with stereo audio, in response to removing the earbud 502-1 from the ear 528-1 (or, alternatively, removing an earcup from one ear for over-the-ear headphones), the stereo audio output is disabled (e.g., because audio output device(s) positioned to provide audio output to both ears of the user are needed to effectively convey stereo audio), even though the device is still configured to output stereo audio when the audio output device(s) are positioned to provide audio output to both ears of the user.

Figure 6K:
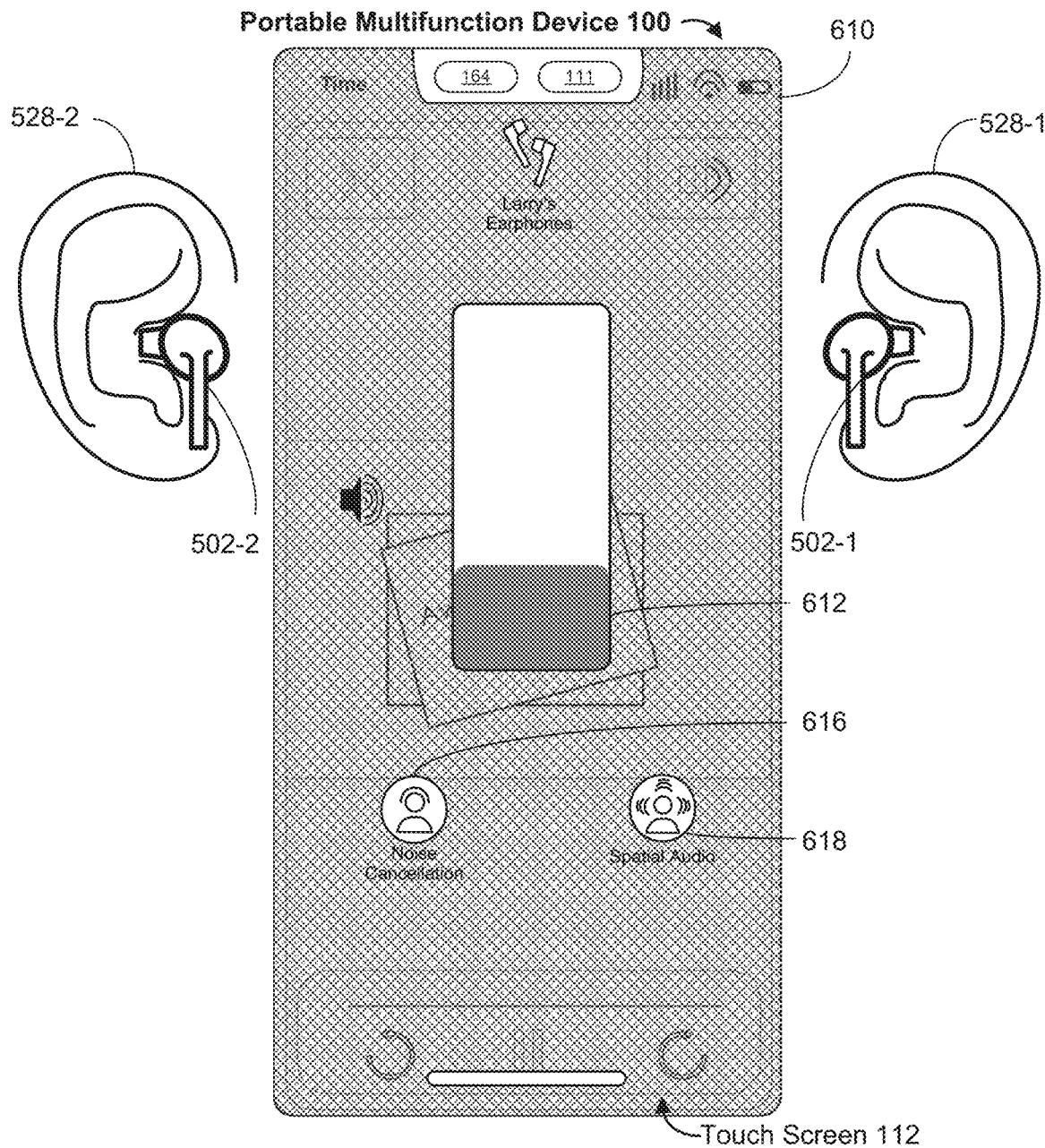

FIG. 6K shows the earbud 502-1 being placed back in ear 528-1 (or, alternatively, earcups are positioned back over both ears for over the ear headphones). In response to the earbud 502-1 being placed back in ear 528-1, earbuds 502 resume playing spatial audio, and the animation of spatial audio toggle 618 is resumed to indicate that spatial audio is being played. The legend 619 also indicates that spatial audio is being played instead of mono audio.

Figure 6L:
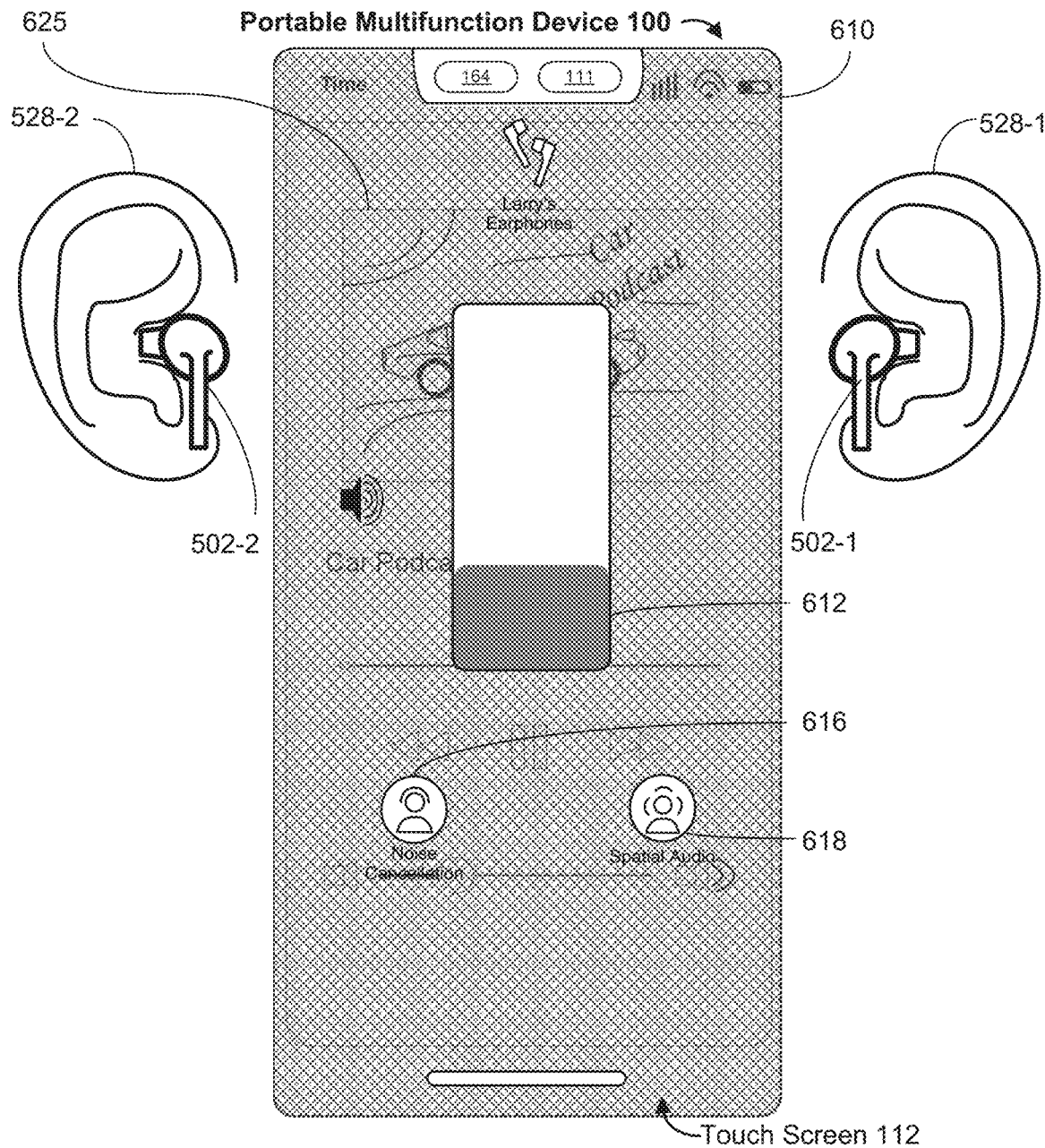

FIG. 6L shows an alternative scenario where the audio content being played via earbuds 502 does not include spatial audio content. For example, the audio content of "Car Podcast" 625 shown in the background of audio settings user interface 610 includes stereo audio but does not include spatial audio content. Thus, although the spatial audio output mode is enabled, as indicated by the highlighted appearance of spatial audio toggle 618 and legend 619 (under "Spatial audio enabled: Yes"), spatial audio is not being played, and accordingly spatial audio toggle 618 is not animated. It is noted that while the example podcast in FIG. 6L does not include spatial content, other podcasts may include spatial content, and playing such podcasts while the spatial audio output mode is enabled and with both earbuds 502 in ears 528 would result in spatial audio being output and spatial audio toggle 618 being highlighted and animated.

Figure 6M:
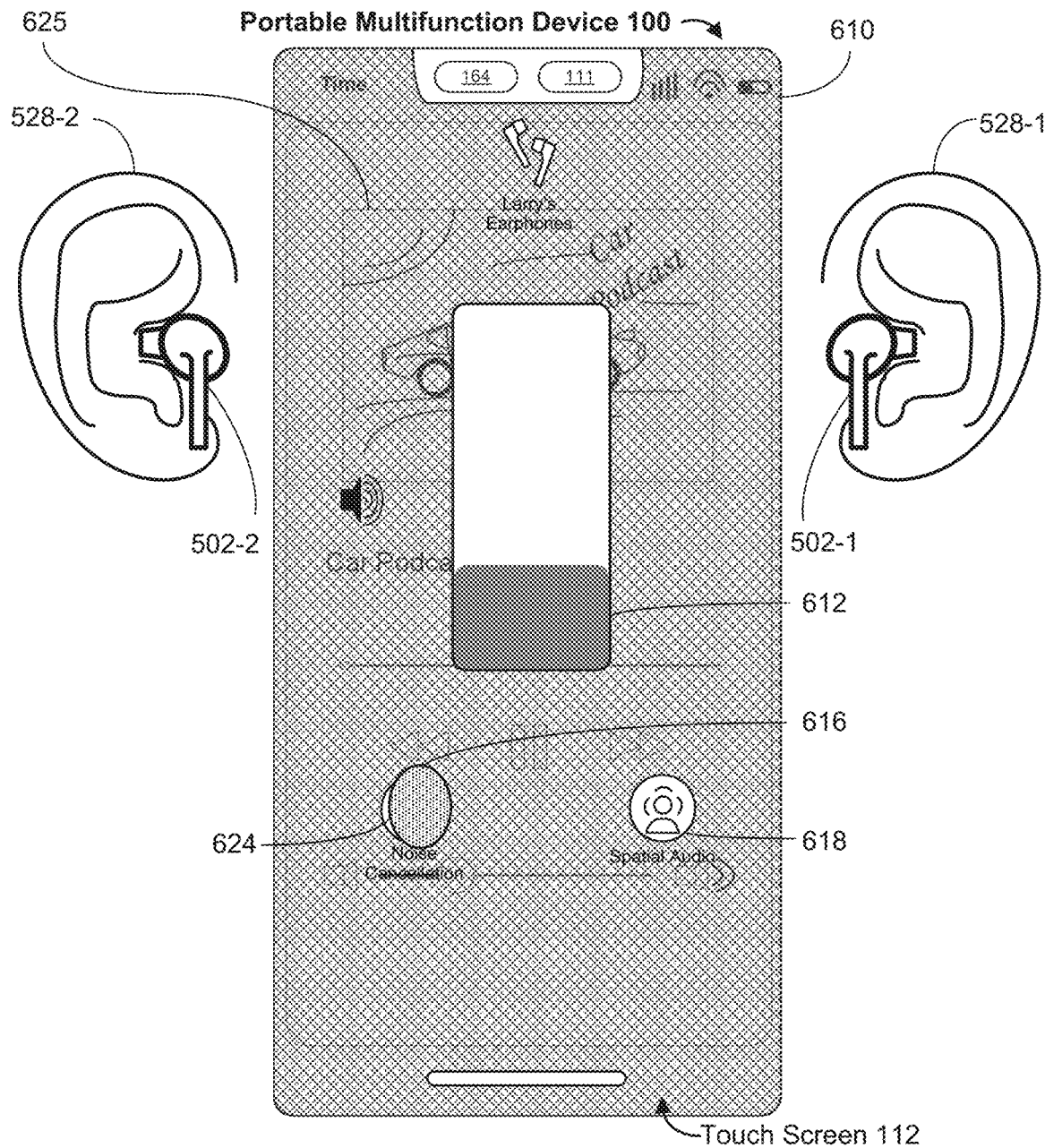
Figure 6N:
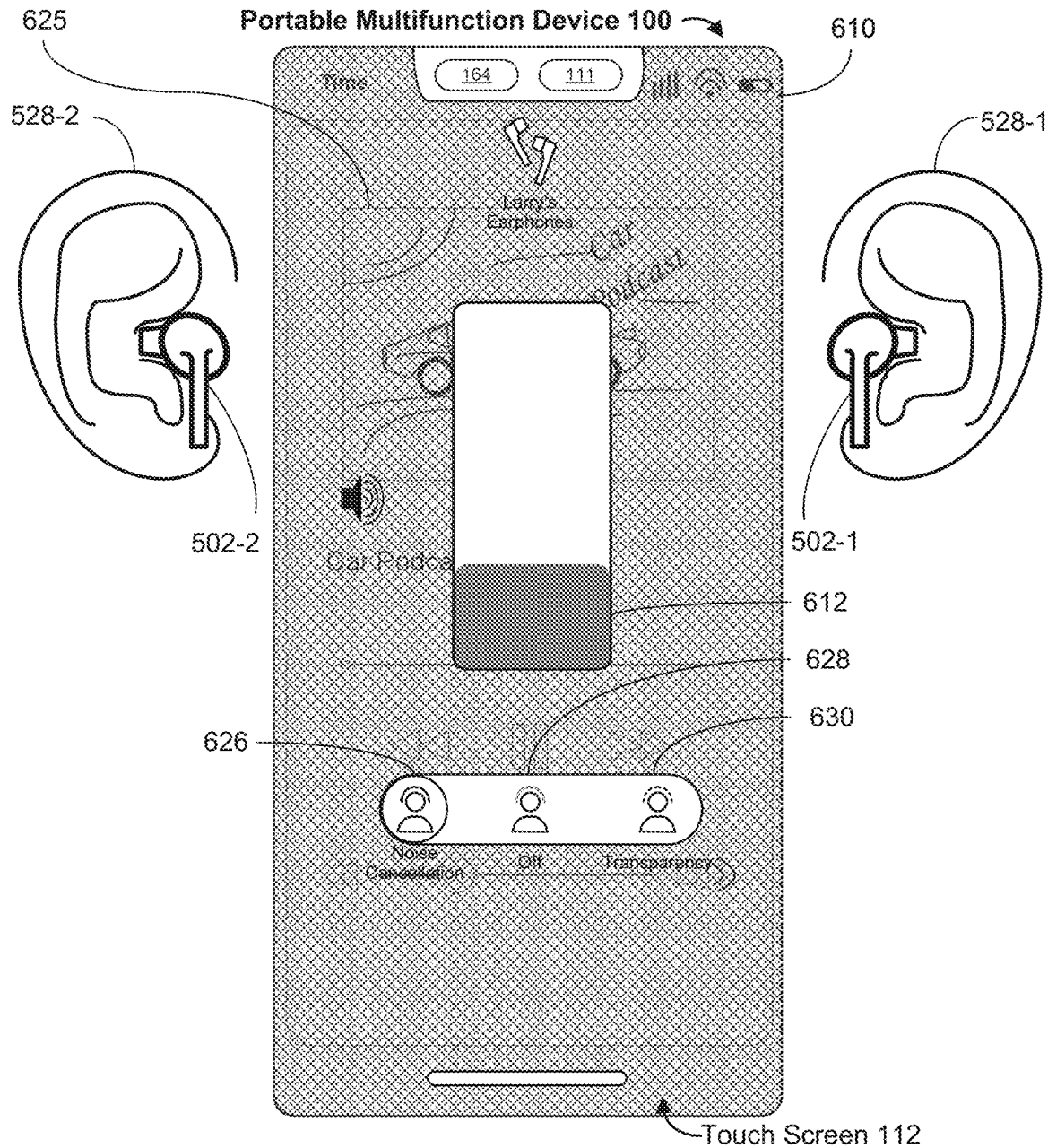

FIG. 6M shows an input 624 over mode control 616. FIG. 6N shows that in response to input 624 over mode control 616, mode control 616 expands to reveal representations of different audio output modes supported by earbuds 502. In the example in FIG. 5N, three audio output mode representations are displayed: noise cancellation mode icon 626 representing an active noise control mode, noise control off mode icon 628 representing a bypass mode, and transparency mode icon 630 representing an active pass-through mode (e.g., as described in more detail herein with reference to FIG. 3C). Activation of (e.g., by a user input selecting) the representation of a particular audio output mode generally selects that audio output mode as the current audio output mode for earbuds 502. In some embodiments, as shown in FIG. 6N, mode control 616 in its expanded state is displayed over the portion of audio settings user interface 610 in which spatial audio toggle 618 was displayed, and spatial audio toggle 618 ceases to be displayed.

Figure 6O:
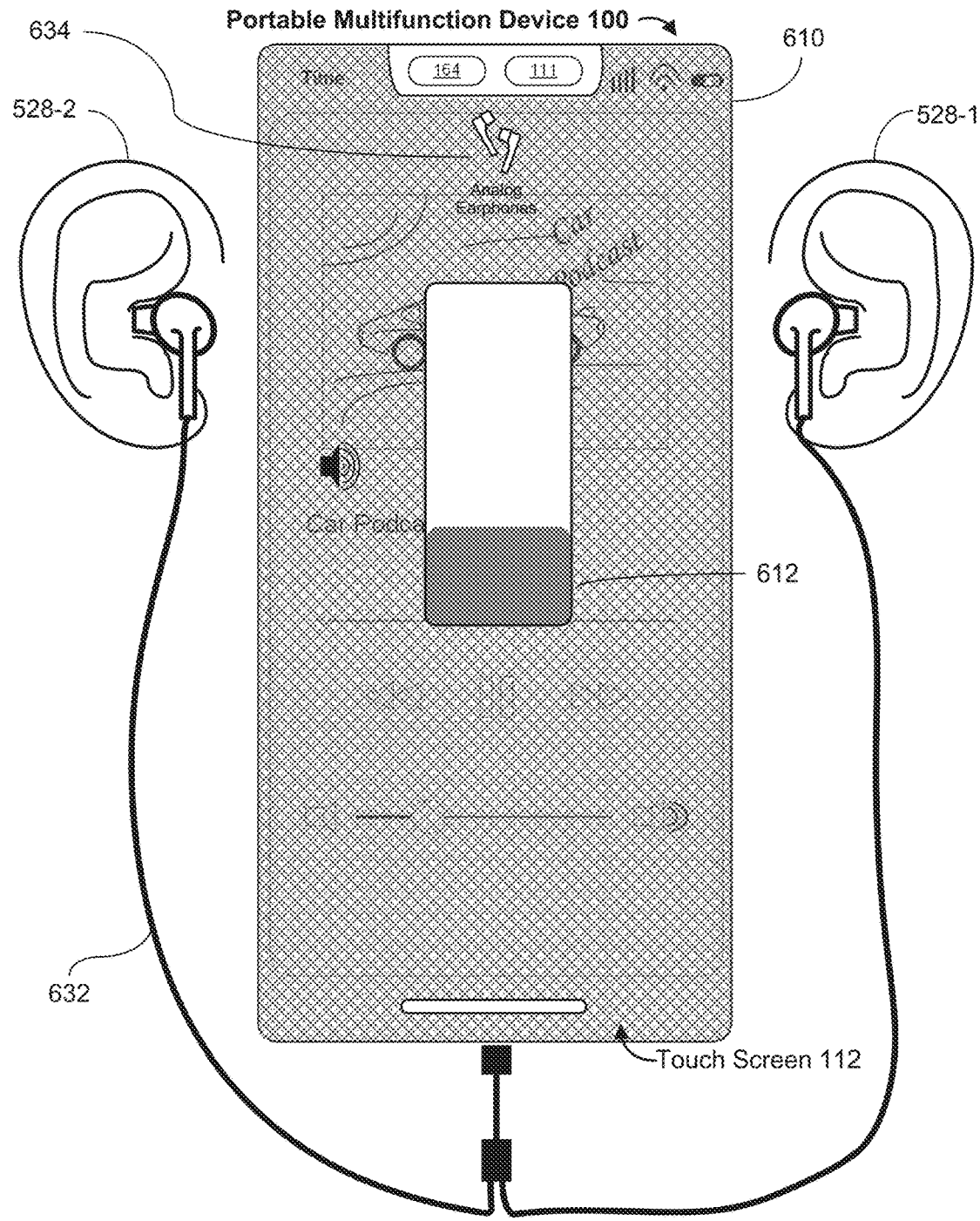
Figure 7A:
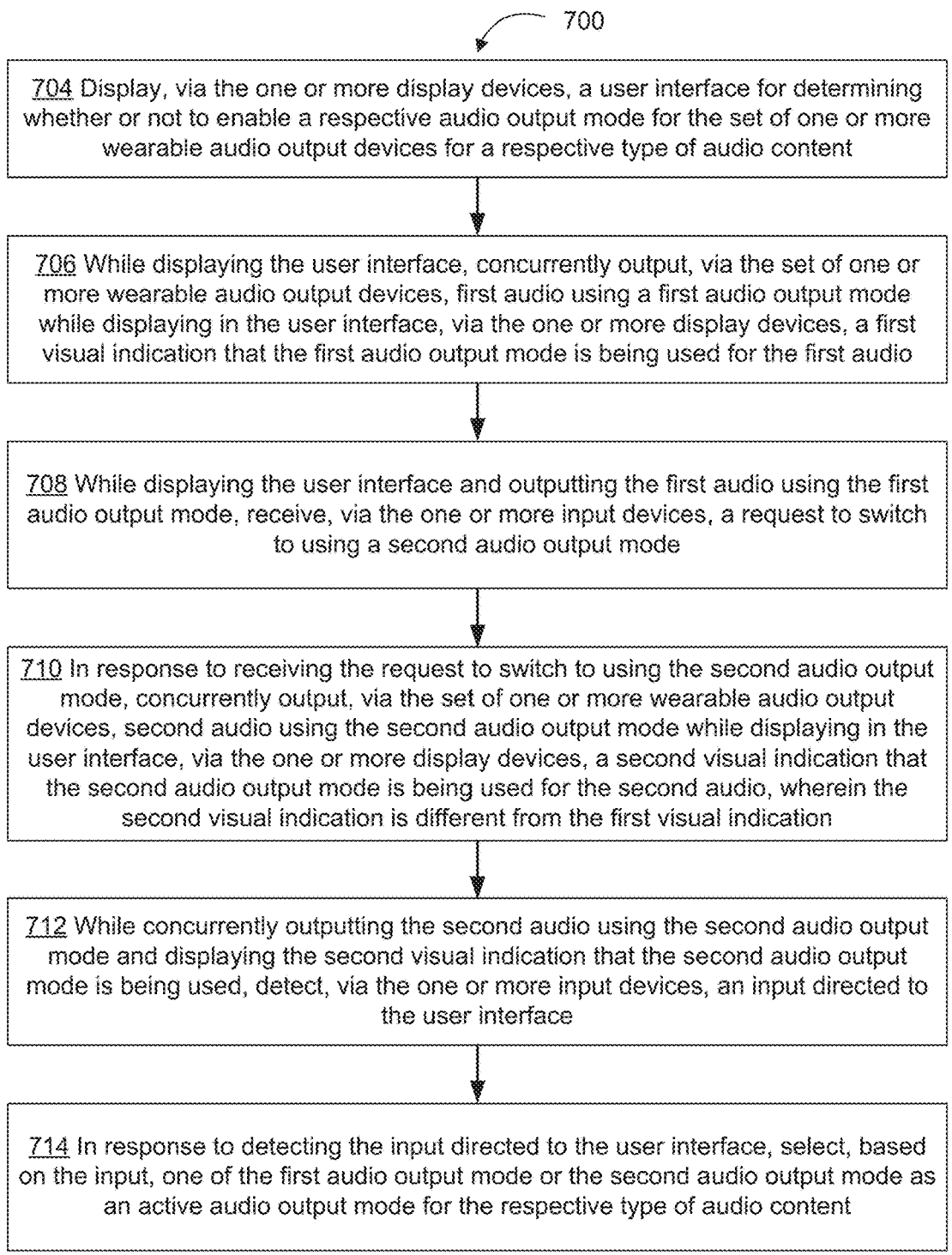
Figure 8A:
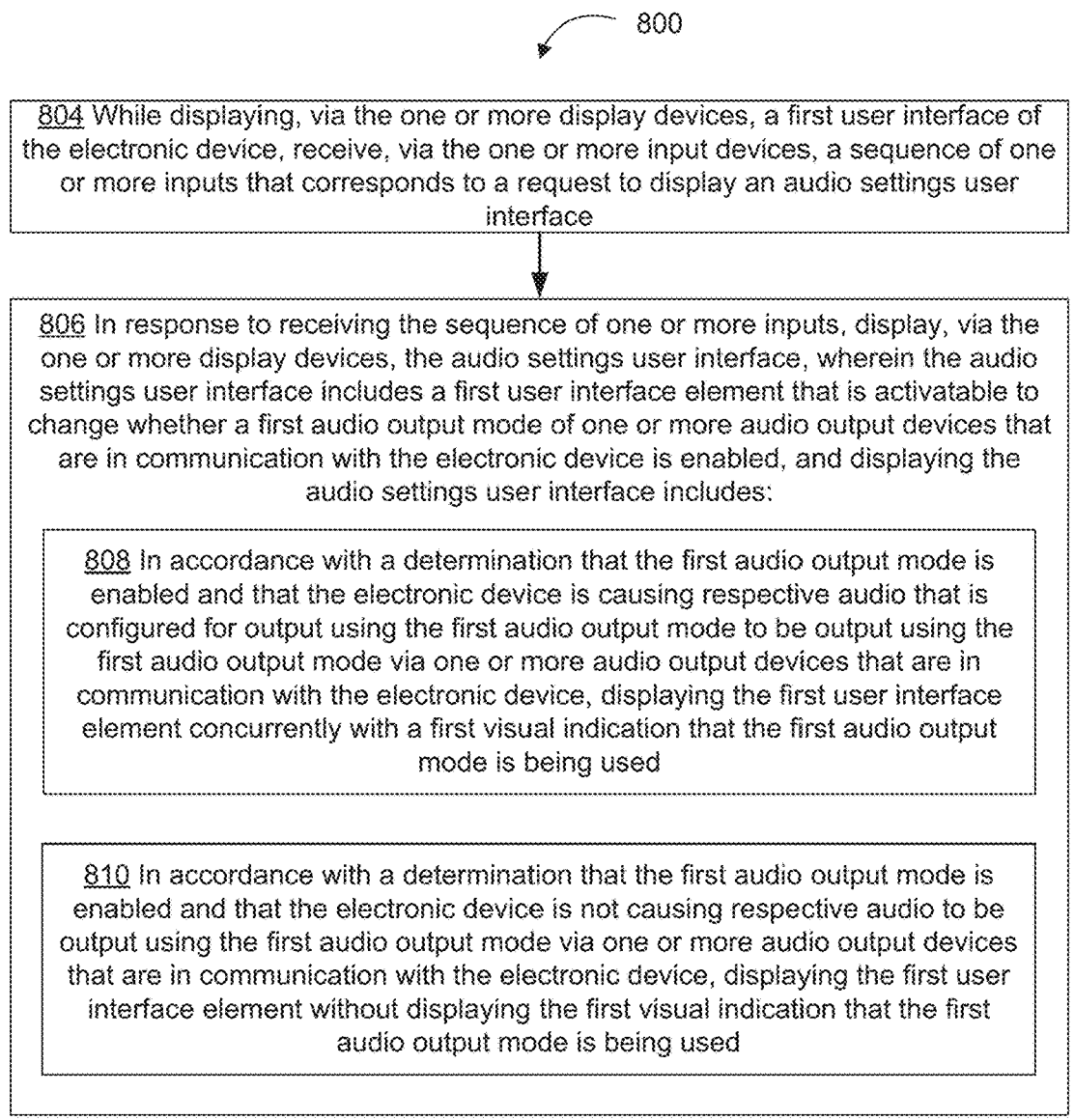

FIG. 6O shows an alternate embodiment that shows audio settings user interface 610 when a set of one or more audio output devices currently connected to device 100 does not support one or more audio output modes. In particular, FIG. 6O shows that earbuds 632 instead of earbuds 502 are connected to device 100, as indicated by icon 634 in audio settings user interface 610 (e.g., the label "Analog Earphones" Identifying earbuds 632). Because earbuds 632 do not support multiple noise control audio output modes, mode control 616 is not displayed (e.g., without regard to whether spatial audio output is supported and whether spatial audio toggle 618 is displayed accordingly). Because earbuds 632 do not support spatial audio output, spatial audio toggle 618 is not displayed (e.g., without regard to whether multiple noise control audio output modes are supported and whether mode control 616 is displayed).

FIGS. 7A-7D are flow diagrams illustrating method 700 of demonstrating and selecting audio output modes of wearable audio output devices in accordance with some embodiments. Method 700 is performed at an electronic device (e.g., device 300, FIG. 3A, or portable multifunction device 100, FIG. 1A) that is in communication with one or more display devices (e.g., touch-sensitive display system 112, FIG. 1A, or display 340, FIG. 3A), one or more input devices (e.g., touch-sensitive display system 112, FIG. 1A, or touchpad 355, FIG. 3A), and a set of one or more wearable audio output devices (e.g., one or more wearable audio output devices 301, FIG. 3B). In some embodiments, the display device is a touch-screen display and the input device is on or integrated with the display device. In some embodiments, the display device is separate from the input device. Some operations in method 700 are, optionally, combined and/or the order of some operations is, optionally, changed.

As described below, method 700 provides on an electronic device an improved user interface for demonstrating different audio output modes for outputting audio content of a particular type via a set of one or more wearable audio output devices (e.g., on-ear or over-ear headphones, or a pair of earbuds or earphones), to illustrate the operation of the different audio output modes and help the user understand how outputting audio using one audio output mode differs from outputting audio using another audio output mode prior to selecting a respective mode as the active audio output mode for the particular type of audio content. Demonstrating different audio output modes for a particular type of audio content, particularly during a setup process for the set of one or more wearable audio output devices, helps the user to quickly choose between different audio output modes with less trial and error during later use of the electronic device and set of one or more wearable audio output devices. Providing to the user improved feedback, or an improved audio mode selection user interface, and reducing the number of inputs needed to use different control options enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

The electronic device displays (704), via the one or more display devices, a user interface for determining whether or not to enable a respective audio output mode (e.g., whether or not to enable spatial audio) for the set of one or more wearable audio output devices for a respective type of audio content (e.g., the user interfaces shown in FIGS. 5B and 5E-5J).

In some embodiments, while displaying the user interface, the electronic device concurrently outputs (706), via the set of one or more wearable audio output devices, first audio using a first audio output mode while displaying in the user interface, via the one or more display devices, a first visual indication that the first audio output mode is being used for the first audio (e.g., stereo audio simulation 538 in FIGS. 5E-5G where the first audio output mode is a stereo audio output mode, or spatial audio simulation 546 in FIGS. 5H-5J where the first audio output mode is a spatial audio output mode).

In some embodiments, while displaying the user interface and outputting the first audio using the first audio output mode, the electronic device receives (708), via the one or more input devices, a request to switch to using a second audio output mode. In some embodiments, when the first audio output mode is a spatial audio output mode, the second audio output mode is a non-spatial audio output mode (e.g., the request to switch to using the second audio output mode is an input on stereo audio user interface element 536 in FIG. 5H or 5I). In some embodiments, when the first audio output mode is a non-spatial audio output mode, the second audio output mode is a spatial audio output mode (e.g., the request to switch to using the second audio output mode is input 544 in FIG. 5G).

In some embodiments, in response to receiving the request to switch to using the second audio output mode, the electronic device concurrently outputs (710), via the set of one or more wearable audio output devices, second audio using the second audio output mode while displaying in the user interface, via the one or more display devices, a second visual indication that the second audio output mode is being used for the second audio. In some embodiments, the second visual indication is different from the first visual indication. For example, where the first audio output mode is a stereo audio output mode, and the second audio output mode is a spatial audio output mode, the second visual indication may be a spatial audio simulation, such as spatial audio simulation 546 in FIGS. 5H-5J, which is different from the first visual indication which may be a stereo audio simulation, such as stereo audio simulation 538 in FIGS. 5E-5G. Alternatively, where the first audio output mode is a spatial audio output mode, and the second audio output mode is a stereo audio output mode, the second visual indication may be a stereo audio simulation, such as stereo audio simulation 538 in FIGS. 5E-5G, which is different from the first visual indication which may be a spatial audio simulation, such as spatial audio simulation 546 in FIGS. 5H-5J.

In some embodiments, while concurrently outputting the second audio using the second audio output mode and displaying the second visual indication that the second audio output mode is being used, the electronic device detects (712), via the one or more input devices, an input (e.g., input 550 over "Use Spatial Audio" button 540 in FIG. 5J) directed to the user interface (e.g., an input dismissing the user interface, an input selecting an "enable first audio output mode" affordance, an input selecting an "enable second audio output mode" affordance, or an input selecting a "confirm current audio output mode" affordance).

In some embodiments, in response to detecting the input directed to the user interface, the electronic device selects (714), based on the input, one of the first audio output mode or the second audio output mode as an active audio output mode for the respective type of audio content (e.g., when the device is causing an audio output device to output the respective type of audio content). For example, in response to detecting input 550 in FIG. 5J, device 100 selects the spatial audio output mode as the active audio output mode to be used when outputting spatial audio via earbuds 502. In some embodiments, while displaying the user interface and outputting the second audio using the second audio output mode, the electronic device receives a request to switch to using the first audio output mode, and, in response, concurrently outputs, via the set of one or more wearable audio output devices, the first audio using the first audio output mode while displaying in the user interface, via the one or more display devices, the first visual indication that the first audio output mode is being used for the first audio. In some embodiments the user can toggle back and forth between: concurrently outputting the first audio using the first audio output mode while displaying the first visual indication, and concurrently outputting the second audio using the second audio output mode while displaying the first second indication. In some embodiments which mode is selected as the active audio output mode for the respective type of audio content (e.g., whether the respective audio output mode is enabled) is independent of whether the first audio is being output using the first audio output mode and the first indication is being displayed or whether the second audio is being output using the second audio output mode and the second indication is being displayed (e.g., the toggling of which mode is being demonstrated does not enable or disable the respective audio output mode, and does not set the active audio output mode for the respective type of audio content).

In some embodiments, the first audio output mode is (716) a non-spatial audio output mode (e.g., as illustrated in FIGS. 5E-5F showing representations of speakers 538-1 through 538-2 moving with a simulated user's head with earbuds 538-3). In some embodiments, the second audio output mode is a spatial audio output mode (e.g., as illustrated in FIGS. 5H-5J showing representations of speakers 546-1 through 546-5 not moving with a representation of a user's head with earbuds 538-3). In some embodiments, a spatial audio output mode is an audio output mode where audio of the set of one or more wearable audio output devices is adjusted as the set of one or more wearable audio output devices is moved relative to a frame of reference (e.g., the audio output device is moved relative to a displayed user interface or the displayed user interface is moved relative to the audio output device), so as to position (a simulated location of, or one or more respective simulated locations of) one or more sources of sound in the frame of reference independently of a position of the set of one or more wearable audio output devices relative to the frame of reference (e.g., for a fixed source of sound, by adjusting the audio output of the one or more wearable audio output devices so as to maintain the simulated location of the fixed source of sound (e.g., of the audio being output) in a substantially fixed position (or in substantially fixed respective positions) relative to the frame of reference independently of a position of the set of one or more wearable audio output devices relative to the frame of reference; or for a moving source of sound, by adjusting the audio output of the one or more wearable audio output devices so as to move the simulated location of the source of sound relative to the frame of reference independently of a position of the set of one or more wearable audio output devices relative to the frame of reference).

In some embodiments, for the spatial audio output mode, audio signal processing is performed to compute and adjust audio signals for output so that a user (e.g., an average user) will perceive the sound of the audio output to be coming from one or more simulated locations in the frame of reference (e.g., not limited to a location within the user's head). In some embodiments, the audio signal processing of the audio signals is performed by the electronic device, by the one or more wearable audio output devices, or by a combination of the electronic device and the one or more wearable audio output devices (e.g., in part by the electronic device and in part by the one or more wearable audio output devices).

In some embodiments, a non-spatial audio output mode is an audio output mode where audio of the set of one or more wearable audio output devices is not adjusted as the set of one or more wearable audio output devices is moved relative to the frame of reference (e.g., relative to a physical environment or relative to a displayed user interface corresponding to the one or more sources of sound, such as the display of a device or a projected user interface) (e.g., resulting in not maintaining the one or more sources of sound in a substantially fixed position relative to the frame of reference).

Demonstrating different audio output modes for a particular type of audio content, such as demonstrating spatial and non-spatial audio output modes for spatial audio content, by allowing the user to easily switch between the different audio output modes helps the user to quickly choose between the different audio output modes with less trial and error during later use of the electronic device and set of one or more wearable audio output devices. Providing to the user improved feedback, or an improved audio output mode selection user interface, and reducing the number of inputs needed to use different control options enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the first audio output mode is (718) a spatial audio output mode (e.g., as illustrated in FIGS. 5H-5J showing representations of speakers 546-1 through 546-5 not moving with a representation of a user's head with earbuds 538-3). In some embodiments, the second audio output mode is a non-spatial audio output mode (e.g., the request to switch to using the second audio output mode is an input on stereo audio user interface 536 in FIG. 5H or 5I, which results in display of the user interfaces illustrated in FIGS. 5E-5F showing representations of speakers 538-1 through 538-2 moving with a simulated user's head with earbuds 538-3). In some embodiments, a spatial audio output mode is an audio output mode where audio of the set of one or more wearable audio output devices is adjusted as the set of one or more wearable audio output devices is moved relative to a frame of reference (e.g., the audio output device is moved relative to a displayed user interface or the displayed user interface is moved relative to the audio output device), so as to position (e.g., a simulated location of, or one or more respective simulated locations of) one or more sources of sound (e.g., of the audio being output) in the frame of reference independently of a position of the set of one or more wearable audio output devices relative to the frame of reference, and a non-spatial audio output mode is an audio output mode where audio of the set of one or more wearable audio output devices are not adjusted as the set of one or more wearable audio output devices is moved relative to the frame of reference (e.g., relative to a physical environment or relative to a displayed user interface corresponding to the one or more sources of sound, such as the display of a device or a projected user interface) (e.g., resulting in not maintaining the one or more sources of sound in a substantially fixed position relative to the frame of reference).

Demonstrating different audio output modes for a particular type of audio content, such as demonstrating spatial and non-spatial audio output modes for spatial audio content, by allowing the user to easily switch between the different audio output modes helps the user to quickly choose between the different audio output modes with less trial and error during later use of the electronic device and set of one or more wearable audio output devices. Providing to the user improved feedback, or an improved audio mode selection user interface, and reducing the number of inputs needed to use different control options enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the user interface includes (720) a user interface element (e.g., button 542 in FIGS. 5E-5J) that, when activated (e.g., by the user input directed to the user interface), selects as the active audio output mode for the respective type of audio content an audio output mode in which the electronic device outputs audio without using the respective audio output mode even when the electronic device is playing audio that can be presented using the respective audio output mode (e.g., audio is presented in non-spatial stereo mode even when the audio includes information that allows the audio to be presented as spatial audio).

Displaying, in the same user interface for demonstrating audio being output in different audio output modes, a user interface element to select a particular audio output mode as the active audio output mode for a particular type of audio content allows the user to quickly enable a desired audio output mode after listening to one or more audio output mode demonstrations. Reducing the number of inputs needed to perform an operation enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the user interface includes (722) a user interface element (e.g., button 540 in FIGS. 5E-5J) that, when activated (e.g., by the user input directed to the user interface), selects as the active audio output mode for the respective type of audio content an audio output mode in which the electronic device outputs audio using the respective audio output mode when the electronic device is playing audio that can be presented using the respective audio output mode (e.g., audio is presented in spatial mode when the audio includes information that allows the audio to be presented as spatial audio, and presented in non-spatial stereo mode or mono mode when the audio does not include information that allows the audio to be presented as spatial audio). In some embodiments, the user interface element of operation 720 and the user interface element of operation 722 are concurrently displayed in the user interface. In some embodiments the user interface element of operation 720 is displayed in a different user interface from the user interface element of operation 722 (e.g., while outputting the first audio using the first audio output mode, a user interface that includes one user interface element for selecting the first audio output mode as the active audio output mode is displayed, whereas a different user interface that includes the other user interface element for selecting the second audio output mode as the active audio output mode is displayed while outputting the second audio using the second audio output mode).

Displaying, in the same user interface for demonstrating audio being output in different audio output modes, a user interface element to select a particular audio output mode as the active audio output mode for a particular type of audio content allows the user to quickly enable a desired audio output mode after listening to one or more audio output mode demonstrations. Reducing the number of inputs needed to perform an operation enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the first visual indication includes (724) a first animation associated with the first audio output mode, and the second visual indication includes a second animation, different from the first animation, associated with the second audio output mode (e.g., where the first audio output mode is the stereo audio output mode and the second audio output mode is the spatial audio output mode, the first visual indication includes stereo audio simulation 538 in FIGS. 5E-5G, and the second visual indication includes spatial audio simulation 546 in FIGS. 5H-5J, or vice versa where the first audio output mode is the spatial audio output mode and the second audio output mode is the stereo audio output mode, in which case the first visual indication includes spatial audio simulation 546 in FIGS. 5H-5J, and the second visual indication includes stereo audio simulation 538 in FIGS. 5E-5G).

Displaying different animations on the electronic device while demonstrating different audio output modes provides the user with visual feedback illustrating the operation of the different audio output modes, to help the user understand how audio is output by the set of one or more wearable audio output devices in the different audio output modes. Providing to the user improved feedback, or an improved audio mode selection user interface, enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the respective audio output mode is (726) a spatial audio output mode. In some embodiments, a respective animation of the first animation and the second animation that corresponds to the spatial audio output mode includes moving a representation of a user while maintaining a representation of an audio output displayed in the user interface (e.g., while the representation of the first audio output continues to be displayed at the first location and the representation of the second audio output continues to be displayed at the second location, without moving). For example, the transition from FIG. 5H to FIG. 5I illustrates an animation that corresponds to the spatial audio output mode and that shows the user's head with earbuds 538-3 moving while maintaining the location of the representations of each of the five speakers 546-1 through 546-5. In some embodiments the representation of the audio output is maintained at a first location in the user interface, a second representation of an audio output is displayed and maintained at a second location in the user interface, and the representation of a user moves relative to the first location and the second location.

Displaying an animation that includes movement of a representation of a user relative to a non-moving representation of an audio output provides the user with visual feedback illustrating the operation of a spatial audio output mode, to help the user understand how audio is output by the set of one or more wearable audio output devices in the spatial audio output mode. Providing to the user improved feedback, or an improved audio mode selection user interface, enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the respective audio output mode is (728) a spatial audio output mode. In some embodiments, a respective animation of the first animation and the second animation that corresponds to a non-spatial audio output mode includes concurrently moving a representation of a user and a representation of a first audio output displayed with a first predefined spatial relationship to the representation of the user in accordance with the movement of the representation of the user (e.g., such that the predefined spatial relationship between the representation of the first audio output and the representation of the user is maintained). For example, the transition from FIG. 5E-5F illustrates an animation that corresponds to a non-spatial audio output mode and that shows the user's head with earbuds 538-3 moving and two simulated speakers 538-1 and 538-2 moving in accordance with the movement of user's head with earbuds 538-3. In some embodiments the respective animation that corresponds to the non-spatial audio output mode further includes moving, in accordance with the movement of the representation of the user, a representation of a second audio output having (e.g., displayed with) a second predefined spatial relationship to the representation of the user, concurrently with moving the representation of the user and the representation of the first audio output having the first predefined spatial relationship to the representation of the user (e.g., such that both the respective predefined spatial relationships between the representations of the first and second audio outputs and the representation of the user are maintained).

Displaying an animation that includes movement of a representation of a user concurrently with corresponding movement of a representation of an audio output that maintains a respective spatial relationship between the representation of the audio outputs and the representation of the user provides the user with visual feedback illustrating the operation of a non-spatial (e.g., stereo) audio output mode, to help the user understand how audio is output by the set of one or more wearable audio output devices in the non-spatial audio output mode. Providing to the user improved feedback, or an improved audio mode selection user interface, enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the second audio is a continuation of the first audio, with the second audio rendered using the second audio output mode where the first audio is rendered using the first audio output mode (730) (e.g., optionally, in FIGS. 5G-5H when transitioning from the stereo audio demo to the spatial audio demo, the outputted audio in the spatial audio demo in FIGS. 5H-5J is a continuation of the same audio from the stereo audio demo in FIGS. 5E-5G). In some embodiments, the audio repeats so that if the user continues listening in the first mode or the second mode the user will hear the same audio rendered in both the first audio output mode and in the second audio output mode.

Using the same audio (e.g., different portions of the same audio) to demonstrate different audio output modes, by rendering a first portion of the audio using one audio output mode and a second portion of the same audio using another audio output mode, or by rendering the audio using one audio output mode and repeating the same audio again rendered in the other audio output mode, ensures that the user is provided with aural feedback illustrating the operation of the different audio output modes in a manner that better enables comparison between how audio is output using the different audio output modes, to help the user understand how the audio output modes operate and differ. Providing to the user improved feedback, or an improved audio mode selection user interface, enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, outputting the first audio using the first audio output mode includes (732) rendering respective audio for output using the first audio output mode. In some embodiments, outputting the second audio using the second audio output mode includes rendering the respective audio (e.g., the same respective audio content used for the first audio output mode) for output using the second audio output mode (e.g., optionally, the audio used for the stereo audio demo in FIGS. 5E-5G is the same audio used for the spatial audio demo in FIGS. 5H-5J).

Using the same respective audio to demonstrate different audio output modes, by rendering the respective audio using the different audio output modes, ensures that the user is provided with aural feedback illustrating the operation of the different audio output modes in a manner that better enables comparison between how audio is output using the different audio output modes, to help the user understand how the audio output modes operate and differ. Providing to the user improved feedback, or an improved audio mode selection user interface, enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the respective audio includes a moving source of sound (734). In some embodiments when rendering audio from a moving source of sound for output via a set of one or more wearable audio output devices using a spatial audio output mode, where the source of sound moves relative to a frame of reference, the audio output via the set of one or more wearable audio output devices is adjusted according to both movement of the moving source of sound and movement of the set of one or more wearable audio output devices relative to a frame of reference, so as to maintain the audio as coming from the moving source of sound (e.g., the spatial relationship between the moving source of sound and the frame of reference is preserved). In one example, a source of sound that moves past the user is output at a first simulated location represented by speaker representation 546-5 and later at a second simulated location represented by speaker representation 546-2 in FIGS. 5H-5I regardless of whether the user's head is positioned as shown by representation 538-3 in FIG. 5H or FIG. 5I (e.g., movement of the user's head from a position corresponding to representation 538-3 in FIG. 5H to representation 538-3 in FIG. 5I will result in adjustment of the audio output so that the sound source still appears to move from the same first simulated location to the same second simulated location relative to the frame of reference).

In some embodiments when rendering audio from a moving source of sound for output using a non-spatial stereo audio output mode, the audio output via the set of one or more wearable audio output devices is adjusted according to movement of the moving source of sound but not according to movement of the set of one or more wearable audio output devices relative to the frame of reference (e.g., the spatial relationship between the moving source of sound and the frame of reference is not preserved, and instead the movement of the moving source of sound is presented as being relative to the set of one or more wearable audio output devices). In one example, a source of sound that moves past the user is output at a first simulated location represented by speaker representation 538-2 in FIG. 5E and later at a second simulated location represented by speaker representation 538-1 in FIG. 5E if the user's head remains positioned corresponding to representation 538-3 in FIG. 5E. However, in this example, if the user's head moves from being positioned corresponding to representation 538-3 in FIG. 5E to being positioned corresponding to representation 538-3 in FIG. 5F instead, because the audio output in the non-spatial stereo audio output mode is not adjusted according to the movement of the user's head, the moving source of sound will appear to be heard at the first simulated location represented by speaker representation 538-2 in FIG. 5E and later at a simulated location represented by speaker representation 538-1 in FIG. 5F rather than FIG. 5E.

Stated another way, the respective audio is to be output to sound as though the respective audio is coming from a plurality of different locations at different times (e.g., audio that is associated with a sequence of different locations, and that is to be output to sound as though the respective audio is moving relative to the user and/or the set of one or more wearable audio output devices). In some embodiments outputting the respective audio using a spatial audio output mode includes outputting the respective audio to sound as though, at a first time, the respective audio is coming from a first simulated location in the frame of reference (e.g., a first location in a physical environment), and, at a second time, the respective audio is coming from a second simulated location in the frame of reference (e.g., a second location in the physical environment), independently of movement of the set of one or more wearable audio output devices. In some embodiments outputting the respective audio using a non-spatial audio output mode includes outputting the respective audio to sound as though, at the first time, the respective audio is coming from a first location with a first predefined spatial relationship to the set of one or more wearable audio output devices, and, at a second time, the respective audio is coming from a second location with a second predefined spatial relationship to the set of one or more wearable audio output devices.

Demonstrating different audio output modes by using the same respective audio that is to be output to sound as though the respective audio is coming from a moving source of sound (e.g., moving over time relative to the user and/or the set of one or more wearable audio output devices) provides the user with aural feedback, or aural demonstrations, illustrating the operation of the different audio output modes in a manner that better enables comparison between how audio is output using the different audio output modes, to help the user understand how the audio output modes operate and differ. Providing to the user improved feedback, or an improved audio mode selection user interface that includes aural demonstrations of user-selectable audio output modes, enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the set of one or more wearable audio output devices includes (736) a first wearable audio output component and a second wearable audio output component (e.g., a pair of earbuds or earcups). In some embodiments, prior to displaying the user interface, in accordance with a determination that at least one of the first wearable audio output component or the second wearable audio output component is not in a respective position relative to an ear of a user (e.g., the respective position is an in-ear, on-ear, or over-the-ear position) (e.g., the first and second wearable audio output components are not both in the respective position relative to different ears of the user), the electronic device presents a notification (e.g., displaying a visual notification via the one or more display devices or outputting an audible notification via one or more of the audio output devices) prompting the user to place the first wearable audio output component in the respective position relative to a first ear of the user and the second wearable audio output component in the respective position relative to a second ear of the user (e.g., notification 530 in FIG. 5C is displayed in accordance with a determination that, as shown in FIG. 5B-5C, earbuds 502 are not both in ears 528 of the user). In some embodiments, the notification ceases to be displayed automatically in response to detecting placement of both wearable audio output components in the respective position relative to the user's ears.

In some embodiments, the notification is displayed in response to activation of a respective user interface element on a previously-displayed user interface (e.g., button 514 in FIG. 5B), if either wearable audio output component is not in the respective position relative to a respective ear of the user. In some embodiments in response to activation of the respective user interface element on the previously-displayed user interface, if both the first wearable audio output component and the second wearable audio output component are in the respective position relative to respective ears of the user, the electronic device displays the user interface (e.g., the audio output mode demonstration user interface displayed in operation 704) without displaying the notification.

Prompting the user to place both wearable audio output components in the respective position relative to (e.g., in, on, or over) the ears of a user before playing audio to demonstrate one or more audio output modes improves the conditions under which the demonstration is performed, particular for audio output modes that require the use of multiple audio output components for outputting audio, which improves the user's perception of the demonstration and reduces the need to repeat the demonstration. In embodiments where the prompt ceases to be displayed in response to detecting placement of both wearable audio output components in the respective position relative to the user's ears, doing so enables the audio output mode demonstration process to proceed without requiring the user to provide an input to explicitly dismiss the prompt and advance the demonstration process. Reducing the number of inputs needed to perform an operation, as well as in some embodiments performing the operation (e.g., automatically) when a set of conditions has been met without requiring further user input, enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the user interface (e.g., as shown in 5E, optionally part of a sequence of user interfaces including the user interface shown in FIG. 5A-1) is displayed in accordance with the electronic device establishing communication with the set of one or more wearable audio output devices for a first time (738) (e.g., an initial time).

Displaying the user interface for demonstrating audio in response to establishing communication with a particular set of one or more wearable audio output devices for a first (e.g., initial) time provides the user with quick access to setup options for the set of one or more wearable audio output devices when setup is needed or most relevant (e.g., without prompting the user about the setup options every time the electronic device establishes communication with the set of one or more wearable audio output devices). Performing an operation (e.g., automatically) when a set of conditions has been met without requiring further user input enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the user interface (e.g., as shown in 5E, optionally part of a sequence of user interfaces including the user interface shown in FIG. 5A-1) is displayed in accordance with the electronic device establishing communication with the set of one or more wearable audio output devices for a first time (e.g., an initial time) since a most recent update of software executing on the electronic device (740) (e.g., an operating system software update).

Displaying the user interface for demonstrating audio in response to establishing communication with a particular set of one or more wearable audio output devices for a first (e.g., initial) time since a most recent electronic device software update provides the user with quick access to setup options for the set of one or more wearable audio output devices when setup is needed or most relevant (e.g., without prompting the user about the setup options every time the electronic device establishes communication with the set of one or more wearable audio output devices). Performing an operation (e.g., automatically) when a set of conditions has been met without requiring further user input enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, prior to displaying the user interface, the electronic device displays (742) a settings user interface (e.g., as shown in FIG. 5A-2) that includes a selectable option for initiating an audio output mode demonstration process. In some embodiments, the user interface is displayed in response to a user input that corresponds to activation of the selectable option (e.g., demo user interface 534 in FIG. 5E or 5H is displayed in response to a user input that corresponds to activation of selectable option 518 as shown in FIG. 5A-2).

Providing access to the user interface for demonstrating audio output modes in response to an input selecting a corresponding option in a settings user interface helps the user to more quickly understand the different options for audio output mode prior to selecting, in the settings user interface, whether to enable a respective mode as the active audio output mode. Providing to the user improved feedback, or an improved audio mode selection user interface, and/or improved access to an audio mode selection user interface, and reducing the number of inputs needed to use different control options enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

It should be understood that the particular order in which the operations in FIGS. 7A-7D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 1000) are also applicable in an analogous manner to method 700 described above with respect to FIGS. 7A-7D. For example, the user interfaces, user interface elements, audio output devices, audio output modes, inputs, interactions, and animations described above with reference to method 700 optionally have one or more of the characteristics of the user interfaces, user interface elements, audio output devices, audio output modes, inputs, interactions, and animations described herein with reference to other methods described herein (e.g., methods 800 and 1000). For brevity, these details are not repeated here.

FIGS. 8A-8E are flow diagrams illustrating method 800 of displaying and modifying status of audio output modes of audio output devices (e.g., earbuds 502) displayed on display 112 of device 100. Method 800 is performed at an electronic device (e.g., device 300, FIG. 3A, or portable multifunction device 100, FIG. 1A) that is in communication with one or more display devices (e.g., touch-sensitive display system 112, FIG. 1A, or display 340, FIG. 3A) and one or more input devices (e.g., touch-sensitive display system 112, FIG. 1A, or touchpad 355, FIG. 3A). In some embodiments, the display device is a touch-screen display and the input device is on or integrated with the display device. In some embodiments, the display device is separate from the input device. Some operations in method 800 are, optionally, combined and/or the order of some operations is, optionally, changed.

As described below, method 800 provides on an electronic device an audio settings user interface for indicating a current audio output mode of one or more connected audio output devices and for enabling and disabling available audio output modes. The user interface includes a user interface element that is associated with a particular audio output mode of the one or more audio output devices and whose appearance is varied, while the particular audio output mode is enabled, to indicate whether audio is in fact being output using the particular enabled audio output mode, thus providing a user with visual feedback about how audio is currently being output via the one or more audio output devices. The user interface element is also activatable to change whether the particular audio output mode is enabled, thereby providing the user with quick access to control over the audio output mode without requiring the user to navigate through complex settings menu hierarchies. Providing improved feedback to the user and reducing the number of inputs needed to access additional control options enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

While displaying, via the one or more display devices, a first user interface of the electronic device, the electronic device receives (804), via the one or more input devices, a sequence of one or more inputs that corresponds to a request to display an audio settings user interface (e.g., in response to swipe gesture 602 in FIGS. 6A-6B and input 608 in FIG. 6D, device 100 displays audio settings user interface 610, shown in FIG. 6E).

In some embodiments, in response to receiving the sequence of one or more inputs, the electronic device displays (806), via the one or more display devices, the audio settings user interface, wherein the audio settings user interface includes a first user interface element that is activatable to change whether a first audio output mode (e.g., a spatial audio output mode) of one or more audio output devices that are in communication with the electronic device is enabled, and displaying the audio settings user interface includes (e.g., as shown in FIG. 6E, audio settings user interface 610 includes spatial audio toggle 618 and mode control 616,).

In some embodiments, displaying the audio settings user interface includes, in accordance with a determination that the first audio output mode is enabled and that the electronic device is causing respective audio that is configured for output using the first audio output mode to be output using the first audio output mode via one or more audio output devices that are in communication with the electronic device (808) (e.g., outputting the respective audio to sound as though the respective audio is coming from one or more simulated locations in a frame of reference, such as a physical environment, independently of a location of the one or more audio output devices in the frame of reference, including, for a fixed source of sound, adjusting output of the respective audio as the one or more audio output devices are moved relative to the frame of reference, so as to maintain the simulated source of sound in a substantially fixed position (or in substantially fixed respective positions) relative to the frame of reference, and/or for a moving source of sound, adjusting output of the respective audio so as to move the simulated location of the source of sound relative to the frame of reference independently of a position of the set of one or more audio output devices relative to the frame of reference), displaying the first user interface element concurrently with a first visual indication that the first audio output mode is being used (e.g., in FIG. 6E, spatial audio toggle 618 is shown in the enabled state and includes an animation that indicates that audio is being output using the spatial audio output mode).

In some embodiments, displaying the audio settings user interface includes, in accordance with a determination that the first audio output mode is enabled and that the electronic device is not causing respective audio to be output using the first audio output mode via one or more audio output devices that are in communication with the electronic device (810) (e.g., the respective audio is not being output (e.g., playback has not been initiated or is paused), or audio that is being output is not configured for output using the first audio output mode), displaying the first user interface element without displaying the first visual indication that the first audio output mode is being used (e.g., in FIG. 6J, spatial audio toggle 618 is shown in the enabled state without an animation because, although the spatial audio output mode is enabled, spatial audio content is not currently being output as spatial audio by earbuds 502; and in FIG. 6L, spatial audio toggle 618 is shown in the enabled state without an animation because the audio content being output does not include spatial content).

In some embodiments, the first visual indication that the first audio output mode is being used is (812) an appearance of the first user interface element (e.g., the first user interface element has a first appearance when audio is being output with the first audio output mode and a second appearance when audio is not being output with the first audio output mode). For example, spatial audio toggle 618 in FIG. 6E has a different appearance from spatial audio toggle 618 in FIGS. 6J and 6L.

Displaying a visual indication as to whether audio is in fact being output using a particular enabled audio output mode provides the user with visual feedback about how audio is currently being output via one or more connected audio output devices. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, while displaying the first user interface element concurrently with the first visual indication that the first audio output mode is being used, the appearance of the first user interface element includes (814) a respective animation (e.g., spatial audio toggle 618 in the enabled state in FIG. 6E is animated) (e.g., the first user interface element is dynamic, and optionally the animation repeats as long as the first audio output mode is enabled and the electronic device is causing respective audio that is configured for output using the first audio output mode to be output using the first audio output mode via one or more audio output devices that are in communication with the electronic device), and while displaying the first user interface element without displaying the first visual indication that the first audio output mode is being used, the appearance of the first user interface element does not include the respective animation (e.g., the first user interface element is not animated, the first user interface element is static, without any portion being animated or, alternatively, the first user interface element includes a different animation from the respective animation). For example, in FIGS. 6J and 6L, spatial audio toggle 618 is not animated, although spatial audio is enabled, because spatial audio is not currently being played.

Displaying an audio output mode user interface element with different appearances, such as animated versus not animated, to indicate whether audio is in fact being output using a particular enabled audio output mode provides the user with visual feedback about how audio is currently being output via one or more connected audio output devices. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, displaying the audio settings user interface includes (816), in accordance with a determination that the first audio output mode is not enabled, displaying the first user interface element and displaying a visual indication that the first audio output mode is not enabled (e.g., without regard to whether or not audio is currently being output that could be output with the first audio output mode). In some embodiments, the visual indication that the first audio output mode is not enabled is a change in appearance of the first user interface element. For example, in FIG. 6G, spatial audio toggle 618 is displayed with an appearance indicating that the spatial audio output mode is not enabled, which is a change from its appearance in FIGS. 6E and 6F in response to input 622 on the spatial audio toggle 618. In some embodiments, embodiments, the visual indication that the first audio output mode is not enabled is an indication displayed in the user interface separately from the first user interface element (e.g., a textual indication as described herein with reference to operation 830).

Displaying a visual indication as to whether a particular audio output mode (e.g., a spatial audio output mode) is enabled or disabled provides the user with visual feedback about whether outputting audio using the particular audio output mode is currently permitted. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the visual indication that the first audio output mode is not enabled is (818) an appearance of the first user interface element that is different from one or more appearances of the first user interface element that are displayed while the first audio output mode is enabled (e.g., FIG. 6E shows spatial audio toggle 618 with a first appearance when the spatial audio output mode is enabled, and FIG. 6G shows spatial audio toggle 618 with a second appearance when the spatial audio output mode is disabled).

Displaying an audio output mode user interface element with different appearances based on whether a particular audio output mode (e.g., a spatial audio output mode) is enabled or disabled (e.g., further differentiated from the appearance(s) of the user interface element based on whether audio is currently being output using the particular audio output mode while the particular audio output mode is enabled), provides the user with visual feedback about whether outputting audio using the particular audio output mode is currently permitted. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the appearance of the first user interface element while the first audio output mode is not enabled is (820) different from (e.g., visually deemphasized relative to) the one or more appearances of the first user interface element that are displayed while the first audio output mode is enabled in color, fill, and/or shading (e.g., FIG. 6E shows spatial audio toggle 618 with highlighting when the spatial audio output mode is enabled, and FIG. 6G shows spatial audio toggle 618 as shaded and/or grayed out when the spatial audio output mode is disabled). In some embodiments, the appearance while the first audio output mode is not enabled is (e.g., further) different from the one or more appearances in that at least one of the one or more appearances includes animating at least a portion of the first user interface element, whereas the appearance while the first audio output mode is not enabled is a static appearance (e.g., without animating any portion of the first user interface element).

Displaying an audio output mode user interface element with different color, fill, and/or shading based on whether a particular audio output mode (e.g., a spatial audio output mode) is enabled or disabled provides the user with intuitive visual feedback about whether outputting audio using the particular audio output mode is currently permitted. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the audio settings user interface includes (822) a second user interface element indicating a first ambient sound control mode in which the one or more audio output devices are operating (e.g., mode control 616 shown in FIG. 6E-6M). In some embodiments, the first ambient sound control mode is one of a plurality of audio output modes that vary how much ambient sound from the physical environment is perceivable by a user wearing the one or more audio output devices. In some embodiments, the first ambient sound control mode is a mode, sometimes called a pass-through audio output mode, in which the one or more audio output devices include, in audio outputs, one or more pass-through audio components selected so as to increase audio pass-through of ambient sound from the physical environment (e.g., thereby increasing the amount of ambient sound from the physical environment that is perceivable by the user). In some embodiments, the first ambient sound control mode is a mode, sometimes called a noise cancellation audio output mode, in which the one or more audio output devices include, in audio outputs, one or more cancellation audio components selected so as to increase audio cancellation of the ambient sound from the physical environment (e.g., thereby decreasing the amount of ambient sound from the physical environment that is perceivable by the user). In some embodiments, the first ambient sound control mode is a mode, sometimes called a noise control off audio output mode or a bypass audio output mode, in which the one or more audio output devices output audio without including (e.g., any) pass-through audio components and without including (e.g., any) cancellation audio components. In some embodiments, the second user interface element is displayed concurrently with the first user interface element.

Displaying a user interface element indicating an ambient sound control mode in which one or more connected audio output devices are currently operating provides the user with visual feedback about how audio is currently being output. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the electronic device detects (824) a user input that corresponds to activation of the second user interface element. In some embodiments, in response to the electronic device detecting the user input that corresponds to the activation of the second user interface element (e.g., input 624 in FIG. 6M): the electronic device ceases to display the first user interface element that is activatable to change whether the first audio output mode is enabled (e.g., FIG. 6N), and the electronic device displays a user interface element (e.g., the second user interface element) corresponding to the first ambient sound control mode, and a user interface element corresponding to a second ambient sound control mode different from the first ambient sound control mode (e.g., as shown in FIG. 6N) (e.g., at least a portion of the user interface elements corresponding to the first and second ambient sound control modes is displayed over a respective portion of the audio settings user interface in which the first user interface element was previously displayed). In some embodiments, the electronic device also displays a user interface element corresponding to a third ambient sound control mode different from the first and second ambient sound control modes. In some embodiments, in response to detecting the user input that corresponds to the activation of the second user interface element, the electronic device displays a plurality of user interface elements, where each respective user interface element corresponds to a respective ambient sound control mode in which the one or more audio output devices are capable of operating. In some embodiments, after displaying the user interface elements corresponding to the first and second ambient sound control modes (e.g., in response to one or more inputs dismissing the user interface elements and/or selecting an ambient sound control mode other than the first ambient sound control mode, or after the user interface elements have been displayed for a predetermined amount of time without user interaction, for example), the electronic device ceases to display the user interface elements over the respective portion of the audio settings user interface and redisplays the first user interface element in the respective portion of the audio settings user interface.

Providing an expanded set of selectable options for available ambient sound control mode of one or more connected audio output devices in response to an input activating a user interface element that indicates the current ambient sound control mode provides the user with quick access to additional audio output mode options without requiring the user to navigate through complex settings menu hierarchies and without displaying the expanded set of options when not needed. Reducing the number of inputs needed to access additional control options and providing such control options without cluttering the user interface with additional displayed controls enhances the operability of the devices and makes the user-device interface more efficient (e.g., by helping the user to achieve an intended outcome and reducing user mistakes when operating/interacting with the device), which, additionally, reduces power usage and improves battery life of the devices by enabling the user to use the devices more quickly and efficiently.

In some embodiments, in accordance with the determination that the first audio output mode is enabled and that the electronic device is not causing respective audio to be output using the first audio output mode via one or more audio output devices that are in communication with the electronic device, while outputting second respective audio that is not configured for output using the first audio output mode, the electronic device outputs (826) the second respective audio using a second audio output mode (e.g., a non-spatial audio output mode such as a stereo audio output mode) that is different from the first audio output mode (e.g., even though the first audio output mode is enabled). For example, in FIGS. 6L-6M, although spatial audio toggle 618 indicates that the spatial audio output mode is enabled, stereo audio is being played, because the audio content being output (e.g., from "Car Podcast" 625) does not include spatial audio content. In some embodiments, outputting the respective audio using the first audio output mode is performed in accordance with a determination that the respective audio output is configured for output using the first audio output mode, and outputting the second respective audio using the second audio output mode instead of the first audio output mode is performed in accordance with a determination that the second respective audio is not configured for output using the first audio output mode (and, optionally, in accordance with a determination that the second respective audio is configured for output using the second audio output mode). In some embodiments, the second audio output mode is a stereo audio output mode (e.g., in which audio that is output via a set of one or more wearable audio output devices is not adjusted as the set of one or more wearable audio output devices moves relative to a frame of reference, or in which audio is output to sound as though the audio is coming from one or more locations with one or more respective predefined spatial relationships to a set of one or more wearable audio output devices, where the relative spatial relationship(s) between the one or more locations and the set of one or more wearable audio output devices are maintained as the set of one or more wearable audio output devices moves). In some embodiments, the second audio output mode is a mono audio mode (e.g., in which audio that is output via a set of one or more wearable audio output devices is not adjusted as the set of one or more wearable audio output devices moves relative to a frame of reference, and is output to sound as though the audio is coming from a single location and/or without any difference between the audio output from a first wearable audio output component and a second wearable audio output component of the set of one or more wearable audio output devices). In some embodiments, audio that is output using a mono audio output mode differs from audio that is output using spatial or stereo audio output modes in that audio output using the spatial or stereo audio output modes can have different spatial relationships with different components of the set of one or more wearable audio output devices (e.g., different earbuds or earcups worn in, on, or over different ears), whereas audio output using the mono audio output mode does not. In some embodiments, while outputting audio using the second audio output mode while the first audio output mode is enabled, the first user interface element is displayed without displaying the first visual indication that the first audio output mode is being used.

Switching audio output mode from a first audio output mode to a different audio output mode in accordance with a determination that the audio that is to be output is not configured for output using the first audio output mode avoids outputting audio in a manner that is not compatible with current conditions for audio output (e.g., due to the type of audio that is to be output). Performing an operation (e.g., automatically) when a set of conditions has been met enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the one or more audio output devices include a first wearable audio output component configured to be placed in a respective position relative to a first ear of a user (e.g., the respective position is an in-ear, on-ear, or over-the-ear position) and a second wearable audio output component configured to be placed in the respective position relative to a second ear of the user (e.g., distinct wearable audio output components, such as earbuds or earcups, configured to be worn in, on, or over different ears of a user). In some embodiments, the electronic device causes (828) the respective audio to be output using the first audio output mode is performed in accordance with a determination that the first wearable audio output component is in the respective position relative to a first ear of a user and that the second wearable audio output component is in the respective position relative to a second ear of the user. In some embodiments, the electronic device displays the first user interface element with the first appearance in accordance with the determination that the first wearable audio output component and the second wearable audio output component are in the respective position relative to the user's ears, respectively. In some embodiments, while the first audio output mode is enabled, and while the electronic device is causing the respective audio that is configured for output using the first audio output mode to be output via the one or more audio output devices: in accordance with a determination that the first wearable audio output component or the second wearable audio output component is not in the respective position relative to a respective ear of the user, the electronic device causes the respective audio to be output via the one or more audio output devices using a third audio output mode (e.g., a mono audio output mode) that is different from the first audio output mode (e.g., FIG. 6J shows the audio playing in a mono audio output mode, even though the spatial audio output mode is enabled and the audio content being played includes spatial audio content as indicated in legend 619, because earbud 502-1 is removed from ear 528-1 of the user). In some embodiments the third audio output mode is different from the second audio output mode. In some embodiments, the third audio output mode is the same as the second audio output mode. In some embodiments the third audio output is the mono audio output mode (e.g., the respective audio sounds as though it is coming from the location of the wearable audio output component that is still in the respective position relative to an ear of the user). In some embodiments the first and second wearable audio output components are on-ear or over-ear earcups, and the determination that the first wearable audio output component or the second wearable audio output component is not in the respective position relative to a respective ear of the user is a determination that one or both earcups are not on the user's ears (for on-ear earcups) or not over the user's ears (for over-ear earcups). In some embodiments the first and second wearable audio output components are in-ear earphones, and the determination that the first wearable audio output component or the second wearable audio output component is not in the respective position relative to a respective ear of the user is a determination that one or both earphones are not in the user's ears.

Switching audio output mode from a first audio output mode to a different audio output mode in response to at least one wearable audio output component being removed from the respective position relative to an ear of the user avoids outputting audio in a manner that is not compatible with current conditions for audio output and that may use more power than necessary (e.g., due to the user not being able to perceive audio output from both wearable audio output components as intended for the first audio output mode). Performing an operation (e.g., automatically) when a set of conditions has been met enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the electronic device detects (830) an input activating the first user interface element to change whether the first audio output mode is enabled. In some embodiments, in response to the electronic device detecting the input activating the first user interface element: the electronic device displays an indication whether the first audio output mode is enabled (e.g., in combination with enabling or disabling the first audio output mode) (e.g., textual indication 621 in FIG. 6G is displayed in accordance with disabling the spatial audio output mode, and textual indication 623 in FIG. 6I is displayed in accordance with enabling the spatial audio output mode). In some embodiments activating the first user interface element toggles whether the first audio output mode is enabled or disabled. In some embodiments or circumstances, the input activating the first user interface element enables the first audio output mode, and in some such embodiments or circumstances the indication displayed in response is an indication that outputting audio using the first audio output mode (e.g., at least for type(s) of audio that are configured to be output in the first audio output mode) is enabled. In some embodiments or circumstances, the input activating the first user interface element disables outputting audio using the first audio output mode, and in some such embodiments or circumstances the indication displayed in response is an indication that outputting audio using the first audio output mode is disabled. In some embodiments the displayed indication whether the first audio output mode is enabled is distinct from (e.g., displayed in a different portion of the user interface from) the first user interface element. In some embodiments, the displayed indication indicates the types of audio that can be output using the first audio output mode (e.g., where the first audio output mode is enabled only for certain types of audio) (e.g., textual indication 621 in FIG. 6G and textual indication 623 in FIG. 6I indicate that the spatial audio output mode being turned off and on, respectively, pertains to music and videos). For example, where TV audio and movie audio, but not other types of audio, can be output using the first audio output mode, the displayed indication that outputting audio using the first audio output mode is enabled indicates that the first audio output mode is enabled for TV audio and movie audio. In this example, optionally, the displayed indication that outputting audio using the first audio output mode is disabled indicates that the first audio output mode is disabled for TV audio and movie audio. Alternatively, the displayed indication that outputting audio using the first audio output mode is disabled does not indicate particular types of audio (e.g., because the first audio output mode is disabled for all types of audio).

Displaying an indication whether the first audio output mode is enabled (and optionally indicating what types of audio will be output using the first audio output mode) in response to activation of the first user interface element (e.g., to toggle whether the first audio output mode is enabled) provides the user with visual feedback indicating a current mode of audio output. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the electronic device automatically ceases (832) to display the indication whether the first audio output mode is enabled after occurrence of a predetermined condition (e.g., after a predetermined amount of time has elapsed since the first audio output mode was enabled, after a predetermined amount of time has elapsed since the first audio output mode was disabled, after a predetermined amount of time has elapsed since audio using the first audio output mode started to be output via one or more audio output devices in communication with the electronic device, after a predetermined amount of time has elapsed since audio using the first audio output mode ceased to be output via one or more audio output devices in communication with the electronic device, and/or after a predetermined amount of time has elapsed since the audio settings user interface was displayed). For example, the transition from FIG. 6G to 6H shows that the textual indication 621 in FIG. 6G has ceased to be displayed in FIG. 6H, and the transition from FIG. 6I to 6J shows that the textual indication 623 in FIG. 6I has ceased to be displayed in FIG. 6J.

Automatically ceasing to display an indication whether the first audio output mode is enabled (and optionally what types of audio will be output using the first audio output mode) after a predetermined condition has occurred, such as a predetermined amount of time elapsing since a respective event associated with the first audio output mode or audio settings user interface occurred, provides the visual feedback indicating the current mode of audio output for an amount of time sufficient for the user to perceive the feedback but not for longer than necessary. Providing improved feedback to the user without cluttering the user interface with additional displayed elements enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the first settings user interface includes (834) a third user interface element for adjusting a volume of audio output via the one or more audio output devices (e.g., expanded volume control slider 612 in FIGS. 6E-6O). In some embodiments, the electronic device detects a user input that changes the third user interface element from indicating a first value to indicating a second value different from the first value (e.g., changing the display state of the third user interface element by increasing or decreasing a value indicator, such as by changing the position of a slider thumb along a slider). In some embodiments, in response to detecting the user input that changes the third user interface element from indicating the first value to indicating the second value, the electronic device changes the volume of audio output via the one or more audio output devices (e.g., changing the volume of audio output via earbuds 502 in FIGS. 6E-6N or the volume of audio output via earbuds 632 in FIG. 6O via expanded volume control slider 612 in FIGS. 6E-6O). In some embodiments the third user interface element is displayed concurrently with the first user interface element (e.g., if the first user interface element is displayed based on the one or more audio output devices being capable of outputting audio using the first audio output mode) (e.g., expanded volume control slider 612 is displayed concurrently with spatial audio toggle 618 in FIGS. 6E-6M). In some embodiments the third user interface element is displayed concurrently with the second user interface element (e.g., if the second user interface element is displayed based on the one or more audio output devices being capable of outputting audio in one of a plurality of different ambient sound control modes) (e.g., expanded volume control slider 612 is displayed concurrently with mode control 616 in FIGS. 6E-6N). In some embodiments the third user interface element is displayed in the first settings user interface without regard to whether any of the first user interface element or the second user interface element is displayed.

Displaying a user interface element for adjusting audio output volume for audio that is output via one or more connected audio output devices provides the user with quick access to additional audio output control options without requiring the user to navigate through complex settings menu hierarchies. Reducing the number of inputs needed to access additional control options enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, while the first audio output mode is enabled, and while causing the respective audio that is configured for output using the first audio output mode to be output using the first audio output mode: in accordance with a determination that an electronic device tracking audio output mode is enabled, the electronic device outputs (836) the respective audio using the first audio output mode includes modifying output of the respective audio based on a current location of the electronic device as the electronic device is moved in a physical environment relative to the one or more audio output devices that are outputting the respective audio (e.g., the respective audio continues to follow the location of the electronic device even if the pose of the one or more audio output devices changes, as described herein with reference to the "follow device" feature, for example in the discussions of FIGS. 5A-1 and 5J). In some embodiments, while the first audio output mode is enabled, and while causing the respective audio that is configured for output using the first audio output mode to be output using the first audio output mode: in accordance with a determination that the electronic device tracking audio output mode is disabled, the electronic device outputs the respective audio using the first audio output mode without modifying the output of the respective audio based on the current location of the electronic device relative to the one or more audio output devices that are outputting the respective audio (e.g., FIG. 5A-2 shows a user interface element 522 that includes a button 523 for activating and deactivating the follow device feature, which may optionally be included in audio settings user interface 610 in FIGS. 6E-6O) (e.g., the respective audio is output at a plurality of locations in the physical environment without regard to the current location of the electronic device). In some embodiments whether the electronic device tracking audio output mode is enabled is configurable using a second settings user interface (e.g., a second audio settings user interface) different from the audio settings user interface (e.g., in settings user interface 516 in FIG. 5A-2, which includes button 523 for toggling whether the follow device feature is enabled). In some embodiments the second settings user interface includes a user interface element that is activatable to change whether the first audio output mode is enabled (e.g., the user interface element in the second settings user interface performs at least some of the same functions as the first user interface element in the audio settings user interface) (e.g., settings user interface 516 in FIG. 5A-2 also includes button 521 for toggling whether the spatial audio output mode is enabled). In some embodiments the second settings user interface is the same as the audio settings user interface.

Providing an electronic device tracking audio output mode that outputs audio to sound as though the audio is moving with the electronic device as the electronic device moves relative to one or more connected audio output devices improves accessibility by providing aural feedback to the user about the current location of the electronic device, thus helping users (e.g., particularly visually-impaired users) interact with the electronic device. Because a user might only need to interact with a user interface element to enable such an audio output mode once, displaying such user interface element in a different, second settings user interface (e.g., a more comprehensive settings user interface) from the audio settings user interface simplifies the audio settings user interface to controls that a user is likely to access more frequently. Improving accessibility and providing additional control options without cluttering the user interface with infrequently-used displayed controls enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the electronic device detects (838) a user input directed to the first user interface element. In some embodiments, in response to the electronic device detecting the user input directed to the first user interface element, and in accordance with a determination that the user input directed to the first user interface element is detected while the first audio output mode is enabled, the electronic device disables the first audio output mode (e.g., in response to input 620 on spatial audio toggle 618 in FIG. 6F, the electronic device deactivates the spatial audio output mode, which is indicated by the changed appearance of spatial audio toggle 618 in FIG. 6G). In some embodiments, in response to the electronic device detecting the user input directed to the first user interface element, and in accordance with a determination that the user input directed to the first user interface element is detected while the first audio output mode is disabled, the electronic device enables the first audio output mode (e.g., in response to input 622 on spatial audio toggle 618 in FIG. 6H, the electronic device activates spatial audio, which is indicated by the changed appearance of spatial audio toggle 618 in FIG. 6I).

Displaying in an audio settings user interface an audio output mode user interface element to enable or disable the first audio output mode (e.g., a spatial audio output mode) provides a user with quick access to control over audio output mode without requiring the user to navigate through complex settings menu hierarchies. Reducing the number of inputs needed to access additional control options enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, in response to receiving the sequence of one or more inputs at the electronic device, the audio settings user interface includes (840) the first user interface element in accordance with a determination that the one or more audio output devices that are in communication with the electronic device are capable of outputting audio using the first audio output mode (e.g., the one or more audio output devices support spatial audio output) (e.g., spatial audio toggle 618 is displayed in audio settings user interface 610 in FIGS. 6E-6M in accordance with a determination that earbuds 502 are capable of outputting spatial audio). In some embodiments, while the electronic device is in communication with one or more audio output devices that are not capable of outputting audio using the first audio output mode, and while displaying the audio settings user interface, the electronic device forgoes displaying the first user interface element (e.g., in accordance with a determination that the one or more audio output devices are not capable of outputting audio using the first audio output mode) (e.g., spatial audio toggle 618 is not displayed in audio settings user interface 610 in FIG. 6O in accordance with a determination that earbuds 632 are not capable of outputting spatial audio).

Conditionally displaying user interface elements, which indicate and are activatable to change respective audio output modes in which one or more audio output devices in communication with an electronic device are operating, based on whether the one or more connected audio output devices support such audio output modes provides visual feedback to the user as to which audio output modes are supported and provides the user with quick access to control options over such audio output modes when relevant. Forgoing displaying a user interface element indicating a respective audio output mode that is not supported by the one or more connected audio output devices avoids misleading the user into believing that the audio output mode is available and can be controlled. Providing improved feedback to the user about available control options, reducing the number of inputs needed to access available and relevant control options, and providing such control options without cluttering the user interface with unavailable and thus irrelevant control options enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, audio that is configured for output using the first audio output mode includes (842) one or more of: audio associated with television content (e.g., videos or video clips of television content such as television shows), audio associated with movie content (e.g., movies or movie clips or trailers), audio associated with video calls (sometimes called video conferences), sounds associated with (e.g., generated by) an operating system of the electronic device, audio associated with a virtual assistant (e.g., a software module or application, executing on the electronic device, that assists a user with performing tasks or operations on the electronic device in response to voice and/or text inputs recognized as requests to perform such tasks or operations), and audio associated with notifications on the electronic device (e.g., to alert a user of notifications received at or generated by the electronic device). In some embodiments audio that is configured for output using the first audio output mode includes audio for videos, more generally. In some embodiments, audio that is configured for output using the first audio output mode includes audio associated with multiparty telephone calls in which users of three or more electronic devices are participating. In some circumstances, one or more (e.g., a subset) of the aforementioned types of audio is not included among the types of audio that are configured for output using the first audio output mode. For example, textual indication 623 in FIG. 6I illustrates that spatial audio can be activated for music and movies.

Outputting one or more different types of audio that are configured for output using a particular audio output mode (e.g., a spatial audio output mode) when playback of the audio is requested while the particular audio output mode is enabled, and conversely using a different audio output mode to output one or more types of audio that are not configured for output using the particular audio output mode, improves how audio is presented to the user based on the properties of the requested audio without requiring the user to explicitly request playback using a specific audio output mode. Performing an operation (e.g., automatically, without further user input) when a set of conditions has been met without requiring further user input enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

It should be understood that the particular order in which the operations in FIGS. 8A-8E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 1000) are also applicable in an analogous manner to method 800 described above with respect to FIGS. 8A-8E. For example, the user interfaces, user interface elements, audio output devices, audio output modes, inputs, interactions, and animations described above with reference to method 800 optionally have one or more of the characteristics of the user interfaces, user interface elements, audio output devices, audio output modes, inputs, interactions, and animations described herein with reference to other methods described herein (e.g., methods 700 and 1000). For brevity, these details are not repeated here.

Figure 9B:
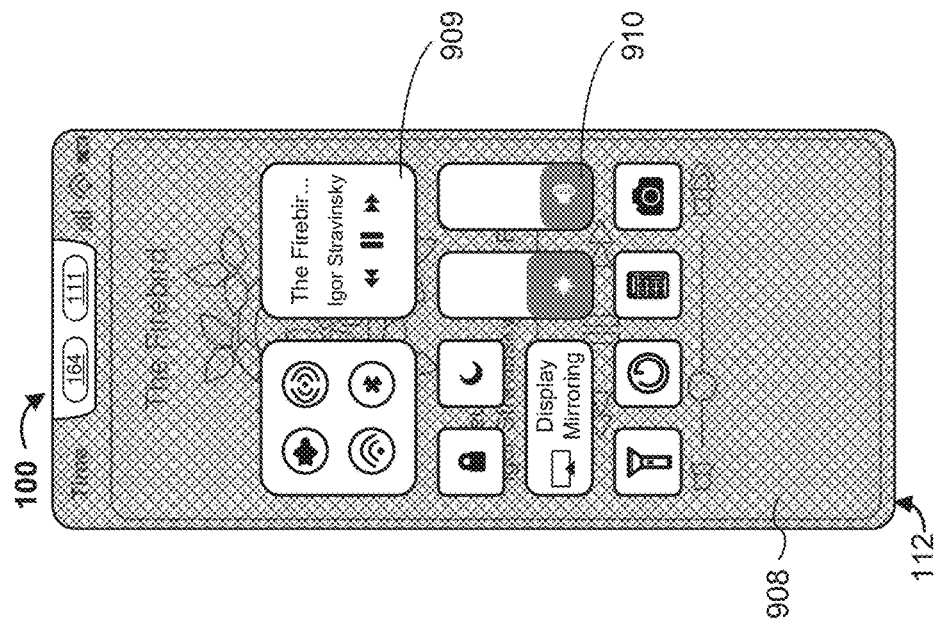
FIGS. 9A-9AM illustrate example user interfaces for selecting, and saving user selections of, audio output modes of audio output devices in accordance with some embodiments.
Figure 9A:
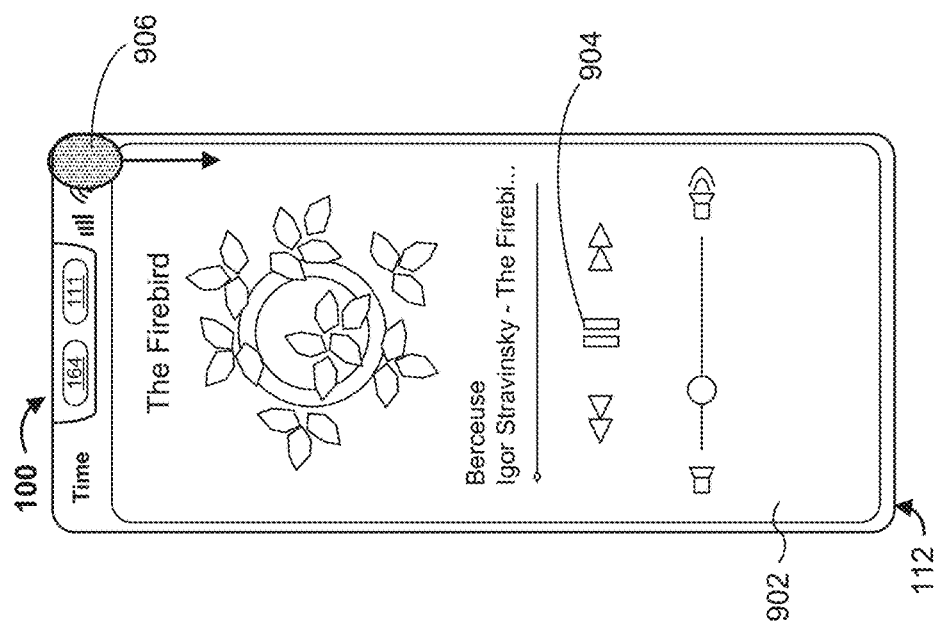

FIGS. 9A-9AM illustrate example user interfaces for selecting, and saving user selections of, audio output modes of audio output devices (e.g., earbuds 502) in accordance with some embodiments.

FIGS. 9A-9J illustrate changing the selected audio output modes for a music application. In particular, FIGS. 9A-9D illustrate invoking an audio settings user interface over an application user interface in response to one or more inputs. FIG. 9A illustrates user interface 902 on touchscreen 112 of device 100. In the example shown in FIG. 9A, user interface 902 is a user interface of a music application. The music application is being used to play music to an audio output device (e.g., earbuds 502, headphones, speakers, etc.), as indicated by pause button 904. FIG. 9A also shows input 906 detected on touchscreen 112 (e.g., a downwards swipe gesture from the top right corner of touchscreen 112). In FIG. 9B, in response to input 906 (in FIG. 9A), settings user interface 908 is displayed on touchscreen 112. In some embodiments, settings user interface 908 is overlaid on and at least partially obscures the previously displayed user interface, in this case music application user interface 902 (FIG. 9A). In some embodiments, settings user interface 908 replaces the previously displayed user interface. Settings user interface 908 includes a plurality of controls for controlling various features of device 100, such as data connectivity controls, a screen orientation control, a brightness control, volume control 910, media controls, and shortcuts to various applications. Settings user interface 908 is analogous to settings user interface 604 (as described herein with reference to FIG. 6C), except that media control 909 in settings user interface 908 identifies the music that is playing from the music application, as described with reference to FIG. 9A, instead of the video content shown in settings user interface 604 (as described herein with reference to FIG. 6A).

Figure 9D:
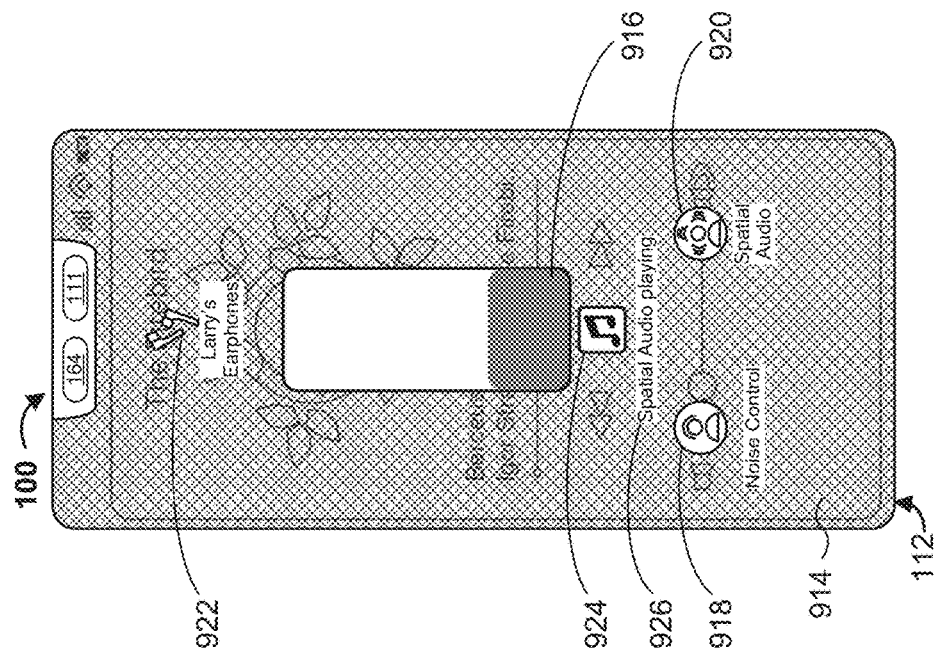
Figure 9C:
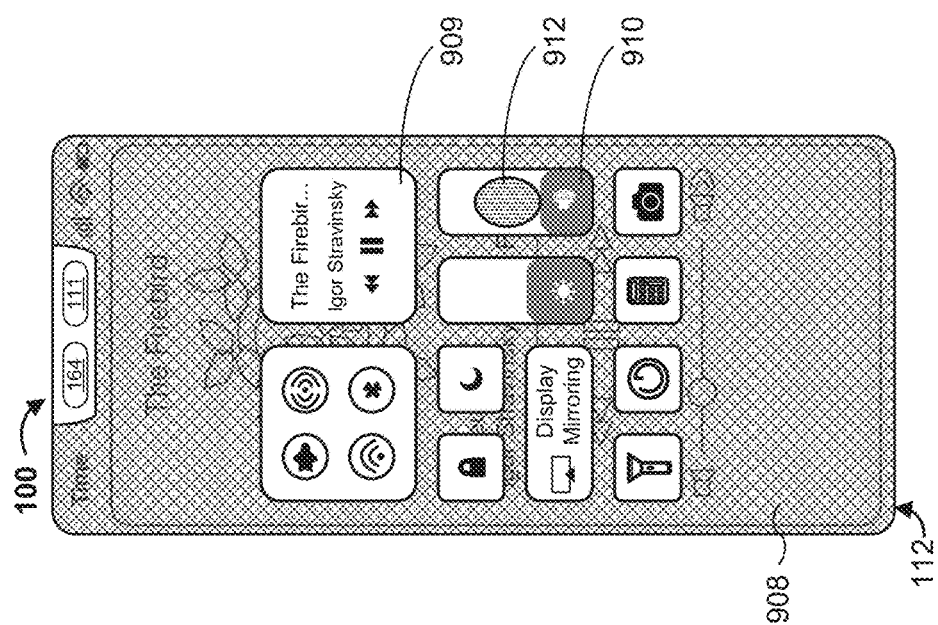

FIG. 9C shows input 912 on volume control 910 in settings user interface 908 (e.g., a tap gesture or a long press gesture that is maintained on volume control 910 for at least a predetermined amount of time). In FIG. 9D, audio settings user interface 914 is displayed in response to input 912 (in FIG. 9C). In some embodiments, audio settings user interface 914 represents a submenu of settings user interface 908. Audio settings user interface 914 is analogous to audio settings user interface 610 (as described herein with reference to FIG. 6E). In the example shown in FIG. 9D, audio settings user interface 914 includes expanded volume control slider 916 for adjusting audio output volume (e.g., expanded volume control slider 916 in audio settings user interface 914 is a larger version of and has analogous behavior to volume control 910 in settings user interface 908), noise management control 918 for selecting an available noise control audio output mode as the current noise control audio output mode (e.g., analogous to mode control 616 described herein with reference to FIG. 6E) and indicating that the active noise control mode is currently selected, and spatial audio toggle 920 for enabling or disabling a spatial audio output mode (e.g., analogous to spatial audio toggle 618 described herein with reference to FIG. 6E). The example appearance of spatial audio toggle 920 in FIG. 9D indicates that spatial audio is currently enabled. In addition, in the example shown in FIG. 9D, audio settings user interface 914 includes indication 922 identifying the currently connected set of audio output devices (e.g., the label "Larry's Earphones" identifying earbuds 502, analogous to icon 614 described herein with reference to FIG. 6E), icon 924 identifying the application that is currently outputting audio (e.g., the music application icon), and indication 926 identifying the type of audio that is currently being output (e.g., the text "Spatial Audio playing" indicating that spatial audio is currently being played).

Figure 9F:
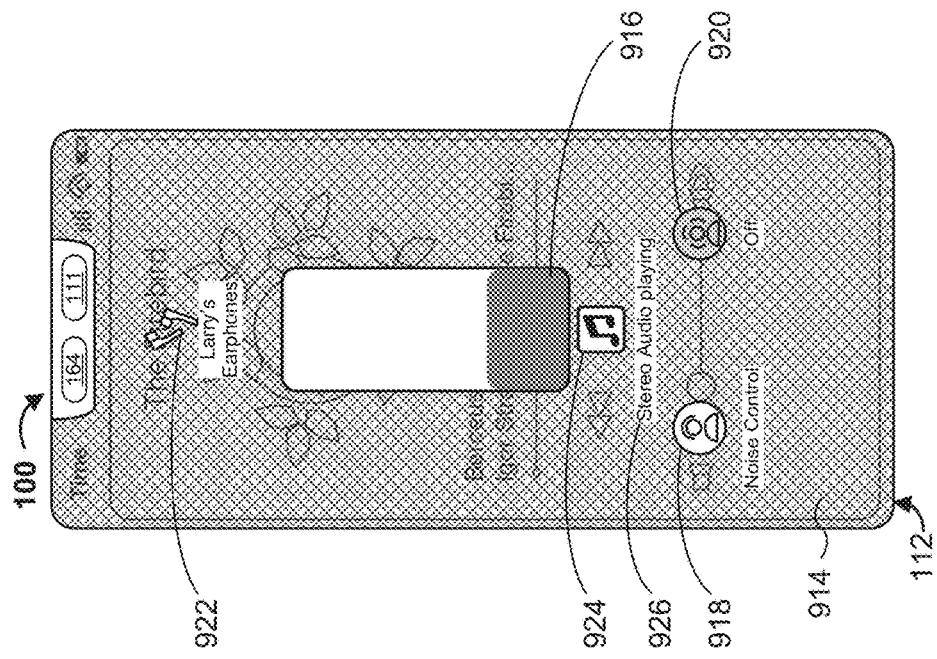
Figure 9E:
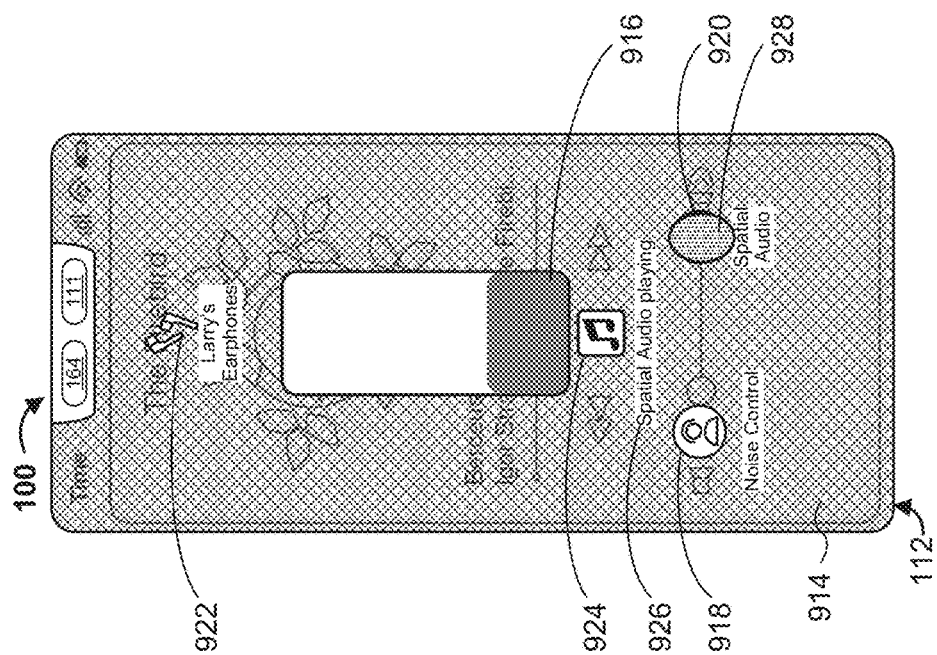

FIGS. 9E-9F illustrate changing a spatial audio output mode setting. In particular, FIG. 9E shows input 928 (e.g., a tap gesture) on spatial audio toggle 920. In FIG. 9F, in response to input 928 on spatial audio toggle 920 (in FIG. 9E), spatial audio is disabled, as indicated by the appearance of spatial audio toggle 920 and by indication 926 (e.g., the text "Stereo Audio playing" indicating that stereo audio is currently being played and that spatial audio is no longer being played).

Figure 9H:
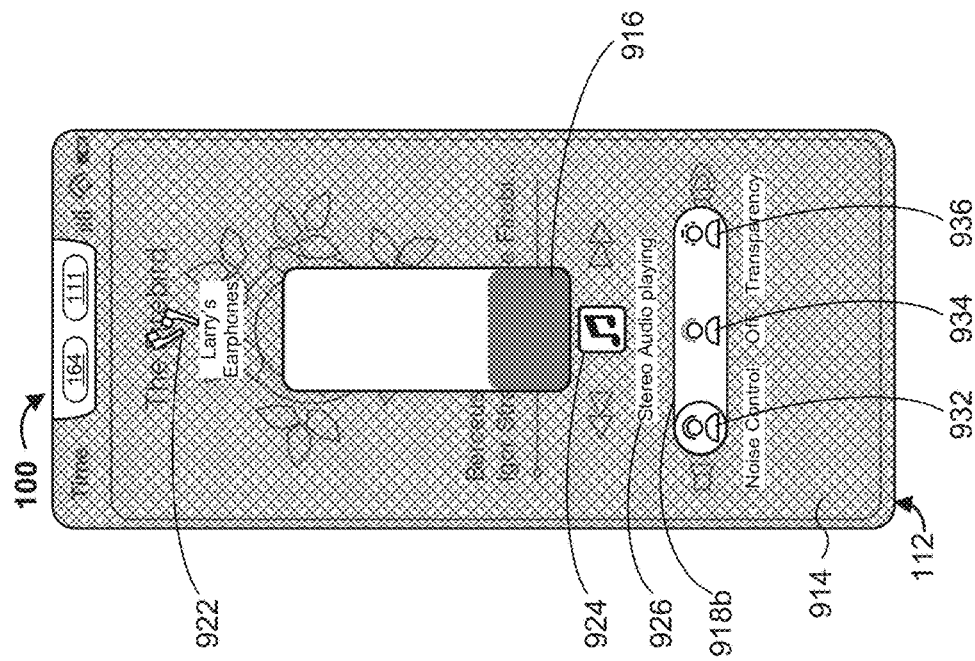
Figure 9G:
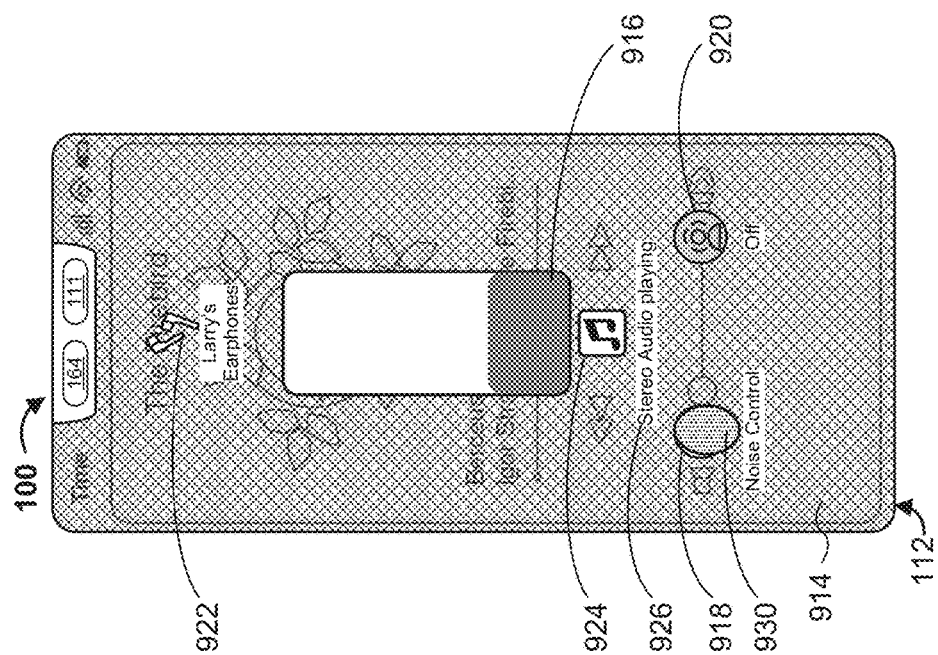

FIGS. 9G-9J illustrate changing the selected noise control audio output mode. In particular, FIG. 9G shows input 930 (e.g., a tap gesture) on noise management control 918. In FIG. 9H, in response to input 930 on noise management control 918 (in FIG. 9G), expanded noise management control 918b is displayed (e.g., optionally with an animation of noise management control 918 expanding), and spatial audio toggle 920 ceases to be displayed. Expanded noise management control 918b is analogous to the expanded version of mode control 616 (described herein with reference to FIG. 6N). In the example shown in FIG. 9H, expanded noise management control 918b displays representations of the three noise control audio output modes supported by the currently connected set of audio output devices (e.g., earbuds 502, as indicated by indication 922) and accompanying labels: noise cancellation mode icon 932 (e.g., labeled "Noise Control") representing the active noise control mode; noise control off mode icon 934 (e.g., labeled "Off") representing the bypass mode; and transparency mode icon 936 (e.g., labeled "Transparency") representing the active pass-through mode.

Figure 9J:
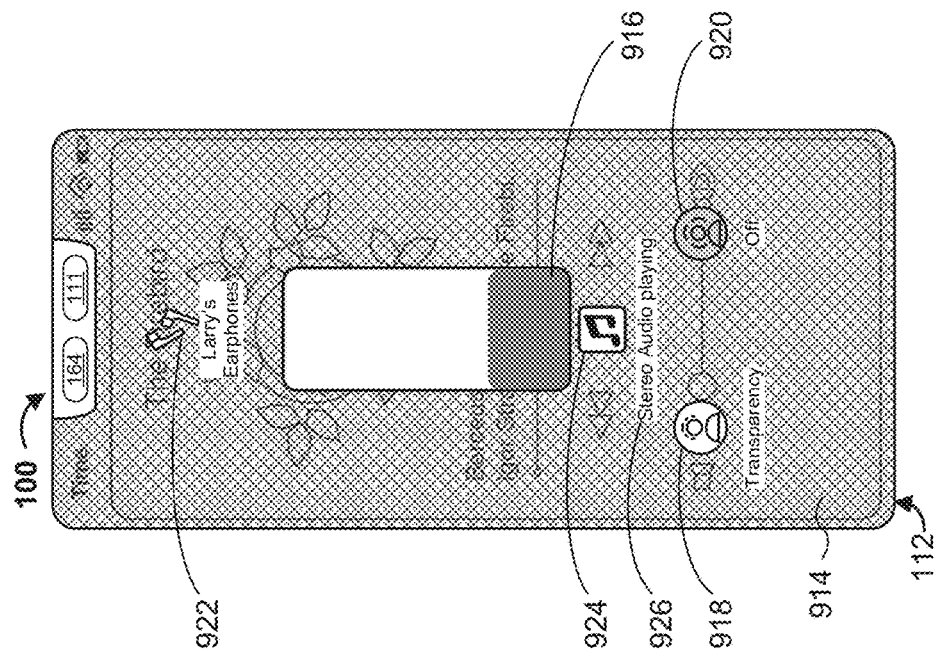
Figure 9I:
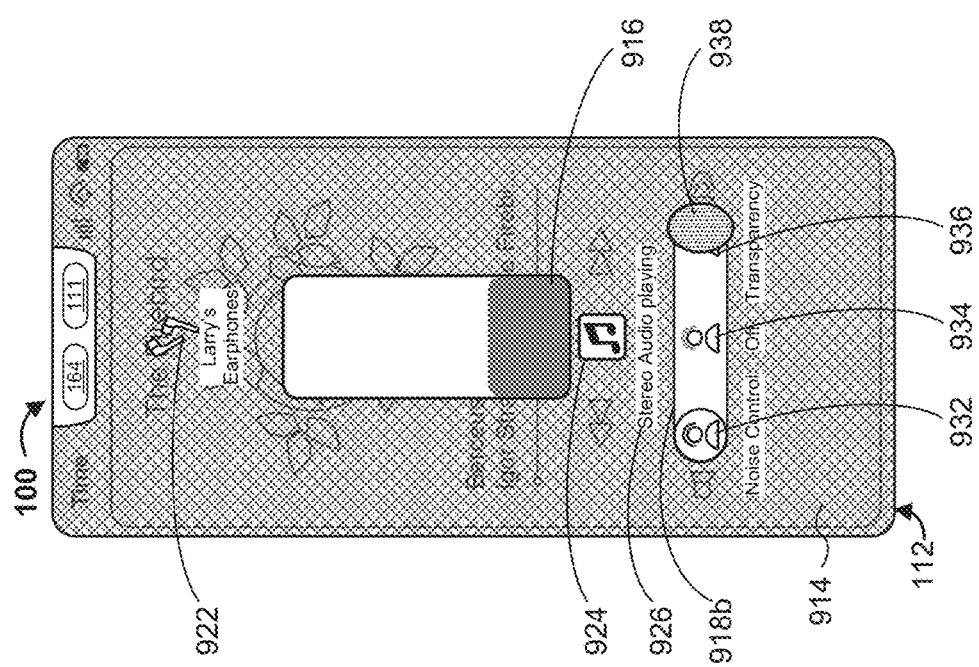

FIG. 9I shows input 938 (e.g., a tap gesture) on transparency mode icon 936 in expanded noise management control 918b. FIG. 9J illustrates an example transition from FIG. 9I, in accordance with the active pass-through mode being selected as the current noise control audio output mode in response to input 938 on transparency mode icon 936 (in FIG. 9I). In the example shown in FIG. 9J, expanded noise management control 918b ceases to be displayed (e.g., optionally with an animation of expanded noise management control 918b collapsing into noise management control 918), and noise management control 918 is displayed with an appearance corresponding to that of transparency mode icon 936 (in FIG. 9H).

Figure 9L:
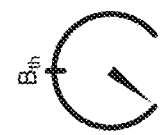
Figure 9L:
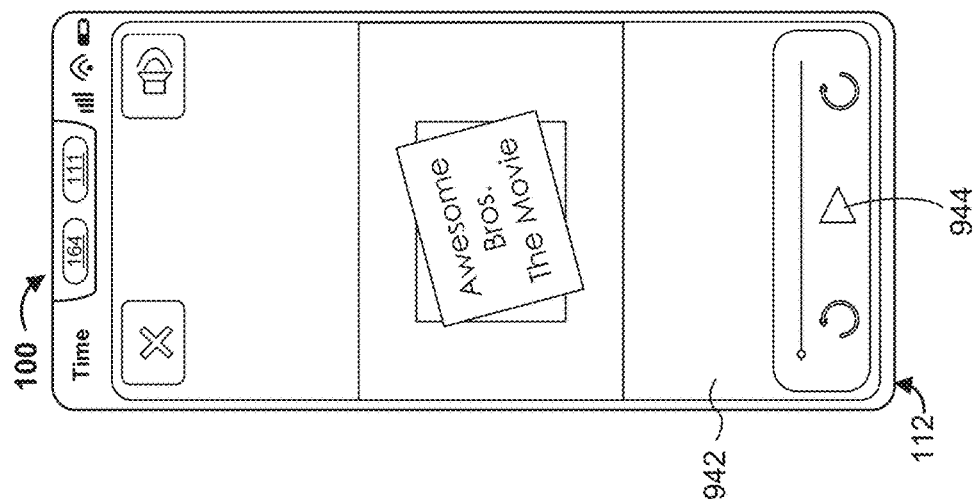
Figure 9K:
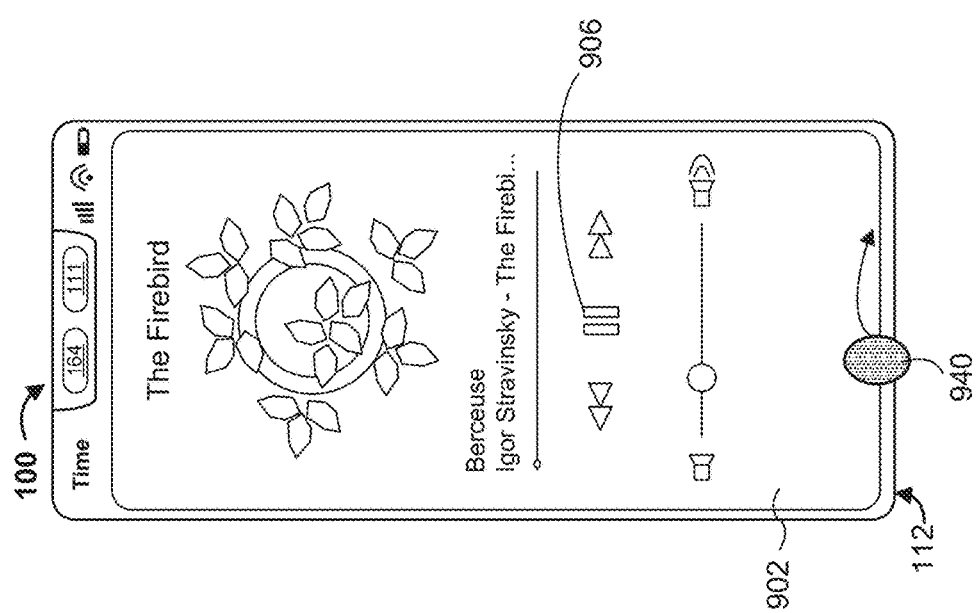

FIGS. 9K-9L illustrate switching from the music application to a different application. In particular, FIG. 9K shows music application user interface 902 displayed on touchscreen 112 following dismissal of audio settings user interface 914 in an example transition from FIG. 9J (e.g., in response to one or more inputs to device 100 while audio settings user interface 914 is displayed). FIG. 9K also shows input 940 for switching from the music application to a different application (e.g., a previously launched application executing in the background on device 100). In FIG. 9L, in response to input 940 (FIG. 9K), user interface 942 is displayed on touchscreen 112 instead of music application user interface 902. In the example shown in FIG. 9L, user interface 942 is a user interface of a movie application. Movie application user interface 942 includes a plurality of movie playback controls, including play button 944, which indicates that the displayed movie (e.g., titled "Awesome Bros. The Movie") is not being played (e.g., playback has not yet been initiated or is paused).

Bandwidth meter 946 in FIG. 9L indicates the amount of bandwidth being used to stream the movie and corresponding movie audio. In some embodiments, the amount of bandwidth available for streaming content affects the type of audio that is output from device 100 via the connected audio output device. For example, if the bandwidth available for device 100 to receive streaming content from a wireless network (e.g., the Internet or a cellular telephone network) is constrained to below a threshold bandwidth $B_{th}$, audio is not output as spatial audio even if the spatial audio output mode is selected (e.g., because spatial audio information is omitted from the audio information transmitted to device 100, to accommodate the constrained bandwidth for device 100 to obtain the streaming content from the wireless network, without regard to the communication bandwidth between device 100 and the connected audio output device). Outputting audio as non-spatial audio in these circumstances allows audio output to continue without interruptions or otherwise reduced quality. In another example, if device 100 is outputting audio to a wireless audio output device (e.g., via Bluetooth or Wi-Fi), and if the signal bandwidth between device 100 and the wireless audio output device is constrained to below a threshold bandwidth $B_{th}$, audio is not output as spatial audio even if the spatial audio output mode is selected (e.g., because spatial audio information is omitted from the audio information transmitted by device 100 to the wireless audio output device, to accommodate the constrained bandwidth between device 100 and the wireless audio output device, even if the bandwidth available for device 100 to receive streaming content from the network is above $B_{th}$). In some embodiments, the appearance of spatial audio toggle 920 is changed to indicate changes in the type of audio that is output based on available bandwidth. In some embodiments, the appearance of spatial audio toggle 920 reflects whether the user has requested that the spatial audio output mode be enabled, and the appearance of spatial audio toggle 920 is not changed even when the type of audio that is output is changed based on available bandwidth. In the scenarios illustrated in FIGS. 9L-9Q, the displayed movie is not being played, as indicated by play button 944, and accordingly bandwidth meter 946 indicates that streaming bandwidth for the movie and/or its corresponding audio remains below the threshold bandwidth $B_{th}$.

Figure 9N:
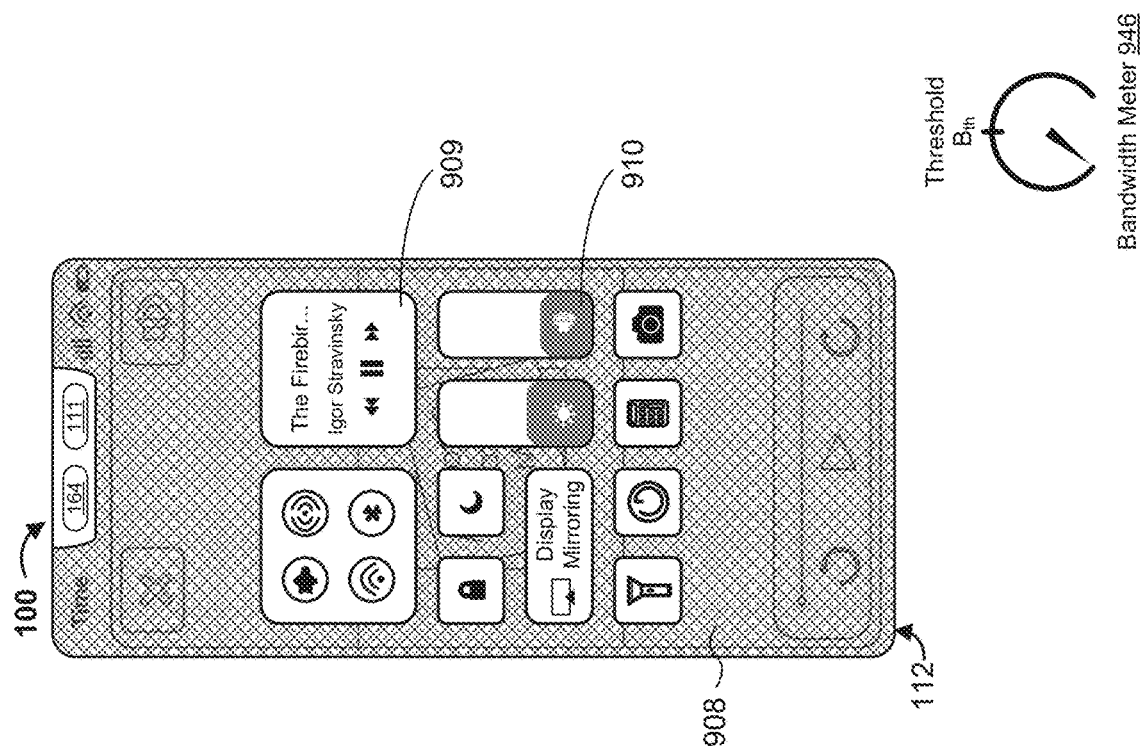
Figure 9M:
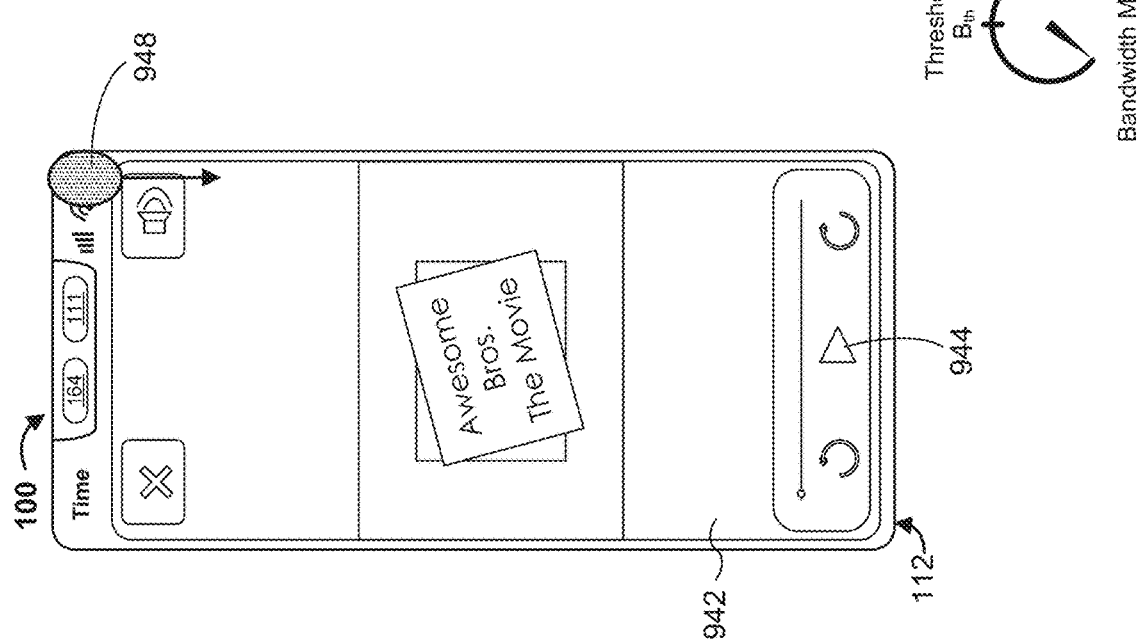

FIGS. 9M-9P illustrate invoking audio settings user interface 914 while movie application user interface 942 is displayed. In particular, FIG. 9M shows input 948 detected on touchscreen 112 (e.g., a downwards swipe gesture from the top right corner of touchscreen 112, similar to input 906 (FIG. 9A)). In FIG. 9N, in response to input 948 (in FIG. 9M), settings user interface 908 is displayed on touchscreen 112. Media control 909 in settings user interface 908 indicates that music is still playing from the music application (e.g., even though audio settings user interface 914 was invoked while movie application user interface 942 was displayed, because movie playback has not been initiated or resumed so as to cause music playback to stop).

FIG. 9O shows input 950 on volume control 910 in settings user interface 908 (e.g., a tap gesture or a long press gesture that is maintained on volume control 910 for at least a predetermined amount of time). In FIG. 9P, audio settings user interface 914 is displayed in response to input 950 (in FIG. 9O). Because music is still playing from the music application as indicated by icon 924 representing the music application, audio settings user interface 914 displays the audio output mode settings that were most recently selected for the music application. In particular, spatial audio is disabled, as indicated by the appearance of spatial audio toggle 920 and by indication 926 (e.g., the text "Stereo Audio playing" indicating that stereo audio is currently being played and that spatial audio is no longer being played) in audio settings user interface 914 (as described herein with reference to FIG. 9F). In addition, the active pass-through mode is selected as the current noise control audio output mode, as indicated by the appearance of noise management control 918 (e.g., which is based on transparency mode icon 936 (FIG. 9H)).

Figures 9Q, 9R:
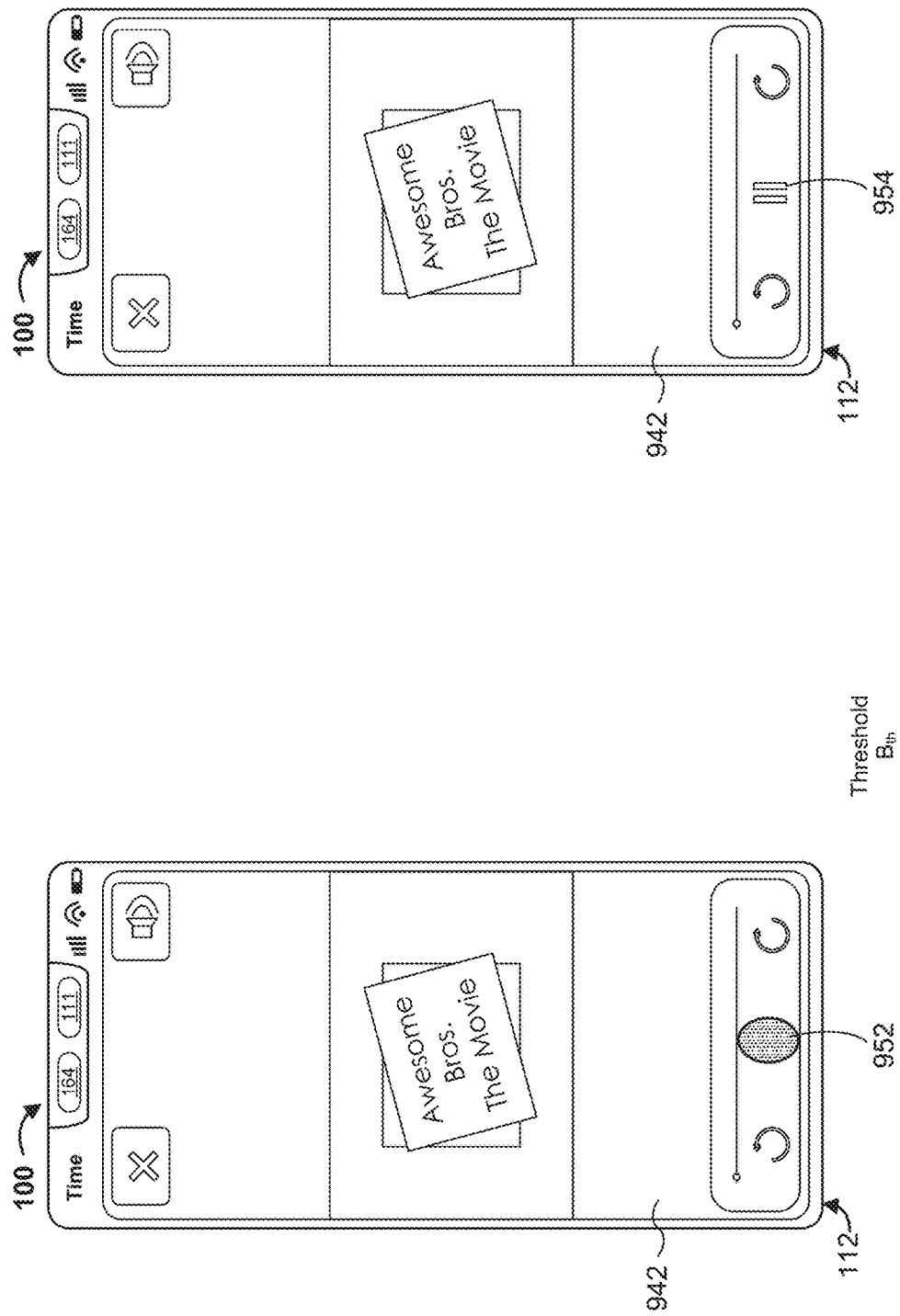

FIGS. 9Q-9R illustrate an example transition from FIG. 9P. In particular, FIG. 9Q shows movie application user interface 942 displayed on touchscreen 112 following dismissal of audio settings user interface 914 (e.g., in response to one or more inputs to device 100 while audio settings user interface 914 is displayed). In addition, FIG. 9Q shows input 952 (e.g., a tap gesture) on play button 944 (visible in FIG. 9M). In FIG. 9R, in response to input 952, movie playback begins (or resumes), as indicated by pause button 954 and by the increase in streaming bandwidth indicated by bandwidth meter 946. The amount of streaming bandwidth being used for movie playback in FIGS. 9R-9V remains below the threshold bandwidth $B_{th}$ (e.g., the bandwidth used by device 100 to receive movie content from a network is below the threshold bandwidth $B_{th}$ and/or the bandwidth used by device 100 to output corresponding movie audio to the audio output device is below the threshold bandwidth $B_{th}$).

Figure 9T:
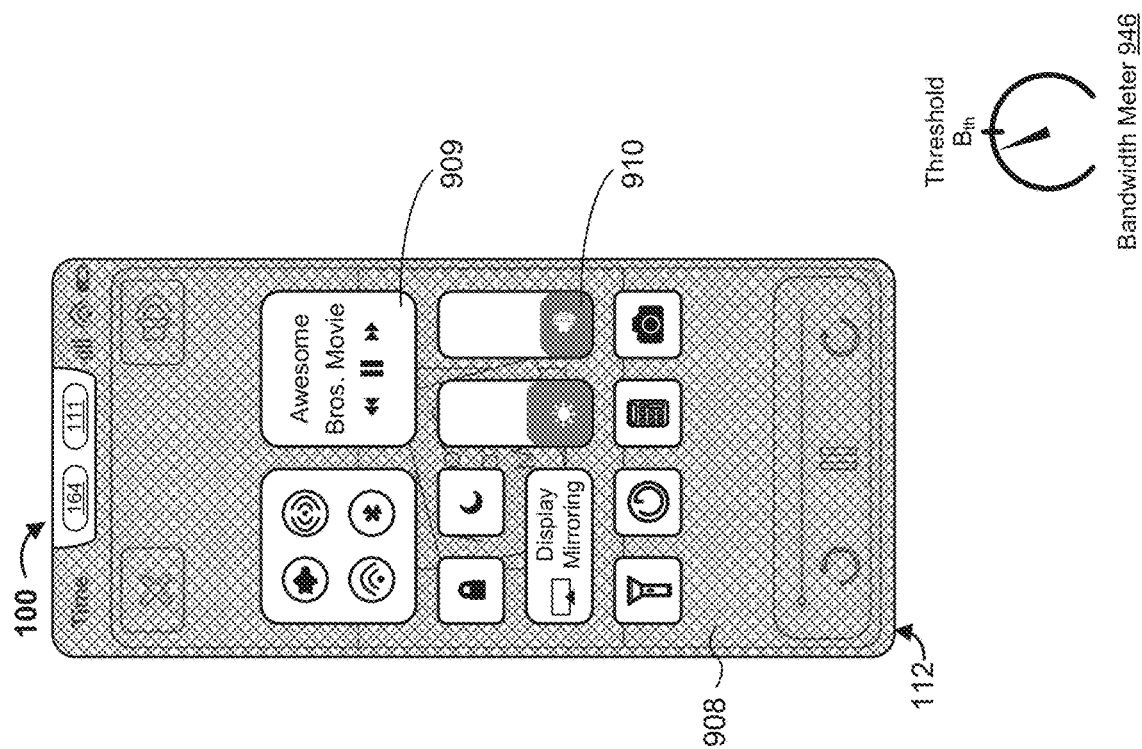
Figure 9S:
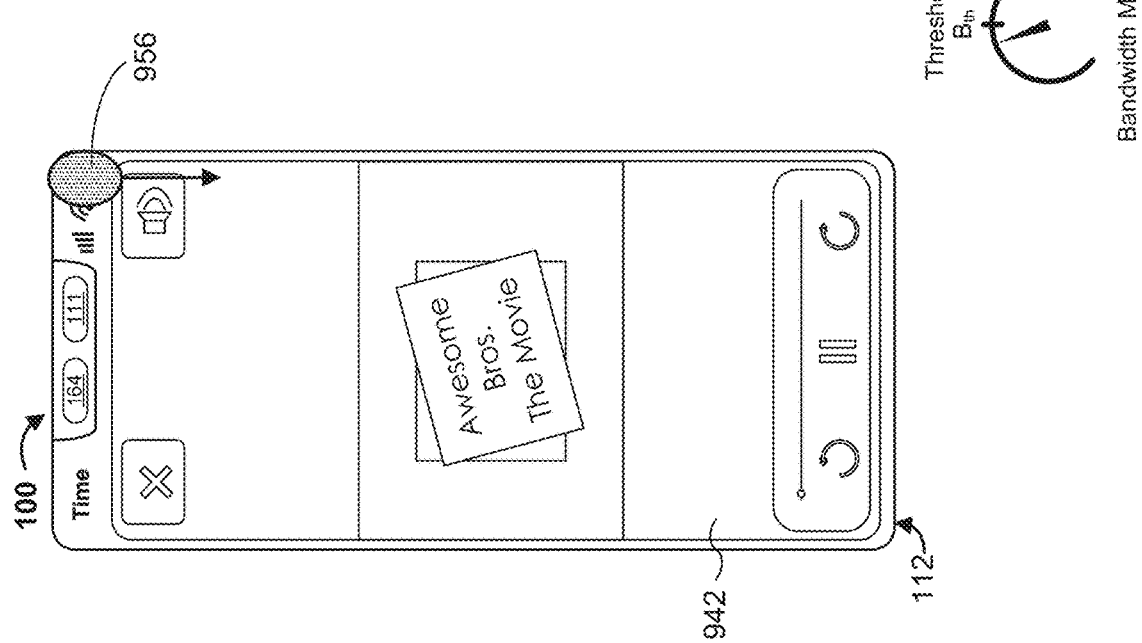

FIGS. 9S-9V illustrate invoking audio settings user interface 914 again while movie application user interface 942 is displayed, after initiating or resuming movie playback in FIGS. 9Q-9R. FIGS. 9S-9V also illustrate that the movie being played is output using audio output settings for the movie application that are different from the most recently selected audio output settings for the music application, as reflected in settings user interface 908 and audio settings user interface 914. In particular, FIG. 9S shows input 956 detected on touchscreen 112 (e.g., a downwards swipe gesture from the top right corner of touchscreen 112, similar to input 948 (FIG. 9M)). In FIG. 9T, in response to input 956 (in FIG. 9S), settings user interface 908 is displayed on touchscreen 112. Media control 909 in settings user interface 908 indicates that movie audio is now playing from the movie application (e.g., in contrast to FIGS. 9N-9O, where movie playback was not taking place).

FIG. 9U shows input 958 on volume control 910 in settings user interface 908 (e.g., a tap gesture or a long press gesture that is maintained on volume control 910 for at least a predetermined amount of time). In response to input 958, audio settings user interface 914 is displayed, as shown in FIG. 9V. Because a movie is now playing from the movie application, as indicated by icon 960 representing the movie application, audio settings user interface 914 displays audio output mode settings for the movie application (e.g., audio output mode settings that were most recently selected by the user for the movie application during previous interactions with the movie application, or default audio output mode settings for the movie application if no user selections have been made). In particular, the active noise control mode is enabled, as indicated by noise management control 918 (e.g., in contrast to noise management control 918 in FIG. 9P indicating that the active pass-through mode was enabled for the music application). In addition, spatial audio toggle 920 indicates that spatial audio is enabled for the movie application.

However, because streaming bandwidth for the movie is below the threshold bandwidth $B_{th}$, spatial audio content is not being output even though spatial audio is enabled. Instead, audio is output as spatialized stereo audio (e.g., by applying an algorithm to two-channel stereo audio content to upscale the stereo audio content, and outputting the upscaled audio content spatially, as spatialized stereo audio content, which is herein described further with reference to operation 1030 of method 1000). In some embodiments, as illustrated by FIG. 9V, audio settings user interface 914 indicates that spatial audio is enabled but not being output, and that spatialized stereo audio is being output instead. For example, the appearance of spatial audio toggle 920 in FIG. 9V is different from the appearance that spatial audio toggle 920 has while spatial audio output is enabled and while spatial audio content is in fact being output (e.g., as shown in FIG. 9D) (e.g., differing in the number or extent of sound waves represented and/or in the type of animation or whether an animation is displayed). The appearance of spatial audio toggle 920 in FIG. 9V also indicates that spatial audio is not disabled, in that the appearance of spatial audio toggle 920 in FIG. 9V is also different from the appearance that spatial audio toggle 920 has while spatial audio is disabled (e.g., as shown in FIG. 9F). In addition, FIG. 9V includes indication 962 (e.g., the text "Spatialized Stereo Audio playing") indicating that spatialized stereo audio is being output.

In contrast to the example shown in FIG. 9V, in some embodiments, while the spatial audio output mode is enabled, audio settings user interface 914 indicates that spatial audio output is enabled and that spatial audio content is being output, even while spatialized stereo audio content is being output instead of spatial audio content (e.g., spatial audio toggle 920 is displayed with the same appearance as in FIG. 9D, and/or indication 926 indicates that spatial audio is currently being played (e.g., using the text "Spatial Audio playing")).

Figures 9W, 9X:
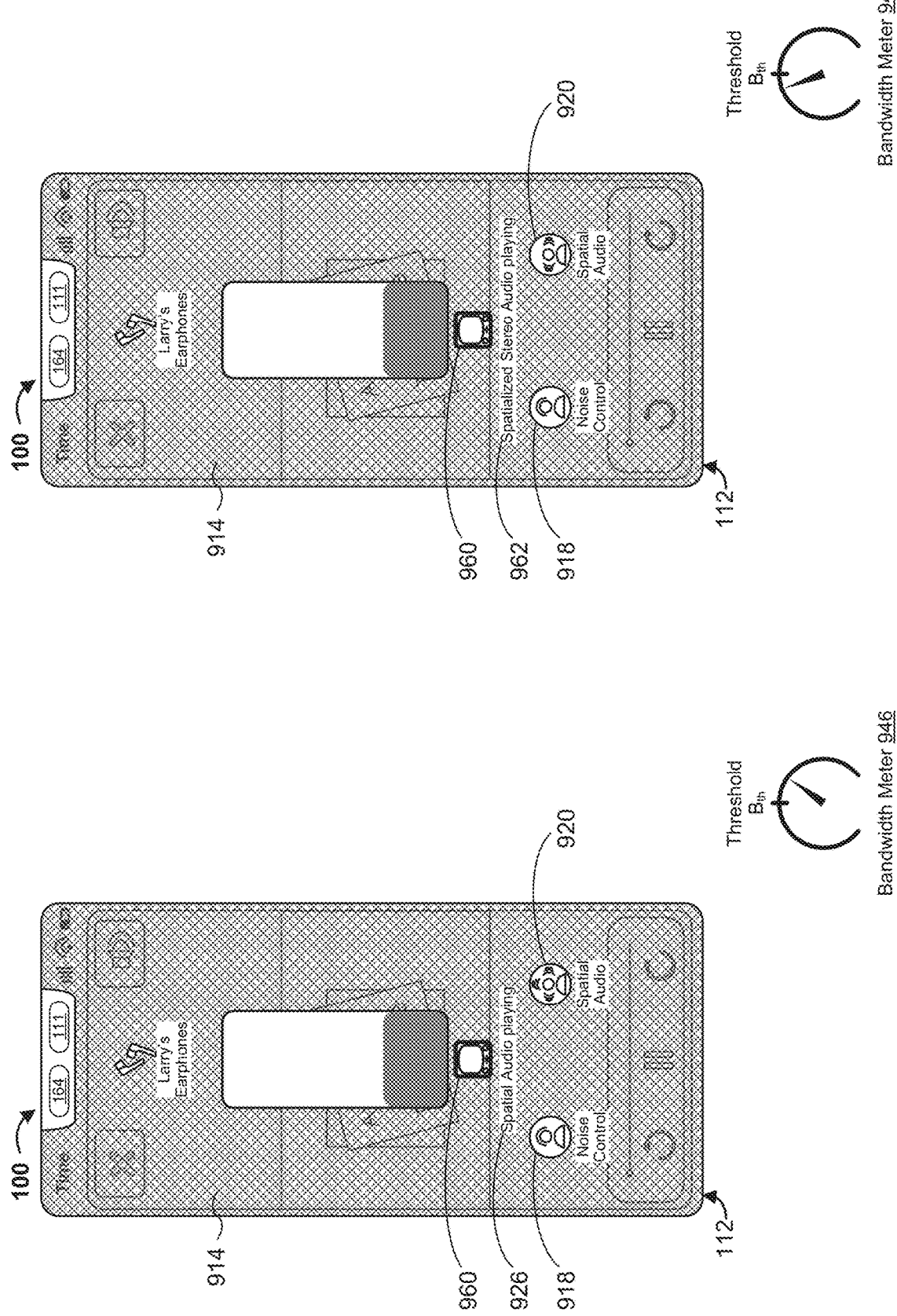

FIG. 9W shows audio settings user interface 914 during streaming of movie content with streaming bandwidth above the threshold bandwidth $B_{th}$. In accordance with sufficient streaming bandwidth being available (e.g., both for device 100 to receive movie content from a network and for device 100 to output movie audio to the audio output device), spatial audio toggle 920 is displayed with an appearance indicating that spatial audio is being output (e.g., the same appearance as in FIG. 9D), and indication 926 (e.g., the text "Spatial Audio playing") indicates that spatial audio is currently being played.

FIG. 9X shows audio settings user interface 914 during streaming of movie content, in response to streaming bandwidth dropping below the threshold bandwidth $B_{th}$. In particular, in FIG. 9X, spatial audio toggle 920 is displayed with an appearance indicating that spatial audio is enabled but that spatialized stereo audio is being output (e.g., the same appearance as in FIG. 9V), and indication 962 (e.g., the text "Spatialized Stereo Audio playing") is displayed, indicating that spatialized stereo audio is being output. As noted above with reference to FIGS. 9V, in some embodiments audio settings user interface 914 is not changed to indicate that spatialized stereo audio content is being output instead of spatial audio content, and instead maintains the same appearance as when spatial audio content is enabled and being output.

Figure 9Z:
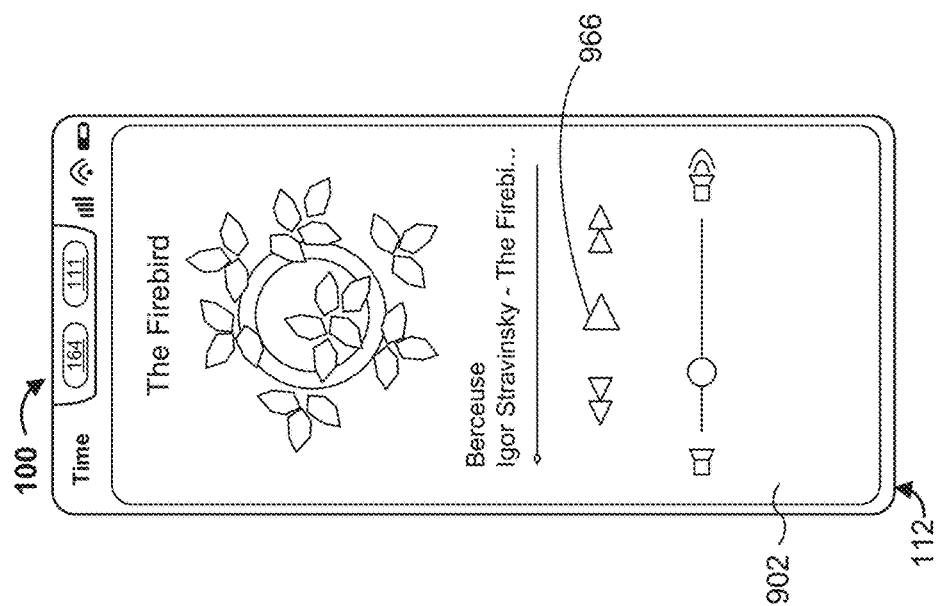
Figure 9Y:
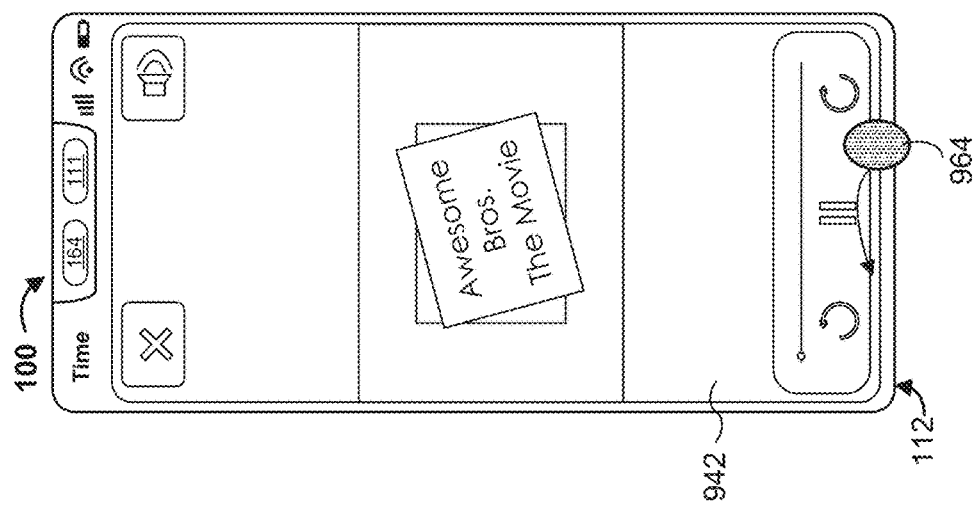
Figure 9A:
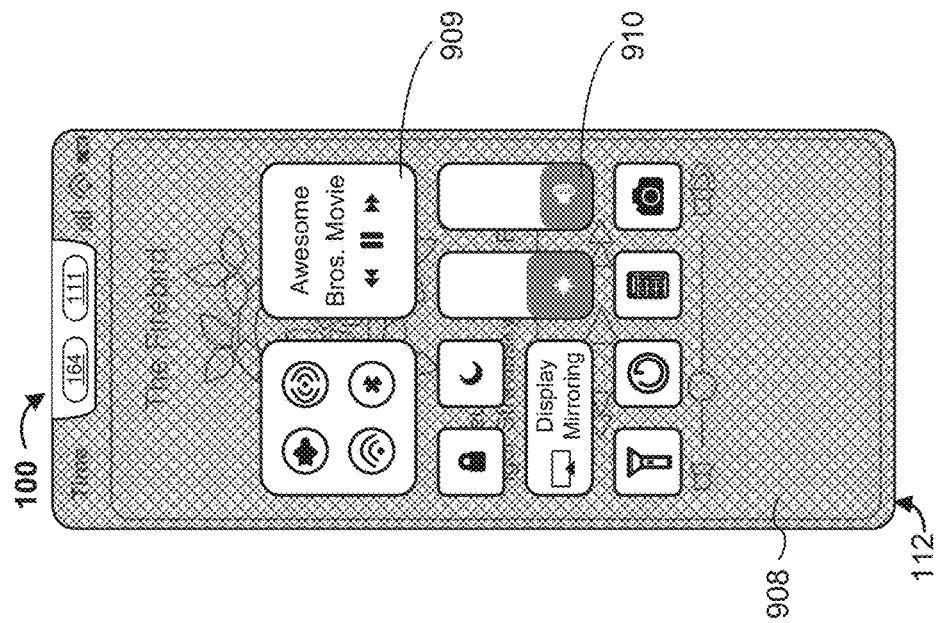
Figure 9A:
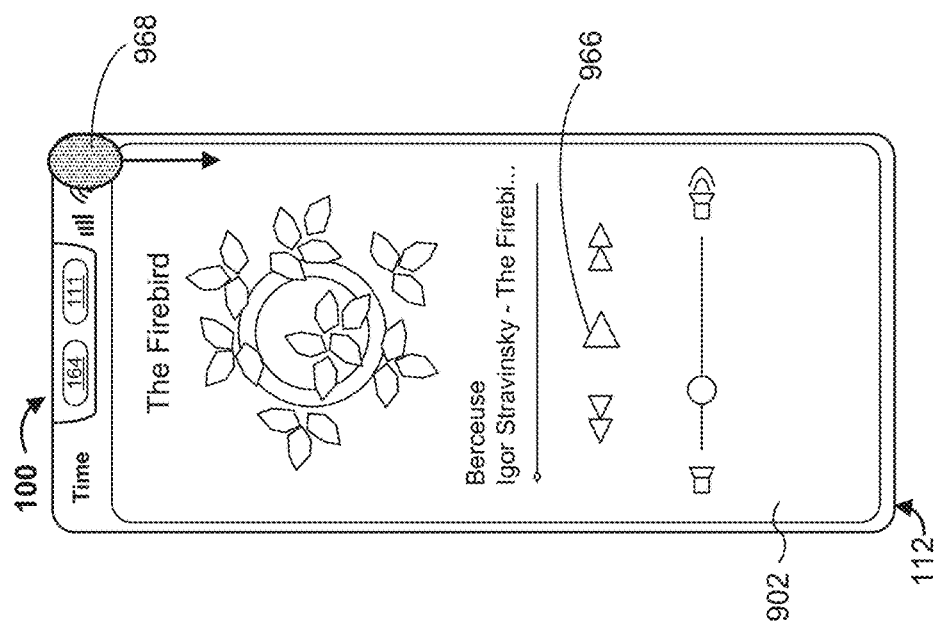
Figure 9A:
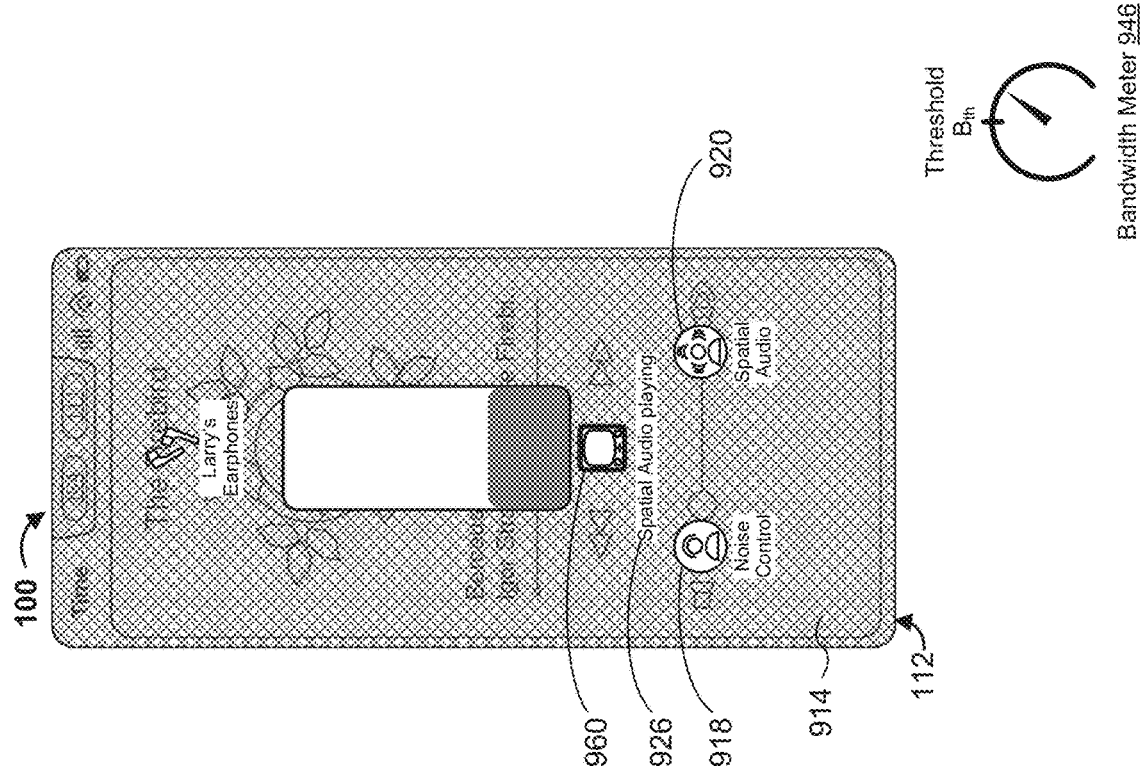
Figure 9A:
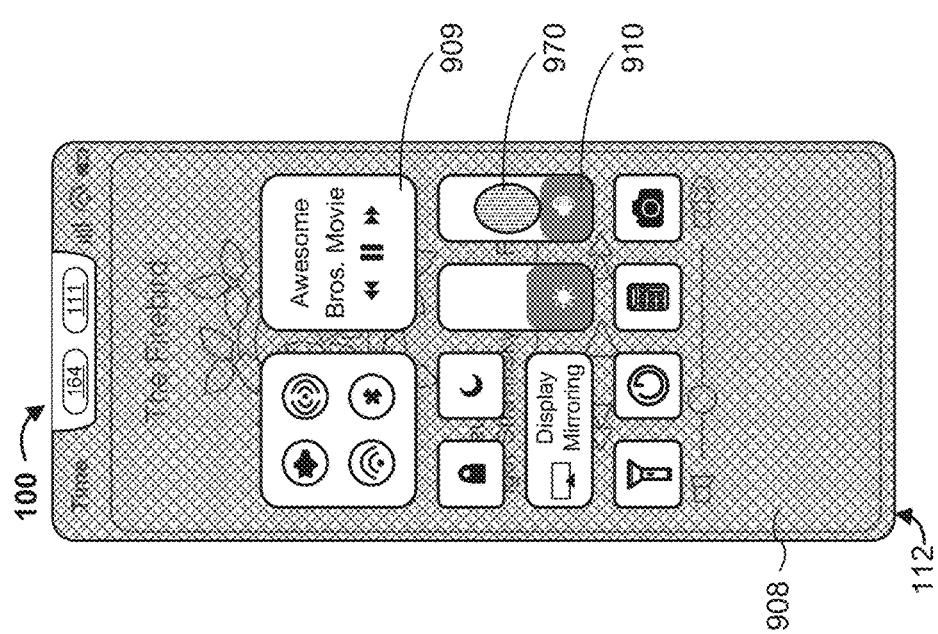
Figure 9A:
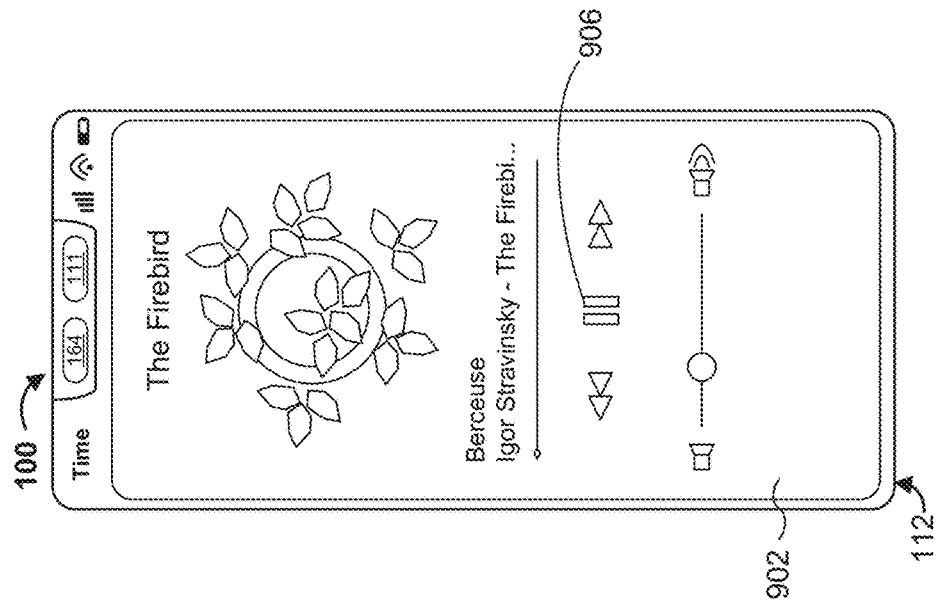
Figure 9A:
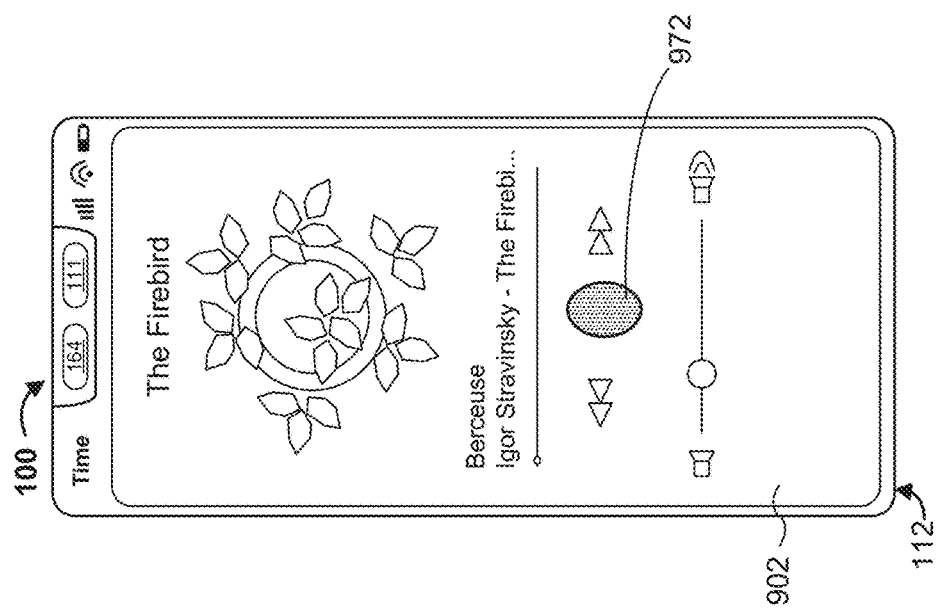
Figure 9A:
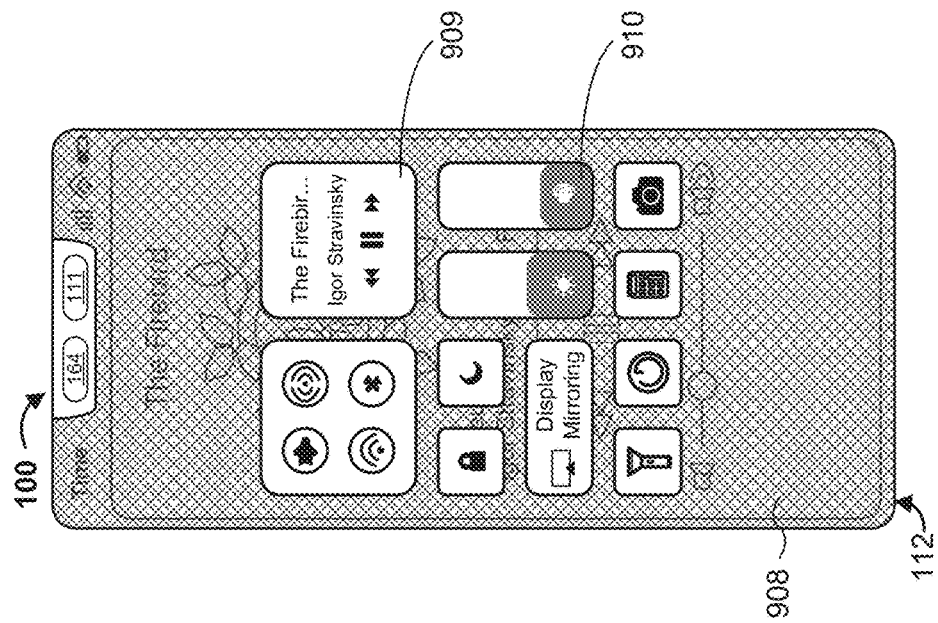
Figure 9A:
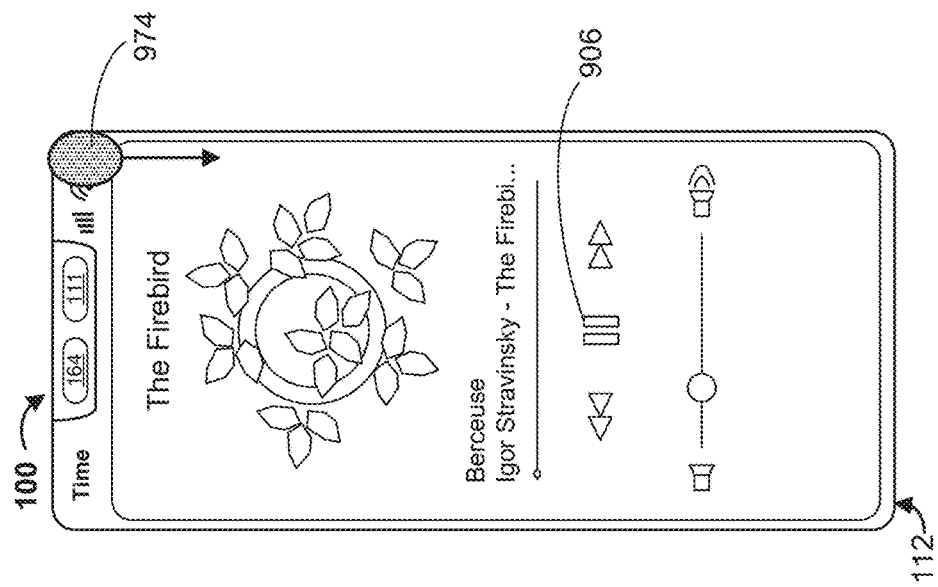
Figure 9A:
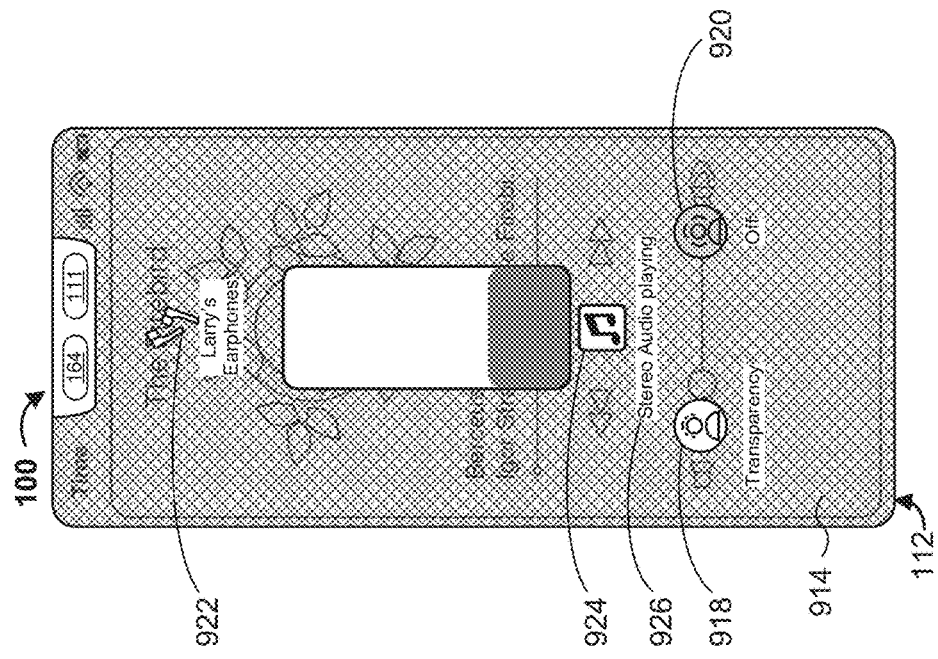
Figure 9A:
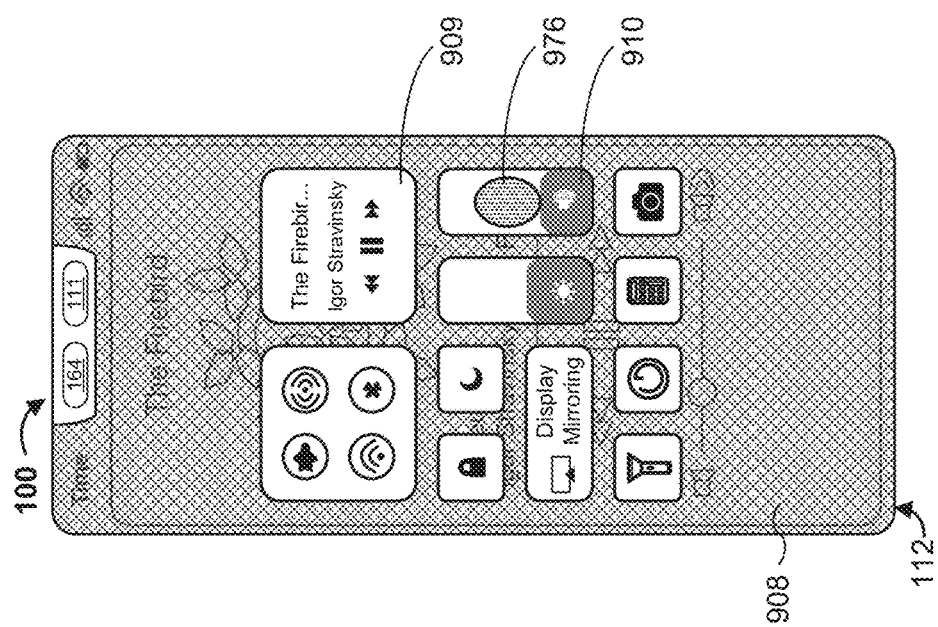
Figure 9A:
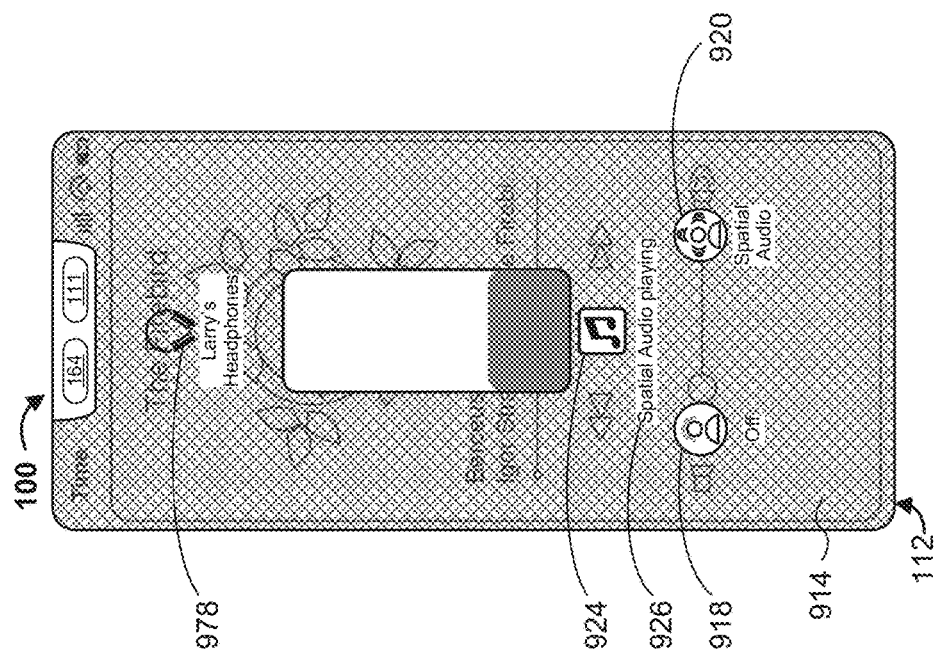
Figure 9A:
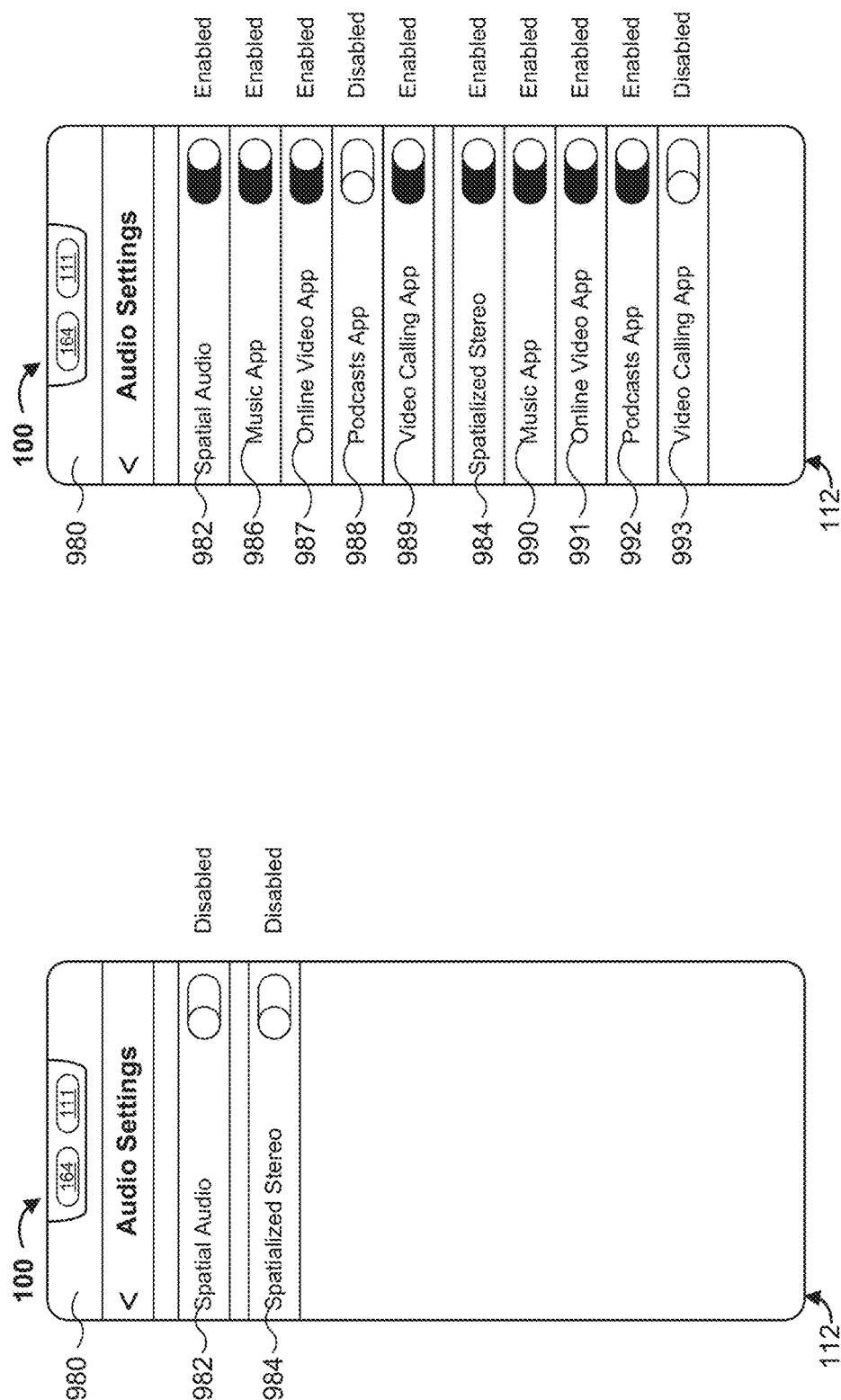
Figure 10A:
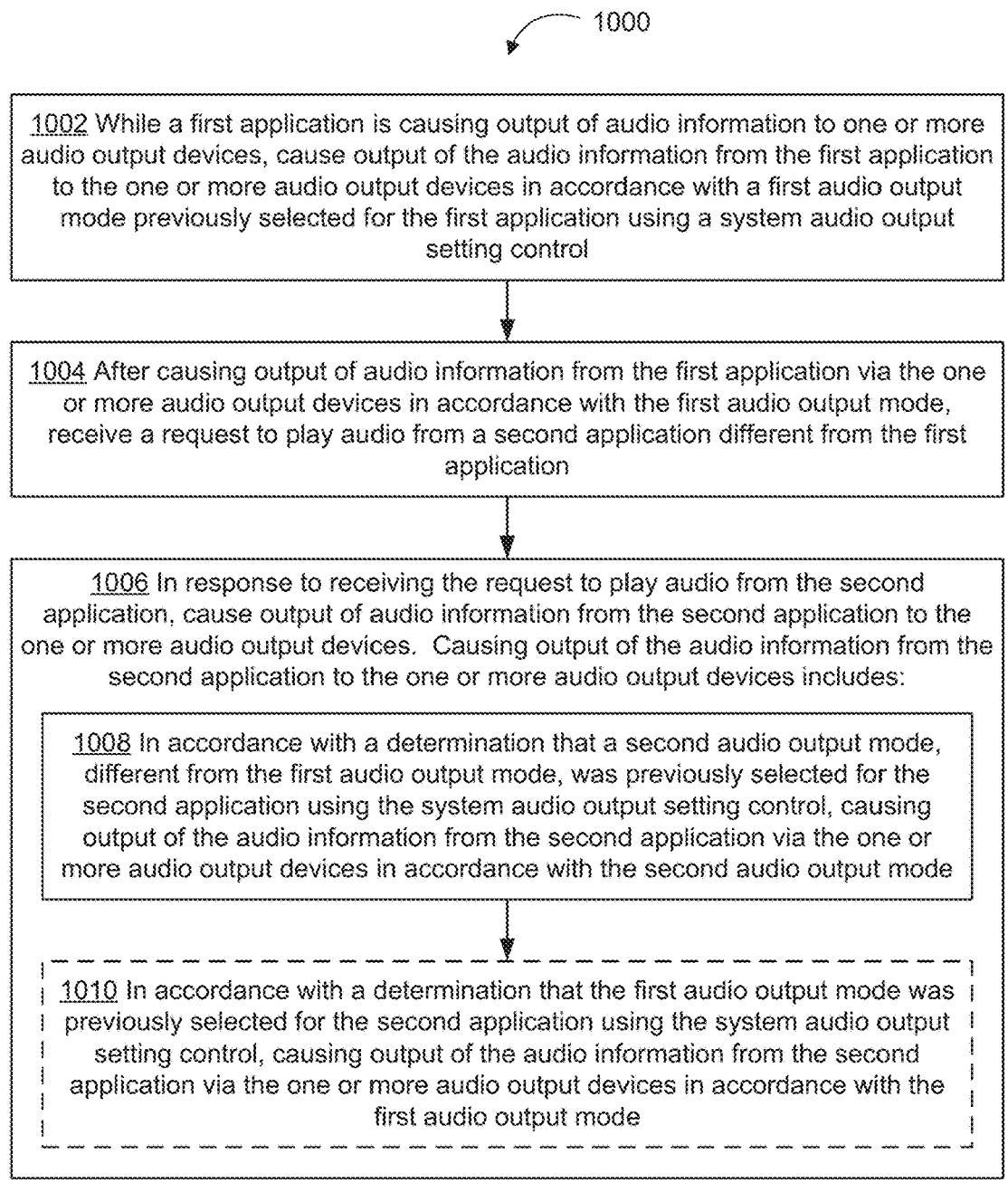

FIGS. 9Y-9Z illustrate switching from the movie application back to the music application. In particular, FIG. 9Y shows movie application user interface 942 following dismissal of audio settings user interface 914 in an example transition from FIG. 9X (e.g., in response to one or more inputs to device 100 while audio settings user interface 914 is displayed). FIG. 9Y also shows input 964 for switching from the movie application to the music application. In FIG. 9Z, in response to input 964 (FIG. 9Y), music application user interface 902 is redisplayed on touchscreen 112 instead of movie application user interface 942. Music application user interface 902 in FIG. 9Z is analogous to music application user interface 902 in FIG. 9A, except that music application user interface 902 includes play button 966 instead of pause button 904, thereby indicating that music is not being played in the scenario shown in FIG. 9Z.

FIGS. 9AA-9AD illustrate invoking audio settings user interface 914 while music application user interface 902 is displayed. In particular, FIG. 9AA shows input 968 detected on touchscreen 112 (e.g., a downwards swipe gesture from the top right corner of touchscreen 112, similar to input 906 (FIG. 9A)). In FIG. 9AB, in response to input 968 (in FIG. 9AA), settings user interface 908 is displayed on touchscreen 112. Media control 909 in settings user interface 908 indicates that movie audio is still playing from the movie application (e.g., even though audio settings user interface 914 was invoked while music application user interface 902 was displayed, because music playback has not been initiated or resumed so as to cause movie playback to stop).

FIG. 9AC shows input 970 on volume control 910 in settings user interface 908 (e.g., a tap gesture or a long press gesture that is maintained on volume control 910 for at least a predetermined amount of time). In FIG. 9AD, audio settings user interface 914 is displayed in response to input 970 (in FIG. 9AC). Because movie audio is still playing from the movie application as indicated by icon 960 representing the movie application, audio settings user interface 914 displays the audio output mode settings for the movie application. In particular, consistent with FIGS. 9V-9X, spatial audio is enabled, and, in accordance with the streaming bandwidth being above the threshold bandwidth $B_{th}$, the appearance of spatial audio toggle 920 and indication 926 indicate that spatial audio is in fact being output. In addition, consistent with FIGS. 9V-9X, the active noise control mode is enabled, as indicated by the appearance of noise management control 918.

FIGS. 9AE-9AF illustrate an example transition from FIG. 9AD. In particular, FIG. 9AE shows music application user interface 902 displayed on touchscreen 112 following dismissal of audio settings user interface 914 (e.g., in response to one or more inputs to device 100 while audio settings user interface 914 is displayed). In addition, FIG. 9AE shows input 972 (e.g., a tap gesture) on play button 966 (visible in FIG. 9AA). In FIG. 9AF, in response to input 972, music playback occurs, as indicated by pause button 906.

FIGS. 9AG-9AJ illustrate invoking audio settings user interface 914 again while music application user interface 902 is displayed, after initiating or resuming music playback in FIGS. 9AE-9AF. FIGS. 9AG-9AJ also illustrate that the music being played from the music application is output using audio output settings for the music application that are different from the most recently selected audio output settings for the movie application, as reflected in settings user interface 908 and audio settings user interface 914. In particular, FIG. 9AG shows input 974 detected on touchscreen 112 (e.g., a downwards swipe gesture from the top right corner of touchscreen 112, similar to input 968 (FIG. 9AA)). In FIG. 9AH, in response to input 974 (in FIG. 9AG), settings user interface 908 is displayed on touchscreen 112. Media control 909 in settings user interface 908 indicates that music is now playing from the music application (e.g., in contrast to FIGS. 9AB-9AC, where music playback was not taking place).

FIG. 9AI shows input 976 on volume control 910 in settings user interface 908 (e.g., a tap gesture or a long press gesture that is maintained on volume control 910 for at least a predetermined amount of time). In response to input 976, audio settings user interface 914 is displayed, as shown in FIG. 9AJ. Because music is now playing from the music application, as indicated by icon 924 representing the music application, audio settings user interface 914 displays the most recently selected audio output mode settings for the music application (e.g., based on the user interactions with the music application as described herein with reference to FIGS. 9E-9J). In particular, FIG. 9AJ shows that spatial audio is disabled, as indicated by the appearance of spatial audio toggle 920 and by indication 926 (e.g., the text "Stereo Audio playing" indicating that stereo audio is currently being played), and in contrast to FIG. 9AD in which spatial audio is enabled for the movie application. In addition, FIG. 9AJ shows that the active pass-through mode is selected as the current noise control audio output mode, as indicated by the appearance of noise management control 918 (e.g., which is based on transparency mode icon 936 (FIG. 9H)), and in contrast to FIG. 9AD in which the active noise control mode is enabled.

FIG. 9AK shows audio settings user interface 914 in accordance with a different set of audio output devices being connected and used for music playback. In FIG. 9AK, indication 978 (e.g., the headphone icon and the label "Larry's Headphones") identifies a pair of headphones that are different from earbuds 502 identified by indication 922 (e.g., the earphone icon and the label "Larry's Earphones," in FIG. 9AJ and earlier). Indication 978 further indicates that the identified headphones are associated with the same user account (e.g., Larry's user account) as earbuds 502. Audio settings user interface 914 in FIG. 9AK also shows the most recently selected and saved audio output mode settings for the identified headphones when used with the music application (e.g., which are different from the audio output mode settings used for earbuds 502 when used with the music application, as shown in FIG. 9AJ). In particular, the bypass mode is the current noise control audio output mode, as indicated by the appearance of noise management control 918 in FIG. 9AK (e.g., which is based on noise control off mode icon 934 (FIG. 9H)), and in contrast to FIG. 9AJ in which the active pass-through mode is enabled. In addition, spatial audio is enabled and being played, as indicated by the appearance of spatial audio toggle 920 and by indication 926 (e.g., the text "Spatial Audio playing"), and in contrast to FIG. 9AJ in which spatial audio is disabled and stereo audio is being output.

FIGS. 9AL-9AM illustrate an example user interface for enabling or disabling audio output modes globally, with respect to all applications on a device, and individually with respect to specific applications. In particular, FIG. 9AL illustrates settings user interface 980 displayed on touchscreen 112 of device 100. In the example shown in FIG. 9AL, settings user interface 908 includes spatial audio global toggle 982 and spatialized stereo global toggle 984. Spatial audio global toggle 982, while in a disabled state as shown in FIG. 9AL, is activatable to at once enable the use of spatial audio for a plurality of applications installed on device 100 (e.g., all applications installed on device 100 that support outputting spatial audio, or all applications for which spatial audio was enabled immediately prior to a most recent instance that spatial audio was globally disabled using spatial audio global toggle 982). While in an enabled state as shown in FIG. 9AM, spatial audio global toggle 982 is activatable to disable, with a single input, spatial audio for a plurality of (e.g., all, or a predetermined subset of) applications installed on device 100 (e.g., all applications installed on device 100 that support outputting spatial audio; all applications without regard to whether those applications support spatial audio output; or a predetermined subset of applications installed on device 100 (with or without regard to whether those applications support spatial audio output), where the predetermined subset of applications omits one or more applications for which spatial audio output cannot be disabled (e.g., using spatial audio global toggle 982 or at all)).

Similarly, spatialized stereo global toggle 984, while in a disabled state as shown in FIG. 9AL, is activatable to enable the use of spatialized stereo audio for a plurality of applications installed on device 100 simultaneously (e.g., all applications installed on device 100 that support outputting spatialized stereo audio, or all applications for which spatialized stereo audio was enabled immediately prior to a most recent instance that spatialized stereo audio was globally disabled using spatialized stereo audio global toggle 982). While in an enabled state as shown in FIG. 9AM, spatialized stereo audio global toggle 982 is activatable to at once disable spatialized stereo audio for a plurality of applications installed on device 100 (e.g., all applications installed on device 100 that support outputting spatialized stereo audio, or all applications without regard to whether those applications support spatialized stereo audio output).

FIG. 9AM illustrates settings user interface 980 with spatial audio global toggle 982 set to the enabled state, enabling the use of spatial audio by applications on device 100 (e.g., making the option for outputting spatial audio available to the applications), and spatialized stereo global toggle 984 set to the enabled state, enabling the use of spatialized stereo audio by applications on device 100. In some embodiments, as shown in FIG. 9AM, while spatial audio global toggle 982 is set to the enabled state, a list of applications on device 100 (e.g., that support spatial audio) is displayed, with a respective toggle for each application in the list for enabling the use of spatial audio by the respective corresponding application. In the example shown in FIG. 9AM, displayed under spatial audio global toggle 982 are music application spatial audio toggle 986, online video application spatial audio toggle 987, podcast application spatial audio toggle 988, and video calling application spatial audio toggle 989. Each of toggles 986, 987, 988, and 989 is separately activatable to enable or disable the use of spatial audio for the respective corresponding application individually, without affecting whether spatial audio is enabled for any other application. For example, a user input solely to music application spatial audio toggle 986 (e.g., while in the enabled state) disables the use of spatial audio for the music application, without changing the enabled/disabled state of any other toggle displayed in settings user interface 980. In addition, while (e.g., after) spatial audio global toggle 982 is set to the enabled state, in some embodiments spatial audio can be disabled for individual applications: for example, in FIG. 9AM, spatial audio is disabled for the podcast application, as indicated by podcast application spatial audio toggle 988, even though spatial audio global toggle 982 is set to the enabled state.

Similarly, while spatialized stereo audio global toggle 984 is set to the enabled state, a list of applications on device 100 (e.g., that support spatialized stereo audio) is displayed, with a respective toggle for each application in the list for enabling the use of spatialized stereo audio by the respective corresponding application. In the example shown in FIG. 9AM, displayed under spatialized stereo audio global toggle 984 are music application spatialized stereo audio toggle 990, online video application spatialized stereo audio toggle 991, podcast application spatialized stereo audio toggle 992, and video calling application spatialized stereo audio toggle 993. Each of toggles 990, 991, 992, and 993 is separately activatable to enable or disable the use of spatialized stereo audio for the respective corresponding application individually, without affecting whether spatialized stereo audio is enabled for any other application. For example, a user input solely to video calling application spatialized stereo audio toggle 993 (e.g., while in the disabled state) enables the use of spatialized stereo audio for the video calling application, without changing the enabled/disabled state of any other toggle displayed in settings user interface 980. In addition, while (e.g., after) spatialized stereo audio global toggle 984 is set to the enabled state, in some embodiments spatialized stereo audio can be disabled for individual applications: for example, in FIG. 9AM, spatialized stereo audio is disabled for the video calling application, as indicated by video calling application spatialized stereo audio toggle 993, even though spatialized stereo audio global toggle 984 is set to the enabled state.

FIGS. 10A-10H are flow diagrams illustrating method 1000 of selecting, and saving user selections of, audio output modes of audio output devices in accordance with some embodiments. Method 1000 is performed at a computer system (e.g., device 300, FIG. 3A, or portable multifunction device 100, FIG. 1A) that is in communication with a display generation component (e.g., touch-sensitive display system 112, FIG. 1A, or display 340, FIG. 3A), one or more input devices (e.g., touch-sensitive display system 112, FIG. 1A, or touchpad 355, FIG. 3A), and a set of one or more audio output devices (e.g., one or more wearable audio output devices 301, FIG. 3B). Some operations in method 1000 are, optionally, combined and/or the order of some operations is, optionally, changed.

As described below, method 1000 enables a user to control the audio output mode used for a respective application independently of the audio output mode that is set for other applications, and uses the same selected audio output mode again later for the same respective application, even if different audio output modes are used with other applications, for example in between uses of the respective application. Saving and reusing a previously selected audio output mode for a respective application avoids requiring the user to select that audio output mode again when resuming use of the respective application. Reducing the number of inputs needed to perform an operation enhances the operability of the system and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently.

While a first application is causing output of audio information (e.g., corresponding to first media being played by the first application) to the set of one or more audio output devices, the computer system causes (1002) output of the audio information from the first application to the set of one or more audio output devices in accordance with a first audio output mode previously selected for the first application using a system audio output setting control (e.g., in FIGS. 9A-9J, device 100 causes output of audio from a music application to earbuds 502 in accordance with current selections for noise control and spatial audio output).

After (e.g., while) causing output of audio information from the first application via the set of one or more audio output devices in accordance with the first audio output mode, the computer system receives (1004) a request to play audio from a second application different from the first application (e.g., a request to play second media using the second application) (e.g., in FIGS. 9K-9Q, device 100 receives requests to switch from the music application to a movie application and to play a movie and corresponding movie audio using the movie application).

In response to receiving the request to play audio from the second application, the computer system causes (1006) output of (second) audio information from the second application to the set of one or more audio output devices (e.g., in FIG. 9R, device 100 performs movie playback).

Causing output of the audio information from the second application to the set of one or more audio output devices includes: in accordance with a determination that a second audio output mode, different from the first audio output mode, was previously selected for the second application using the system audio output setting control (1008), causing output of the (second) audio information from the second application via the set of one or more audio output devices in accordance with the second audio output mode (e.g., and changing an audio output mode for the set of one or more audio output devices from the first audio output mode to the second audio output mode) (e.g., in FIGS. 9R-9X, device 100 performs movie playback using previously selected audio output mode settings for the movie application that are different from the audio output mode settings most recently selected for the music application in FIGS. 9E-9J; in another example, in FIGS. 9AE-9AJ, device 100 performs music playback using audio output mode settings previously selected for the music application in FIGS. 9E-9J that are different from the audio output mode settings shown for the movie application in FIGS. 9R-9X).

In some embodiments, causing, in response to receiving the request to play audio from the second application, output of the audio information from the second application to the set of one or more audio output devices includes: in accordance with a determination that the first audio output mode was previously selected for the second application using the system audio output setting control (1010), causing output of the (second) audio information from the second application via the set of one or more audio output devices in accordance with the first audio output mode (e.g., and maintaining use of the first audio output mode for the set of one or more audio output devices) (e.g., if the user were to switch to the movie application without performing the changes, shown in FIGS. 9E-9J, to the audio output mode settings for the music application, the spatial audio output mode would be used for the movie application as well as maintained for the music application). Using the same selected audio output mode again later for a respective application avoids requiring the user to select that audio output mode again when resuming use of the respective application, which reduces the number of inputs needed to perform the operation.

In some embodiments, an audio output mode for the first application, previously selected for the first application using the system audio output setting control, is (1012) the first audio output mode (e.g., spatial audio output mode). In some such embodiments, while executing the first application (e.g., optionally, or in some circumstances, while delivering audio information from the first application to the set of one or more audio output devices), using the system audio output setting control, the computer system changes (e.g., in response to one or more user inputs) the audio output mode for the first application from the first audio output mode to the second audio output mode (e.g., non-spatial audio output mode) (e.g., and saving the changed audio output mode for future audio output by the first application). In some such embodiments, after changing the audio output mode for the first application to the second audio output mode, while the first application is delivering audio information to the set of one or more audio output devices, the computer system causes output of the audio information from the first application via the set of one or more audio output devices in accordance with the second audio output mode (e.g., instead of delivering the audio information from the first application to the set of one or more audio output devices in accordance with the first audio output mode) (e.g., in FIGS. 9E-9J, the audio output mode settings used for the music application are changed and saved for later use as shown in FIGS. 9AE-9AJ). Outputting audio in accordance with a newly selected audio output mode for a respective application and saving that selected audio output mode for the respective application avoids requiring the user to select that audio output mode again when resuming use of the respective application later, which reduces the number of inputs needed to perform the operation.

In some embodiments, the computer system saves (1014) the changed audio output mode for the first application (e.g., as a saved audio output mode setting for the first application) for future audio output by the first application (e.g., after execution of the first application ends, and is then resumed at a later time, audio information is output from the first application to the set of one or more audio output devices in accordance with the (saved) audio output mode). In some embodiments, after the audio output mode for a respective application (e.g., the first application) is changed (e.g., from the first audio output mode to the second audio output mode), and after ceasing to cause output of audio information from the respective application via the set of one or more audio output devices in accordance with the changed (e.g., second) audio output mode, a subsequent request for the respective application to cause output of audio information is received, and, in response to the subsequent request, output of audio information from the respective application is performed in accordance with the changed audio output mode for the respective application. For example, after the audio output mode settings used for the music application are changed in FIGS. 9E-9J, the selected settings are saved for later use with the music application; later, after stopping use of the music application and using the movie application instead as shown in FIGS. 9R-9X, upon resuming use of the music application, the previously saved settings for the music application are used as shown in FIGS. 9AE-9AJ. Saving a selected audio output mode for a respective application and reusing the same selected audio output mode later for the respective application avoids requiring the user to select that audio output mode again when resuming use of the respective application, which reduces the number of inputs needed to perform the operation.

In some embodiments, an audio output mode for the second application, previously selected for the second application using the system audio output setting control, is (1016) the second audio output mode (e.g., a non-spatial audio output mode such as a stereo mode). In some such embodiments, while executing the second application (e.g., optionally, or in some circumstances, while delivering audio information from the second application to the set of one or more audio output devices), using the system audio output setting control, the computer system changes (e.g., in response to one or more a user inputs) the audio output mode for the second application from the second audio output mode to the first audio output mode (e.g., and saves the changed audio output mode for future audio output by the second application). In some such embodiments, after changing the audio output mode for the second application to the first audio output mode, while the second application is delivering audio information to the set of one or more audio output devices, the computer system causes output of the audio information from the second application via the set of one or more audio output devices in accordance with the first audio output mode (e.g., instead of delivering the audio information from the second application to the set of one or more audio output devices in accordance with the second audio output mode). For example, if the audio output mode settings for the movie application were changed, the newly selected audio output mode settings would be used to output movie audio. Outputting audio in accordance with a newly selected audio output mode for a respective application and saving that selected audio output mode for the respective application avoids requiring the user to select that audio output mode again when resuming use of the respective application later, which reduces the number of inputs needed to perform the operation.

In some embodiments, the computer system saves (1018) the changed audio output mode for the second application (e.g., as a saved audio output mode setting for the second application) for future audio output by the second application (e.g., after execution of the second application ends, and is then resumed at a later time, audio information is output from the second application to the set of one or more audio output devices in accordance with the (saved) audio output mode). For example, if the audio output mode settings for the movie application were changed, the newly selected audio output mode settings would be saved for future audio output by the movie application. Saving a selected audio output mode for a respective application and reusing the same selected audio output mode later for the respective application avoids requiring the user to select that audio output mode again when resuming use of the respective application, which reduces the number of inputs needed to perform the operation.

In some embodiments, the first audio output mode is (1020) a spatial audio output mode, and the second audio output mode is the spatial audio output mode or a non-spatial audio output mode. In some embodiments, a spatial audio output mode is an audio output mode where audio is output at simulated spatial locations in a 3D environment, independent of the audio output device locations and orientations. In some embodiments, a spatial audio output mode is an audio output mode where audio of the set of one or more audio output devices is adjusted as the set of one or more audio output devices is moved relative to a frame of reference (e.g., the set of one or more audio output devices are moved relative to a three-dimensional environment, such as a physical environment in which the set of one or more audio output devices are located, or moved relative to a displayed user interface, or the displayed user interface is moved relative to the set of one or more audio output devices), so as to position (e.g., a simulated location of, or one or more respective simulated locations of) one or more sources of sound in the frame of reference independently of a position of the set of one or more audio output devices relative to the frame of reference (e.g., for a fixed source of sound, adjust the audio output of the set of one or more audio output devices so as to maintain the simulated location of the fixed source of sound (e.g., of the audio being output) in a substantially fixed position (or in substantially fixed respective positions) relative to the frame of reference, independent of a position of the set of one or more audio output devices relative to the frame of reference; or for a moving source of sound, adjust the audio output of the set of one or more audio output devices so as to move the simulated location of the source of sound relative to the frame of reference independently of a position of the set of one or more audio output devices relative to the frame of reference). In some embodiments, for the spatial audio output mode, audio signal processing is performed to compute and adjust audio signals for output so that a user (e.g., an average user) will perceive the sound of the audio output to be coming from one or more simulated locations in the frame of reference (e.g., not limited to a location within the user's head). In some embodiments, the audio signal processing of the audio signals is performed by the computer system, by the set of one or more audio output devices, or by a combination of the computer system and the set of one or more audio output devices (e.g., in part by the computer system and in part by the set of one or more audio output devices).

In some embodiments, a non-spatial audio output mode is an audio output mode where audio of the set of one or more audio output devices is not adjusted as the set of one or more audio output devices is moved relative to the frame of reference (e.g., resulting in not maintaining the one or more sources of sound in a substantially fixed position relative to the frame of reference (e.g., relative to a three-dimensional environment or relative to a displayed user interface corresponding to the one or more sources of sound, such as the display of a device or a projected user interface)).

Using the same selected audio output mode again later for a respective application avoids requiring the user to select that audio output mode again when resuming use of the respective application. For example, saving and reusing a spatial audio output mode for a respective application is beneficial particularly if the spatial audio output mode is commonly used for the respective application; analogously, saving and reusing a non-spatial audio output mode for a respective application is beneficial particularly if the non-spatial audio output mode is commonly used for the respective application, which reduces the number of inputs needed to perform the operation.

In some embodiments, an audio output mode of the first application is (1022) configured, by default, to be the spatial audio output mode (e.g., when the first application is executed for the first time on the computer system, the default audio output mode is a spatial audio output mode, for example based on the type of the first application or based on the specific identity of the first application). Configuring the spatial audio output mode as the default audio output mode for a respective application avoids requiring the user to select that audio output mode for the respective application, which is beneficial particularly if the spatial audio output mode is a commonly used or most appropriate audio output mode for the respective application, which reduces the number of inputs needed to perform the operation.

In some embodiments, an audio output mode of the second application is (1024) configured, by default, to be the non-spatial audio output mode (e.g., when the second application is executed for the first time on the computer system, the default audio output mode for the second application is a non-spatial audio output mode, for example based on the type of the second application (e.g., screen reader applications for converting text to speech) or based on the specific identity of the second application). Configuring the non-spatial audio output mode as the default audio output mode for a respective application avoids requiring the user to select that audio output mode for the respective application, which is beneficial particularly if the non-spatial audio output mode is a commonly used or most appropriate audio output mode for the respective application, which reduces the number of inputs needed to perform the operation.

In some embodiments, an audio output mode of the first application is (1026) configured, by default, in accordance with a user preference of (e.g., selected by or for) a user of the computer system (e.g., if a user dislikes spatial audio, and saves a corresponding preference setting (e.g., saved within a settings user interface for the computer system), then the audio output mode for the first application is set by default to a non-spatial audio output mode; in some embodiments, if the user expresses no preference with respect to spatial audio, or has a preference for spatial audio, then the audio output mode for the first application is set by default to a spatial audio output mode). Configuring the default audio output mode for applications based on a previously determined user preference or selection avoids requiring the user to select that audio output mode for each application individually or each time the user uses a respective application, which reduces the number of inputs needed to perform the operation.

In some embodiments, an audio output mode of the first application is (1028) configured, by default, by the first application (e.g., by the first application itself, for example by setting the audio output mode via an application programming interface (API)). Allowing a respective application to configure its own default audio output mode avoids requiring the user to select that audio output mode for the respective application and has the added benefit that the respective application (or application developer) may be better able to determine the most appropriate mode to use by default for outputting audio, which reduces the number of inputs needed to perform the operation and enables one or more operations to be performed automatically.

In some embodiments, while an audio output mode of the first application is a spatial audio output mode (1030): in accordance with a determination that the computer system is receiving streaming content at a reduced bandwidth, less than a threshold bandwidth, the computer system causes output of audio information by the first application, from the streaming content to the set of one or more audio output devices, as spatialized stereo audio information (e.g., at simulated spatial locations not specified by the streaming content) (e.g., the threshold bandwidth is, or corresponds to, the minimum bandwidth required to provide spatial audio information to the headphones (one or more audio output devices) so that spatial audio can be generated by the headphones); and, in accordance with a determination that the computer system is receiving streaming content at a bandwidth of at least the threshold bandwidth, the computer system causes output of audio information by the first application, from the streaming content to the set of one or more audio output devices, as spatial audio information (e.g., with different audio sources within the streaming content being output at different simulated spatial locations specified by the streaming content). As used herein, "spatial audio" refers to audio content that includes three or more audio channels (e.g., more than merely left and right channels as in stereo audio) rendered to simulate virtual speakers placed around a user's head. As used herein, "spatialized stereo audio" refers to two-channel stereo audio content that is put through an upscaling algorithm and output spatially even though the underlying stereo audio content does not have more than two channels. While the spatial audio output mode is selected, outputting audio as spatialized stereo audio rather than spatial audio while streaming bandwidth is below a threshold bandwidth (e.g., when initially beginning to stream content as illustrated by FIGS. 9R-9V, or at some later point during content streaming as illustrated by FIG. 9X) helps reduce other potential adverse effects of constrained bandwidth, such as reduction in audio (and/or corresponding video) quality or the audio (and/or corresponding video) skipping or freezing, which enables one or more operations to be performed automatically.

In some embodiments, the computer system makes (1032) a determination (e.g., an initial determination, prior to beginning playback) of whether the computer system is receiving streaming content at a bandwidth of at least the threshold bandwidth while buffering the streaming content (e.g., as playback quality may be initially reduced to avoid noticeable transitions in audio quality during playback; further, the streaming content source may initially transmit the streaming content at a lower bandwidth and then increase the bandwidth as it determines that higher bandwidth transmission is available) (e.g., as illustrated by FIGS. 9R-9W). As streaming bandwidth may be more constrained while buffering streaming content (e.g., when initially beginning to stream content) than at other times during content playback, determining whether streaming bandwidth is below a threshold bandwidth while buffering helps reduce other potential adverse effects of constrained bandwidth, such as reduction in audio (and/or corresponding video) quality or the audio (and/or corresponding video) skipping or freezing, which enables one or more operations to be performed automatically.

In some embodiments, after causing output of audio information by the first application, from the streaming content to the set of one or more audio output devices, as spatial audio information: in accordance with a determination that the computer system is receiving the streaming content at a reduced bandwidth, less than the threshold bandwidth (e.g., that the bandwidth at which the computer system receives the streaming content decreases below the threshold bandwidth), the computer system transitions (1034) to causing output of audio information by the first application, from the streaming content to the set of one or more audio output devices, as spatialized stereo audio information (e.g., as illustrated by FIG. 9X). While the spatial audio output mode is selected, outputting audio as spatialized stereo audio rather than spatial audio while streaming bandwidth is below a threshold bandwidth helps reduce other potential adverse effects of constrained bandwidth, such as reduction in audio (and/or corresponding video) quality or the audio (and/or corresponding video) skipping or freezing, which enables one or more operations to be performed automatically.

In some embodiments, after causing output of audio information by the first application, from the streaming content to the set of one or more audio output devices, as spatialized stereo audio information: in accordance with a determination that the computer system is receiving the streaming content at or above the threshold bandwidth (e.g., that the bandwidth at which the computer system receives the streaming content increases to or above the threshold bandwidth), the computer system transitions (1036) to causing output of audio information by the first application, from the streaming content to the set of one or more audio output devices, as spatial audio information (e.g., as illustrated by FIG. 9W). While the spatial audio output mode is selected, outputting audio as spatial audio (e.g., as requested, rather than spatialized stereo audio or other less complex type of audio output) conditional on streaming bandwidth being at least a threshold bandwidth helps ensure that sufficient bandwidth is available for various aspects of content playback using spatial audio and reduces potential adverse effects of constrained bandwidth, such as reduction in audio (and/or corresponding video) quality or the audio (and/or corresponding video) skipping or freezing, which enables one or more operations to be performed automatically.

In some embodiments, or in some circumstances, the first audio output mode is (1038) a spatialized stereo audio output mode (e.g., as defined herein with reference to operation 1030). Using the same selected audio output mode again later for a respective application avoids requiring the user to select that audio output mode again when resuming use of the respective application. For example, saving and reusing a spatialized stereo audio output mode for a respective application is beneficial particularly if the spatialized stereo audio output mode is commonly used for the respective application, which reduces the number of inputs needed to perform the operation.

In some embodiments, the first audio output mode is (1040) an active noise cancelling mode, which reduces audio components corresponding to ambient sound from a physical environment, or a transparency audio mode (e.g., sometimes called a pass-through audio mode) that outputs audio components selected so as to increase audio-pass through of ambient sound from the physical environment. For example, FIGS. 9E-9F illustrate an active noise cancelling audio output mode selected and used for audio output, and FIGS. 9G-9J show a transparency audio output mode selected and used for audio output. In some embodiments, the active noise cancelling mode and the transparency audio mode are designed to work with one or more wearable audio output devices. In some embodiments, the active noise cancelling mode, sometimes called a noise cancellation audio output mode, is a mode in which the set of one or more audio output devices include, in audio outputs, one or more cancellation audio components selected so as to increase audio cancellation of ambient sound from a physical environment surrounding the set of one or more audio output devices (e.g., thereby decreasing the amount of ambient sound from the physical environment that is perceivable by the user, for example relative to what the user would otherwise have perceived due to attenuation from physical placement of audio output devices in the user's ears). In some embodiments, the transparency audio mode, sometimes called a pass-through audio output mode, is a mode in which the set of one or more audio output devices include, in audio outputs, one or more pass-through audio components selected so as to increase audio pass-through of ambient sound from the physical environment (e.g., thereby increasing the amount of ambient sound from the physical environment that is perceivable by the user, for example relative to what the user would otherwise have perceived due to attenuation from physical placement of audio output devices in the user's ears). Using the same selected audio output mode again later for a respective application avoids requiring the user to select that audio output mode again when resuming use of the respective application. For example, saving and reusing an active noise cancelling audio output mode for a respective application is beneficial particularly if the active noise cancelling audio output mode is commonly used for the respective application; analogously, saving and reusing a transparency audio output mode for a respective application is beneficial particularly if the transparency audio output mode is commonly used for the respective application, which reduces the number of inputs needed to perform the operation.

In some embodiments, the computer system displays (1042) a system control user interface that includes the system audio output setting control and at least one additional system control (e.g., settings user interface 908, FIG. 9B, which includes volume control 910 (for invoking the submenu audio settings user interface 914), as well as other system controls such as brightness controls, network controls, Bluetooth controls, Wi-Fi controls, do-not-disturb controls, etc., as further described above with reference to FIG. 9B). Displaying the system audio output setting control in a user interface that includes (or alternatively that is displayed in response to an input directed to an immediately preceding user interface that includes) at least one additional system control (e.g., one or more other audio output controls such as for output volume and/or noise cancellation, or other system controls such as brightness controls, network controls, etc.) provides the user with quick access to multiple system control options without requiring the user to navigate through complex settings menu hierarchies, which reduces the number of inputs needed to perform the operation.

In some embodiments, the system audio output setting control in the system control user interface indicates (1044) whether the audio information from the first application (and/or the second application) includes spatial audio information (e.g., in some embodiments the spatial audio information includes an indication of a spatial audio type, such as spatialized stereo, or a specific brand or identifier of spatial audio) (e.g., in FIGS. 9D, 9V-9X, 9AD, and 9AK, the appearance of spatial audio toggle 920 in audio settings user interface 914, as well as indications 926 and 962, indicate whether spatial audio is being output). In some embodiments, this information is displayed only when a volume control is expanded; in some embodiments, some of the other controls typically shown in the control center, such as brightness controls and Wi-Fi controls, are no longer displayed while the volume control is expanded (e.g., information about whether spatial audio is being output is displayed in audio settings user interface 914, which is displayed in response to an input to expand volume control 910 in settings user interface 908, which results in ceasing to display other controls in settings user interface 908, as shown for example in FIGS. 9B-9D). Displaying a visual indication as to whether the audio information being output includes spatial audio information provides the user with visual feedback about how audio is currently being output via one or more connected audio output devices, which provides improved feedback to the user.

In some embodiments, the system audio output setting control in the system control user interface identifies (1046) an application (e.g., the first application or second application) causing output of audio information to the set of one or more audio output devices (e.g., icon 924 in FIG. 9D or icon 960 in FIG. 9V). In some embodiments, the system control user interface indicates whether the first application is outputting audio, or the second application is outputting audio, by displaying an application icon and/or textual description of the application in the system control user interface. Displaying a visual indication of which application is causing audio output via one or more connected audio output devices provides the user with visual feedback about how audio is currently being output and which application is affected by the system audio output setting control, which provides improved feedback to the user.

In some embodiments, in accordance with a determination that a current audio output mode of the computer system is a spatial audio output mode and that the computer system is causing output of audio information that includes spatial audio content (1048), the computer system displays the system audio output setting control with a first appearance (e.g., an appearance corresponding to or indicating that spatial audio content is being output, such as the appearance of spatial audio toggle 920 in FIG. 9D); in accordance with a determination that a current audio output mode of the computer system is a spatial audio output mode and that the computer system is causing output of audio information that does not include spatial audio content (e.g., the computer system is outputting the audio information as spatialized stereo audio), the computer system displays the system audio output setting control with a second appearance (e.g., an appearance corresponding to or indicating that the spatial audio output mode is enabled but that audio being output does not include spatial audio content and is being output as spatialized stereo audio rather than true spatial audio, such as the appearance of spatial audio toggle 920 in FIG. 9V); and, in accordance with a determination that a current audio output mode of the computer system is a non-spatial audio output mode (e.g., a stereo output mode or mono output mode), the computer system displays the system audio output setting control with a third appearance (e.g., an appearance corresponding to or indicating that the spatial audio output mode is disabled and/or that the current audio output mode is the non-spatial audio mode, such as the appearance of spatial audio toggle 920 in FIG. 9F). Displaying a visual indication as to whether a particular audio output mode is selected and whether audio is in fact being output using the particular selected audio output mode provides the user with visual feedback about how audio is currently being output via one or more connected audio output devices, which provides improved feedback to the user.

In some embodiments, the set of one or more audio output devices comprises (1050) a first set of one or more audio output devices or a second set of one or more audio output devices. In some such embodiments, while using the first set of one or more audio output devices, the computer system saves, using the system audio output setting control, a first respective audio output mode for the first application; and, while using the second set of one or more audio output devices, the computer system saves, using the system audio output setting control, a second respective audio output mode for the first application. In some such embodiments, in accordance with a determination that the first set of one or more audio output devices is in use, the computer system causes output of the audio information from the first application to the first set of one or more audio output devices in accordance with the first respective audio output mode saved for the first application while using the first set of one or more audio output devices (e.g., in FIG. 9AJ, audio is output using audio output mode selections for earbuds 502); and, in accordance with a determination that the second set of one or more audio output devices is in use, the computer system causes output of the audio information from the first application to the second set of one or more audio output devices in accordance with the second respective audio output mode saved for the first application while using the second set of one or more audio output devices (e.g., in FIG. 9AK, audio is output using audio output mode selections for headphones different from earbuds 502). In some embodiments, after saving the first respective audio output mode for the first application, the user ceases using the first set of one or more audio output devices; later, use of the first set of one or more audio output devices is resumed, and audio information from the first application is output to the first set of one or more audio output devices in accordance with the previously saved first respective audio output mode (e.g., the previously saved first respective audio output mode is used again even after a period of non-use of the first set of one or more audio output devices). Similarly, in some embodiments, after saving the second respective audio output mode for the first application, the user ceases using the second set of one or more audio output devices; later, use of the second set of one or more audio output devices is resumed, and audio information from the first application is output to the second set of one or more audio output devices in accordance with the previously saved second respective audio output mode (e.g., the previously saved second respective audio output mode is used again even after a period of non-use of the second set of one or more audio output devices). Saving a selected audio output mode for a respective set of one or more audio output devices and reusing the same selected audio output mode later for the respective set of one or more audio output devices avoids requiring the user to select that audio output mode again when resuming use of the respective set of audio output devices, which reduces the number of inputs needed to perform the operation.

In some embodiments, the first set of one or more audio output devices and the second set of one or more audio output devices are (1052) associated with a same user account (e.g., earbuds 502 being used to output audio in FIG. 9AJ and the headphones being used to output audio in FIG. 9AK are associated with the same user account). In some embodiments, at a second computer system associated with the same user account, the (same) first respective audio output mode is used for the first application while using the first set of one or more audio output devices, and the (same) second respective audio output mode is used for the first application while using the second set of one or more audio output devices, in accordance with which set of one or more audio output devices is being used with the second computer system. In some embodiments, after saving the first respective audio output mode while using the first set of one or more audio output devices (e.g., and optionally after ceasing to output audio using the first set of one or more audio output devices), in response to a request by the second computer system to output audio using the first set of one or more audio output devices that are associated with the same user account, audio information (e.g., for the first application) is output to the first set of one or more audio output devices using the same first respective audio output mode. Similarly, in some embodiments, after saving the second respective audio output mode while using the second set of one or more audio output devices (e.g., and optionally after ceasing to output audio using the second set of one or more audio output devices), in response to a request by the second computer system to output audio using the second set of one or more audio output devices that are associated with the same user account, audio information (e.g., for the first application) is output to the second set of one or more audio output devices using the same second respective audio output mode (e.g., without having saved the second respective audio output mode for the second set of one or more audio output devices while using the second computer system). In some embodiments, a saved audio output mode setting for a respective set of one or more audio output devices associated with a user account (and/or for a respective application) is applied while using that set of one or more audio output devices with another computer system associated with the same user account (optionally for the respective application). Saving selected audio output modes for sets of one or more audio output devices associated with a user account allows for the same selected audio output modes to be used later for (e.g., any of) the sets of one or more audio output devices, even while those audio output devices are used with different computer systems associated with the same user account, and avoids requiring the user to select those audio output modes again when resuming use of a respective set of audio output devices or when using a different set of audio output devices also associated with the same user account, which reduces the number of inputs needed to perform the operation.

In some embodiments, while displaying a settings user interface, the computer system detects (1054) an input directed to a first respective user interface element for enabling or disabling a spatial audio output mode with respect to all applications (or in some embodiments a plurality of applications), installed on the computer system, capable of causing output of audio information in accordance with the spatial audio output mode (e.g., a user can globally disable the use of a spatial audio output mode). In some such embodiments, in response to the input directed to the first respective user interface element: in accordance with a determination that the input corresponds to a request to disable spatial audio (e.g., an input directed to the first respective user interface element while the first respective user interface element indicates that the spatial audio output mode is enabled) (e.g., for one or more, or a plurality, or any, or all, applications installed on the computer system and capable of causing output of audio information in accordance with the spatial audio output mode), the computer system disables the spatial audio output mode with respect to all applications, installed on the computer system, capable of causing output of audio information in accordance with the spatial audio output mode; and, in accordance with a determination that input corresponds to a request to enable spatial audio (e.g., an input directed to the first respective user interface element while the first respective user interface element indicates that the spatial audio output mode is disabled) (e.g., for one or more, or a plurality, or any, or all, applications installed on the computer system and capable of causing output of audio information in accordance with the spatial audio output mode), the computer system makes the spatial audio output mode available to all applications, installed on the computer system, capable of causing output of audio information in accordance with the spatial audio output mode. For example, as described herein with reference to FIGS. 9AL-9AM, an input directed to spatial audio global toggle 982, while in the disabled state, enables the use of spatial audio globally for applications on device 100, and an input directed to spatial audio global toggle 982, while in the enabled state, disables the use of spatial audio globally for applications on device 100. Providing a user interface element that is activatable to enable the spatial audio output mode with respect to all applications installed on the computer system and capable of causing output of audio information in accordance with the spatial audio output mode, or to disable the spatial audio output mode with respect to all applications installed on the computer system (e.g., and capable of causing output of audio information in accordance with the spatial audio output mode) avoids requiring the user to enable or disable the spatial audio output mode with respect to each application individually, which reduces the number of inputs required to perform the operation.

In some embodiments, the computer system displays (1056) a settings user interface that concurrently displays: a first set of one or more controls for enabling or disabling use of a spatial audio output mode for the first application; and a second set of one or more controls for enabling or disabling use of the spatial audio output mode for the second application (e.g., a toggle or other dual-state affordance is displayed in conjunction with an identifier for each concurrently listed application). In some such embodiments, while displaying the settings user interface, the computer system receives an input. In some such embodiments, in accordance with a determination that the input is directed to the first set of one or more controls: in accordance with a determination that the input corresponds to a request to disable spatial audio for the first application (e.g., an input directed to the first set of one or more controls while use of the spatial audio output mode is enabled for the first application), the computer system disables use of the spatial audio output mode for the first application (e.g., making the spatial audio output mode unavailable to the first application); and, in accordance with a determination that the input corresponds to a request to enable spatial audio for the first application (e.g., an input directed to the first set of one or more controls while use of the spatial audio output mode is disabled for the first application), the computer system enables use of the spatial audio output mode for the first application (e.g., making the spatial audio output mode available to the first application). In some such embodiments, in accordance with a determination that the input is directed to the second set of one or more controls: in accordance with a determination that the input corresponds to a request to disable spatial audio for the second application (e.g., an input directed to the second set of one or more controls while use of the spatial audio output mode is enabled for the second application), the computer system disables use of the spatial audio output mode for the second application (e.g., making the spatial audio output mode unavailable to the second application); and, in accordance with a determination that the input corresponds to a request to enable spatial audio for the second application (e.g., an input directed to the second set of one or more controls while use of the spatial audio output mode is disabled for the second application), the computer system enables use of the spatial audio output mode for the second application (e.g., making the spatial audio output mode available to the second application). For example, as described herein with reference to FIG. 9AM, an input directed to an individual application's spatial audio toggle (e.g., toggle 986, 987, 988, or 989), while the toggle is in the disabled state, enables the use of spatial audio for that application, and an input directed to an individual application's spatial audio toggle, while the toggle is in the enabled state, disables the use of spatial audio for that application. In some embodiments, the settings user interface includes a first user interface element for indicating (e.g., and for enabling/disabling or changing) an audio output mode (previously selected) for the first application; and a second user interface element for indicating (e.g., and for enabling/disabling or changing) an audio output mode (previously selected) for the second application. Providing, in a same settings user interface, different respective sets of controls that are activatable to enable the spatial audio output mode with respect to different applications individually avoids requiring the user to navigate through numerous settings user interfaces and/or complex settings menu hierarchies to enable or disable the spatial audio output mode with respect to each application separately, which reduces the number of inputs required to perform the operation.

In some embodiments, while displaying a settings user interface, the computer system detects (1058) an input directed to a second respective user interface element for enabling or disabling a spatialized stereo audio output mode with respect to a plurality of (e.g., all) applications, installed on the computer system, capable of causing output of audio information in accordance with the spatialized stereo audio output mode (e.g., a user can globally disable the use of a spatialized stereo audio output mode, for example using a toggle or other dual-state affordance). In some such embodiments, in response to the input directed to the second respective user interface element: in accordance with a determination that the input corresponds to a request to disable spatialized stereo audio (e.g., an input directed to the second respective user interface element while the second respective user interface element indicates that the spatialized stereo audio output mode is enabled) (e.g., for one or more, or a plurality, or any, or all, applications installed on the computer system and capable of causing output of audio information in accordance with the spatialized stereo audio output mode), the computer system disables the spatialized stereo audio output mode with respect to all applications, installed on the computer system, capable of causing output of audio information in accordance with the spatialized stereo audio output mode; and, in accordance with a determination that the input corresponds to a request to enable spatialized stereo audio (e.g., an input directed to the second respective user interface element while the second respective user interface element indicates that the spatialized stereo audio output mode is disabled) (e.g., for one or more, or a plurality, or any, or all, applications installed on the computer system and capable of causing output of audio information in accordance with the spatialized stereo audio output mode), the computer system makes the spatialized stereo audio output mode available to all applications, installed on the computer system, capable of causing output of audio information in accordance with the spatialized stereo audio output mode. For example, as described herein with reference to FIGS. 9AL-9AM, an input directed to spatialized stereo audio global toggle 984, while in the disabled state, enables the use of spatialized stereo audio globally for applications on device 100, and an input directed to spatialized stereo audio global toggle 984, while in the enabled state, disables the use of spatialized stereo audio globally for applications on device 100. Providing a user interface element that is activatable to enable the spatialized stereo audio output mode with respect to all applications installed on the computer system and capable of causing output of audio information in accordance with the spatialized stereo audio output mode, or to disable the spatialized stereo audio output mode with respect to all applications installed on the computer system (e.g., and capable of causing output of audio information in accordance with the spatialized stereo audio output mode) avoids requiring the user to enable or disable the spatialized stereo audio output mode with respect to each application individually, which reduces the number of inputs required to perform the operation.

In some embodiments, the computer system displays (1060) a settings user interface that concurrently displays: a first user interface element for enabling or disabling use of a spatialized stereo audio output mode for the first application; and a second user interface element for enabling or disabling use of the spatialized stereo audio output mode for the second application (e.g., a toggle or other dual-state affordance is displayed in conjunction with an identifier for each concurrently listed application). In some such embodiments, while displaying the settings user interface, the computer system receives an input. In some such embodiments, in accordance with a determination that the input is directed to the first user interface element: in accordance with a determination that the input corresponds to a request to disable spatialized stereo audio for the first application (e.g., an input directed to the first user interface element while use of the spatialized stereo audio output mode is enabled for the first application), the computer system disables use of the spatialized stereo audio output mode for the first application; and, in accordance with a determination that the input corresponds to a request to enable spatialized stereo audio for the first application (e.g., an input directed to the first user interface element while use of the spatialized stereo audio output mode is disabled for the first application), the computer system enables use of the spatialized stereo audio output mode for the first application (e.g., making the spatialized stereo audio output mode available to the first application). In some such embodiments, in accordance with a determination that the input is directed to the second user interface element: in accordance with a determination that the input corresponds to a request to disable spatialized stereo audio for the second application (e.g., an input directed to the second user interface element while use of the spatialized stereo audio output mode is enabled for the second application), the computer system disables use of the spatialized stereo audio output mode for the second application; and, in accordance with a determination that the input corresponds to a request to enable spatialized stereo audio for the second application (e.g., an input directed to the second user interface element while use of the spatialized stereo audio output mode is disabled for the second application), the computer system enables use of the spatialized stereo audio output mode for the second application (e.g., making the spatialized stereo audio output mode available to the second application). For example, as described herein with reference to FIG. 9AM, an input directed to an individual application's spatialized stereo audio toggle (e.g., toggle 990, 991, 992, or 993), while the toggle is in the disabled state, enables the use of spatialized stereo audio for that application, and an input directed to an individual application's spatialized stereo audio toggle, while the toggle is in the enabled state, disables the use of spatialized stereo audio for that application. Providing, in a same settings user interface, different respective sets of controls that are activatable to enable the spatialized stereo audio output mode with respect to different applications individually avoids requiring the user to navigate through numerous settings user interfaces and/or complex settings menu hierarchies to enable or disable the spatialized stereo audio output mode with respect to each application separately, which reduces the number of inputs required to perform the operation.

It should be understood that the particular order in which the operations in FIGS. 10A-10H have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 800) are also applicable in an analogous manner to method 1000 described above with respect to FIGS. 10A-10H. For example, the user interfaces, user interface elements, audio output devices, audio output modes, inputs, interactions, and animations described above with reference to method 1000 optionally have one or more of the characteristics of the user interfaces, user interface elements, audio output devices, audio output modes, inputs, interactions, and animations described herein with reference to other methods described herein (e.g., methods 700 and 800). For brevity, these details are not repeated here.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten or described as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at an electronic device that is in communication with one or more display devices and one or more input devices:
while displaying, via the one or more display devices, a first user interface of the electronic device, receiving, via the one or more input devices, a sequence of one or more inputs that corresponds to a request to display an audio settings user interface; and
in response to receiving the sequence of one or more inputs, displaying, via the one or more display devices, the audio settings user interface, wherein the audio settings user interface includes a first user interface element that is activatable to change whether a first audio output mode of one or more audio output devices that are in communication with the electronic device is enabled, and displaying the audio settings user interface includes:
in accordance with a determination that the first audio output mode is enabled and that the electronic device is causing respective audio that is configured for output using the first audio output mode to be output using the first audio output mode via one or more audio output devices that are in communication with the electronic device, displaying the first user interface element concurrently with a first visual indication that the first audio output mode is being used; and
in accordance with a determination that the first audio output mode is enabled and that the electronic device is not causing respective audio to be output using the first audio output mode via one or more audio output devices that are in communication with the electronic device, displaying the first user interface element without displaying the first visual indication that the first audio output mode is being used.

2. The method of claim 1, wherein the first visual indication that the first audio output mode is being used is an appearance of the first user interface element.

3. The method of claim 2, wherein:
while displaying the first user interface element concurrently with the first visual indication that the first audio output mode is being used, the appearance of the first user interface element includes a respective animation; and
while displaying the first user interface element without displaying the first visual indication that the first audio output mode is being used, the appearance of the first user interface element does not include the respective animation.

4. The method of claim 1, wherein displaying the audio settings user interface includes, in accordance with a determination that the first audio output mode is not enabled, displaying the first user interface element and displaying a visual indication that the first audio output mode is not enabled.

5. The method of claim 4, wherein the visual indication that the first audio output mode is not enabled is an appearance of the first user interface element that is different from one or more appearances of the first user interface element that are displayed while the first audio output mode is enabled.

6. The method of claim 5, wherein the appearance of the first user interface element while the first audio output mode is not enabled is different, in color, fill and/or shading, from the one or more appearances of the first user interface element that are displayed while the first audio output mode is enabled.

7. The method of claim 1, wherein the audio settings user interface includes a second user interface element indicating a first ambient sound control mode in which the one or more audio output devices are operating.

8. The method of claim 7, including:
detecting a user input that corresponds to activation of the second user interface element; and
in response to detecting the user input that corresponds to the activation of the second user interface element:
ceasing to display the first user interface element that is activatable to change whether the first audio output mode is enabled; and
displaying a user interface element corresponding to the first ambient sound control mode, and a user interface element corresponding to a second ambient sound control mode different from the first ambient sound control mode.

9. The method of claim 1, including:
in accordance with the determination that the first audio output mode is enabled and that the electronic device is not causing respective audio to be output using the first audio output mode via one or more audio output devices that are in communication with the electronic device:
  while outputting second respective audio that is not configured for output using the first audio output mode, outputting the second respective audio using a second audio output mode that is different from the first audio output mode.

10. The method of claim 1, wherein:
the one or more audio output devices include a first wearable audio output component configured to be placed in a respective position relative to a first ear of a user and a second wearable audio output component configured to be placed in the respective position relative to a second ear of the user;
causing the respective audio to be output using the first audio output mode is performed in accordance with a determination that the first wearable audio output component is in the respective position relative to a first ear of a user and that the second wearable audio output component is in the respective position relative to a second ear of the user; and
the method includes, while the first audio output mode is enabled, and while causing the respective audio that is configured for output using the first audio output mode to be output via the one or more audio output devices:
  in accordance with a determination that the first wearable audio output component or the second wearable audio output component is not in the respective position relative to a respective ear of the user, causing the respective audio to be output via the one or more audio output devices using a third audio output mode that is different from the first audio output mode.

11. The method of claim 1, including:
detecting an input activating the first user interface element to change whether the first audio output mode is enabled;
in response to detecting the input activating the first user interface element:
  displaying an indication whether the first audio output mode is enabled.

12. The method of claim 11, including automatically ceasing to display the indication whether the first audio output mode is enabled after occurrence of a predetermined condition.

13. The method of claim 1, wherein the audio settings user interface includes a third user interface element for adjusting a volume of audio output via the one or more audio output devices, and the method includes:
detecting a user input that changes the third user interface element from indicating a first value to indicating a second value different from the first value; and
in response to detecting the user input that changes the third user interface element from indicating the first value to indicating the second value:
  changing the volume of audio output via the one or more audio output devices.

14. The method of claim 1, including:
while the first audio output mode is enabled:
  while causing the respective audio that is configured for output using the first audio output mode to be output using the first audio output mode:
    in accordance with a determination that an electronic device tracking audio output mode is enabled, outputting the respective audio using the first audio output mode includes modifying output of the respective audio based on a current location of the electronic device as the electronic device is moved in a physical environment relative to the one or more audio output devices that are outputting the respective audio; and
    in accordance with a determination that the electronic device tracking audio output mode is disabled, outputting the respective audio using the first audio output mode without modifying the output of the respective audio based on the current location of the electronic device relative to the one or more audio output devices that are outputting the respective audio.

15. The method of claim 1, including:
detecting a user input directed to the first user interface element; and
in response to detecting the user input directed to the first user interface element:
  in accordance with a determination that the user input directed to the first user interface element is detected while the first audio output mode is enabled, disabling the first audio output mode; and
  in accordance with a determination that the user input directed to the first user interface element is detected while the first audio output mode is disabled, enabling the first audio output mode.

16. The method of claim 1, wherein, displaying the audio settings user interface includes displaying the first user interface element in accordance with a determination that the one or more audio output devices that are in communication with the electronic device are capable of outputting audio using the first audio output mode, and the method includes:
while the electronic device is in communication with one or more audio output devices that are not capable of outputting audio using the first audio output mode, and while displaying the audio settings user interface, forgoing displaying the first user interface element.

17. The method of claim 1, wherein audio that is configured for output using the first audio output mode includes one or more of: audio associated with television content, audio associated with movie content, audio associated with video calls, sounds associated with an operating system of the electronic device, audio associated with a virtual assistant, and audio associated with notifications on the electronic device.

18. An electronic device that is in communication with one or more display devices and one or more input devices, the electronic device comprising:
one or more processors; and
memory storing one or more programs, wherein the one or more programs are configured to be executed by the one or more processors, the one or more programs including instructions for:
  while displaying, via the one or more display devices, a first user interface of the electronic device, receiving, via the one or more input devices, a sequence of one or more inputs that corresponds to a request to display an audio settings user interface; and
  in response to receiving the sequence of one or more inputs, displaying, via the one or more display devices, the audio settings user interface, wherein the audio settings user interface includes a first user interface element that is activatable to change whether a first audio output mode of one or more audio output devices that are in communication with the electronic device is enabled, and displaying the audio settings user interface includes:
in accordance with a determination that the first audio output mode is enabled and that the electronic device is causing respective audio that is configured for output using the first audio output mode to be output using the first audio output mode via one or more audio output devices that are in communication with the electronic device, displaying the first user interface element concurrently with a first visual indication that the first audio output mode is being used; and
in accordance with a determination that the first audio output mode is enabled and that the electronic device is not causing respective audio to be output using the first audio output mode via one or more audio output devices that are in communication with the electronic device, displaying the first user interface element without displaying the first visual indication that the first audio output mode is being used.

19. The electronic device of claim 18, wherein the first visual indication that the first audio output mode is being used is an appearance of the first user interface element.

20. The electronic device of claim 19, wherein:
while displaying the first user interface element concurrently with the first visual indication that the first audio output mode is being used, the appearance of the first user interface element includes a respective animation; and
while displaying the first user interface element without displaying the first visual indication that the first audio output mode is being used, the appearance of the first user interface element does not include the respective animation.

21. The electronic device of claim 18, wherein displaying the audio settings user interface includes, in accordance with a determination that the first audio output mode is not enabled, displaying the first user interface element and displaying a visual indication that the first audio output mode is not enabled.

22. The electronic device of claim 21, wherein the visual indication that the first audio output mode is not enabled is an appearance of the first user interface element that is different from one or more appearances of the first user interface element that are displayed while the first audio output mode is enabled.

23. The electronic device of claim 22, wherein the appearance of the first user interface element while the first audio output mode is not enabled is different, in color, fill and/or shading, from the one or more appearances of the first user interface element that are displayed while the first audio output mode is enabled.

24. The electronic device of claim 18, wherein the audio settings user interface includes a second user interface element indicating a first ambient sound control mode in which the one or more audio output devices are operating.

25. The electronic device of claim 24, wherein the one or more programs include instructions for:
detecting a user input that corresponds to activation of the second user interface element; and
in response to detecting the user input that corresponds to the activation of the second user interface element:
ceasing to display the first user interface element that is activatable to change whether the first audio output mode is enabled; and displaying a user interface element corresponding to the first ambient sound control mode, and a user interface element corresponding to a second ambient sound control mode different from the first ambient sound control mode.

26. The electronic device of claim 18, wherein the one or more programs include instructions for:
in accordance with the determination that the first audio output mode is enabled and that the electronic device is not causing respective audio to be output using the first audio output mode via one or more audio output devices that are in communication with the electronic device:
while outputting second respective audio that is not configured for output using the first audio output mode, outputting the second respective audio using a second audio output mode that is different from the first audio output mode.

27. The electronic device of claim 18, wherein:
the one or more audio output devices include a first wearable audio output component configured to be placed in a respective position relative to a first ear of a user and a second wearable audio output component configured to be placed in the respective position relative to a second ear of the user;
causing the respective audio to be output using the first audio output mode is performed in accordance with a determination that the first wearable audio output component is in the respective position relative to a first ear of a user and that the second wearable audio output component is in the respective position relative to a second ear of the user; and
the one or more programs include instructions for, while the first audio output mode is enabled, and while causing the respective audio that is configured for output using the first audio output mode to be output via the one or more audio output devices:
in accordance with a determination that the first wearable audio output component or the second wearable audio output component is not in the respective position relative to a respective ear of the user, causing the respective audio to be output via the one or more audio output devices using a third audio output mode that is different from the first audio output mode.

28. The electronic device of claim 18, wherein the one or more programs include instructions for:
detecting an input activating the first user interface element to change whether the first audio output mode is enabled;
in response to detecting the input activating the first user interface element:
displaying an indication whether the first audio output mode is enabled.

29. The electronic device of claim 28, wherein the one or more programs include instructions for automatically ceasing to display the indication whether the first audio output mode is enabled after occurrence of a predetermined condition.

30. The electronic device of claim 18, wherein the audio settings user interface includes a third user interface element for adjusting a volume of audio output via the one or more audio output devices, and the one or more programs include instructions for:
detecting a user input that changes the third user interface element from indicating a first value to indicating a second value different from the first value; and in response to detecting the user input that changes the third user interface element from indicating the first value to indicating the second value:
changing the volume of audio output via the one or more audio output devices.

31. The electronic device of claim 18, wherein the one or more programs include instructions for:
while the first audio output mode is enabled:
while causing the respective audio that is configured for output using the first audio output mode to be output using the first audio output mode:
in accordance with a determination that an electronic device tracking audio output mode is enabled, outputting the respective audio using the first audio output mode includes modifying output of the respective audio based on a current location of the electronic device as the electronic device is moved in a physical environment relative to the one or more audio output devices that are outputting the respective audio; and
in accordance with a determination that the electronic device tracking audio output mode is disabled, outputting the respective audio using the first audio output mode without modifying the output of the respective audio based on the current location of the electronic device relative to the one or more audio output devices that are outputting the respective audio.

32. The electronic device of claim 18, wherein the one or more programs include instructions for:
detecting a user input directed to the first user interface element; and
in response to detecting the user input directed to the first user interface element:
in accordance with a determination that the user input directed to the first user interface element is detected while the first audio output mode is enabled, disabling the first audio output mode; and
in accordance with a determination that the user input directed to the first user interface element is detected while the first audio output mode is disabled, enabling the first audio output mode.

33. The electronic device of claim 18, wherein displaying the audio settings user interface includes displaying the first user interface element in accordance with a determination that the one or more audio output devices that are in communication with the electronic device are capable of outputting audio using the first audio output mode, and the one or more programs include instructions for:
while the electronic device is in communication with one or more audio output devices that are not capable of outputting audio using the first audio output mode, and while displaying the audio settings user interface, forgoing displaying the first user interface element.

34. The electronic device of claim 18, wherein audio that is configured for output using the first audio output mode includes one or more of: audio associated with television content, audio associated with movie content, audio associated with video calls, sounds associated with an operating system of the electronic device, audio associated with a virtual assistant, and audio associated with notifications on the electronic device.

35. A non-transitory computer readable storage medium storing one or more programs, the one or more programs comprising instructions that, when executed by an electronic device that is in communication with one or more display devices and one or more input devices, cause the electronic device to:
while displaying, via the one or more display devices, a first user interface of the electronic device, receive, via the one or more input devices, a sequence of one or more inputs that corresponds to a request to display an audio settings user interface; and
in response to receiving the sequence of one or more inputs, display, via the one or more display devices, the audio settings user interface, wherein the audio settings user interface includes a first user interface element that is activatable to change whether a first audio output mode of one or more audio output devices that are in communication with the electronic device is enabled, and displaying the audio settings user interface includes:
in accordance with a determination that the first audio output mode is enabled and that the electronic device is causing respective audio that is configured for output using the first audio output mode to be output using the first audio output mode via one or more audio output devices that are in communication with the electronic device, displaying the first user interface element concurrently with a first visual indication that the first audio output mode is being used; and
in accordance with a determination that the first audio output mode is enabled and that the electronic device is not causing respective audio to be output using the first audio output mode via one or more audio output devices that are in communication with the electronic device, displaying the first user interface element without displaying the first visual indication that the first audio output mode is being used.

36. The non-transitory computer readable storage medium of claim 35, wherein the first visual indication that the first audio output mode is being used is an appearance of the first user interface element.

37. The non-transitory computer readable storage medium of claim 36, wherein:
while displaying the first user interface element concurrently with the first visual indication that the first audio output mode is being used, the appearance of the first user interface element includes a respective animation; and
while displaying the first user interface element without displaying the first visual indication that the first audio output mode is being used, the appearance of the first user interface element does not include the respective animation.

38. The non-transitory computer readable storage medium of claim 35, wherein displaying the audio settings user interface includes, in accordance with a determination that the first audio output mode is not enabled, displaying the first user interface element and displaying a visual indication that the first audio output mode is not enabled.

39. The non-transitory computer readable storage medium of claim 38, wherein the visual indication that the first audio output mode is not enabled is an appearance of the first user interface element that is different from one or more appearances of the first user interface element that are displayed while the first audio output mode is enabled.

40. The non-transitory computer readable storage medium of claim 39, wherein the appearance of the first user interface element while the first audio output mode is not enabled is different, in color, fill and/or shading, from the one or more appearances of the first user interface element that are displayed while the first audio output mode is enabled.

41. The non-transitory computer readable storage medium of claim 35, wherein the audio settings user interface includes a second user interface element indicating a first ambient sound control mode in which the one or more audio output devices are operating.

42. The non-transitory computer readable storage medium of claim 41, wherein the one or more programs comprise instructions that when executed by the electronic device cause the electronic device to:
- detect a user input that corresponds to activation of the second user interface element; and
- in response to detecting the user input that corresponds to the activation of the second user interface element:
  - cease to display the first user interface element that is activatable to change whether the first audio output mode is enabled; and
  - display a user interface element corresponding to the first ambient sound control mode, and a user interface element corresponding to a second ambient sound control mode different from the first ambient sound control mode.

43. The non-transitory computer readable storage medium of claim 35, wherein the one or more programs comprise instructions that when executed by the electronic device cause the electronic device to:
- in accordance with the determination that the first audio output mode is enabled and that the electronic device is not causing respective audio to be output using the first audio output mode via one or more audio output devices that are in communication with the electronic device:
  - while outputting second respective audio that is not configured for output using the first audio output mode, output the second respective audio using a second audio output mode that is different from the first audio output mode.

44. The non-transitory computer readable storage medium of claim 35, wherein:
- the one or more audio output devices include a first wearable audio output component configured to be placed in a respective position relative to a first ear of a user and a second wearable audio output component configured to be placed in the respective position relative to a second ear of the user;
- causing the respective audio to be output using the first audio output mode is performed in accordance with a determination that the first wearable audio output component is in the respective position relative to a first ear of a user and that the second wearable audio output component is in the respective position relative to a second ear of the user; and
- the one or more programs comprise instructions that when executed by the electronic device cause the electronic device to, while the first audio output mode is enabled, and while causing the respective audio that is configured for output using the first audio output mode to be output via the one or more audio output devices:
  - in accordance with a determination that the first wearable audio output component or the second wearable audio output component is not in the respective position relative to a respective ear of the user, cause the respective audio to be output via the one or more audio output devices using a third audio output mode that is different from the first audio output mode.

45. The non-transitory computer readable storage medium of claim 35, wherein the one or more programs comprise instructions that when executed by the electronic device cause the electronic device to:
- detect an input activating the first user interface element to change whether the first audio output mode is enabled;
- in response to detecting the input activating the first user interface element:
  - display an indication whether the first audio output mode is enabled.

46. The non-transitory computer readable storage medium of claim 45, wherein the one or more programs comprise instructions that when executed by the electronic device cause the electronic device to automatically cease to display the indication whether the first audio output mode is enabled after occurrence of a predetermined condition.

47. The non-transitory computer readable storage medium of claim 35, wherein the audio settings user interface includes a third user interface element for adjusting a volume of audio output via the one or more audio output devices, and wherein the one or more programs comprise instructions that when executed by the electronic device cause the electronic device to:
- detect a user input that changes the third user interface element from indicating a first value to indicating a second value different from the first value; and
- in response to detecting the user input that changes the third user interface element from indicating the first value to indicating the second value:
  - change the volume of audio output via the one or more audio output devices.

48. The non-transitory computer readable storage medium of claim 35, wherein the one or more programs comprise instructions that when executed by the electronic device cause the electronic device to:
- while the first audio output mode is enabled:
  - while causing the respective audio that is configured for output using the first audio output mode to be output using the first audio output mode:
    - in accordance with a determination that an electronic device tracking audio output mode is enabled, output the respective audio using the first audio output mode includes modifying output of the respective audio based on a current location of the electronic device as the electronic device is moved in a physical environment relative to the one or more audio output devices that are outputting the respective audio; and
    - in accordance with a determination that the electronic device tracking audio output mode is disabled, output the respective audio using the first audio output mode without modifying the output of the respective audio based on the current location of the electronic device relative to the one or more audio output devices that are outputting the respective audio.

49. The non-transitory computer readable storage medium of claim 35, wherein the one or more programs comprise instructions that when executed by the electronic device cause the electronic device to:
- detect a user input directed to the first user interface element; and
- in response to detecting the user input directed to the first user interface element:
  - in accordance with a determination that the user input directed to the first user interface element is detected while the first audio output mode is enabled, disable the first audio output mode; and in accordance with a determination that the user input directed to the first user interface element is detected while the first audio output mode is disabled, enable the first audio output mode.

50. The non-transitory computer readable storage medium of claim 35, wherein displaying the audio settings user interface includes displaying the first user interface element in accordance with a determination that the one or more audio output devices that are in communication with the electronic device are capable of outputting audio using the first audio output mode, and wherein the one or more programs comprise instructions that when executed by the electronic device cause the electronic device to:

while the electronic device is in communication with one or more audio output devices that are not capable of outputting audio using the first audio output mode, and while displaying the audio settings user interface, forgo displaying the first user interface element.

51. The non-transitory computer readable storage medium of claim 35, wherein audio that is configured for output using the first audio output mode includes one or more of: audio associated with television content, audio associated with movie content, audio associated with video calls, sounds associated with an operating system of the electronic device, audio associated with a virtual assistant, and audio associated with notifications on the electronic device.

* * * * *